(12) United States Patent
Devoe et al.

(10) Patent No.: US 8,470,493 B2
(45) Date of Patent: Jun. 25, 2013

(54) FUEL CELL DEVICE AND SYSTEM

(76) Inventors: Alan Devoe, La Jolla, CA (US);
Lambert Devoe, San Diego, CA (US)

( * ) Notice: Subject to any disclaimer, the term of this patent is extended or adjusted under 35 U.S.C. 154(b) by 663 days.

(21) Appl. No.: 12/607,384

(22) Filed: Oct. 28, 2009

(65) Prior Publication Data

US 2010/0104910 A1    Apr. 29, 2010

Related U.S. Application Data

(60) Provisional application No. 61/109,107, filed on Oct. 28, 2008.

(51) Int. Cl.
*H01M 8/10* (2006.01)
*H01M 8/24* (2006.01)
*H01M 8/04* (2006.01)

(52) U.S. Cl.
USPC .................... 429/481; 429/465; 429/433

(58) Field of Classification Search
USPC .......................... 429/433, 465, 481
See application file for complete search history.

(56) References Cited

U.S. PATENT DOCUMENTS

| | | |
|---|---|---|
| 3,120,456 A | 2/1964 | Broers |
| 4,395,468 A | 7/1983 | Isenberg |
| 4,413,041 A | 11/1983 | Hegedus |
| 4,414,337 A | 11/1983 | Ichikawa et al. |
| 4,490,444 A | 12/1984 | Isenberg |
| 4,808,491 A | 2/1989 | Reichner |
| 4,913,982 A | 4/1990 | Kotchick et al. |
| 4,943,494 A | 7/1990 | Riley |
| 5,034,288 A | 7/1991 | Bossel |

(Continued)

FOREIGN PATENT DOCUMENTS

| | | |
|---|---|---|
| DE | 10117985 | 10/2002 |
| EP | 0321069 | 6/1989 |

(Continued)

OTHER PUBLICATIONS

European Patent Office, Invitation Search Report and Written Opinion received in corresponding International Application No. PCT/US2009/062335 dated Feb. 15, 2010, 10 pp.

(Continued)

*Primary Examiner* — Karie O'Neill Apicella
(74) *Attorney, Agent, or Firm* — Wood, Herron & Evans, LLP

(57) ABSTRACT

Fuel cell devices and systems are provided. In certain embodiments, the devices include a ceramic support structure having a length, a width, and a thickness with the length direction being the dominant direction of thermal expansion. A reaction zone having at least one active layer therein is spaced from the first end and includes first and second opposing electrodes, associated active first and second gas passages, and electrolyte. The active first gas passage includes sub-passages extending in the y direction and spaced apart in the x direction. An artery flow passage extends from the first end along the length and into the reaction zone and is fluidicly coupled to the sub-passages of the active first gas passage. The thickness of the artery flow passage is greater than the thickness of the sub-passages. In other embodiments, fuel cell devices include second sub-passages for the active second gas passage and a second artery flow passage coupled thereto, and extending from either the first end or the second end into the reaction zone. In yet other embodiments, one or both electrodes of a fuel cell device are segmented.

43 Claims, 105 Drawing Sheets

U.S. PATENT DOCUMENTS

| | | | |
|---|---|---|---|
| 5,185,219 | A | 2/1993 | Ishihara et al. |
| 5,380,601 | A | 1/1995 | Jaspers et al. |
| 5,770,326 | A | 6/1998 | Limaye |
| 6,007,932 | A | 12/1999 | Steyn |
| 6,291,089 | B1 | 9/2001 | Piascik et al. |
| 6,444,339 | B1 | 9/2002 | Eshraghi |
| 6,458,477 | B1 | 10/2002 | Hsu |
| 6,767,662 | B2 | 7/2004 | Jacobson et al. |
| 6,841,284 | B2 | 1/2005 | Brown et al. |
| 6,846,511 | B2 | 1/2005 | Visco et al. |
| 6,949,307 | B2 | 9/2005 | Cable et al. |
| 2001/0044043 | A1 | 11/2001 | Badding et al. |
| 2002/0018924 | A1 | 2/2002 | Saito et al. |
| 2002/0102450 | A1 | 8/2002 | Badding et al. |
| 2002/0146523 | A1 | 10/2002 | Devoe et al. |
| 2002/0146611 | A1 | 10/2002 | Kawasaki et al. |
| 2003/0013046 | A1 | 1/2003 | Fonash et al. |
| 2003/0235745 | A1 | 12/2003 | Mook et al. |
| 2004/0067404 | A1 | 4/2004 | Lazaroff et al. |
| 2004/0081878 | A1 | 4/2004 | Mardilovich et al. |
| 2004/0086767 | A1 | 5/2004 | Lazaroff et al. |
| 2004/0110054 | A1 | 6/2004 | Bourgeois et al. |
| 2004/0183055 | A1 | 9/2004 | Chartier et al. |
| 2004/0185318 | A1 | 9/2004 | Novak |
| 2004/0185321 | A1 | 9/2004 | Sutherland et al. |
| 2004/0247972 | A1 | 12/2004 | Kendall et al. |
| 2004/0258972 | A1 | 12/2004 | Du et al. |
| 2005/0000621 | A1 | 1/2005 | Devoe et al. |
| 2005/0116190 | A1 | 6/2005 | Adams et al. |
| 2005/0208363 | A1 | 9/2005 | Taylor et al. |
| 2006/0003213 | A1 | 1/2006 | Ketcham et al. |
| 2006/0035130 | A1 | 2/2006 | Noda et al. |
| 2006/0175194 | A1 | 8/2006 | Bagby et al. |
| 2007/0104991 | A1* | 5/2007 | Devoe et al. ............ 429/30 |
| 2007/0105003 | A1 | 5/2007 | Devoe et al. |
| 2007/0264542 | A1 | 11/2007 | Devoe et al. |
| 2008/0233462 | A1 | 9/2008 | Curello et al. |
| 2008/0289180 | A1 | 11/2008 | Brantley et al. |
| 2009/0226781 | A1 | 9/2009 | Devoe et al. |

FOREIGN PATENT DOCUMENTS

| | | |
|---|---|---|
| EP | 0387643 | 9/1990 |
| EP | 0442742 | 8/1991 |
| EP | 0756347 | 1/1997 |
| EP | 1333519 | 8/2003 |
| EP | 1445817 | 8/2004 |
| EP | 1447871 A1 | 8/2004 |
| EP | 1612876 | 1/2006 |
| EP | 1650821 | 4/2006 |
| FR | 2877496 | 5/2006 |
| JP | 01320778 | 12/1989 |
| JP | 02075167 | 3/1990 |
| JP | 08050914 | 2/1996 |
| JP | 10189017 | 7/1998 |
| JP | 2000164239 | 6/2000 |
| JP | 2004030972 | 1/2004 |
| JP | 2004134323 | 4/2004 |
| JP | 2004152645 | 5/2004 |
| WO | 9422178 | 9/1994 |
| WO | 0124300 A1 | 4/2001 |
| WO | 0225763 | 3/2002 |
| WO | 03001624 | 1/2003 |
| WO | 03005462 | 1/2003 |
| WO | 03036746 | 5/2003 |
| WO | 03/081703 A2 | 10/2003 |
| WO | 03096469 | 11/2003 |
| WO | 2004082050 A1 | 9/2004 |
| WO | 2006048573 A1 | 5/2006 |
| WO | 2007005767 A1 | 1/2007 |
| WO | 2007056518 A2 | 5/2007 |
| WO | 2007134209 A2 | 11/2007 |
| WO | 2009062127 A2 | 5/2009 |
| WO | 2009111771 A1 | 9/2009 |

OTHER PUBLICATIONS

U.S. Patent and Trademark Office, Non-final Office Action issued in related U.S. Appl. No. 11/557,901 dated Mar. 29, 2010, 25 pp.

European Patent Office, International Search Report and Writen Opinion received in corresponding International Application No. PCT/US2009/062335 dated May 6, 2010, 28 pp.

European Patent Office, Search Report and Written Opinion issued in corresponding International Application No. PCT/US2010/0568860 dated Jun. 8, 2011, 17 pp.

U.S. Patent and Trademark Office, Non-final Office Action issued in related U.S. Appl. No. 11/557,934 dated Jun. 21, 2010, 25 pp.

U.S. Patent and Trademark Office, Non-final Office Action issued in related U.S. Appl. No. 11/864,961 dated Sep. 13, 2010, 17 pp.

Siemens, Siemens Power Generation: Next Generation SOFC, www.powergeneration.siemens.com/en/fuelcells/seca/index.cfm?session=1142501x39517655, 2 pp., 2007.

SOFCo-EFS Fuel Cell and Fuel Processor Solutions, Solid Oxide Fuel Cell Technology and SOFCo-EFS, www.sofco-efs.com/technology/sofctech/, 2 pp., Aug. 28, 2005.

Fuel Cell Energy, Timeline, www.fce.com/site/products/sofc/timeline1.html and www.fce.com/site/products/sofc/timeline2.html, 4 pp.

Ben Wiens Energy Science, Solid Oxide Fuel Cell (SOFC), The Future of Fuel Cells, www.benwiens.com/energy4.html, 2 pp., Aug. 28, 2005.

Ceramic Fuel Cells Limited, CFCL's Stack Design, www.cfcl.com.au/html/p_stack_design.htm, 3 pp., Aug. 28, 2005.

Miwa, Taiichiro et al., Japan-Finland Cooperation in Technological Research & Development: R&D Status of Fuel Cell in Japan, Jun. 15, 2005, 19 pp., DIA Research Martech Inc., Espoo, Finland.

Norrick, Dan, 10kWe SOFC Power System Commercialization Program Progress, SECA Annual Workshop, Pacific Grove, CA, Apr. 20, 2005, 67 pp., Cummins Power Generation.

Shaffer, Steven, Development Update on Delphi's Solid Oxide Fuel Cell System, 2005 SECA Review Meeting, Pacific Grove, CA, Apr. 20, 2005, 41 pp., Delphi.

FuelCell Energy, Inc. et al., Thermally Integrated High Power Density SOFC Generator, SECA Annual Meeting, Pacific Grove, CA, Apr. 18-21, 2005, 42 pp., Distributed Energy Corporation.

GE Hybrid Power Generation Systems, SECA Solid Oxide Fuel Cell Program, Sixth SECA Annual Workshop, Pacific Grove, CA, Apr. 18-21, 2005, 28 pp., GE Energy.

Vora, S.D., SECA Program at Siemens Westinghouse, Sixth Annual SECA Workshop, Pacific Grove, CA, Apr. 18, 2005, 44 pp., Siemens Westinghouse Power Corporation.

Acumentrics Corporation, How Acumentrics Fuel Cells Work, 2004, 12 pp.

Tokyo Gas Co., Ltd, Environmental Affairs Dept, Environmental Report 2004, Environmental Technology Development, Measures Taken Within the Tokyo Gas Group, pp. 28-29, Tokyo, Japan.

Vora, Shailesh D., Small-Scale Low-Cost Solid Oxide Fuel Cell Power Systems, Office of Fossil Energy Fuel Cell Program, FY 2004 Annual Report, pp. 33-35.

Zurich University of Applied Sciences, HEXIS Co-Generation System, Nov. 8-9, 2004, 2 pp., Berlin.

Bessette, Norman, Status of the Acumentrics SOFC Program, SEC Annual Workshop, Boston, MA, May 11, 2004, 47 pp., Acumentrics Corporation.

Subhash C. Singhal et al., High Temperature Solid Oxide Fuel Cells: Fundamentals, Design and Applications, Chapter 1, Introduction to SOFCs, 2003, pp. 1-22.

Subhash C. Singhal et al., High Temperature Solid Oxide Fuel Cells: Fundamentals, Design and Applications, Chapter 2, History, 2003, pp. 23-51.

Subhash C. Singhal et al., High Temperature Solid Oxide Fuel Cells: Fundamentals, Design and Applications, Chapter 8, Cell and Stack Designs, 2003, pp. 197-228.

Kyocera Corporation, 1kW Solid Oxide Fuel Cell (SOFC) for Small-Scale Power Generation: World's Highest Efficiency for 1kW Class Power Generation, News Release, http://global.kyocera.com/news/2003/1205.html, Dec. 18, 2003, 4 pp.

Talbot, David, Flying the Efficient Skies, Technology Review, www.technologyreview.com/articles/03/06innovation80603.0.asp, Jun. 2003, 1 pp.

De Guire, Eileen J., Solid Oxide Fuel Cells, Internet article, www.csa.com/hottopics/fuecel/overview.php, CSA Illumina, Apr. 2003, 8 pp.

Lawrence Livermore National Laboratory, Solid-Oxide Fuel Cells Stack Up to Efficient, Clean Power, S&TR, Research Highlights, Sep. 2002, 3 pp.

European Patent Office, Invitation to Pay Additional Fees with Partial International Search Report issued in corresponding International Application No. PCT/US2010/056860, dated Jan. 18, 2011, 6 pp.

* cited by examiner

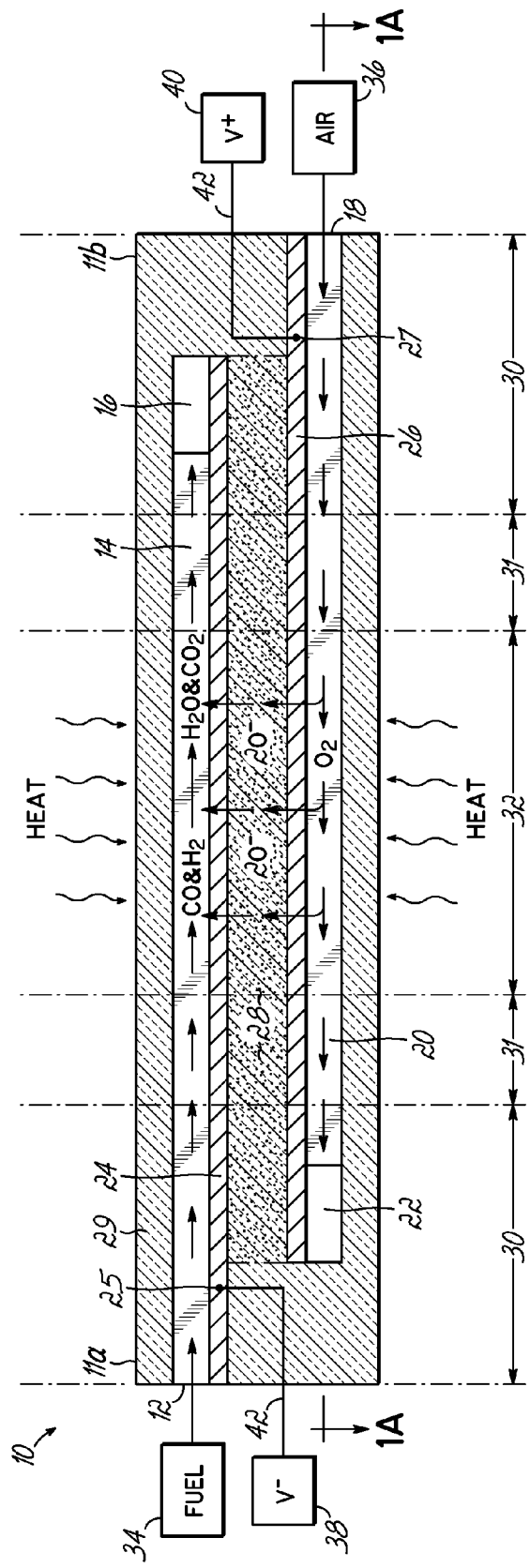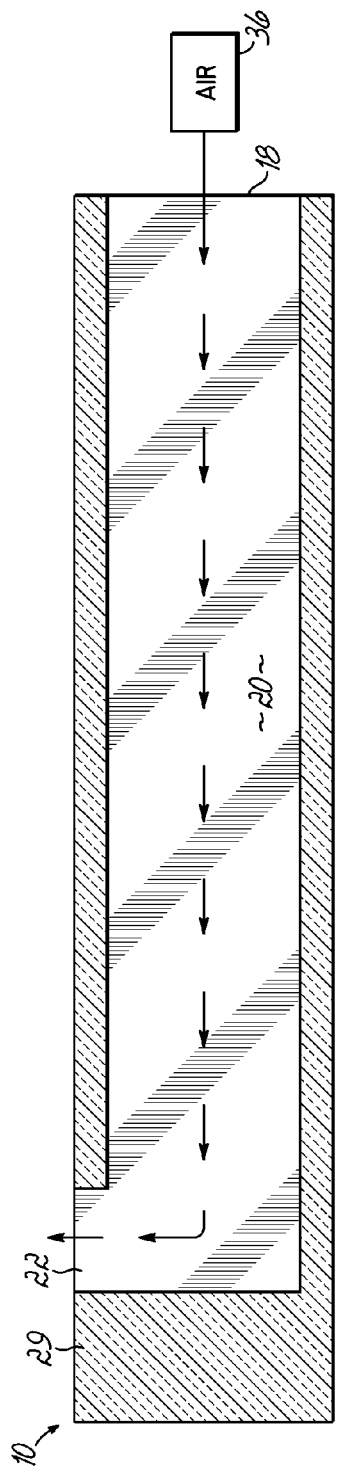

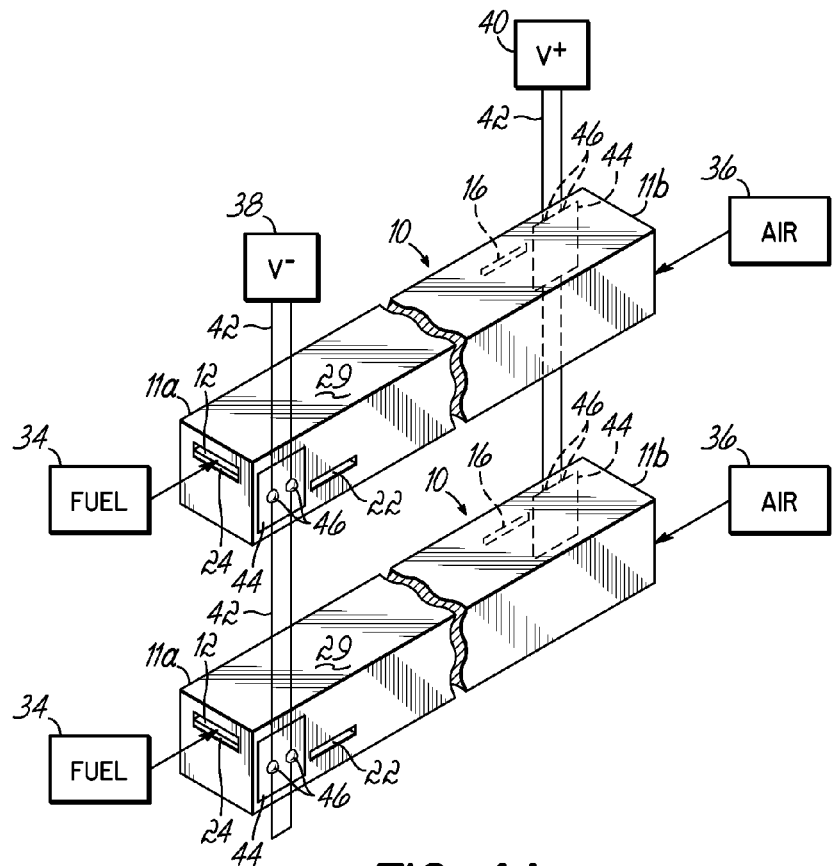
FIG. 4A
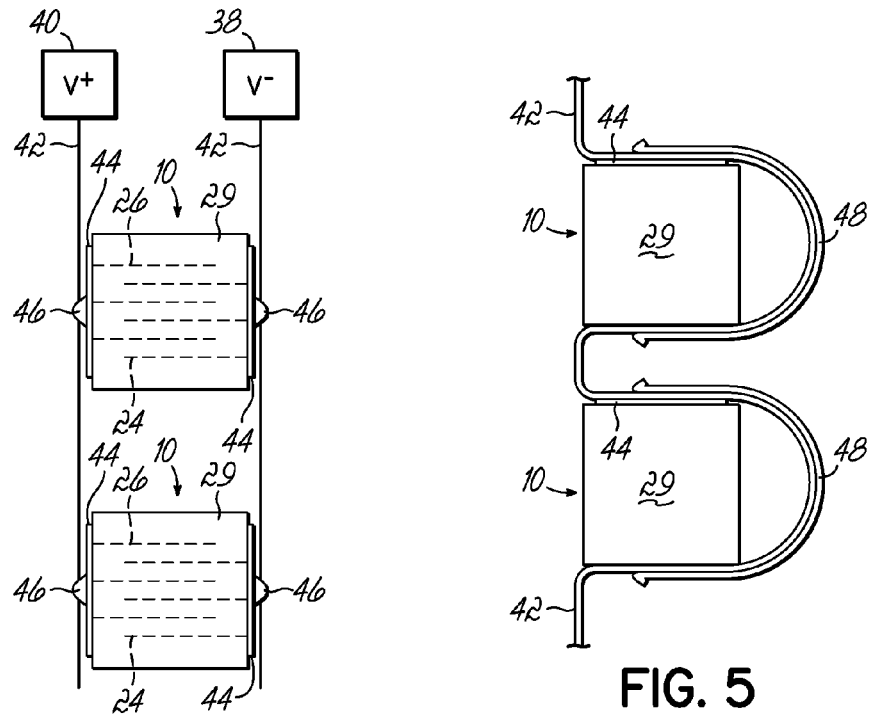
FIG. 4B
FIG. 5

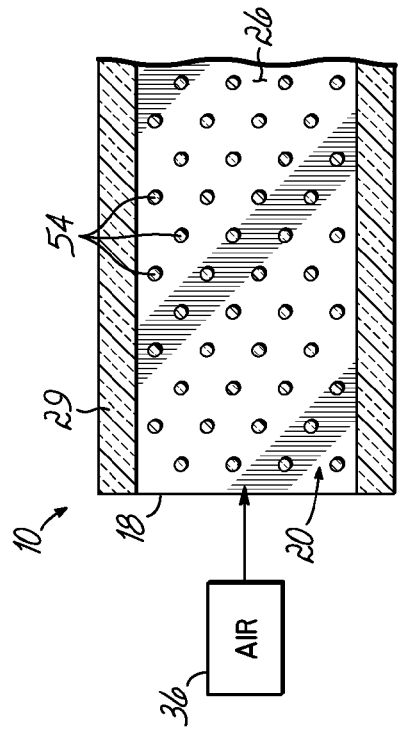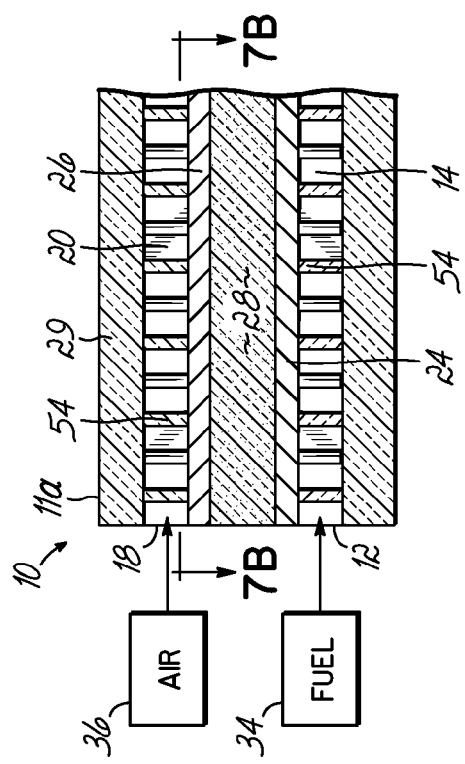

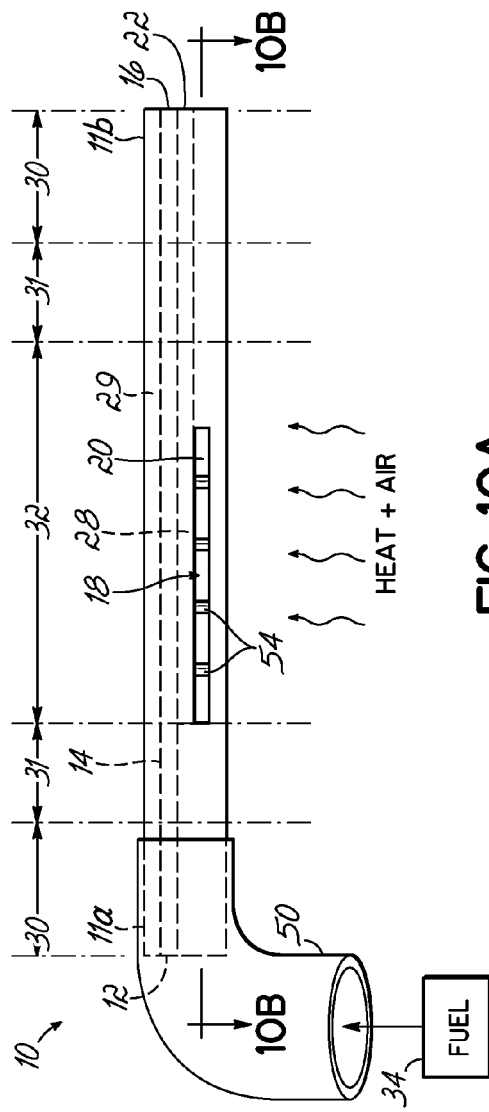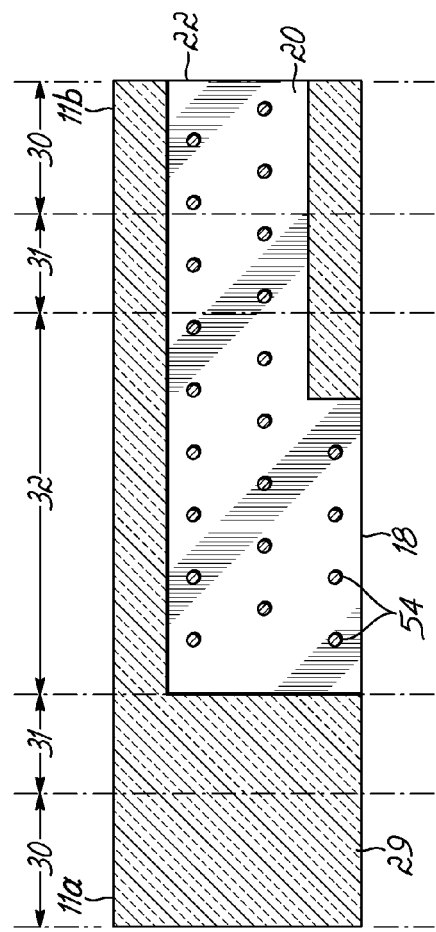

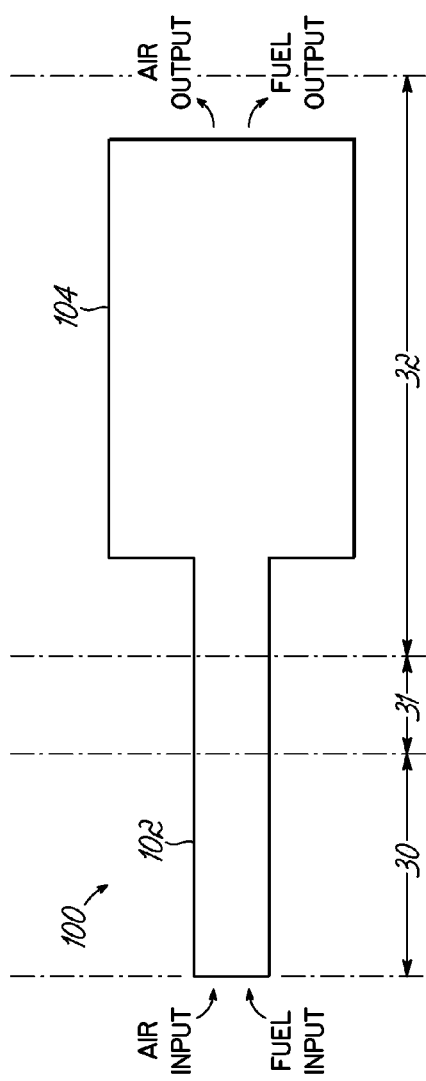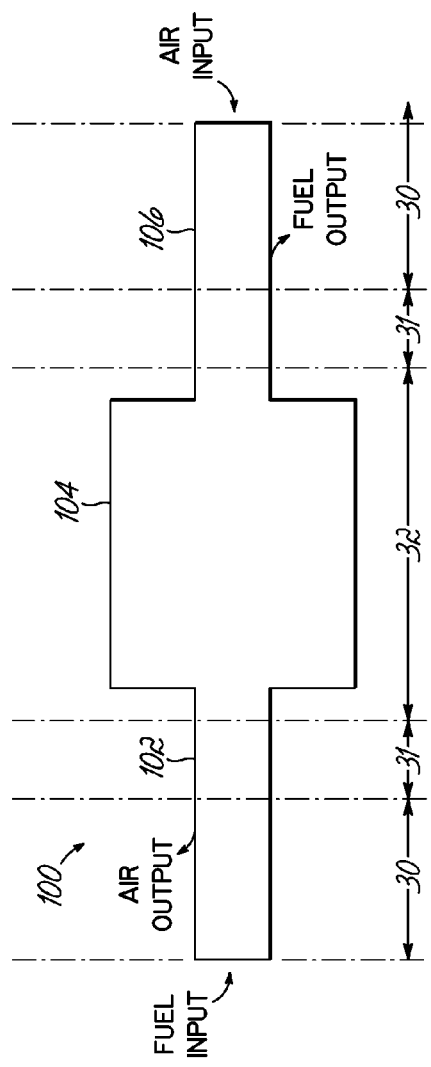

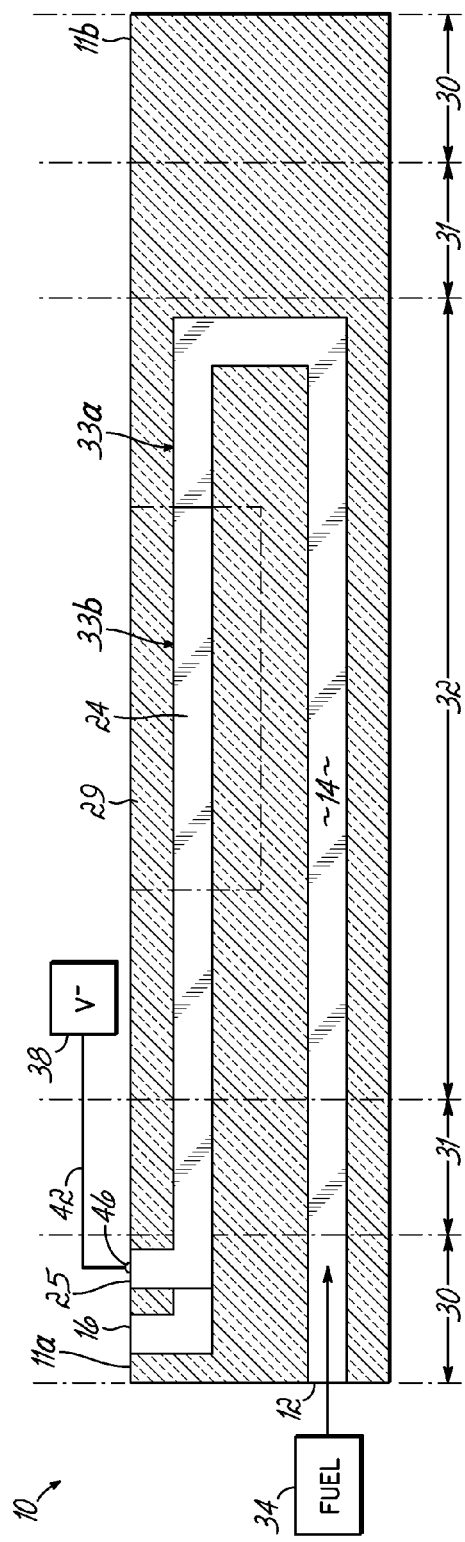
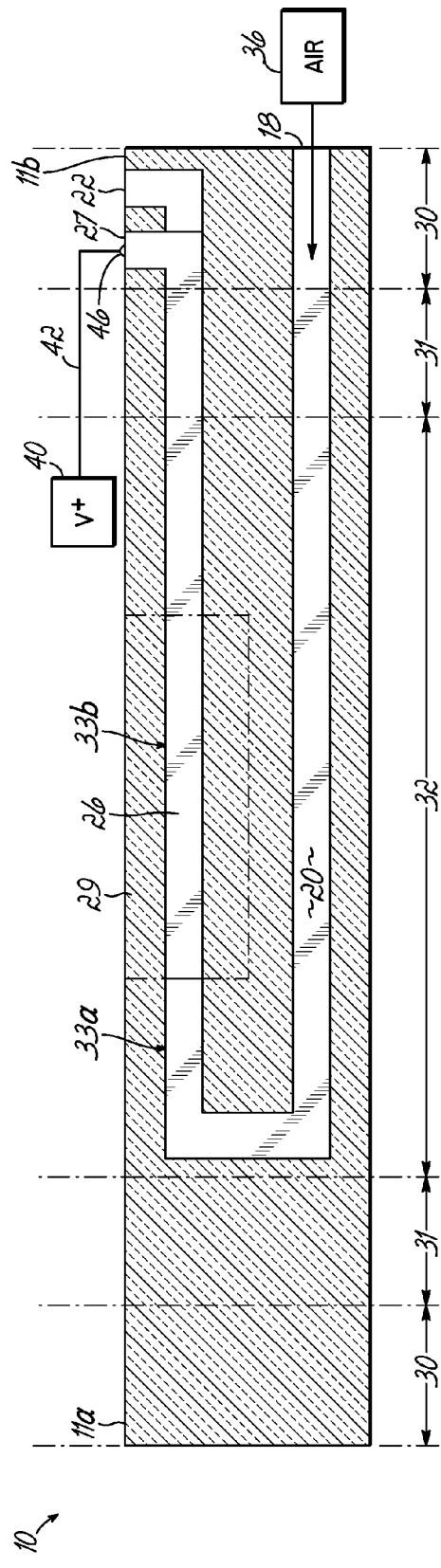
FIG. 33B
FIG. 33C

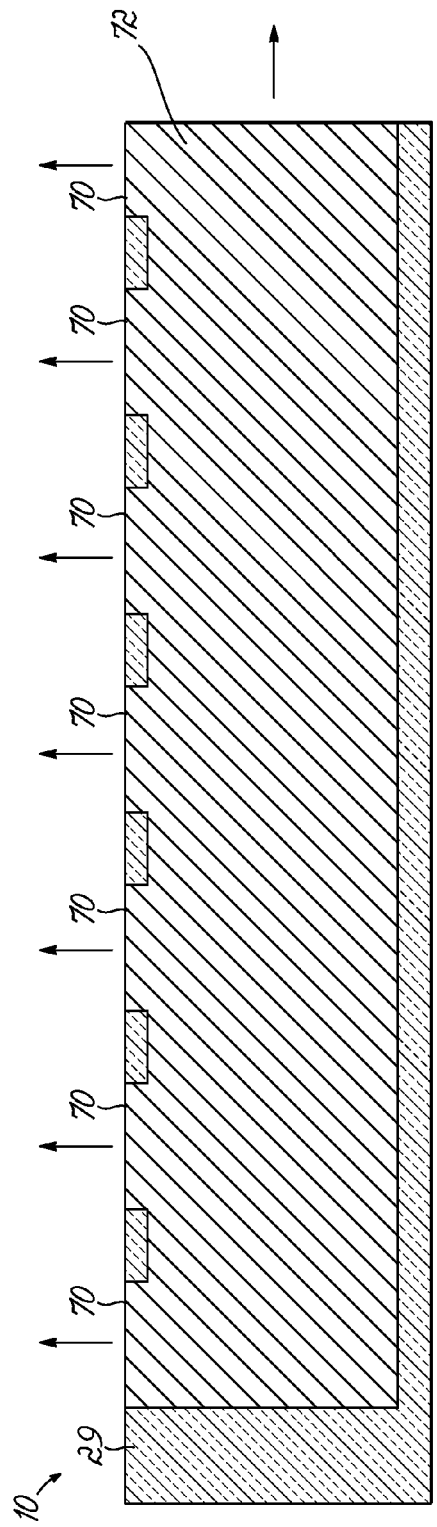
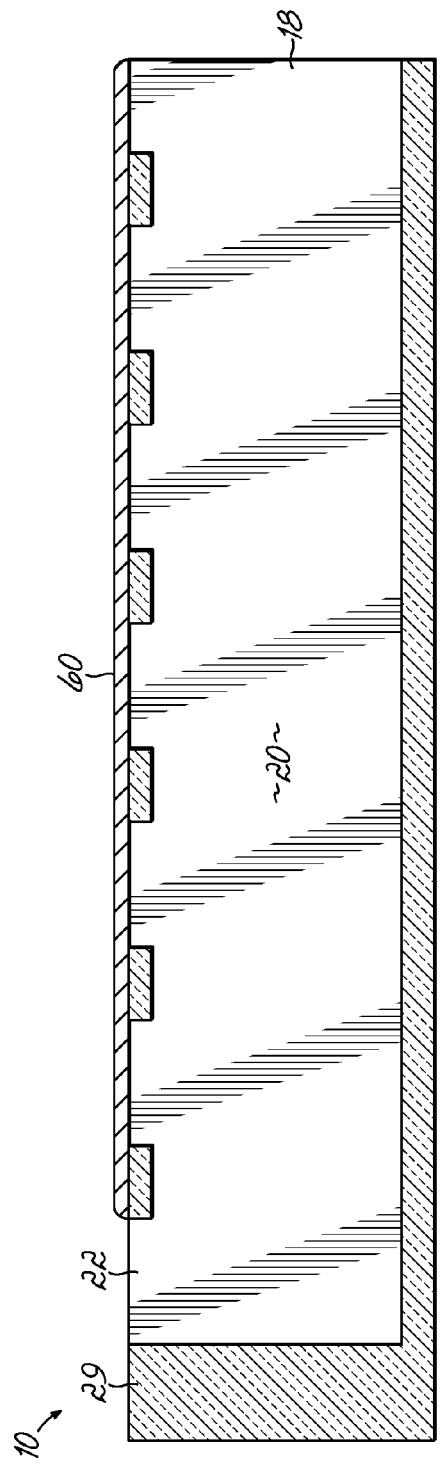
FIG. 38A
FIG. 38B

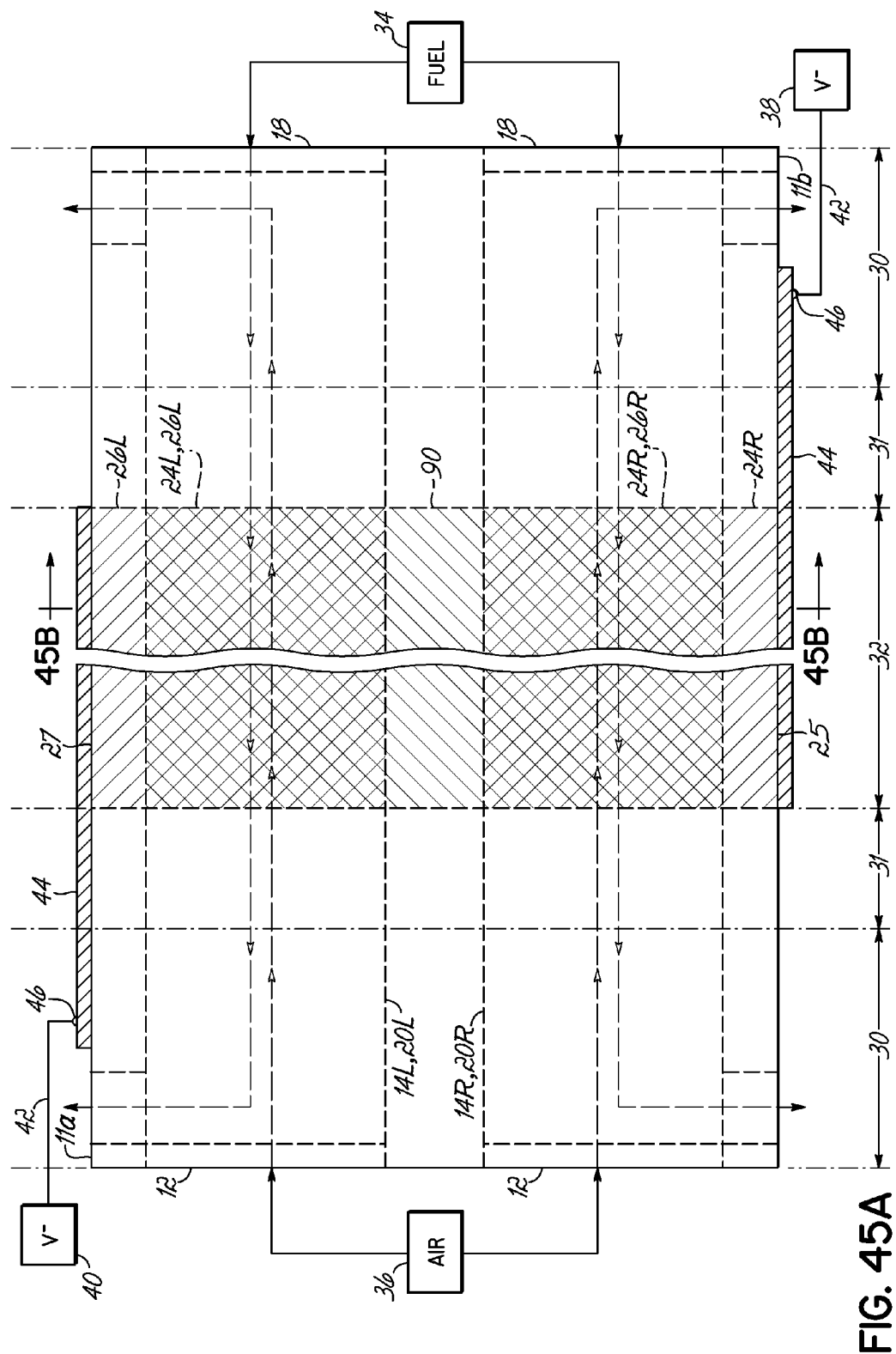

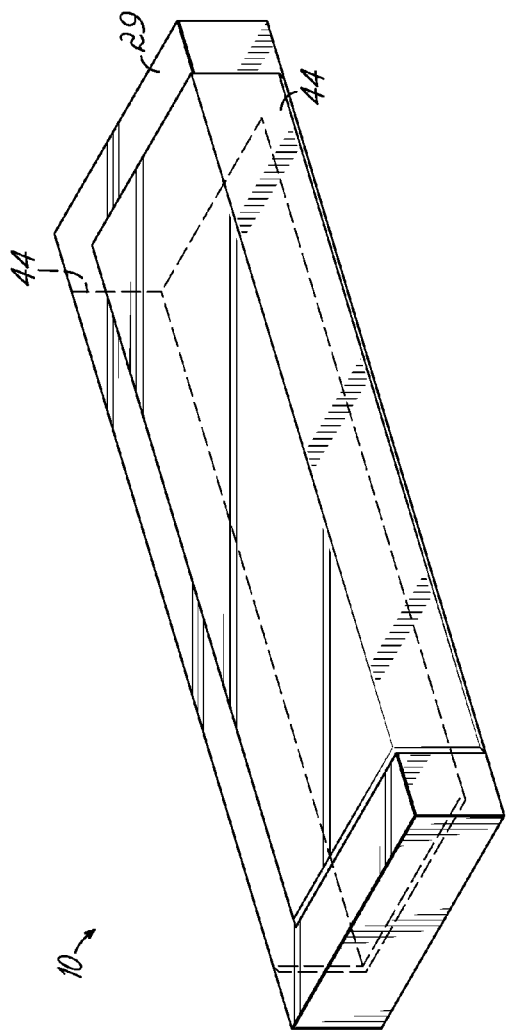
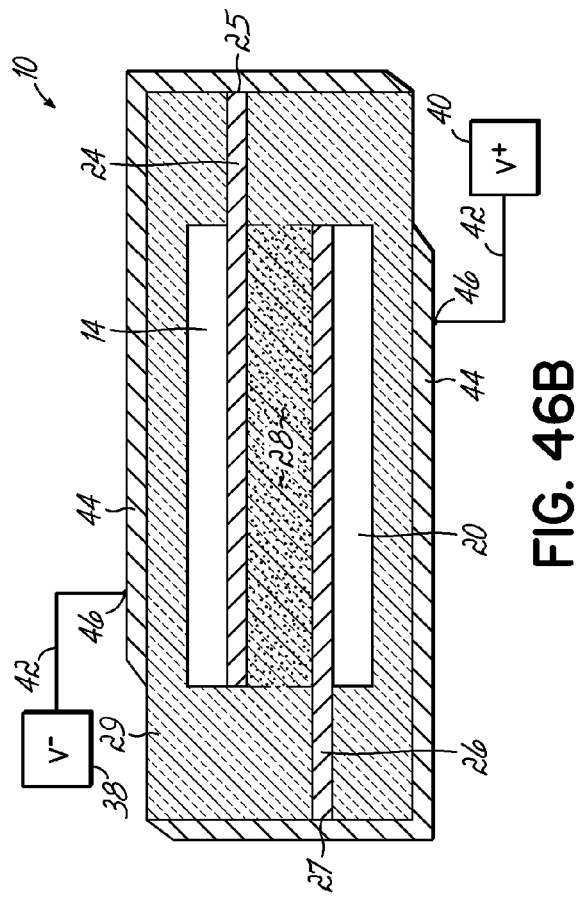
FIG. 46A
FIG. 46B

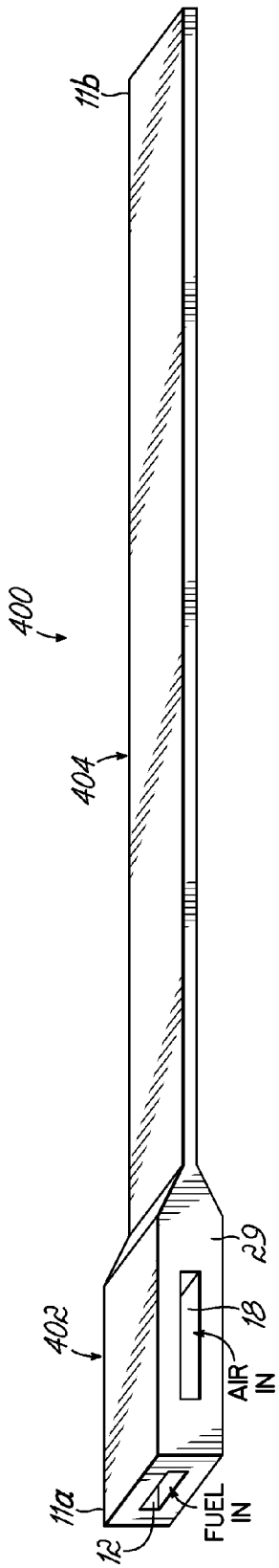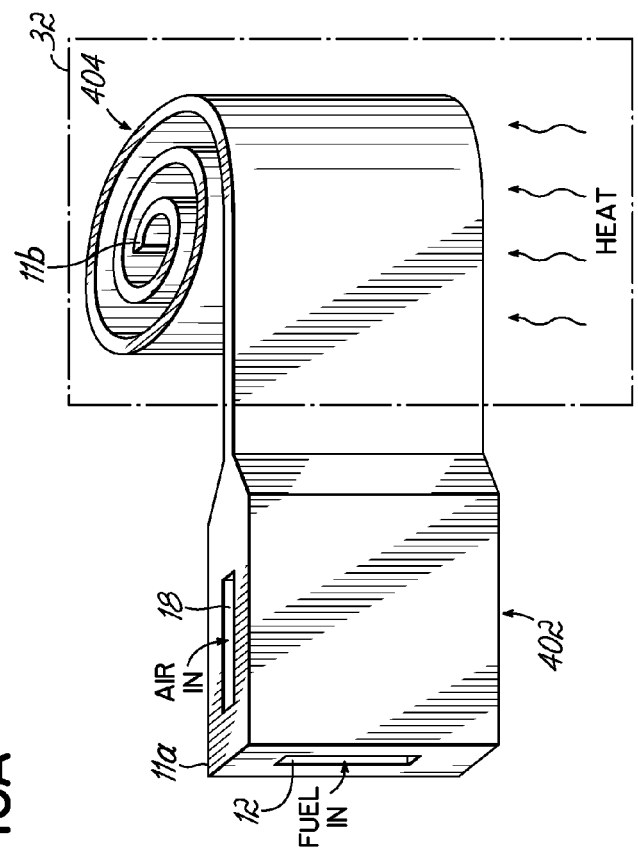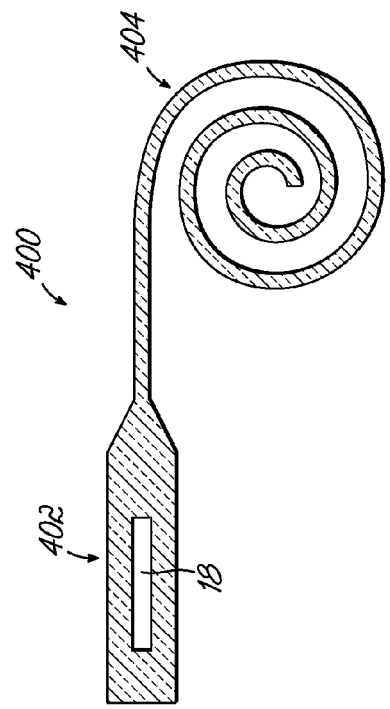
FIG. 48A
FIG. 48B
FIG. 48C

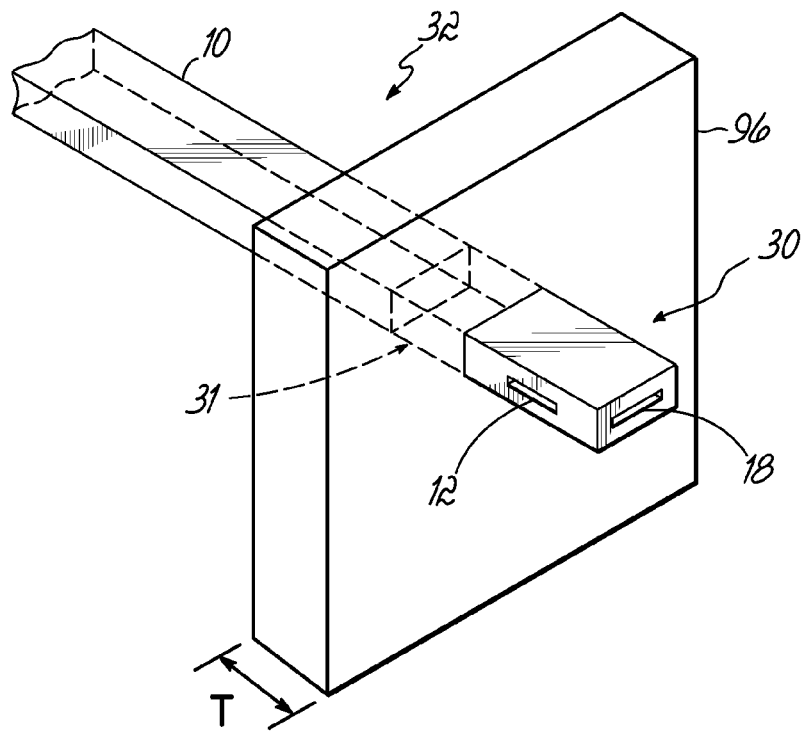
FIG. 52A
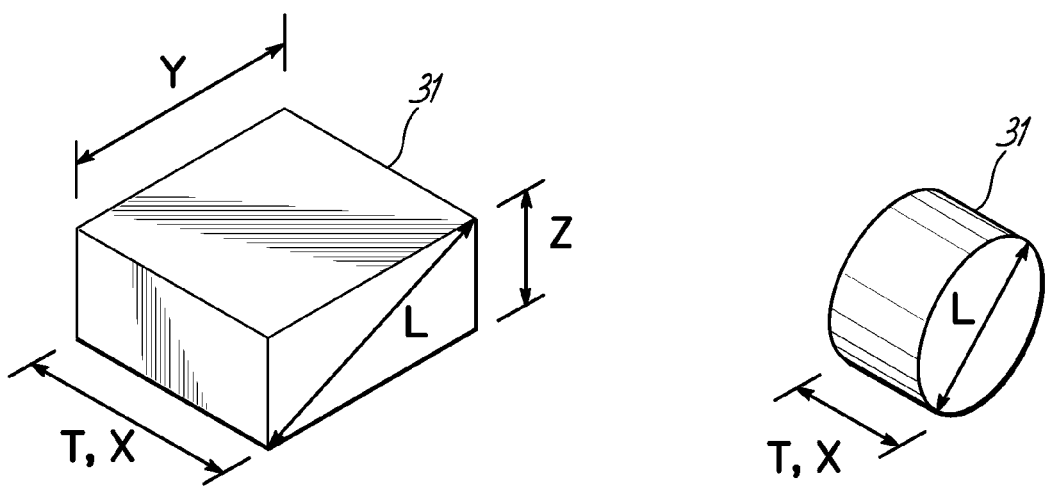
FIG. 52B
FIG. 52C

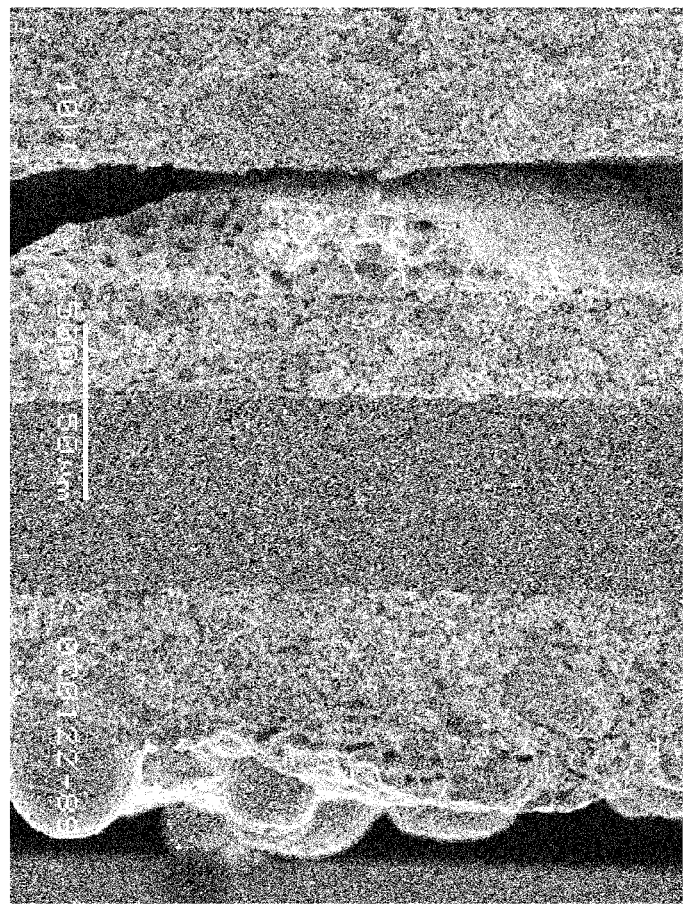
FIG. 58C
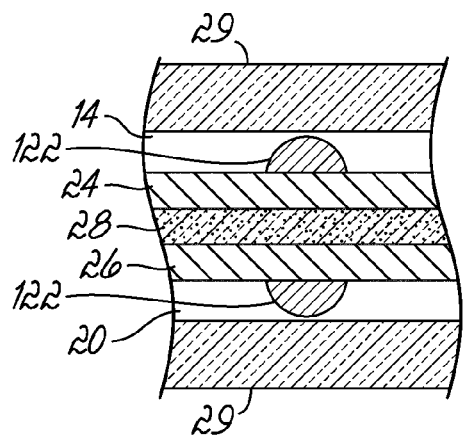
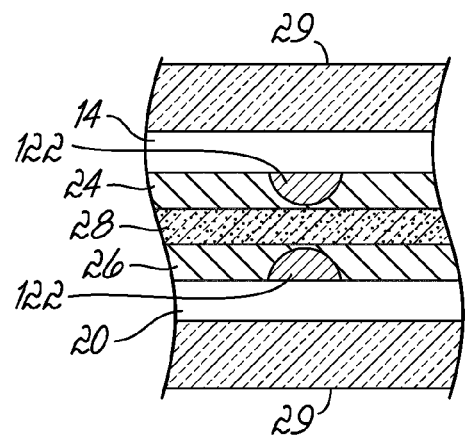
FIG. 59          FIG. 60

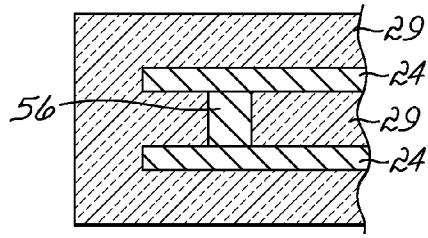
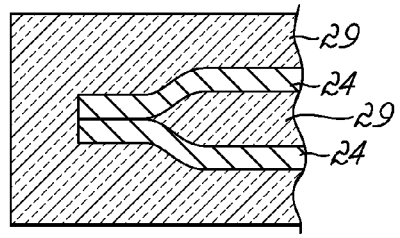
FIG. 71  FIG. 72
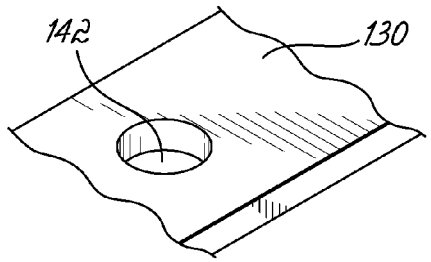
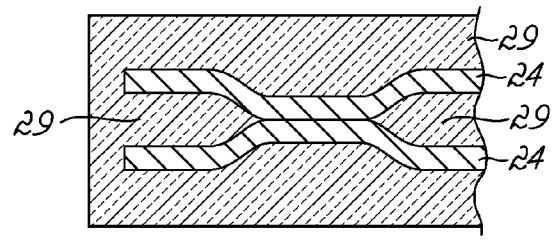
FIG. 73A  FIG. 73B
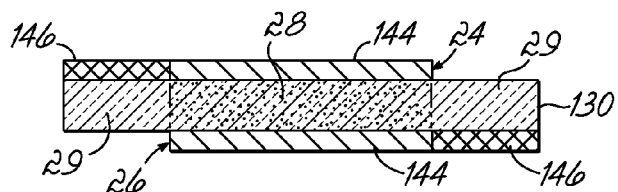
FIG. 74A
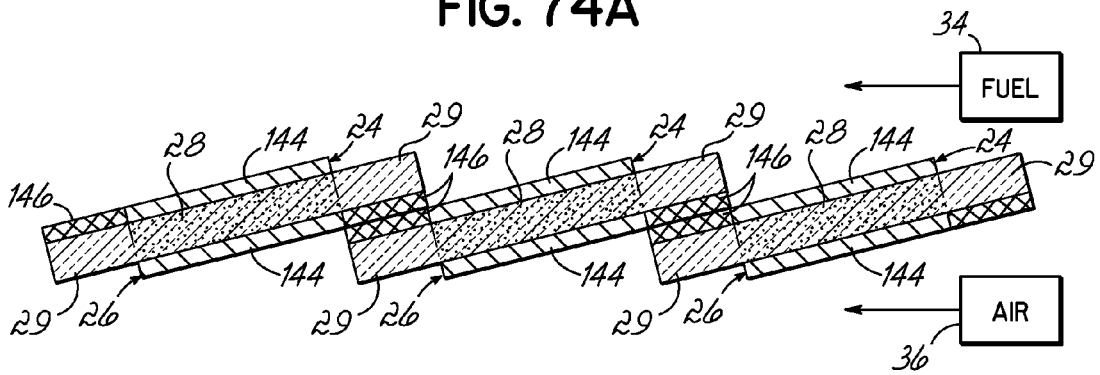
FIG. 74B
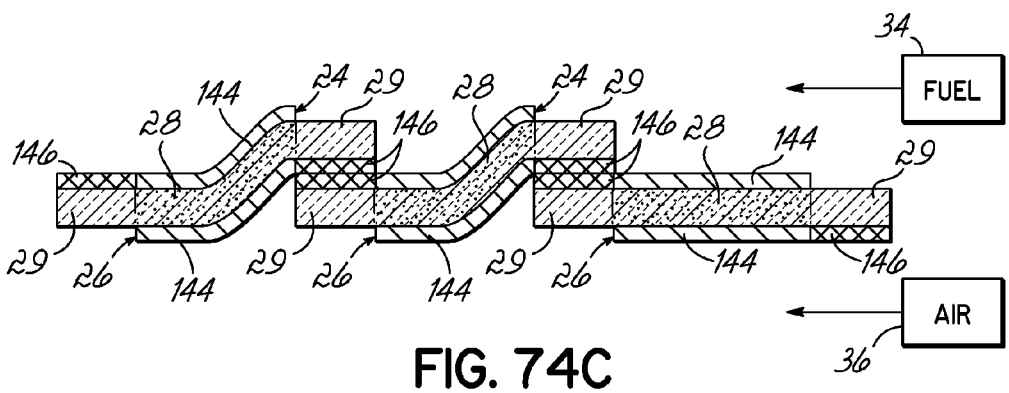
FIG. 74C

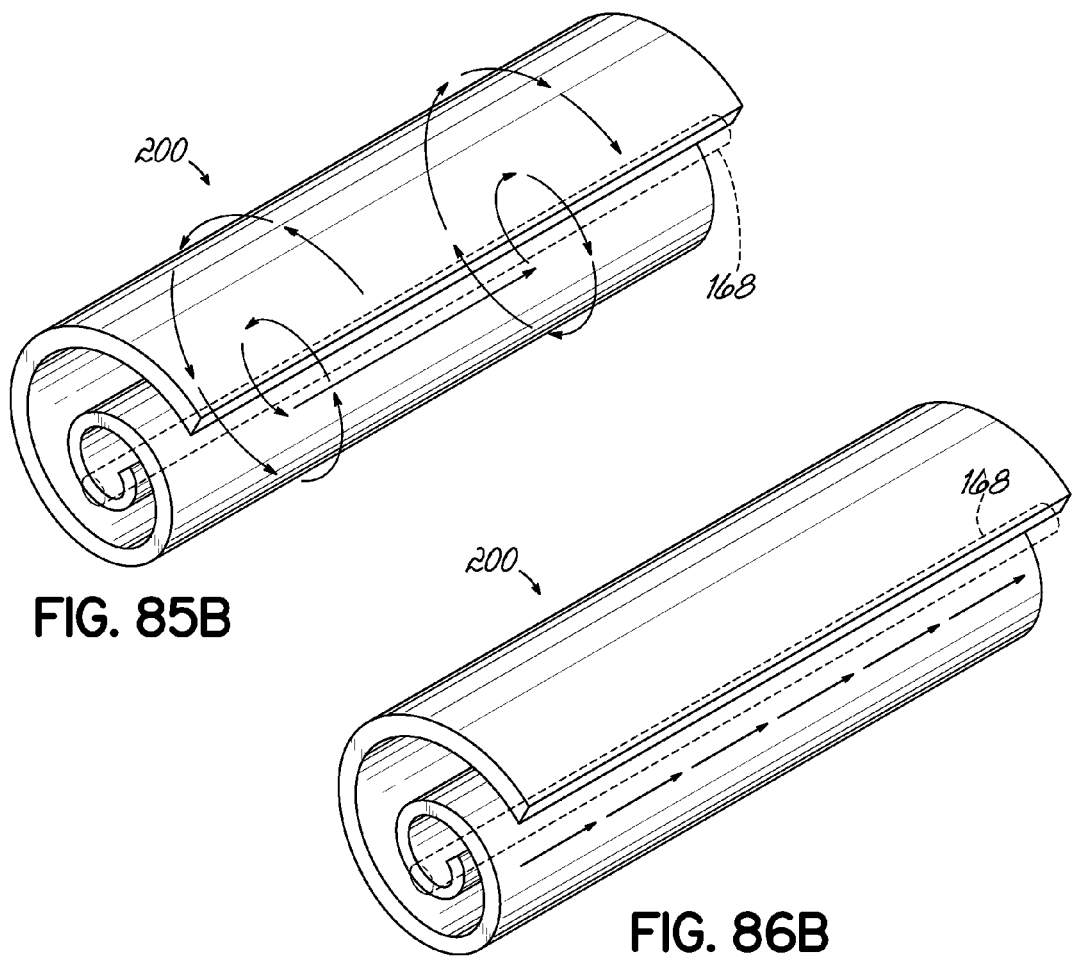
FIG. 85B
FIG. 86B
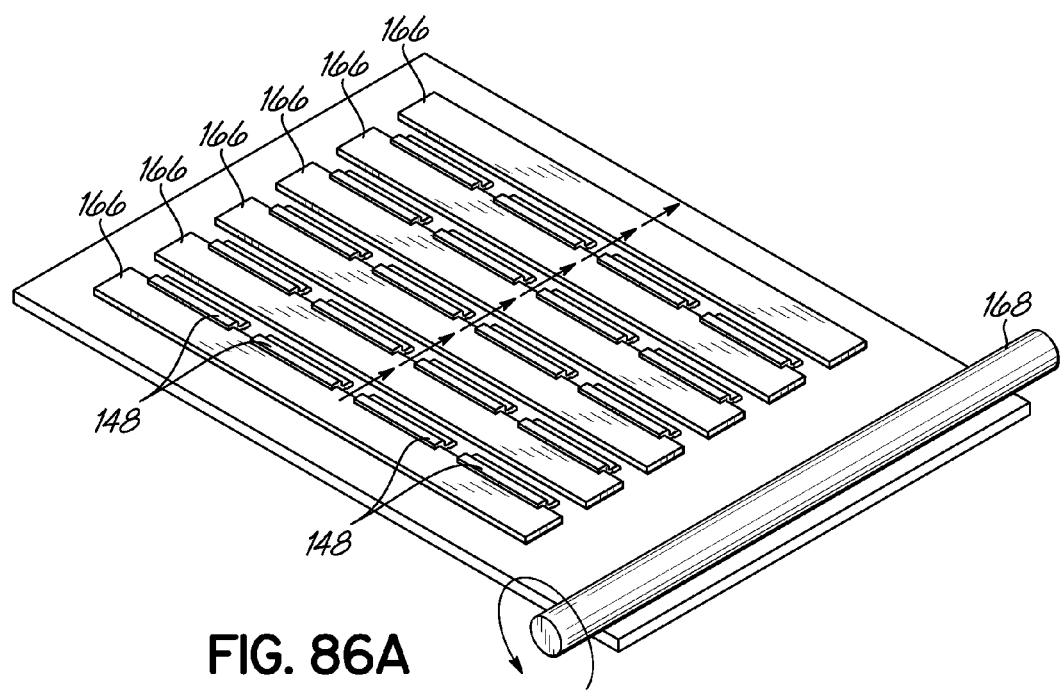
FIG. 86A

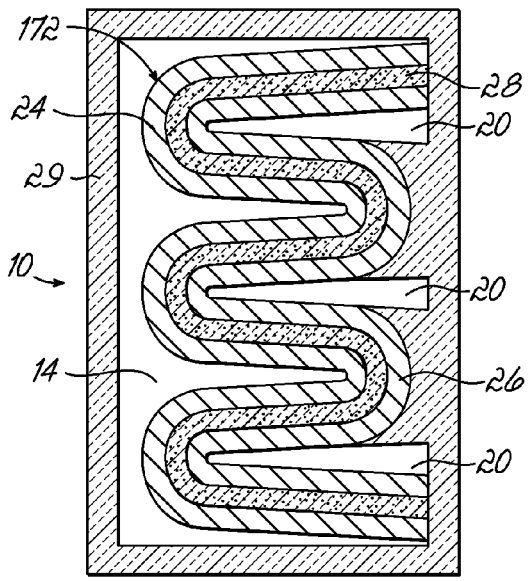
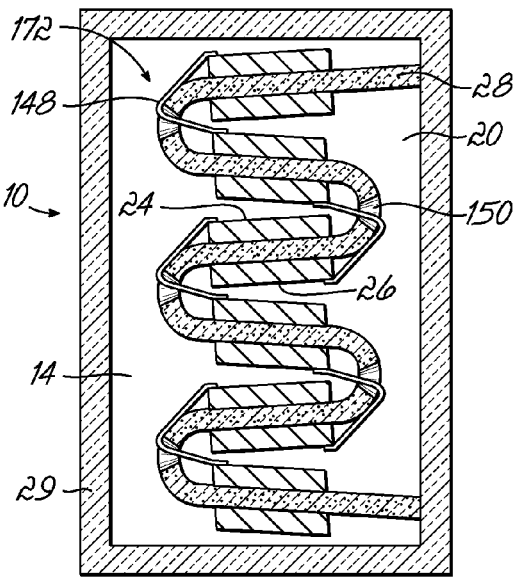
FIG. 93A    FIG. 93B
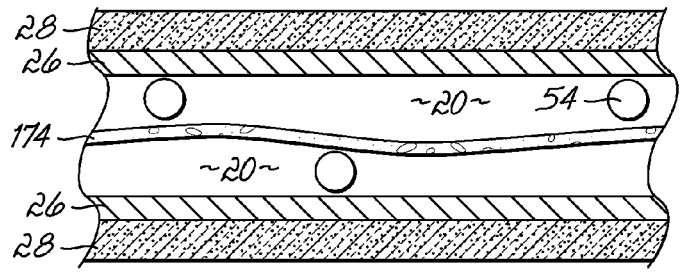
FIG. 95
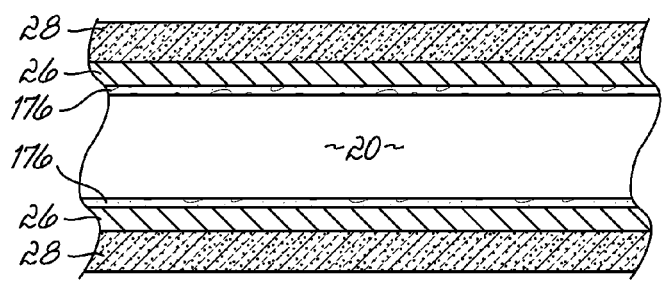
FIG. 96
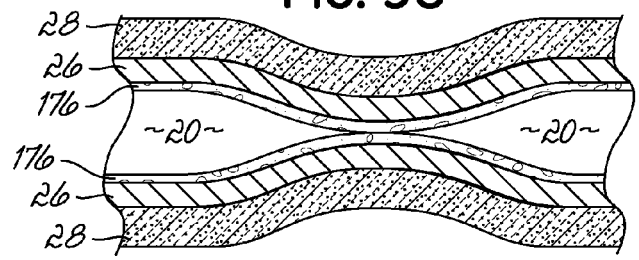
FIG. 97

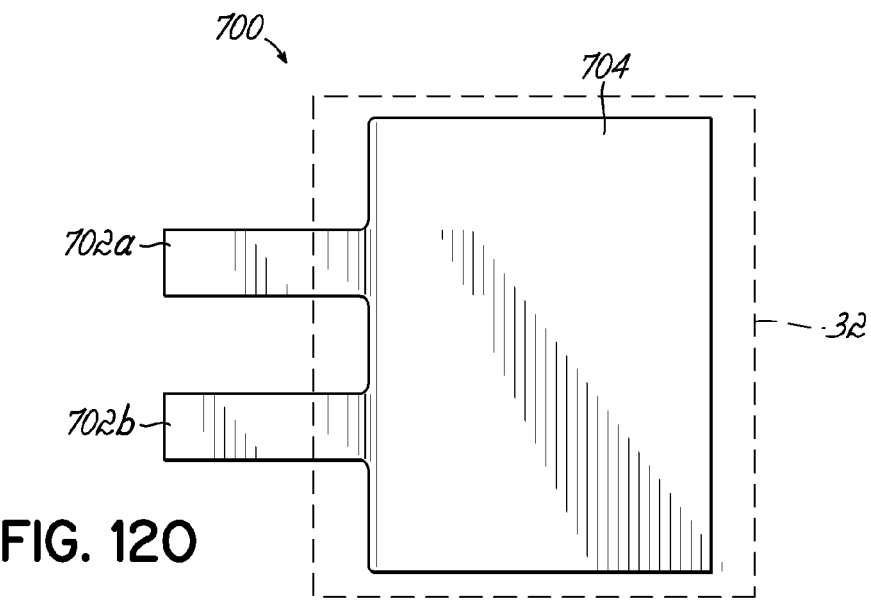
FIG. 120
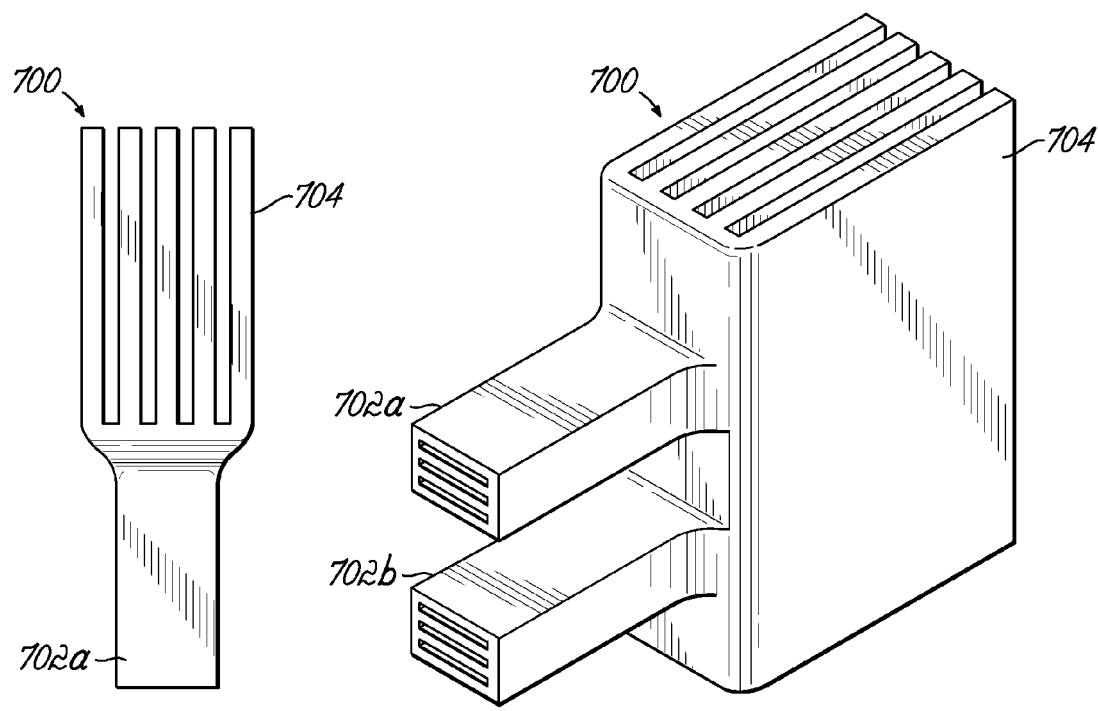
FIG. 121A
FIG. 121B

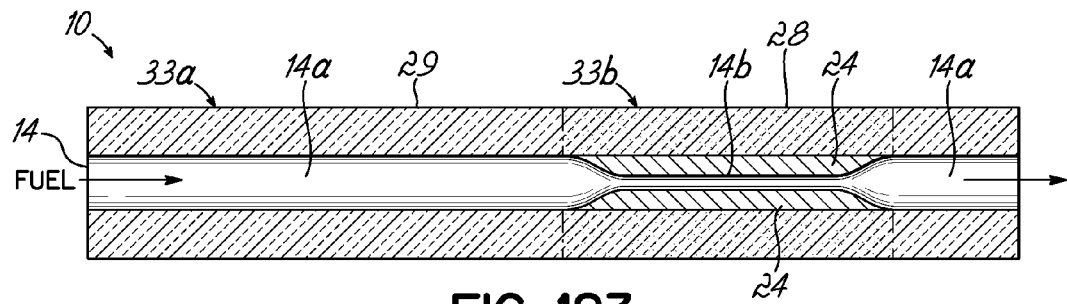
FIG. 123
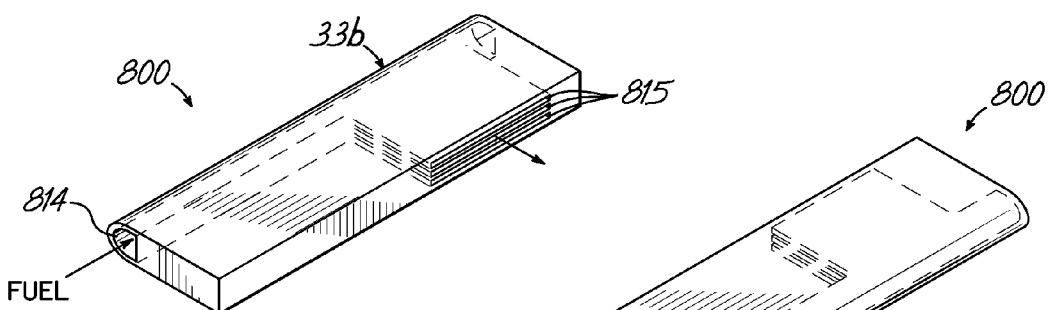
FIG. 124A
FIG. 124B
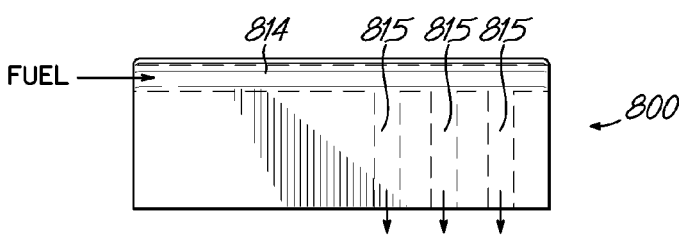
FIG. 124C
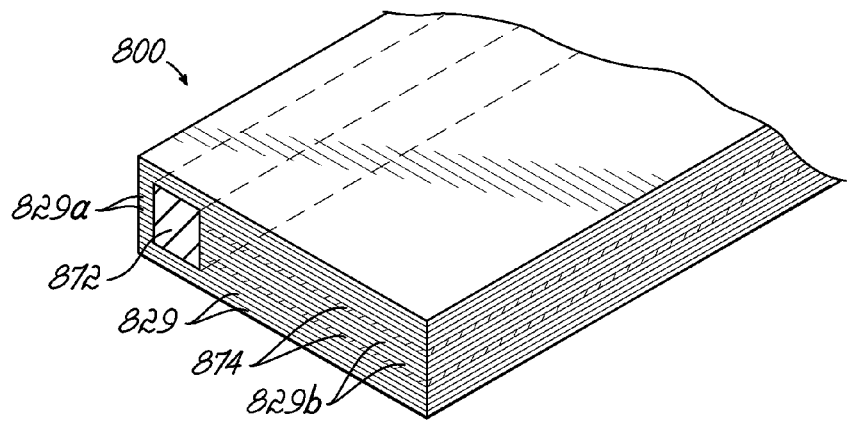
FIG. 125A

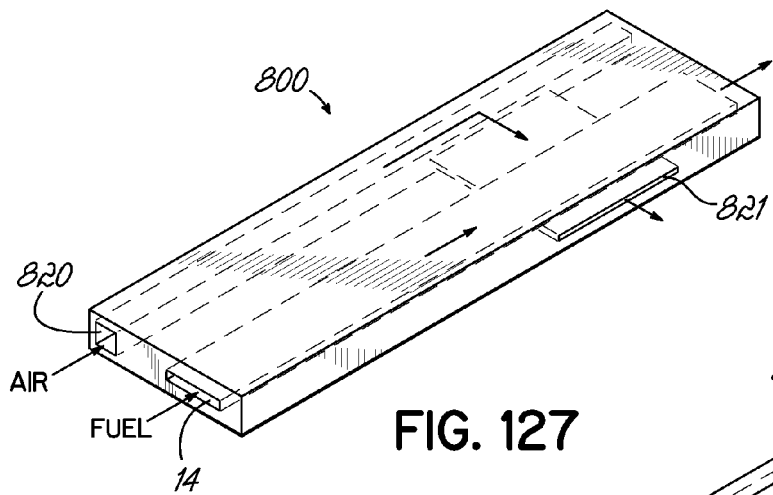
FIG. 127
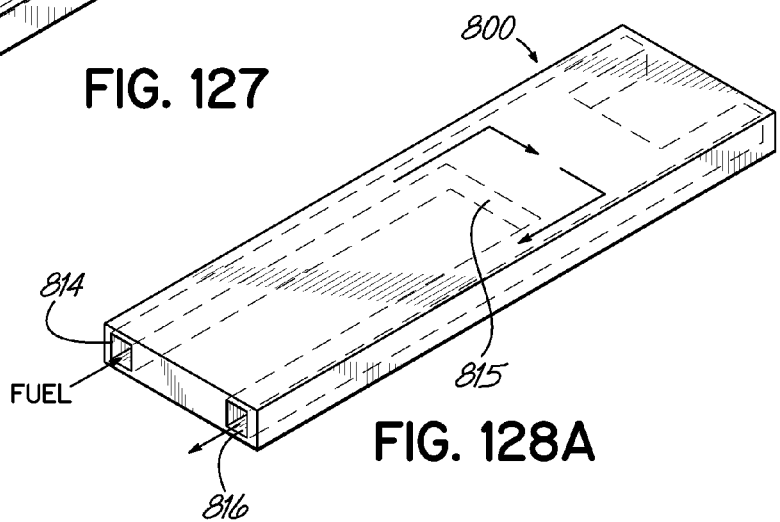
FIG. 128A
FIG. 128B
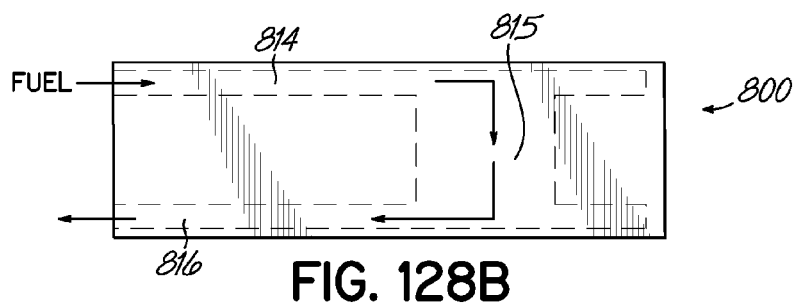
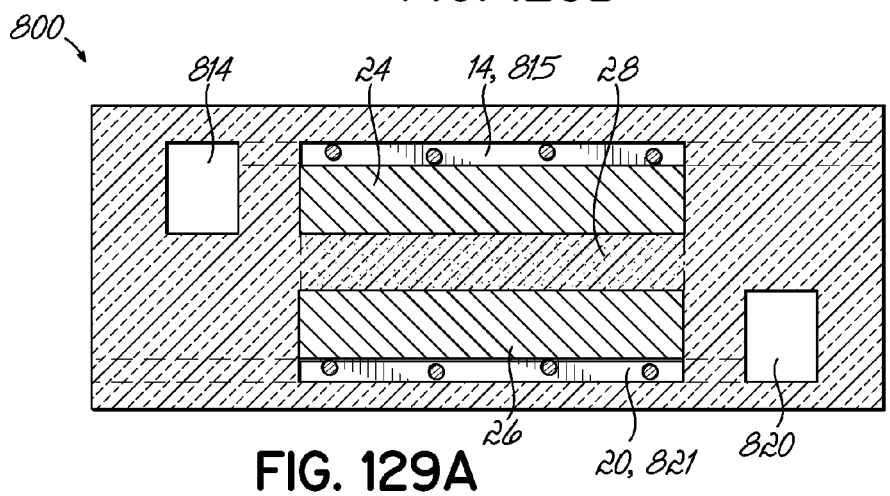
FIG. 129A

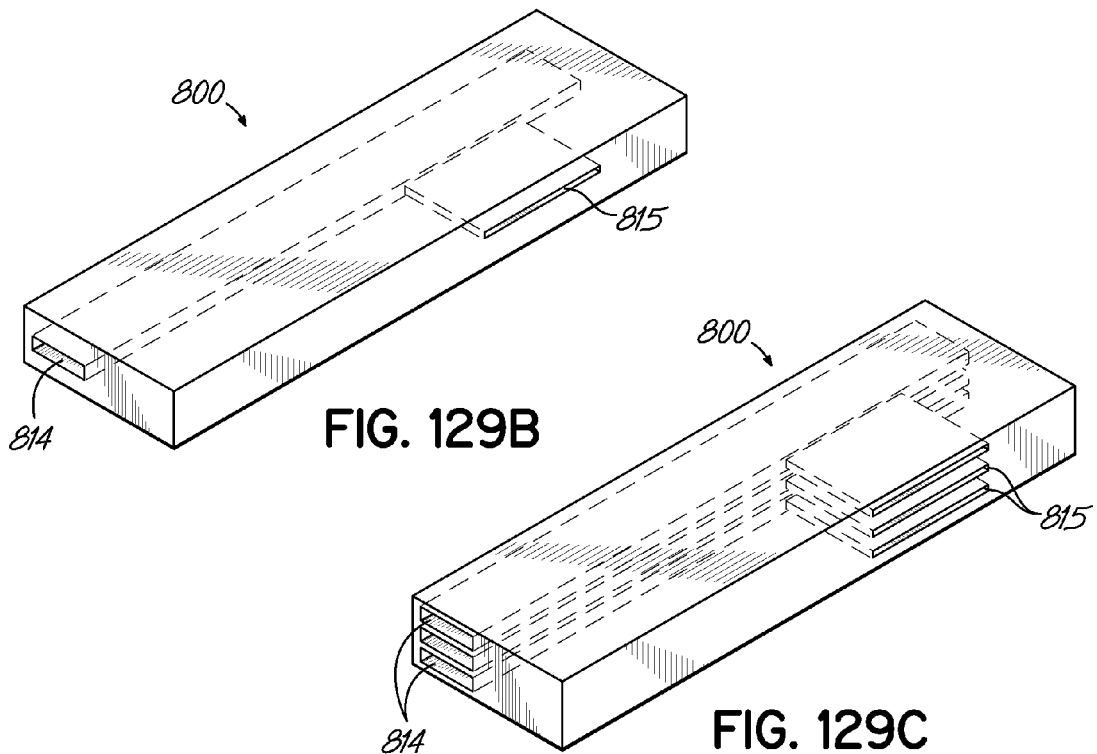
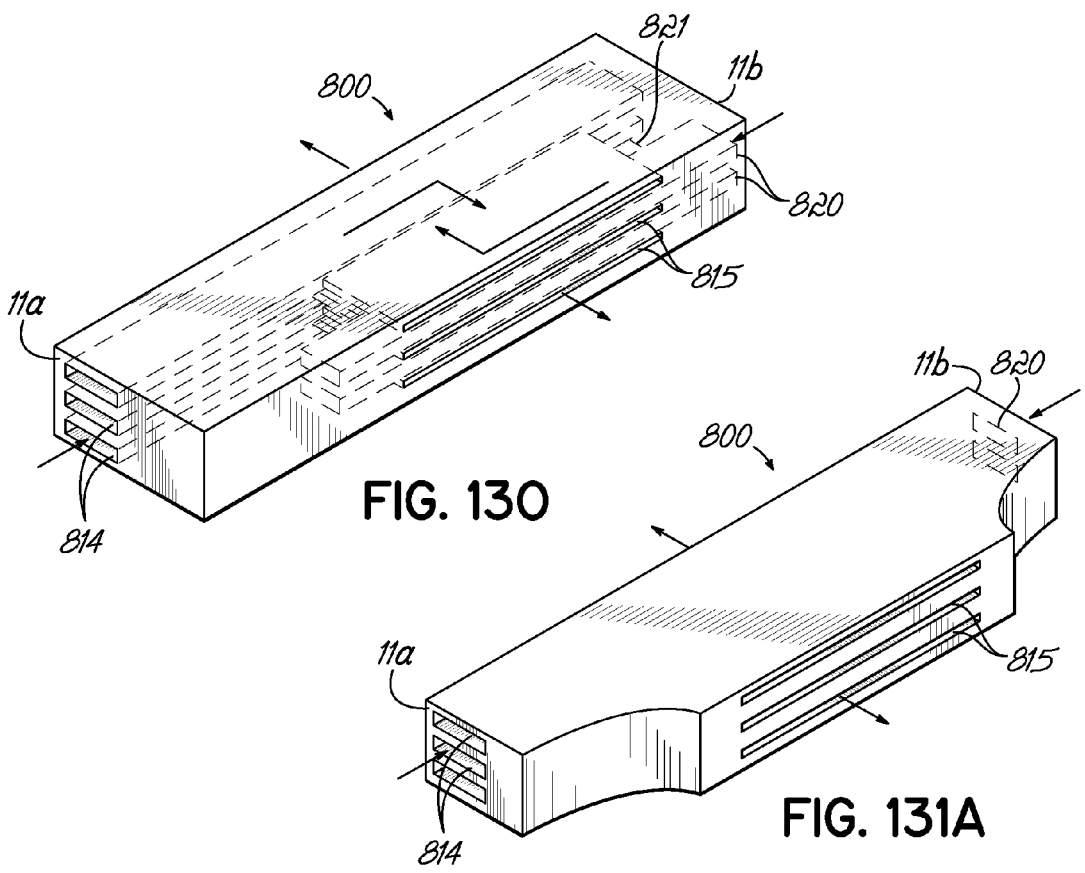

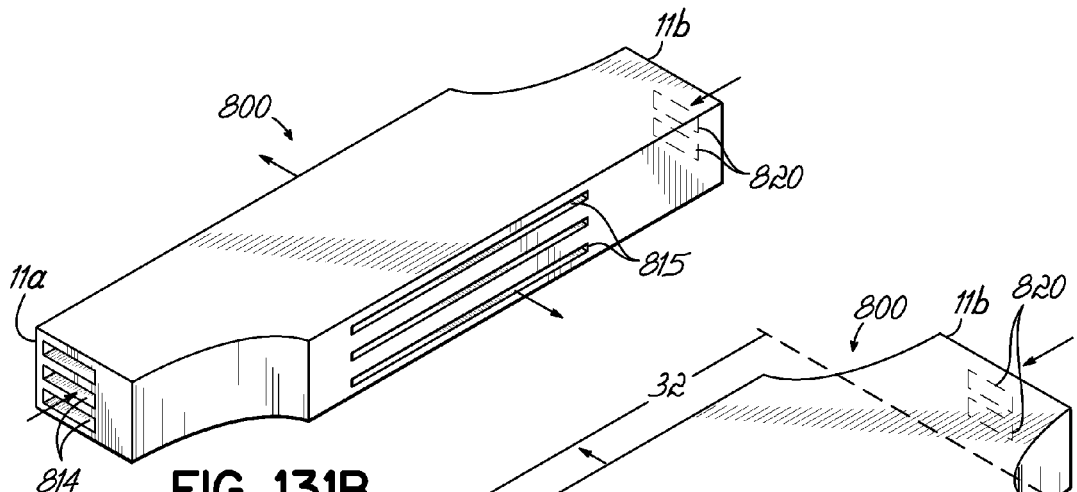
FIG. 131B
FIG. 131C
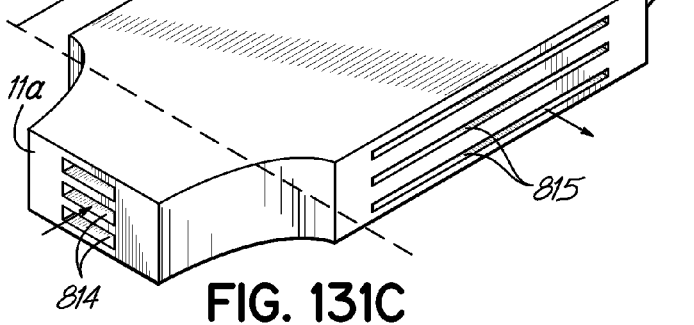
FIG. 132A
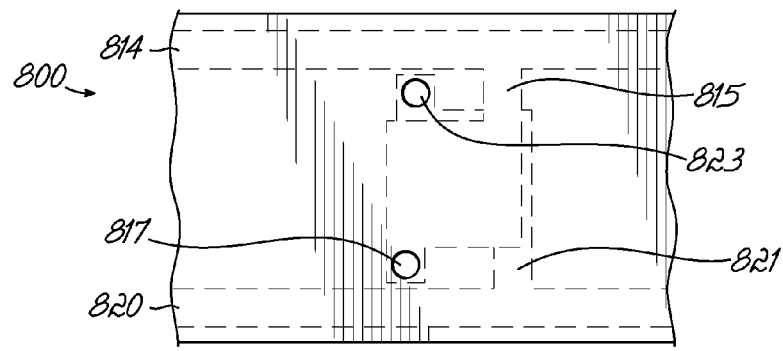
FIG. 132B

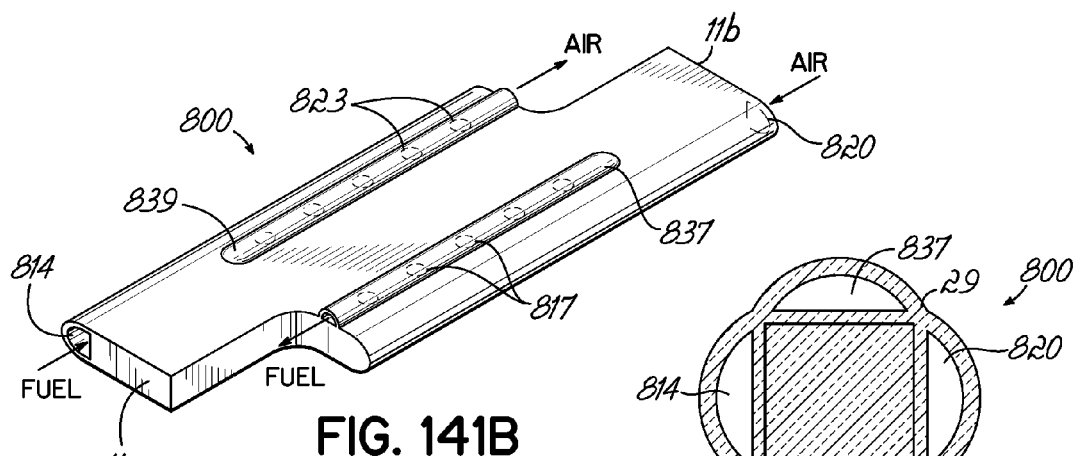
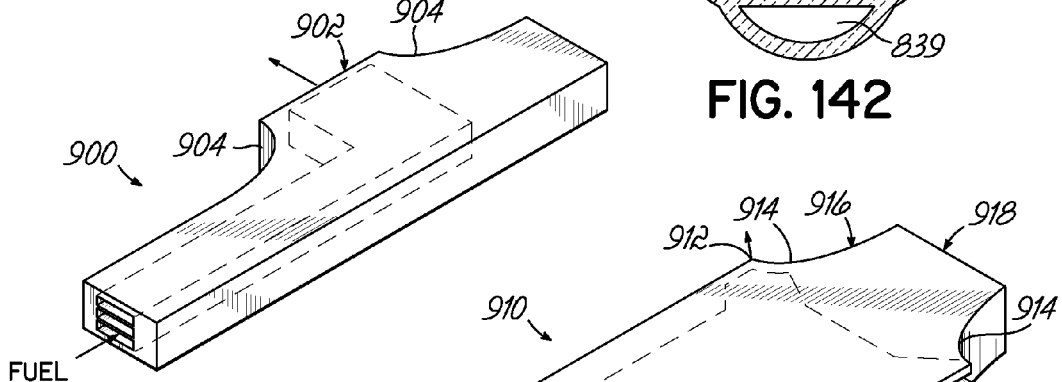
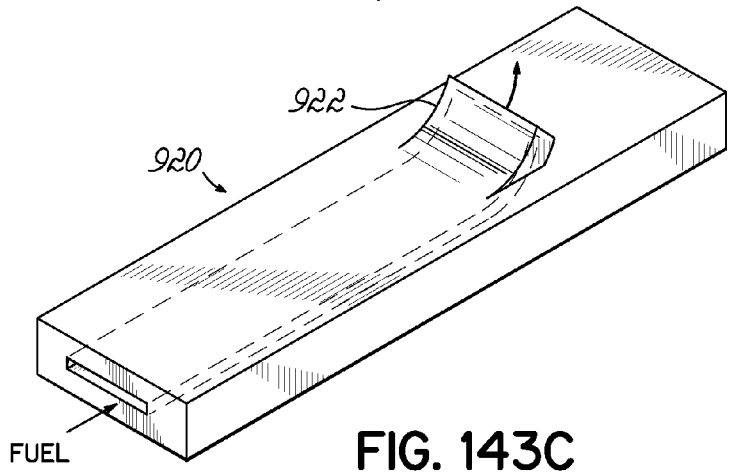

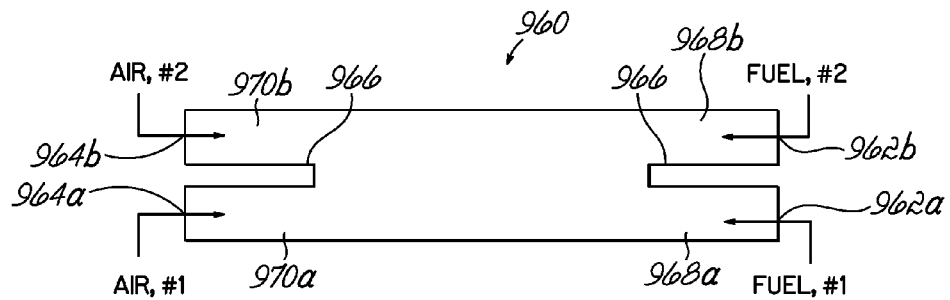
FIG. 146B
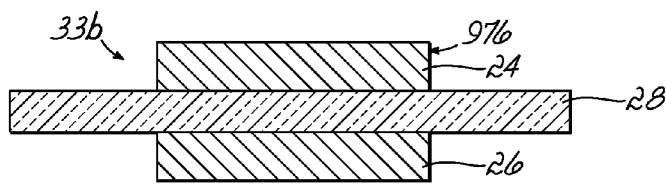
FIG. 147A
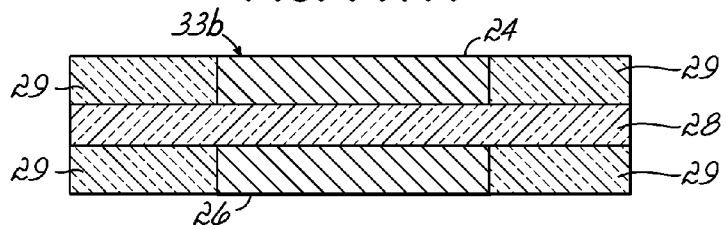
FIG. 147B
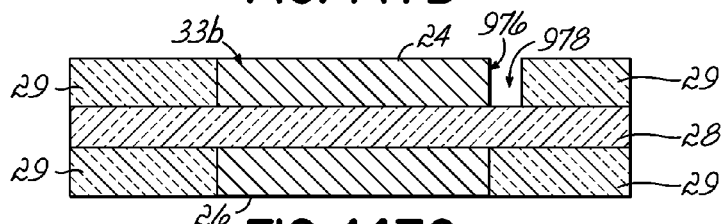
FIG. 147C
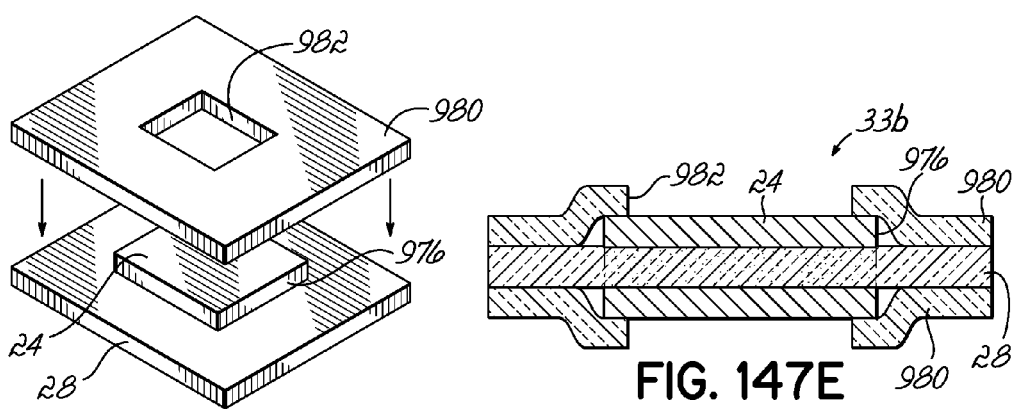
FIG. 147D
FIG. 147E

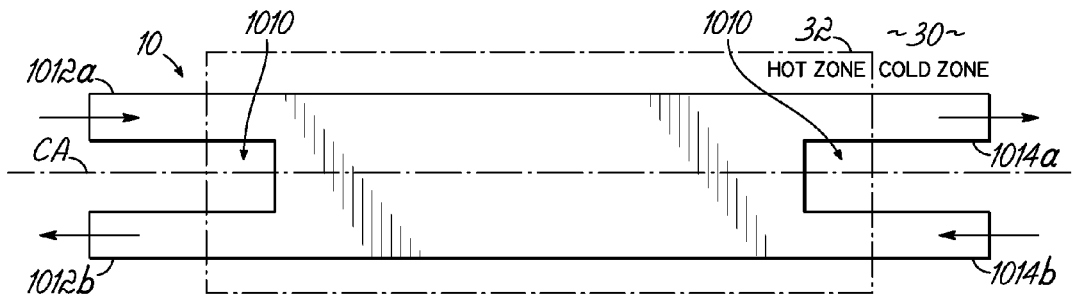
FIG. 151A
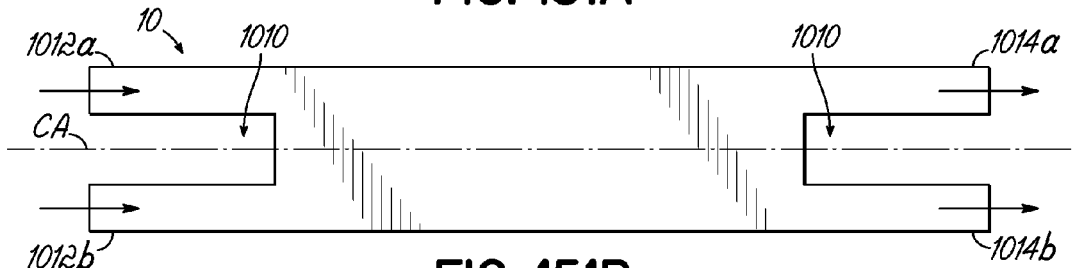
FIG. 151B
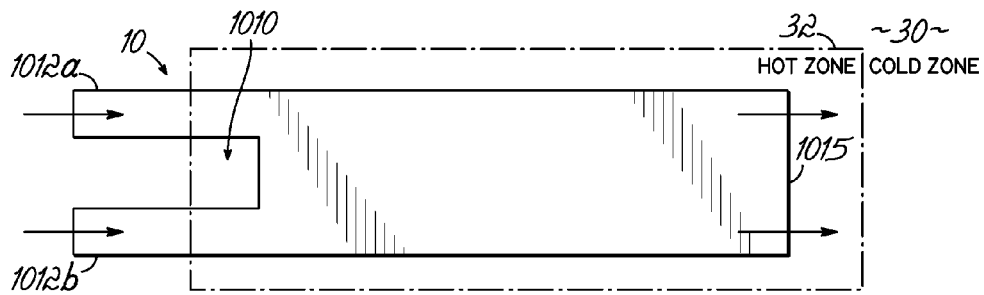
FIG. 151C
FIG. 153A
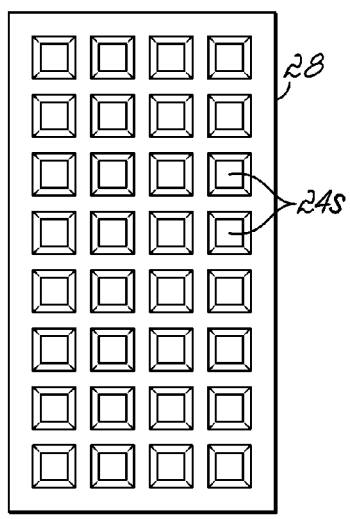
FIG. 154A
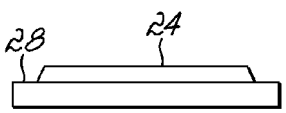
FIG. 153B
FIG. 154B ic tubes at 150 μm or less wall thickness.

FUEL CELL DEVICE AND SYSTEM

CROSS-REFERENCE TO RELATED APPLICATIONS

Pursuant to 37 C.F.R. §1.78(a)(4), the present application claims the benefit of and priority to Provisional Application No. 61/109,107 filed on Oct. 28, 2008 and entitled "Fuel Cell Device and System."

The present application is also related to copending U.S. patent application Ser. Nos. 12/399,732, 12/267,439 and 12/117,622, filed Mar. 6, 2009, Nov. 7, 2008, and May 8, 2008, respectively, and each entitled "Fuel Cell Device and System," the disclosures of which are incorporated herein by reference in their entirety. The present application is also related to co-pending U.S. patent application Ser. Nos. 11/747,066 and 11/747,073, both filed on May 10, 2007 and entitled "Solid Oxide Fuel Cell Device and System," the disclosures of which are incorporated herein by reference in their entirety. The present application is also related to co-pending U.S. patent application Ser. Nos. 11/557,894, 11/557,901 and 11/557,935, each entitled "Solid Oxide Fuel Cell Device and System" and 11/557,934 entitled "Solid Oxide Fuel Cell Device and System, and Method of Using and Method of Making," all of which were filed on Nov. 8, 2006, and the disclosures of which are incorporated herein by reference in their entirety.

FIELD OF THE INVENTION

This invention relates to fuel cell devices and systems, and methods of manufacturing the devices.

BACKGROUND OF INVENTION

Ceramic tubes have found a use in the manufacture of Solid Oxide Fuel Cells (SOFCs). There are several types of fuel cells, each offering a different mechanism of converting fuel and air to produce electricity without combustion. In SOFCs, the barrier layer (the "electrolyte") between the fuel and the air is a ceramic layer, which allows oxygen atoms to migrate through the layer to complete a chemical reaction. Because ceramic is a poor conductor of oxygen atoms at room temperature, the fuel cell is operated at 700° C. to 1000° C., and the ceramic layer is made as thin as possible.

Early tubular SOFCs were produced by the Westinghouse Corporation using long, fairly large diameter, extruded tubes of zirconia ceramic. Typical tube lengths were several feet long, with tube diameters ranging from ¼ inch to ½ inch. A complete structure for a fuel cell typically contained roughly ten tubes. Over time, researchers and industry groups settled on a formula for the zirconia ceramic which contains 8 mol % $Y_2O_3$. This material is made by, among others, Tosoh of Japan as product TZ-8Y.

Another method of making SOFCs makes use of flat plates of zirconia, stacked together with other anodes and cathodes, to achieve the fuel cell structure. Compared to the tall, narrow devices envisioned by Westinghouse, these flat plate structures can be cube shaped, 6 to 8 inches on an edge, with a clamping mechanism to hold the entire stack together.

A still newer method envisions using larger quantities of small diameter tubes having very thin walls. The use of thin walled ceramic is important in SOFCs because the transfer rate of oxygen ions is limited by distance and temperature. If a thinner layer of zirconia is used, the final device can be operated at a lower temperature while maintaining the same efficiency. Literature describes the need to make ceramic tubes at 150 μm or less wall thickness.

There are several main technical problems that have stymied the successful implementation of SOFCs. One problem is the need to prevent cracking of the ceramic elements during heating. For this, the tubular SOFC approach is better than the competing "stack" type (made from large, flat ceramic plates) because the tube is essentially one-dimensional. The tube can get hot in the middle, for example, and expand but not crack. For example, a tube furnace can heat a 36" long alumina tube, 4" in diameter, and it will become red hot in the center, and cold enough to touch at the ends. Because the tube is heated evenly in the center section, that center section expands, making the tube become longer, but it does not crack. A ceramic plate heated in the center only would quickly break into pieces because the center expands while the outside remains the same size. The key property of the tube is that it is uniaxial, or one-dimensional.

A second key challenge is to make contact to the SOFC. The SOFC ideally operates at high temperature (typically 700-1000° C.), yet it also needs to be connected to the outside world for air and fuel, and also to make electrical connection. Ideally, one would like to connect at room temperature. Connecting at high temperature is problematic because organic material cannot be used, so one must use glass seals or mechanical seals. These are unreliable, in part, because of expansion problems. They can also be expensive.

Thus, previous SOFC systems have difficulty with at least the two problems cited above. The plate technology also has difficulty with the edges of the plates in terms of sealing the gas ports, and has difficulty with fast heating, as well as cracking. The tube approach resolves the cracking issue but still has other problems. An SOFC tube is useful as a gas container only. To work it must be used inside a larger air container. This is bulky. A key challenge of using tubes is that you must apply both heat and air to the outside of the tube; air to provide the $O_2$ for the reaction, and heat to accelerate the reaction. Usually, the heat would be applied by burning fuel, so instead of applying air with 20% $O_2$ (typical), the air is actually partially reduced (partially burned to provide the heat) and this lowers the driving potential of the cell.

An SOFC tube is also limited in its scalability. To achieve greater kV output, more tubes must be added. Each tube is a single electrolyte layer, such that increases are bulky. The solid electrolyte tube technology is further limited in terms of achievable electrolyte thinness. A thinner electrolyte is more efficient. Electrolyte thickness of 2 μm or even 1 μm would be optimal for high power, but is very difficult to achieve in solid electrolyte tubes. It is noted that a single fuel cell area produces about 0.5 to 1 volt (this is inherent due to the driving force of the chemical reaction, in the same way that a battery gives off 1.2 volts), but the current, and therefore the power, depend on several factors. Higher current will result from factors that make more oxygen ions migrate across the electrolyte in a given time. These factors are higher temperature, thinner electrolyte, and larger area.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 1 and 1A depict in side cross-sectional view and top cross-sectional view, respectively, one embodiment of a basic Fuel Cell Stick™ device of the invention, having a single anode layer, cathode layer and electrolyte layer, and a hot zone between two end cold zones.

FIG. 4A depicts in perspective view a metallurgical bonding attachment means to a plurality of Fuel Cell Stick™ devices to make electrical connection to positive and negative voltage nodes according to one embodiment of the invention; and FIG. 4B depicts in schematic end view a connection between multiple Fuel Cell Stick™ devices according to one embodiment of the invention, where each Fuel Cell Stick™ device includes a plurality of anodes and cathodes.

FIG. 5 depicts in schematic end view a mechanical attachment means for making the electrical connection to positive and negative voltage nodes according to one embodiment of the invention.

FIGS. 7A and 7B are cross-sectional side and top views, respectively, illustrating a plurality of support pillars in the air and fuel passages according to one embodiment.

FIG. 9A depicts three fuel cell layers connected in parallel and FIG. 9B depicts three fuel cells connected in series.

FIG. 10A depicts in schematic side view a variation of the embodiment of FIG. 10, where the hot zone is positioned between opposing cold ends; and FIG. 10B depicts the Fuel Cell Stick™ device of FIG. 10A in top cross-sectional view taken along line 10B-10B.

FIGS. 25A and 27A depict in schematic top plan views and FIG. 27B depicts in schematic side view a Fuel Cell Stick™ device according to one embodiment of the invention having a panhandle design with an elongate section at one cold end and a large surface area section at the opposing hot end; and FIGS. 25B and 26A depict in schematic top plan views and FIG. 26B depicts in schematic side view an alternative embodiment of the panhandle design having two elongate sections at opposing cold ends with a center large surface area section in a central hot zone.

FIGS. 28A-28C depict the unrolled structure in schematic top views, end views and side views, respectively, and FIG. 28D depicts the spiral or rolled, tubular configuration in schematic perspective view.

FIG. 29A depicts the device in schematic isometric view, FIGS. 29B-29E depict cross-sectional views taken from FIG. 29A, FIG. 29F depicts an end view at the air input end, and FIG. 29G depicts an end view at the fuel input end.

FIGS. 33A-33C depict another embodiment of the invention for pre-heating the air and fuel, where FIG. 33A is a schematic cross-sectional side view through the longitudinal center of the Fuel Cell Stick™ device, FIG. 33B is a schematic cross-sectional top view taken along line 33B-33B of FIG. 33A, and FIG. 33C is a schematic cross-sectional bottom view taken along line 33C-33C of FIG. 33A.

FIGS. 38A and 38B depict in schematic cross-sectional side views an embodiment of the invention having multiple exit gaps along the sides of the device for bake-out of organic material used to form passages within the structure.

FIG. 45A depicts in schematic top view and FIG. 45B depicts in cross-sectional view through the hot zone an embodiment of a Fuel Cell Stick™ device of the invention having a plurality of fuel cells on each of a left and right side of the device, with a bridging portion therebetween.

FIGS. 46A and 46B depict in schematic perspective view and schematic cross-sectional view, respectively, another embodiment of a Fuel Cell Stick™ device of the invention having large exterior contact pads to provide a large or wide path of low resistance for electrons to travel to the cold end of the device.

FIGS. 48A-48C depict an alternative embodiment referred to as an "end-rolled Fuel Cell Stick™ device" having a thick portion and a thin rolled portion, wherein FIG. 48A depicts the unrolled device in perspective view, FIG. 48B depicts the rolled device in cross-sectional side view, and FIG. 48C depicts the rolled device in perspective view.

FIGS. 51 and 52A depict in schematic perspective views a Fuel Cell Stick™ device passing through a furnace wall; FIG. 52B depicts in schematic perspective view the portion of the Fuel Cell Stick™ device of 52B within the bounds of the furnace wall; and FIG. 52C depicts in schematic perspective view a portion of a tubular Fuel Cell Stick™ device where it would pass through a furnace wall.

FIGS. 58A, 58B, and 58C are micrographs depicting a current collector nearly causing a blockage of a passage.

FIG. 59 depicts in schematic cross-sectional view current collectors on the surface of the anode and the cathode; and FIG. 60 depicts in schematic cross-sectional view current collectors buried in the surface of the anode and the cathode.

FIG. 71 depicts in schematic cross-sectional view a via connection between two electrodes according to one embodiment.

FIG. 72 depicts in schematic cross-sectional view two interconnected electrodes according to one embodiment.

FIGS. 73A and 73B depict in perspective and schematic cross-sectional views a method of interconnecting two electrodes according to another embodiment.

FIGS. 74A-74D depict in schematic cross-sectional views one embodiment of serial connection between cells using an overlapping method.

FIGS. 85A and 85B show in schematic perspective views an embodiment of a spiral wound multi-layer Tubular Fuel Cell Stick™ device having series design.

FIGS. 86A and 86B show in schematic perspective views another embodiment of a spiral wound multi-layer Tubular Fuel Cell Stick™ device.

FIGS. 93A and 93B show in detailed schematic cross-sectional views embodiments for attachment of a folded stack design to provide free floating areas.

FIGS. 95-97 depict in schematic cross-sectional view two cathodes in series connection with a barrier layer therebetween.

FIG. 120 is a side view of an embodiment of a Fuel Cell Stick™ device of a miniature size; and FIGS. 121A and 121B depict in top and perspective views embodiments of a device of FIG. 120.

FIG. 123 depicts in schematic cross-sectional view an embodiment in which the flow passage is thinner in the active area.

FIGS. 124A and 124B depict in perspective views a Fuel Cell Stick™ device according to an embodiment having an artery flow passage feeding several active flow passages in different active layers, and FIG. 124C depicts in top view an embodiment having an artery flow passage feeding several active flow passages in a single active layer.

FIGS. 125A and 125B depict in schematic perspective view and schematic cross-sectional view, respectively, a green assembly method for making the device having an artery flow passage and active flow passages.

FIG. 127 depicts in perspective view an embodiment having different gas flow passages.

FIGS. 128A-128B depict in perspective view and schematic top view, respectively, an entry and exit design for a gas flow pathway according to another embodiment.

FIG. 129A depicts in schematic cross-sectional view a dual artery device having single artery flow passage serving a single active flow passage for both the fuel and the air flow, and FIGS. 129B and 129C depict in perspective views this embodiment in a single active layer device and a multiple active layer device, respectively, for one gas flow; and FIG. 130 depicts in perspective view a device similar to that of FIG. 129C, but showing both gas flows.

FIGS. 131A-131C depict in perspective views embodiments of shaped dual artery Fuel Cell Stick™ devices.

FIGS. 132A and 132B depict in schematic end view and schematic internal top down view, respectively, a dual artery Fuel Cell Stick™ device having vertical gas exit holes.

FIGS. 141A-141B are cross-sectional and perspective views, respectively, depicting fuel exiting the Fuel Cell Stick™ device by surface arteries according to another embodiment.

FIG. 142 is a cross-sectional view depicting four surface arteries for entry and exit of gases according to another embodiment.

FIGS. 143A-143C are schematic perspective views and FIG. 143D is a schematic side view depicting variations on the exit points for the gas flow according to various embodiments.

FIGS. 146A and 146B are schematic top view depictions of embodiments of a dual-power supply Fuel Cell Stick™ device according to embodiments.

FIGS. 147A-147C depict the buildup of an active area and adjacent region where misalignment can cause a gap as best seen in FIG. 147C; and FIGS. 147D-F depict in exploded perspective view and cross-sectional views, respectively, a picture frame approach to prevent misalignment.

FIGS. 151A-151C depict in schematic top view embodiments having one or two forked ends.

FIGS. 153A-153B depict in schematic top and side views, respectively, a non-segmented electrode, and FIGS. 154A-154C depict in schematic top and side views and cross-sectional view, respectively, the same electrode area with the electrode segmented.

FIG. 163 is a schematic top view of a flow path with decreasing area/volume.

FIG. 164 depicts in perspective view an embodiment for making a device of the invention.

DETAILED DESCRIPTION

Figure 2:
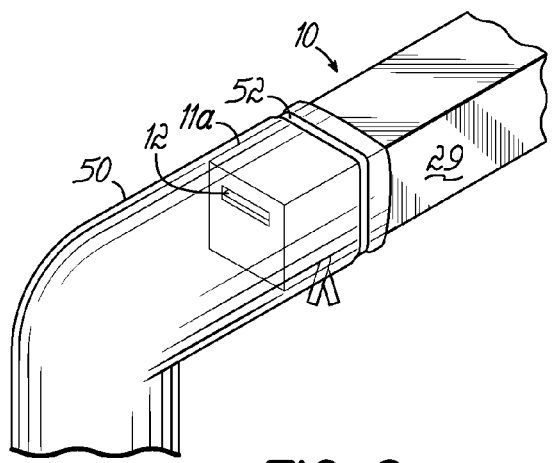
FIG. 2 depicts in perspective view a first end of one embodiment of a Fuel Cell Stick™ device of the invention with a fuel supply tube connected thereto.

In one embodiment, the invention provides a SOFC device and system in which the fuel port and the air port are made in one monolithic structure. In one embodiment, the SOFC device is an elongate structure, essentially a relatively flat or rectangular stick (and thus, referred to as a Fuel Cell Stick™ device), in which the length is considerably greater than the width or thickness. The Fuel Cell Stick™ devices are capable of having cold ends while the center is hot (cold ends being <300° C.; hot center being >400° C., and most likely >700° C.). Slow heat conduction of ceramic can prevent the hot center from fully heating the colder ends. In addition, the ends are quickly radiating away any heat that arrives there. The invention includes the realization that by having cold ends for connection, it is possible to make easier connection to the anode, cathode, fuel inlet and $H_2O$ $CO_2$ outlet, and air inlet and air outlet. While tubular fuel cell constructions are also capable of having cold ends with a hot center, the prior art does not take advantage of this benefit of ceramic tubes, but instead, places the entire tube in the furnace, or the hot zone, such that high temperature connections have been required. The prior art recognizes the complexity and cost of making high temperature brazed connections for the fuel input, but has not recognized the solution presented herein. The Fuel Cell Stick™ device of the invention is long and skinny so that it has the thermal property advantages discussed above that allow it to be heated in the center and still have cool ends. This makes it structurally sound with temperature, and makes it relatively easy to connect fuel, air and electrodes. The Fuel Cell Stick™ device is essentially a stand-alone system, needing only heat, fuel, and air to be added in order to make electricity. The structure is designed so that these things can be readily attached.

The Fuel Cell Stick™ device of the invention is a multi-layer structure and may be made using a multi-layer co-fired approach, which offers several other advantages. First, the device is monolithic, which helps to make it structurally sound. Second, the device lends itself to traditional high volume manufacturing techniques such as those used in MLCC (multi-layer co-fired ceramic) production of capacitor chips. (It is believed that multi-layer capacitor production is the largest volume use of technical ceramics, and the technology is proven for high volume manufacturing.) Third, thin electrolyte layers can be achieved within the structure at no additional cost or complexity. Electrolyte layers of 2 μm thickness are possible using the MLCC approach, whereas it is hard to imagine a SOFC tube with less than a 60 μm electrolyte wall thickness. Hence, the Fuel Cell Stick™ device of the invention can be about 30 times more efficient than a SOFC tube. Finally, the multi-layer Fuel Cell Stick™ devices of the invention could each have many hundreds, or thousands, of layers, which would offer the largest area and greatest density.

Consider the surface area of a SOFC tube of the prior art versus a Fuel Cell Stick™ device of the invention. For example, consider a 0.25" diameter tube versus a 0.25"×0.25" Fuel Cell Stick™ device. In the tube, the circumference is 3.14×D, or 0.785". In the 0.25" Fuel Cell Stick™ device, the usable width of one layer is about 0.2 inches. Therefore, it takes about four layers to give the same area as one tube. These figures are dramatically different than those for capacitor technology. The state of the art for Japanese multi-layer capacitors is currently 600 layers of 2 μm thicknesses. The Japanese will likely soon launch 1000 layer parts in production, and they make them now in the laboratory. These chip capacitors with 600 layers are only 0.060" (1500 μm). Applying this manufacturing technology to a Fuel Cell Stick™ device of the invention, in a 0.25" device having a 2 μm electrolyte thickness and air/fuel passages with respective cathodes/anodes of 10 μm thickness, it would be feasible to produce a single device with 529 layers. That would be the equivalent of 132 tubes. Prior art strategies either add more tubes, increase diameter, and/or increase tube length to get more power, with result being very large structures for high power output. The invention, on the other hand, either adds more layers to a single Fuel Cell Stick™ device to get more power and/or uses thinner layers or passages in the device, thereby enabling miniaturization for SOFC technology. Moreover, the benefit in the present invention is a squared effect, just like in capacitors. When the electrolyte layers are made half as thick, the power doubles, and then you can fit more layers in the device so power doubles again.

Another key feature of the invention is that it would be easy to link layers internally to increase the output voltage of the Fuel Cell Stick™ device. Assuming 1 volt per layer, 12 volts output may be obtained by the Fuel Cell Stick™ devices of the invention using via holes to link groups of 12 together. After that, further connections may link groups of 12 in parallel to achieve higher current. This can be done with existing methods used in capacitor chip technology. The critical difference is that the invention overcomes the brazing and complex wiring that other technologies must use.

The invention also provides a greater variety of electrode options compared to the prior art. Precious metals will work for both the anodes and cathodes. Silver is cheaper, but for higher temperature, a blend with Pd, Pt, or Au would be needed, with Pd possibly being the lowest priced of the three. Much research has focused on non-precious metal conductors. On the fuel side, attempts have been made to use nickel, but any exposure to oxygen will oxidize the metal at high temperature. Conductive ceramics are also known, and can be used in the invention. In short, the present invention may utilize any sort of anode/cathode/electrolyte system that can be sintered.

In an embodiment of the invention, it is possible that when a large area of 2 μm tape is unsupported, with air/gas on both sides, the layer might become fragile. It is envisioned to leave pillars across the gap. These would look something like pillars in caves where a stalactite and stalagmite meet. They could be spaced evenly and frequently, giving much better strength to the structure.

For attachment of the gas and air supply, it is envisioned that the end temperature is below 300° C., for example, below 150° C., such that high temperature flexible silicone tubes or latex rubber tubes, for example, may be used to attach to the Fuel Cell Stick™ devices. These flexible tubes can simply stretch over the end of the device, and thereby form a seal. These materials are available in the standard McMaster catalog. Silicone is commonly used at 150° C. or above as an oven gasket, without losing its properties. The many silicone or latex rubber tubes of a multi-stick Fuel Cell Stick™ system could be connected to a supply with barb connections.

The anode material or the cathode material, or both electrode materials, may be a metal or alloy. Suitable metals and alloys for anodes and cathodes are known to those of ordinary skill in the art. Alternatively, one or both electrode materials may be an electronically conductive green ceramic, which are also known to those of ordinary skill in the art. For example, the anode material may be a partially sintered metallic nickel coated with yttria-stabilized zirconia, and the cathode material may be a modified lanthanum manganite, which has a perovskite structure.

In another embodiment, one or both of the electrode materials may be a composite of a green ceramic and a conductive metal present in an amount sufficient to render the composite conductive. In general, a ceramic matrix becomes electronically conductive when the metal particles start to touch. The amount of metal sufficient to render the composite matrix conductive will vary depending mainly on the metal particle morphology. For example, the amount of metal will generally need to be higher for spherical powder metal than for metal flakes. In an exemplary embodiment, the composite comprises a matrix of the green ceramic with about 40-90% conductive metal particles dispersed therein. The green ceramic matrix may be the same or different than the green ceramic material used for the electrolyte layer.

In the embodiments in which one or both electrode materials include a ceramic, i.e., the electronically conductive green ceramic or the composite, the green ceramic in the electrode materials and the green ceramic material for the electrolyte may contain cross-linkable organic binders, such that during lamination, the pressure is sufficient to cross-link the organic binder within the layers as well as to link polymer molecular chains between the layers.

Reference will now be made to the drawings in which like numerals are used throughout to refer to like components.

RERERENCE NUMBERS USED IN THE FIGURES ARE AS FOLLOWS

10 Full Cell Stick™ device
11a First end
11b Second end
12 Fuel inlet
13 Fuel pre-heat chamber
14 Fuel passage
14a Thick fuel passage
14b Thin fuel passage
16 Fuel outlet
18 Air inlet
19 Air pre-heat chamber
20 Air passage
21 Exhaust passage
22 Air outlet
24 Anode layer/anode
25 Exposed anode portion
26 Cathode layer/cathode
27 Exposed cathode portion
28 Electrolyte layer/electrolyte
29 Ceramic
30 Cold zone (or second temperature)
31 Transition zone
32 Hot zone/heated zone/first temperature zone
33a Pre-heat zone/non-active zone
33b Active zone
34 Fuel supply
36 Air supply
38 Negative voltage node
40 Positive voltage node
42 Wire
44 Contact pad
46 Solder connection
48 Spring clip
50 Supply tube
52 Tie wrap
54 Support pillars
56 First via
58 Second via
60 Barrier coating
62 Surface particles
64 Textured surface layer
66 Anode suspension
70 Openings
72(a,b) Organic material/sacrificial layer
80 Left side
82 Right side
84 Bridging portion
90 Bridge
92 Wire/physical structure
94 Gap-forming tape
96,96',96" Furnace wall
98a,b,c Insulation
100 Fuel Cell Stick™ device
102 Elongate section
104 Large surface area section
106 Elongate section
120 Air gap
122 Current collector 123 Gap
124 Electrode particles
126 Viscous fluid
128 Temporary substrate
130 Ceramic tape
132 Indentations
134 Connector
136 Electrical contacts
138 Gas flow pathway
140 O-ring
142 Large hole (in ceramic tape)
144 Porous area of electrode
146 Nonporous area of electrode
148 Connector electrode (conductor tape)
150 Slit
152 First Conductor
154 Second Conductor
156 Oblong via
158a,b,c,d Plugs (at via)
160 Edge connection
162 Center connect
164 Hole (in gap tape)
166 Individual cell
167 Common pathway
168 Mandrel
170a,b Conductive ends
172 Folded stack
174 Barrier layer
176 Insulating layer
178 LSM tape
180 Interior fuel channel
182 Nickel conductor
184 End tube
186 Wrapped end tube
190 Cylindrical end portion
192 End holes
194 Rectangular end portion
196 Rectangular tube
198 Shape transitioning end tube
200 Spiral Tubular Fuel Cell Stick™ device
300 Concentric Tubular Fuel Cell Stick™ device
400 End-rolled Fuel Cell Stick™ device
401 Fuel Cell Stick™ device
402 Thick portion
404 Thin portion
410 Furnace
500 Fuel Cell Stick™ device
600 Fuel Cell Stick™ device
610 Plate
612 Rectangular plate
614 Round tube
616 Flat tube
618 Support members
620 Vertical ribs
622 Delta ribs
624 Channels
624a Fuel channels
624b Air channels
626 Cover
628 Via paths
630 High temperature manifolds
632 Narrowing flat tube
634 Fibers
636 Cloth
638 Microtubes
642 Divider
700 Fuel Cell Stick™ device
702a,b Stick entrances
704 Large area
706 Stabilization points
708 Spines
710 Larger connection
800 Fuel Cell Stick™ device
814,820 Artery flow passage
815,821 Active flow passage
817,823 Vertical exit hole
829,829a,b Green ceramic sheets
837,839 Surface artery
868 Interconnect
872 Artery gap-forming material
874 Thin gap-forming material
878 Fixed plate
900 Fuel Cell Stick™ device
902 Exit region
904 Inside corners
910 Fuel Cell Stick™ device
912 Corner
914 Curved Path
916 End of device
918 Narrow end region
920 Fuel Cell Stick™ device
922 Top exit protrusion
930 Conductive balls
932 Ceramic balls
934 Outer coating
940 Furnace
950 AFP plug
952 Fuel pathway
954 Air pathway
956 Conductor
960 Fuel Cell Stick™ device
962a,b Fuel entry points
964a,b Air entry points
966 Grooves
968a,b End sections
970a,b End sections
976 Edge
978 Gap
980 Extra material
982 Cutout
1000 Fuel Cell Stick™ device
1002 Tube
1010 Groove
1012a,b Forked end
1014a,b Forked end
1015 Non-forked end
1022 Voids
1030 Triple layer structure
1040 Stack
1042 Tube
1050 Support member The terms "zone," "area," and "region" may be used interchangeably throughout, and are intended to have the same meaning. Similarly, the terms "passage," "channel," and "path" may be used interchangeably throughout and the terms "outlet" and "exit" may be used interchangeably throughout.

FIGS. 1 and 1A depict, in side cross-sectional view and top cross-sectional view, respectively, one embodiment of a basic Fuel Cell Stick™ device 10 of the invention, having a single anode layer 24, cathode layer 26 and electrolyte layer 28, wherein the device 10 is monolithic. The Fuel Cell Stick™ device 10 includes a fuel inlet 12, a fuel outlet 16 and a fuel passage 14 therebetween. Device 10 further includes an air inlet 18, an air outlet 22 and an air passage 20 therebetween.

The fuel passage 14 and the air passage 20 are in an opposing and parallel relation, and the flow of fuel from fuel supply 34 through the fuel passage 14 is in a direction opposite to the flow of air from air supply 36 through air passage 20. The electrolyte layer 28 is disposed between the fuel passage 14 and the air passage 20. The anode layer 24 is disposed between the fuel passage 14 and the electrolyte layer 28. Similarly, the cathode layer 26 is disposed between the air passage 20 and the electrolyte layer 28. The remainder of the Fuel Cell Stick™ device 10 comprises ceramic 29, which may be of the same material as the electrolyte layer 28 or may be a different but compatible ceramic material. The electrolyte layer 28 is considered to be that portion of the ceramic lying between opposing areas of the anode 24 and cathode 26, as indicated by dashed lines. It is in the electrolyte layer 28 that oxygen ions pass from the air passage 20 to the fuel passage 14. As shown in FIG. 1, O2 from the air supply 36 travels through the air passage 20 and is ionized by the cathode layer 26 to form 2O—, which travels through the electrolyte layer 28 and through the anode 24 into the fuel passage 14 where it reacts with fuel, for example, a hydrocarbon, from the fuel supply 34 to first form CO and H2 and then to form H2O and CO2. While FIG. 1 depicts the reaction using a hydrocarbon as the fuel, the invention is not so limited. Any type of fuel commonly used in SOFCs may be used in the present invention. Fuel supply 34 may be any hydrocarbon source or hydrogen source, for example. Methane (CH4), propane (C3H8) and butane (C4H10) are examples of hydrocarbon fuels.

For the reaction to occur, heat must be applied to the Fuel Cell Stick™ device 10. In accordance with the invention, the length of the Fuel Cell Stick™ device 10 is long enough that the device can be divided into a hot zone 32 (or heated zone) in the center of the device 10 and cold zones 30 at each end 11a and 11b of the device 10. Between the hot zone 32 and the cold zones 30, a transition zone 31 exists. The hot zone 32 will typically operate above 400° C. In exemplary embodiments, the hot zone 32 will operate at temperatures >600° C., for example >700° C. The cold zones 30 are not exposed to a heat source, and due to the length of the Fuel Cell Stick™ device 10 and the thermal property advantages of the ceramic materials, heat dissipates outside the hot zone 32, such that the cold zones 30 have a temperature <300° C. It is believed that heat transfer from the hot zone 32 down the length of the ceramic to the end of the cold zone 30 is slow, whereas the heat transfer from the ceramic material outside the hot zone 32 into the air is relatively faster. Thus, most of the heat inputted in the hot zone 32 is lost to the air (mainly in the transition zone 31) before it can reach the end of the cold zone 30. In exemplary embodiments of the invention, the cold zones 30 have a temperature <150° C. In a further exemplary embodiment, the cold zones 30 are at room temperature. The transition zones 31 have temperatures between the operating temperature of the hot zone 32 and the temperature of the cold zones 30, and it is within the transition zones 31 that the significant amount of heat dissipation occurs.

Because the dominant coefficient of thermal expansion (CTE) is along the length of the Fuel Cell Stick™ device 10, and is therefore essentially one-dimensional, fast heating of the center is permitted without cracking. In exemplary embodiments, the length of the device 10 is at least five times greater than the width and thickness of the device. In further exemplary embodiments, the length of the device 10 is at least 10 times greater than the width and thickness of the device. In yet further exemplary embodiments, the length of the device 10 is at least 15 times greater than the width and thickness of the device. In addition, in exemplary embodiments, the width is greater than the thickness, which provides for greater area. For example, the width may be at least twice the thickness. By way of further example, a 0.2 inch thick Fuel Cell Stick™ device 10 may have a width of 0.5 inch. It may be appreciated that the drawings are not shown to scale, but merely give a general idea of the relative dimensions.

In accordance with the invention, electrical connections to the anode 24 and cathode 26 are made in the cold zones 30 of the Fuel Cell Stick™ device 10. In an exemplary embodiment, the anode 24 and the cathode 26 will each be exposed to an outer surface of the Fuel Cell Stick™ device 10 in a cold zone 30 to allow an electrical connection to be made. A negative voltage node 38 is connected via a wire 42, for example, to the exposed anode portion 25 and a positive voltage node 40 is connected via a wire 42, for example, to the exposed cathode portion 27. Because the Fuel Cell Stick™ device 10 has cold zones 30 at each end 11a, 11b of the device, low temperature rigid electrical connections can be made, which is a significant advantage over the prior art, which generally requires high temperature brazing methods to make the electrical connections.

FIG. 2 depicts in perspective view a first end 11a of Fuel Cell Stick™ device 10 with a supply tube 50 attached over the end 11a and secured with a tie wrap 52. Fuel from fuel supply 34 will then be fed through the supply tube 50 and into the fuel inlet 12. As a result of first end 11a being in the cold zone 30, flexible plastic tubing or other low temperature type connection material may be used to connect the fuel supply 34 to the fuel inlet 12. The need for high temperature brazing to make the fuel connection is eliminated by the invention.

Figure 3A:
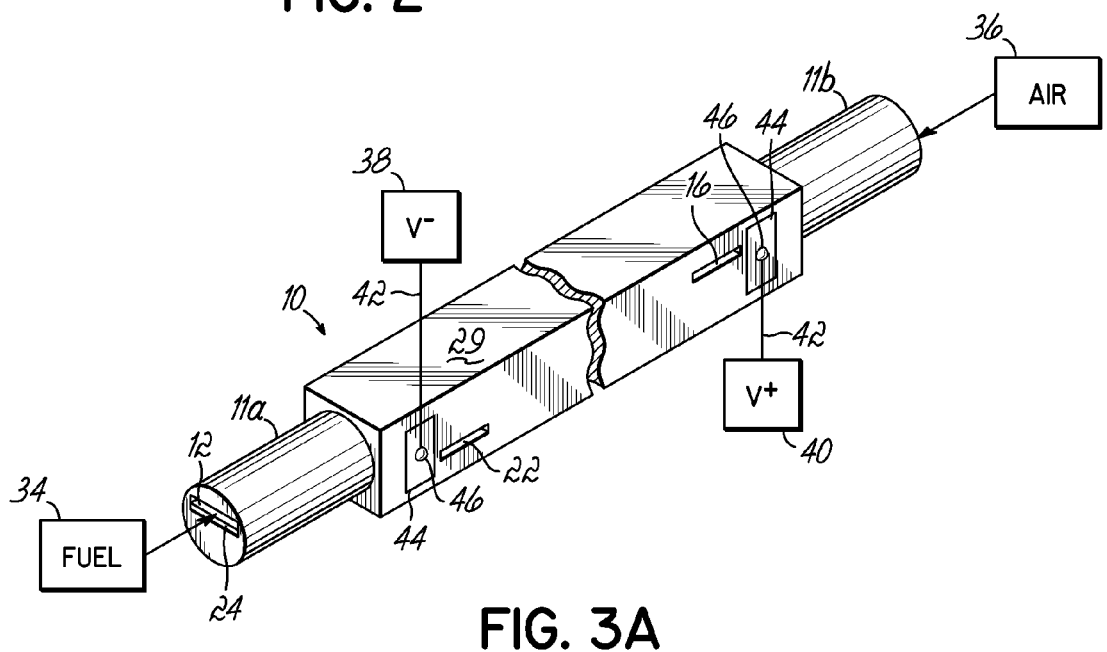
FIG. 3A depicts in perspective view a Fuel Cell Stick™ device according to one embodiment of the invention, but having modified ends.
Figure 3B:
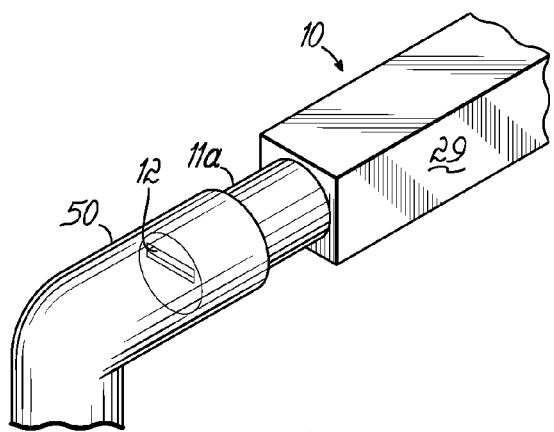
FIG. 3B depicts in perspective view a fuel supply tube connected to one modified end of the device of FIG. 3A.

FIG. 3A depicts in perspective view a Fuel Cell Stick™ device 10 similar to that depicted in FIG. 1, but having modified first and second ends 11a, 11b. Ends 11a, 11b have been machined to form cylindrical end portions to facilitate connection of the fuel supply 34 and air supply 36. FIG. 3B depicts in perspective view a supply tube 50 connected to the first end 11a for feeding fuel from fuel supply 34 to the fuel inlet 12. By way of example, supply tube 50 can be a silicone or latex rubber tube that forms a tight seal by virtue of its elasticity to the first end 11a. It may be appreciated that the flexibility and elasticity of the supply tubes 50 can provide a shock-absorbing holder for the Fuel Cell Stick™ devices 10 when the use is in a mobile device subject to vibrations. In the prior art, the tubes or plates were rigidly brazed, and thus subject to crack failure if used in a dynamic environment. Therefore, the additional function of the supply tubes 50 as vibration dampers offers a unique advantage compared to the prior art.

Referring back to FIG. 3A, contact pads 44 are provided on the outer surface of the Fuel Cell Stick™ device 10 so as to make contact with the exposed anode portion 25 and the exposed cathode portion 27. Material for the contact pads 44 should be electrically conductive so as to electrically connect the voltage nodes 38, 40 to their respective anode 24 and cathode 26. It may be appreciated that any suitable method may be used for forming the contact pads 44. For example, metal pads may be printed onto the outer surface of a sintered Fuel Cell Stick™ device 10. The wires 42 are secured to the contact pads 44 by a solder connection 46, for example, to establish a reliable connection. Solders are a low temperature material, which can be used by virtue of being located in the cold zones 30 of the Fuel Cell Stick™ device 10. For example, a common 10Sn88Pb2Ag solder can be used. The present invention eliminates the need for high temperature voltage connections, thereby expanding the possibilities to any low temperature connection material or means.

Also depicted in FIG. 3A, in perspective view, are the fuel outlet 16 and the air outlet 22. The fuel enters through the fuel inlet 12 at first end 11a, which is in one cold zone 30, and exits out the side of Fuel Cell Stick™ device 10 through outlet 16 adjacent the second end 11b. Air enters through air inlet 18 located in the second end 11b, which is in the cold zone 30, and exits from the air outlet 22 in the side of the Fuel Cell Stick™ device 10 adjacent the first end 11a. While the outlets 16 and 22 are depicted as being on the same side of the Fuel Cell Stick™ device 10, it may be appreciated that they may be positioned at opposing sides, for example, as depicted below in FIG. 4A.

By having air outlet 22 close to fuel inlet 12 (and similarly fuel outlet 16 close to air inlet 18), and through the close proximity of the overlapping layers (anode, cathode, electrolyte), the air outlet 22 functions as a heat exchanger, usefully pre-heating the fuel that enters the device 10 through fuel inlet 12 (and similarly, fuel outlet 16 pre-heats air entering through air inlet 18). Heat exchangers improve the efficiency of the system. The transition zones 31 have overlapping areas of spent air and fresh fuel (and spent fuel and fresh air), such that heat is transferred before the fresh fuel (fresh air) reaches the hot zone 32. Thus, the Fuel Cell Stick™ device 10 of the invention is a monolithic structure that includes a built-in heat exchanger.

With respect to FIG. 4A, there is depicted in perspective view the connection of a plurality of Fuel Cell Stick™ devices 10, in this case two Fuel Cell Stick™ devices 10, by aligning each contact pad 44 connected to the exposed anode portions 25 and soldering (at 46) a wire 42 connected to the negative voltage node 38 to each of the contact pads 44. Similarly, the contact pads 44 that are connected to the exposed cathode portions 27 are aligned and a wire 42 connecting the positive voltage node 40 is soldered (at 46) to each of those aligned contact pads 44, as shown partially in phantom. As may be appreciated, because the connection is in the cold zone 30, and is a relatively simple connection, if one Fuel Cell Stick™ device 10 in a multi-Fuel Cell Stick™ system or assembly needs replacing, it is only necessary to break the solder connections to that one device 10, replace the device with a new device 10, and re-solder the wires 42 to the contact pads 44 of the new Fuel Cell Stick™ device 10.

FIG. 4B depicts in an end view the connection between multiple Fuel Cell Stick™ devices 10, where each Fuel Cell Stick™ device 10 includes a plurality of anodes 24 and cathodes 26. For example, the specific embodiment depicted in FIG. 4B includes three sets of opposing anodes 24 and cathodes 26, with each anode 24 exposed at the right side of the Fuel Cell Stick™ device 10 and each cathode 26 exposed at the left side of the Fuel Cell Stick™ device 10. A contact pad 44 is then placed on each side of the Fuel Cell Stick™ device 10 to contact the respective exposed anode portions 25 and exposed cathode portions 27. On the right side, where the anodes 24 are exposed, the negative voltage node 38 is connected to the exposed anode portions 25 by securing wire 42 to the contact pad 44 via a solder connection 46. Similarly, positive voltage node 40 is connected electrically to the exposed cathode portions 27 on the left side of the Fuel Cell Stick™ device 10 by securing wire 42 to contact pad 44 via the solder connection 46. Thus, while FIGS. 1-4A depicted a single anode 24 opposing a single cathode 26, it may be appreciated, as shown in FIG. 4B, that each Fuel Cell Stick™ device 10 may include multiple anodes 24 and cathodes 26, with each being exposed to an outer surface of the Fuel Cell Stick™ device 10 for electrical connection by means of a contact pad 44 applied to the outer surface for connection to the respective voltage node 38 or 40. The number of opposing anodes 24 and cathodes 26 in the structure may be tens, hundreds and even thousands.

FIG. 5 depicts in an end view a mechanical attachment for making the electrical connection between wire 42 and the contact pad 44. In this embodiment, the Fuel Cell Stick™ devices 10 are oriented such that one set of electrodes is exposed at the top surface of each Fuel Cell Stick™ device 10. The contact pad 44 has been applied to each top surface at one end (e.g., 11a or 11b) in the cold zone 30. Spring clips 48 may then be used to removably secure the wire 42 to the contact pads 44. Thus, metallurgical bonding may be used to make the electrical connections, such as depicted in FIGS. 3A, 4A and 4B, or mechanical connection means may be used, as depicted in FIG. 5. The flexibility in selecting an appropriate attachment means is enabled by virtue of the cold zones 30 in the Fuel Cell Stick™ devices 10 of the invention. Use of spring clips 48 or other mechanical attachment means further simplifies the process of replacing a single Fuel Cell Stick™ device 10 in a multi-stick assembly.

Figure 6A:
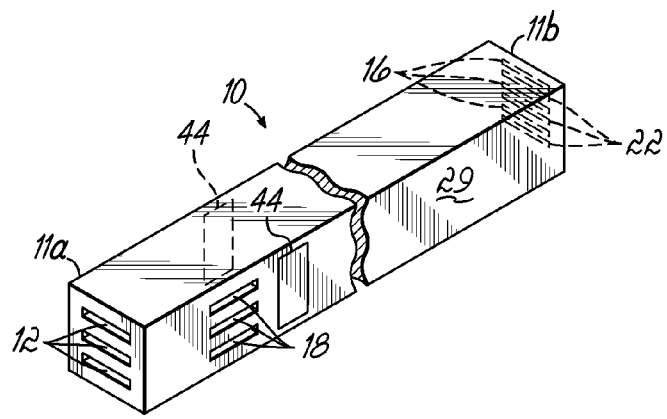
FIGS. 6A and 6B depict in perspective views an alternative embodiment having a single cold zone at one end of a Fuel Cell Stick™ device to which fuel and air supply tubes are attached, with the other end being in the hot zone.
Figure 6B:
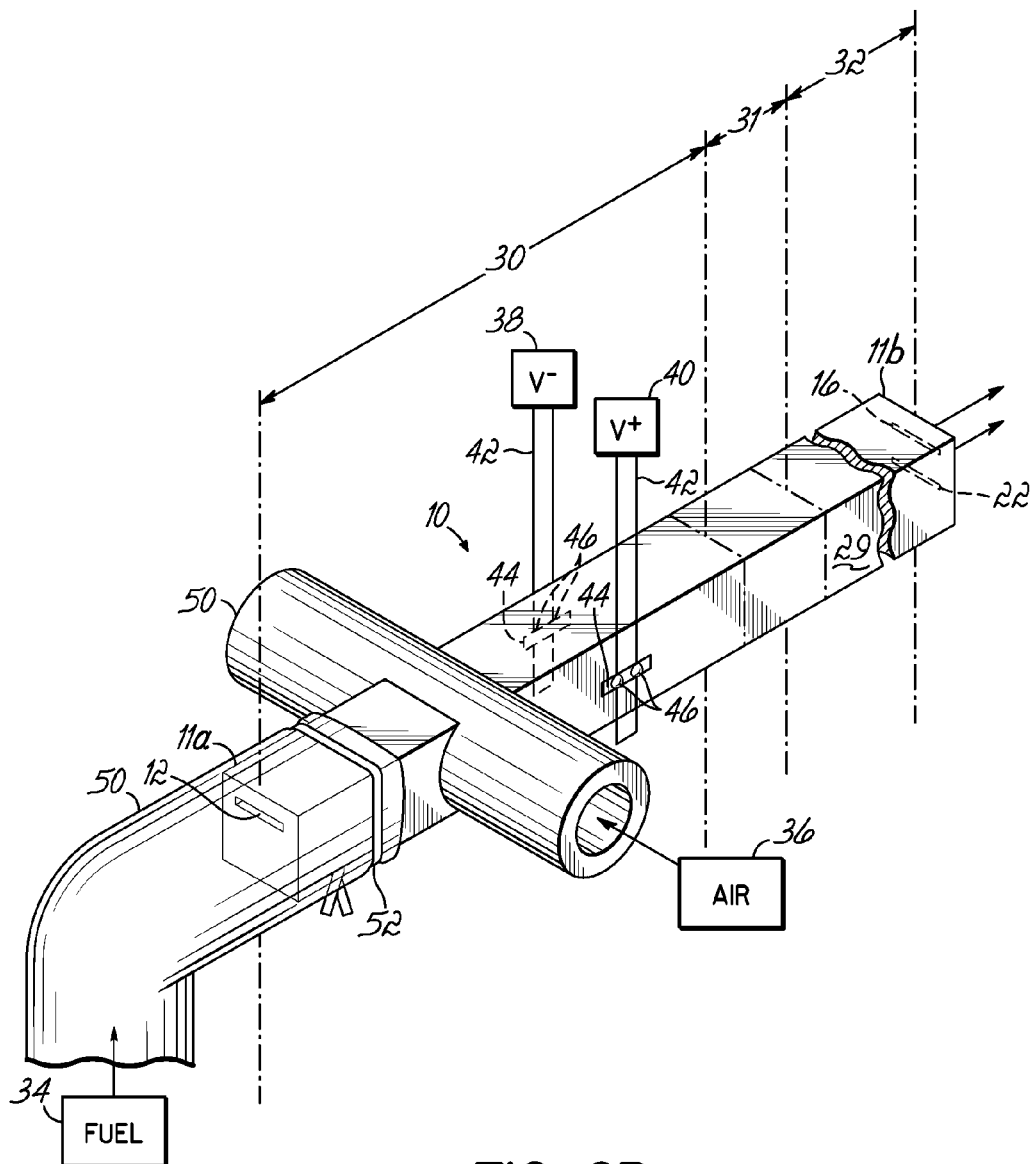

FIGS. 6A and 6B depict in perspective views an alternative embodiment having a single cold zone 30 at the first end 11a of Fuel Cell Stick™ device 10, with the second end 11b being in the hot zone 32. In FIG. 6A, the Fuel Cell Stick™ device 10 includes three fuel cells in parallel, whereas the Fuel Cell Stick™ device 10 of FIG. 6B includes a single fuel cell. Thus, embodiments of the invention may include a single cell design or a multi-cell design. To enable the single end input of both the fuel and the air, the air inlet 18 is reoriented to be adjacent the first end 11a at the side surface of the Fuel Cell Stick™ device 10. The air passage 20 (not shown) again runs parallel to the fuel passage 14, but in this embodiment, the flow of air is in the same direction as the flow of fuel through the length of the Fuel Cell Stick™ device 10. At the second end 11b of the device 10, the air outlet 22 is positioned adjacent the fuel outlet 16. It may be appreciated that either the fuel outlet 16 or the air outlet 22, or both, can exit from a side surface of the Fuel Cell Stick™ device 10, rather than both exiting at the end surface.

As depicted in FIG. 6B, the supply tube 50 for the air supply 36 is formed by making holes through the side of the supply tube 50 and sliding the device 10 through the side holes so that the supply tube 50 for the air supply 36 is perpendicular to the supply tube 50 for the fuel supply 34. Again, a silicone rubber tube or the like may be used in this embodiment. A bonding material may be applied around the joint between the supply tube 50 and the device 10 to form a seal. The electrical connections are also made adjacent the first end 11a in the cold zone 30. FIGS. 6A and 6B each depict the positive voltage connection being made on one side of the Fuel Cell Stick™ device 10 and the negative voltage connection being made on the opposing side of the Fuel Cell Stick™ device 10. However, it may be appreciated that the invention is not so limited. An advantage of the single end input Fuel Cell Stick™ device 10 is that there is only one cold-to-hot transition instead of two transition zones 31, such that the Fuel Cell Stick™ device 10 could be made shorter.

One benefit of the invention is the ability to make the active layers very thin, thereby enabling a Fuel Cell Stick™ device 10 to incorporate multiple fuel cells within a single device. The thinner the active layers are, the greater the chance of an air passage 20 or fuel passage 14 caving in during manufacture of the Fuel Cell Stick™ device 10, thereby obstructing flow through the passage 14 and/or 20. Therefore, in one embodiment of the invention, depicted in FIGS. 7A and 7B, a plurality of support pillars 54, for example ceramic support pillars, are provided in the passages 14 and 20 to prevent distortion of the electrolyte layer 28 and obstruction of the passages 14, 20. FIG. 7A is a cross-sectional side view, whereas FIG. 7B is a cross-sectional top view through the air passage 20. According to one method of the invention, using the tape casting method, a sacrificial tape layer may be used, with a plurality of holes formed in the sacrificial layer, such as by means of laser removal of the material. A ceramic material is then used to fill the holes, such as by spreading a ceramic slurry over the sacrificial tape layer to penetrate the holes. After the various layers are assembled together, the sacrificial material of the sacrificial layer is removed, such as by use of a solvent, leaving the support pillars 54 remaining.

Figure 7C:
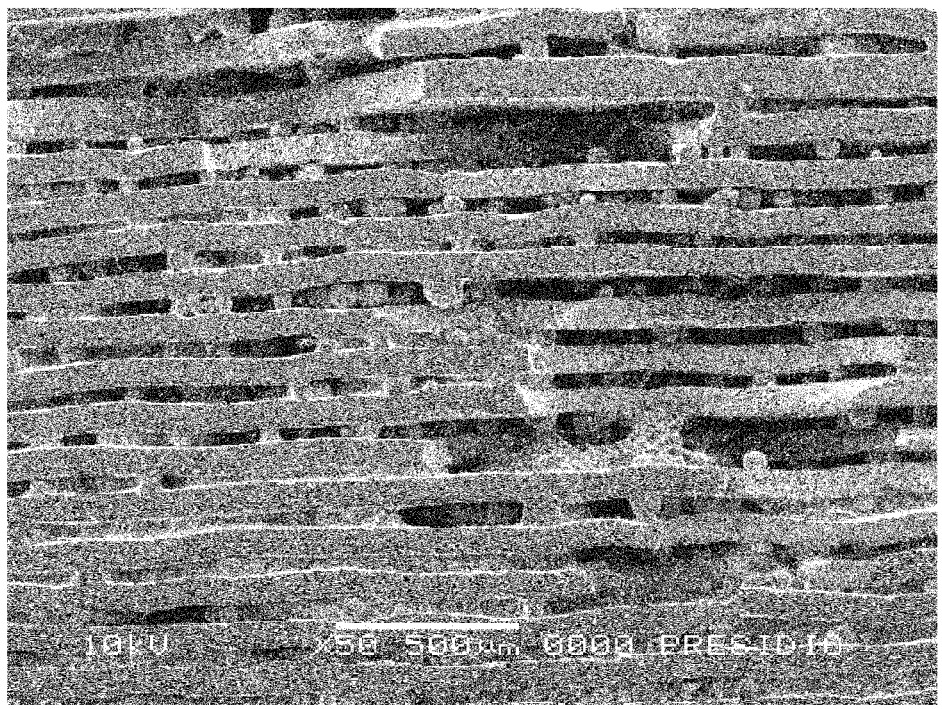
FIGS. 7C and 7D are micrographs depicting the use of spherical balls in the fuel and air passages as the support pillars according to another embodiment.
Figure 7D:
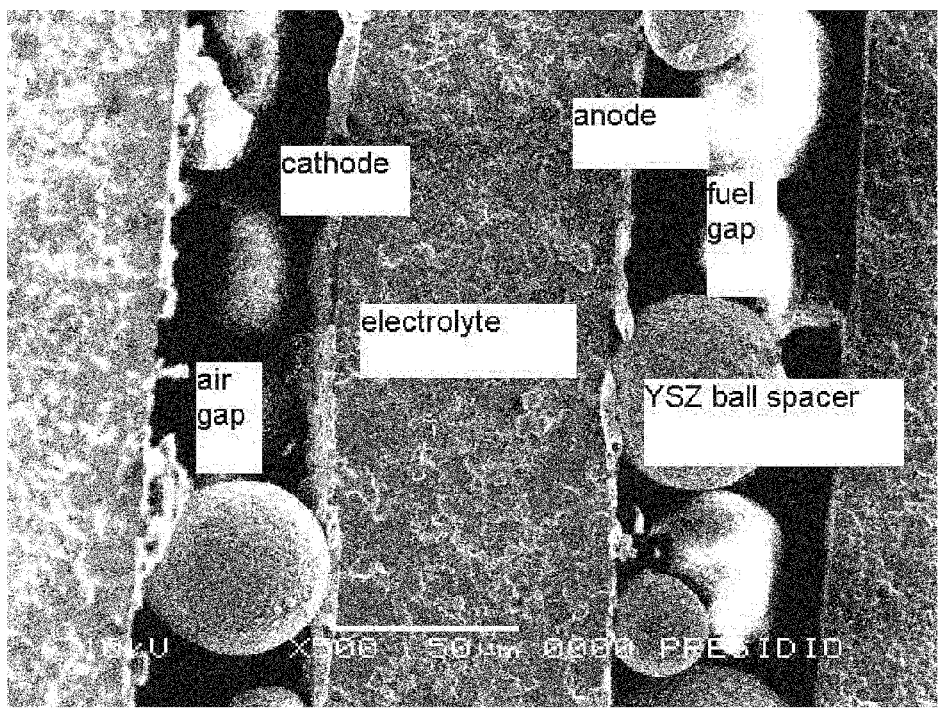

In another embodiment for forming the support pillars 54, large particles of a pre-sintered ceramic can be added to an organic vehicle, such as plastic dissolved in a solvent, and stirred to form a random mixture. By way of example and not limitation, the large particles may be spheres, such as 0.002 in. diameter balls. The random mixture is then applied to the green structure, such as by printing in the areas where the fuel and air passages 14 and 20 are to be located. During the sintering (bake/fire) process, the organic vehicle leaves the structure (e.g. is burned out), thereby forming the passages 14, 20, and the ceramic particles remain to form the support pillars 54 that physically hold open the passages 14, 20. The resultant structure is shown in the micrographs of FIGS. 7C and 7D. The support pillars 54 are randomly positioned, with the average distance being a function of the loading of the ceramic particles in the organic vehicle.

Figure 8A:
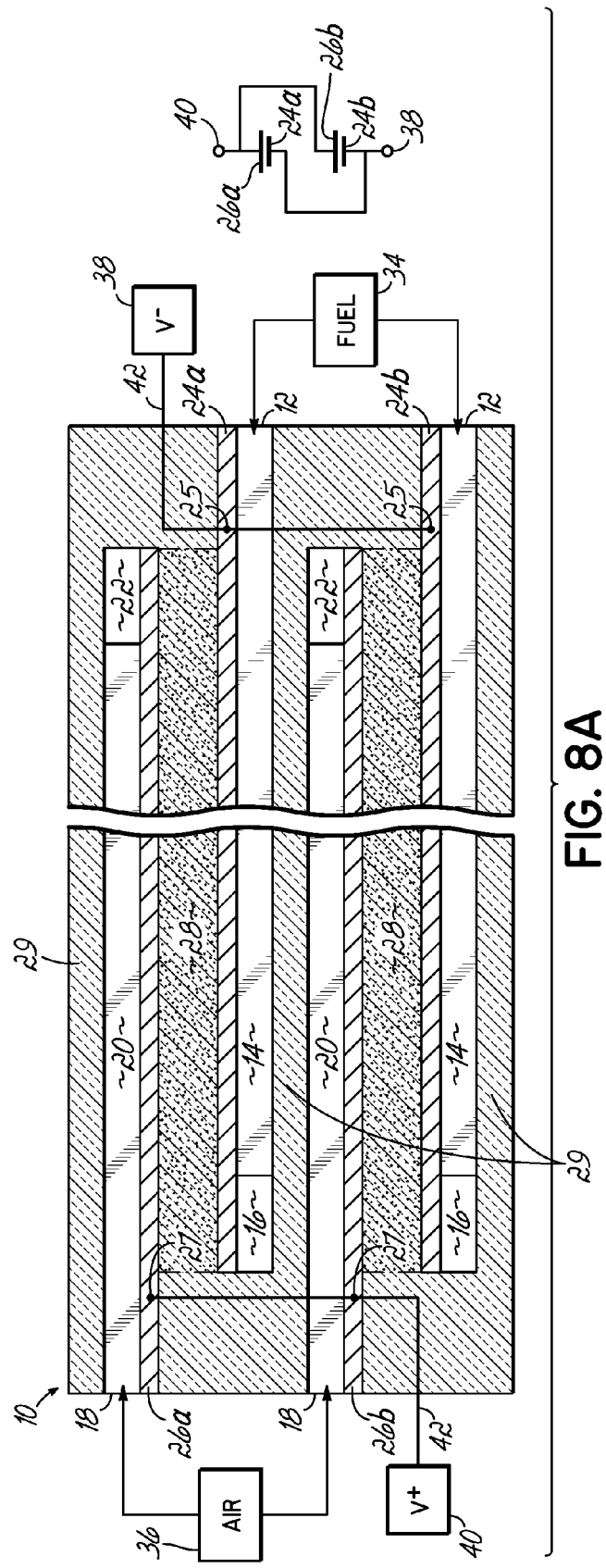
FIG. 8A depicts in cross-section one embodiment of the invention containing two fuel cells connected externally in parallel.

FIG. 8A depicts in cross-section one embodiment of the invention containing two fuel cells in parallel. Each active electrolyte layer 28 has an air passage 20 and cathode layer 26a or 26b on one side and a fuel passage 14 and anode layer 24a or 24b on the opposing side. The air passage 20 of one fuel cell is separated from the fuel passage 14 of the second fuel cell by ceramic material 29. The exposed anode portions 25 are each connected via wire 42 to the negative voltage node 38 and the exposed cathode portions 27 are each connected via a wire 42 to the positive voltage node 40. A single air supply 36 can then be used to supply each of the multiple air passages 20 and a single fuel supply 34 may be used to supply each of the multiple fuel passages 14. The electrical circuit established by this arrangement of the active layers is depicted at the right side of the figure.

Figure 8B:
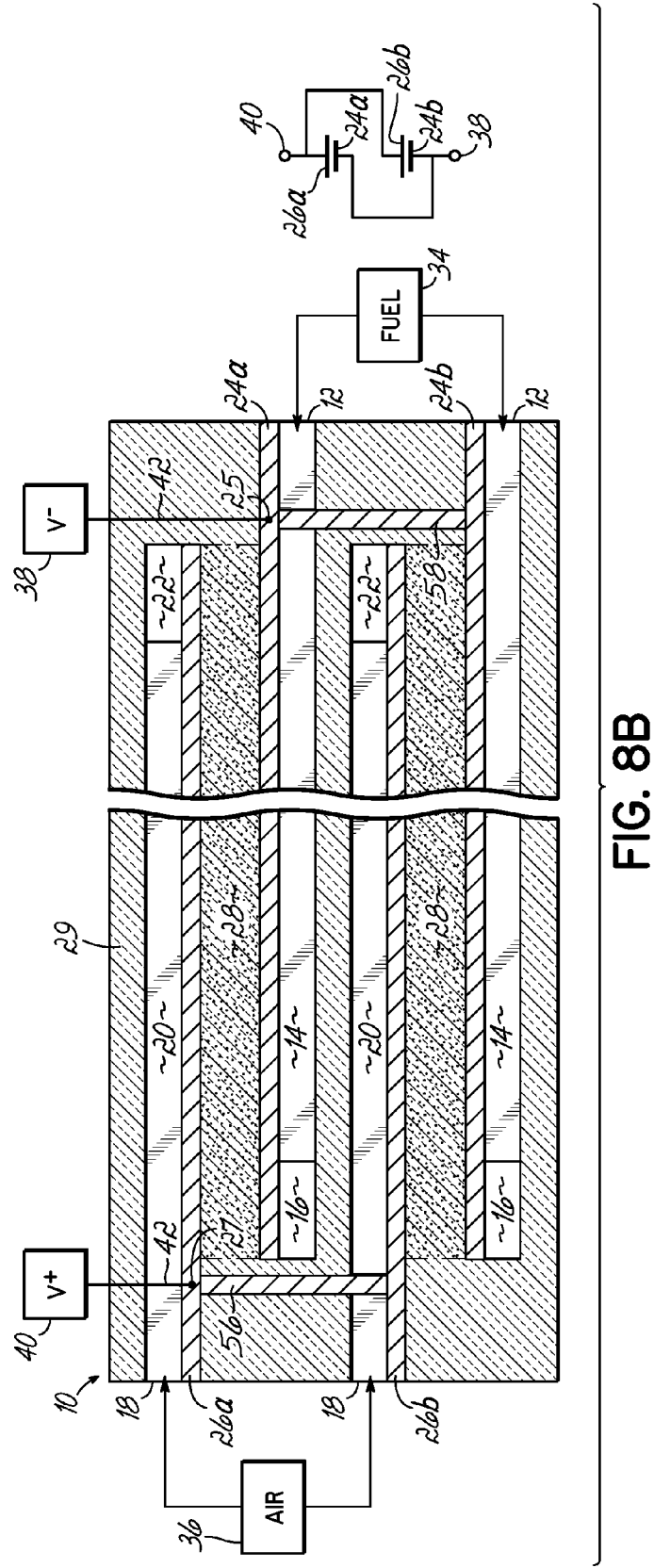
FIG. 8B depicts in cross-sectional view another embodiment similar to FIG. 8A, but having the two fuel cells connected internally in parallel through the use of vias.

In the cross-sectional view of FIG. 8B, the Fuel Cell Stick™ device 10 is similar to that depicted in FIG. 8A, but instead of having multiple exposed anode portions 25 and multiple exposed cathode portions 27, only anode layer 24a is exposed at 25 and only one cathode layer 26a is exposed at 27. A first via 56 connects cathode layer 26a to cathode layer 26b and a second via 58 connects anode layer 24a to anode layer 24b. By way of example, laser methods may be used during formation of the green layers to create open vias, which are then subsequently filled with electrically conductive material to form the via connections. As shown by the circuit at the right of FIG. 8B, the same electrical path is formed in the Fuel Cell Stick™ device 10 of FIG. 8B as in the Fuel Cell Stick™ device 10 of FIG. 8A.

Figure 9A:
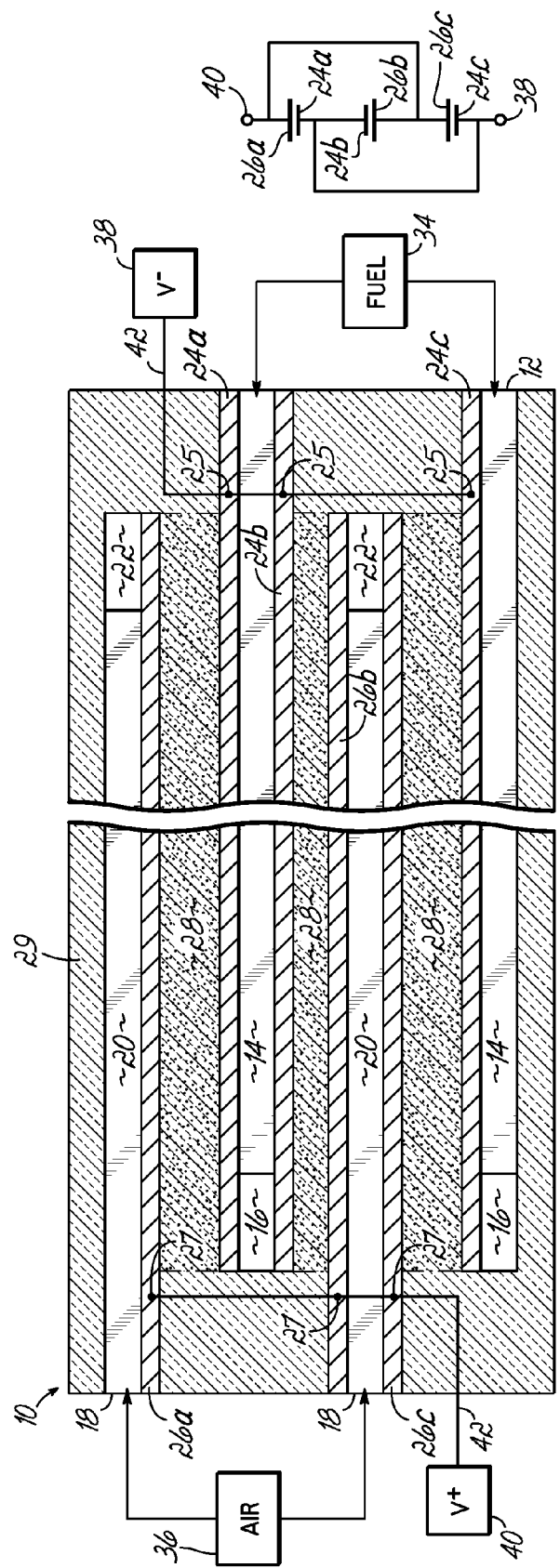
FIGS. 9A and 9B depict in cross-sectional views a multi-fuel cell design according to an embodiment of the invention having shared anodes and cathodes, where
Figure 9B:
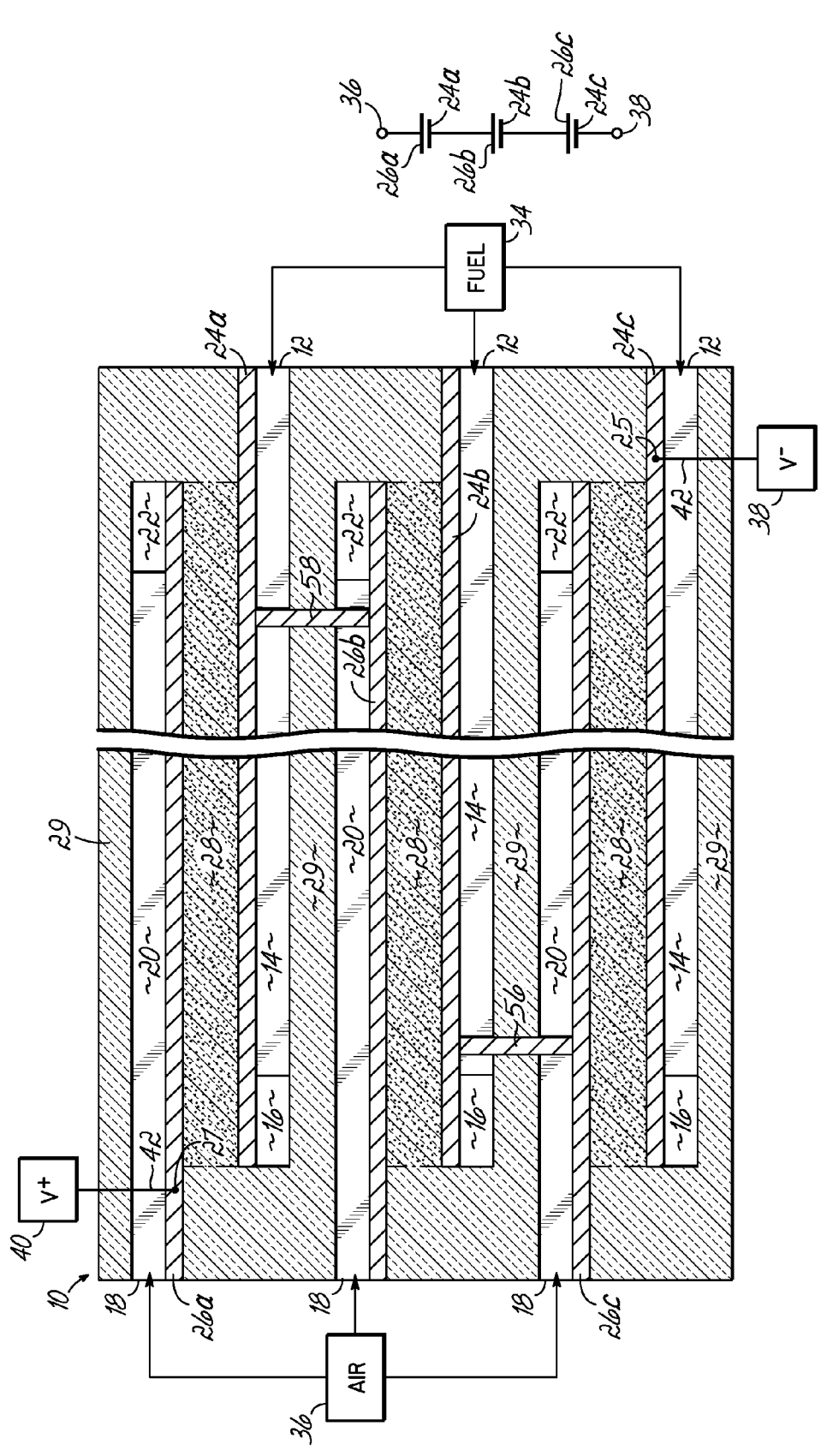

FIGS. 9A and 9B also depict, in cross-sectional views, multi-fuel cell designs, but with shared anodes and cathodes. In the embodiment of FIG. 9A, the Fuel Cell Stick™ device 10 includes two fuel passages 14 and two air passages 20, but rather than having two fuel cells, this structure includes three fuel cells. The first fuel cell is formed between anode layer 24a and cathode layer 26a with intermediate electrolyte layer 28. Anode layer 24a is on one side of a fuel passage 14, and on the opposing side of that fuel passage 14 is a second anode layer 24b. Second anode layer 24b opposes a second cathode layer 26b with another electrolyte layer 28 there between, thereby forming a second fuel cell. The second cathode layer 26b is on one side of an air passage 20 and a third cathode layer 26c is on the opposing side of that air passage 20. Third cathode layer 26c opposes a third anode layer 24c with an electrolyte layer 28 therebetween, thus providing the third fuel cell. The portion of the device 10 from anode layer 24a to cathode layer 26c could be repeated numerous times within the device 10 to provide the shared anodes and cathodes thereby multiplying the number of fuel cells within a single Fuel Cell Stick™ device 10. Each anode layer 24a, 24b, 24c includes an exposed anode portion 25 to which electrical connections can be made at the outer surface of the Fuel Cell Stick™ device 10 to connect to a negative voltage node 38 via a wire 42, for example. Similarly, each cathode layer 26a, 26b, 26c includes an exposed cathode portion 27 to the outside surface for connection to a positive voltage node 40 via a wire 42, for example. A single air supply 36 may be provided at one cold end to supply each of the air passages 20 and a single fuel supply 34 may be provided at the opposite cold end to supply each of the fuel passages 14. The electrical circuit formed by this structure is provided at the right side of FIG. 9A. This Fuel Cell Stick™ device 10 contains three fuel cell layers in parallel trebling the available power. For example, if each layer produces 1 volt and 1 amp, then each fuel cell layer produces 1 watt of power output (volt×amp=watt). Therefore, this three-layer layout would then produce 1 volt and 3 amps for a total of 3 watts of power output.

In FIG. 9B, the structure of FIG. 9A is modified to provide a single electrical connection to each of the voltage nodes to create three fuel cells in series, as shown by the circuit at the right side of FIG. 9B. The positive voltage node 40 is connected to cathode layer 26a at exposed cathode portion 27. Anode layer 24a is connected to cathode layer 26b by via 58. Anode layer 24b is connected to cathode layer 26c by via 56. Anode layer 24c is then connected at exposed anode portion 25 to the negative voltage node 38. Thus, using the same 1 amp/1 volt per layer assumption, this three cell structure would produce 3 volts and 1 amp for a total of 3 watts of power output.

Figure 10:
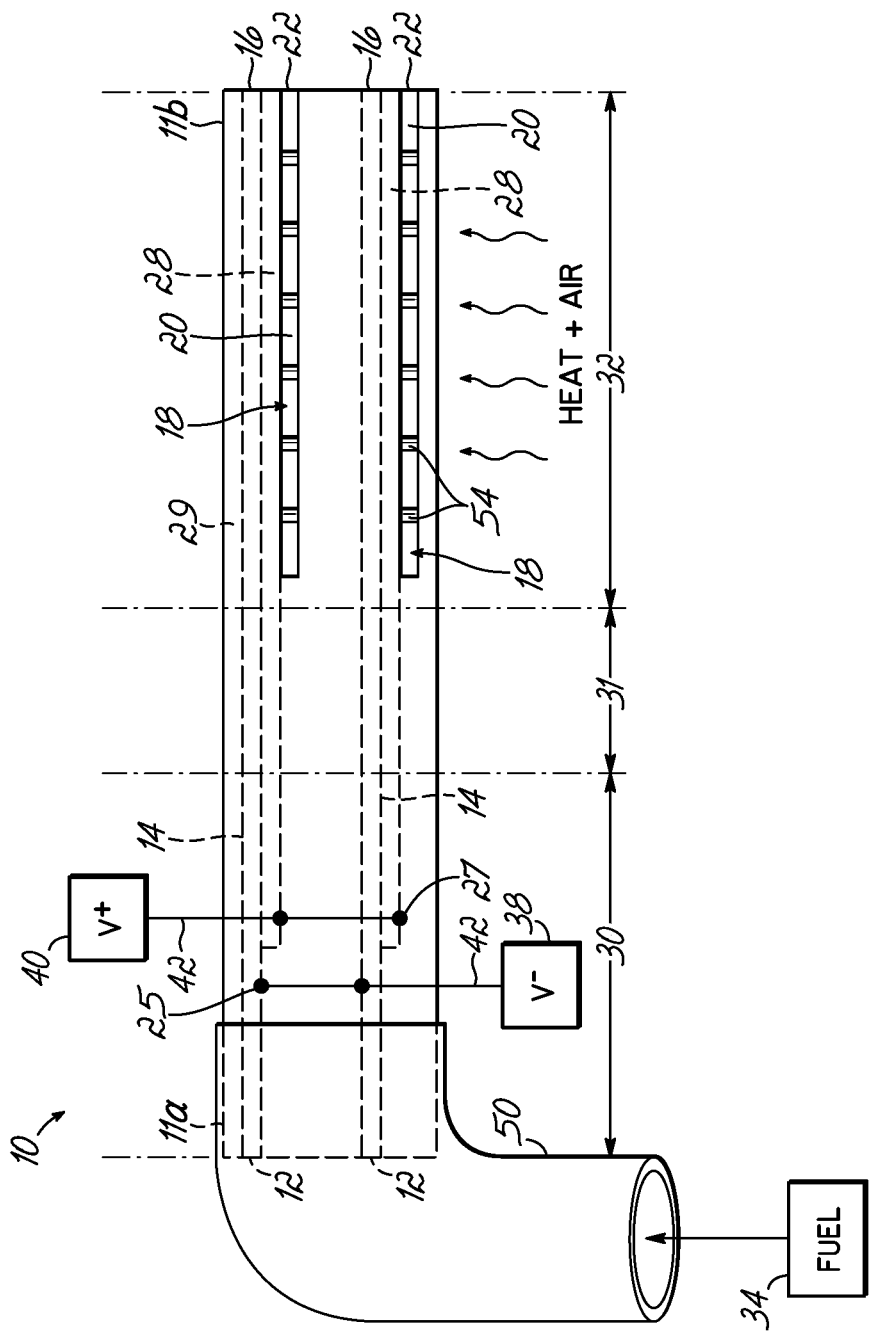
FIG. 10 depicts in schematic side view a Fuel Cell Stick™ device according to one embodiment of the invention having a fuel supply tube connected to a cold end of the device and a side of the device open in the hot zone to an air passage for supply of heated air to the device in the hot zone.

Another embodiment of the invention is depicted in side view in FIG. 10. In this embodiment, the Fuel Cell Stick™ device 10 has a single cold zone 30 at the first end 11a with the second end 11b being in the hot zone 32. As in other embodiments, the fuel inlets 12 are at the first end 11a and connected to a fuel supply 34 by a supply tube 50. In this embodiment, the fuel passages 14 extend the length of the Fuel Cell Stick™ device 10 with the fuel outlet 16 being at second end 11b. Thus, the fuel supply connection is made in the cold zone 30 and the outlet for the fuel reactants (e.g., $CO_2$ and $H_2O$) is in the hot zone 32. Similarly, the anodes have an exposed anode portion 25 in the cold zone 30 for connecting to the negative voltage node 38 via a wire 42.

In the embodiment of FIG. 10, the Fuel Cell Stick™ device 10 is open at least at one side, and potentially at both opposing sides, to provide both air inlets 18 and air passages 20 in the hot zone 32. The use of support pillars 54 may be particularly useful in this embodiment within the air passages 20. The air outlet can be at the second end 11b, as depicted. Alternatively, although not shown, the air outlet may be at an opposing side from the air inlet side if the passages 20 extend through the width and the air supply is directed only toward the input side, or if the passages 20 do not extend through the width. Instead of providing only heat to the hot zone 32, in this embodiment, air is also provided. In other words, the sides of the device 10 in the hot zone 32 are open to heated air instead of supplying air through a forced air tube.

FIG. 10A shows in side view a variation of the embodiment depicted in FIG. 10. In FIG. 10A, the Fuel Cell Stick™ device 10 includes opposing cold zones 30 with a central heated zone 32 separated from the cold zones 30 by transition zones 31. The air inlet 18 is provided in the central heated zone 32, in at least a portion thereof, to receive the heated air. However, in this embodiment, the air passage 20 is not completely open to the side of the Fuel Cell Stick™ device 10 for an appreciable length as in FIG. 10. Rather, as shown more clearly in FIG. 10B, air passage 20 is open in a portion of the hot zone 32 and then is close to the sides for the remainder of the length and then exits at air outlet 22 at second end 11b of the Fuel Cell Stick™ device 10. This embodiment allows heated air to be supplied in the hot zone 32 rather than a forced air supply tube, but also allows for the fuel and air to exit at one end 11b of the device 10 in a cold zone 30.

Figure 11:
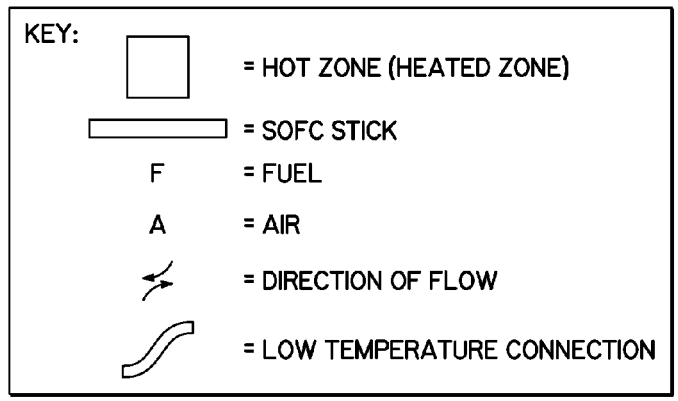
FIGS. 11-24 schematically depict various embodiments of the invention, where FIG. 11 provides a key for the components depicted in FIGS. 12-24.
Figure 12:
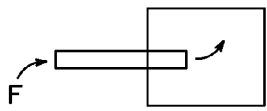
Figure 13:
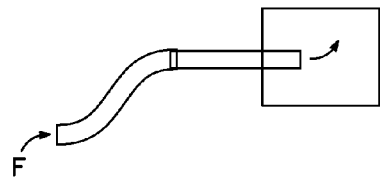
Figure 14:
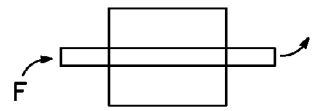
Figure 15:
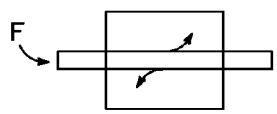
Figure 16:
Figure 17:
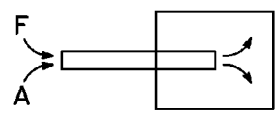
Figure 18:
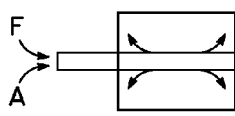
Figure 19:
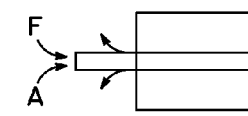
Figure 20:
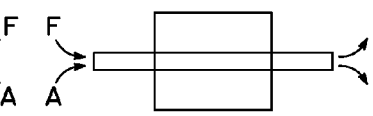
Figure 21:
Figure 22:
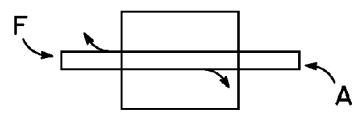
Figure 23:
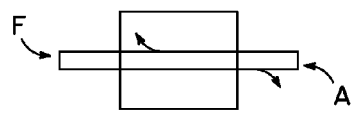
Figure 24:
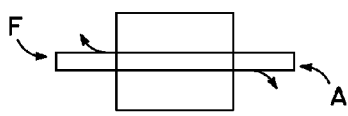

While specific embodiments have been depicted and described in detail, the scope of the invention should not be so limited. More general embodiments of the invention are described below and may be understood more fully with reference to the schematic views depicted in FIGS. 11-24. FIG. 11 provides a key for the components depicted schematically in FIGS. 12-24. Where fuel (F) or air (A) is shown by an arrow going into the Fuel Cell Stick™ device (e.g., SOFC Stick) that indicates forced flow, such as through a tube connected to the input access point. Where air input is not depicted, that indicates that heated air is supplied in the hot zone by means other than a forced flow connection and the Fuel Cell Stick™ device is open to the air passage at an access point within the hot zone.

One embodiment of the invention is a Fuel Cell Stick™ device that includes at least one fuel passage and associated anode, at least one oxidant pathway and associated cathode, and an electrolyte therebetween, where the cell is substantially longer than it is wide or thick so as to have a CTE in one dominant axis and operating with a portion thereof in a heated zone having a temperature of greater than about 400° C. In this embodiment, the Fuel Cell Stick™ device has integrated access points for both air and fuel input at one end of the device according to the dominant CTE direction, or air input at one end and fuel input at the other end according to the dominant CTE direction, and air and fuel inputs being located outside the heated zone. For example, see FIGS. 20 and 24.

In another embodiment of the invention, the fuel cell has a first temperature zone and a second temperature zone, wherein the first temperature zone is the hot zone, which operates at a temperature sufficient to carry out the fuel cell reaction, and the second temperature zone is outside the heated zone and operates at a lower temperature than the first temperature zone. The temperature of the second temperature zone is sufficiently low to allow low temperature connections to be made to the electrodes and a low temperature connection for at least the fuel supply. The fuel cell structure extends partially into the first temperature zone and partially into the second temperature zone. For example, see FIGS. 12, 13 and 17.

In one embodiment of the invention, the fuel cell includes a first temperature zone that is the heated zone and a second temperature zone operating at a temperature below 300° C. The air and fuel connections are made in the second temperature zone using rubber tubing or the like as a low temperature connection. Low temperature solder connections or spring clips are used to make the electrical connections to the anode and cathode for connecting them to the respective negative and positive voltage nodes. Further, the fuel outlet for carbon dioxide and water and the air outlet for depleted oxygen are located in the first temperature zone, i.e., the heated zone. For example, see FIG. 17.

In another embodiment, the fuel cell structure has a central first temperature zone that is the heated zone, and each end of the fuel cell is located outside the first temperature zone in a second temperature zone operating below 300° C. Fuel and air inputs are located in the second temperature zone, as are solder connections or spring clips for electrical connection to the anode and cathode. Finally, output for the carbon dioxide, water and depleted oxygen are located in the second temperature zone. For example, see FIGS. 19, 20 and 24.

In another embodiment of the invention, fuel inputs may be provided at each end according to the dominant CTE direction in a second temperature zone operating below 300° C. with a first temperature zone being the heated zone provided in the center between the opposing second temperature zones. The output for the carbon dioxide, water, and depleted oxygen may be located in the central heated zone. For example, see FIGS. 15 and 18. Alternatively, the output for the carbon dioxide, water and depleted oxygen may be located in the second temperature zone, i.e., outside of the heated zone. For example, see FIGS. 16 and 19.

In another embodiment, both the fuel and air input access points are located outside the first temperature zone, which is the heated zone, in a second temperature zone operating below 300° C. thereby allowing use of low temperature connections, such as rubber tubing for air and fuel supply. In addition, solder connections or spring clips are used in the second temperature zone for connecting the voltage nodes to anodes and cathodes. In one embodiment, the fuel and air input are both at one end according to the dominate CTE direction, with the other end of the Fuel Cell Stick™ device being in the first heated temperature zone with the outputs of carbon dioxide, water and depleted oxygen being in the heated zone. For example, see FIG. 17. Thus, the Fuel Cell Stick™ device has one heated end and one non-heated end.

In another embodiment, fuel and air are inputted into one end according to the dominant CTE direction outside the heated zone and exit at the opposite end also outside the heated zone, such that the heated zone is between two opposing second temperature zones. For example, see FIG. 20. In yet another alternative, fuel and air are inputted into both of opposing ends located in second temperature zones with the fuel and air outputs being in the central heated zone. For example, see FIG. 18.

In yet another alternative, fuel and air are inputted into both of opposing ends located in second temperature zones with the respective outputs being in the second temperature zone at the opposite end from the input. For example, see FIG. 19. Thus, the fuel cell has a central heated zone and opposing ends outside the heated zone, with fuel and air both inputted into the first end with the respective reaction outputs exiting adjacent the second end, and both fuel and air being inputted into the second end and the reaction outputs exiting adjacent the first end.

In yet another embodiment, fuel input may be at one end outside the heated zone and air input may be at the opposite end outside the heat zone. For example, see FIGS. 21-24. In this embodiment, the reaction outputs from both the air and fuel may be within the heated zone (see FIG. 21), or they both may be outside the heated zone adjacent the opposite end from the respective input (see FIG. 24). Alternatively, the carbon dioxide and water output may be in the hot zone while the depleted oxygen output is outside the hot zone (see FIG. 22), or conversely, the depleted oxygen output may be in the heated zone and the carbon dioxide and water output outside the heated zone (see FIG. 23). The variations with respect to fuel and air output depicted in FIGS. 22 and 23 could also be applied in the embodiments depicted in FIGS. 18-20, for example.

Figure 27A:
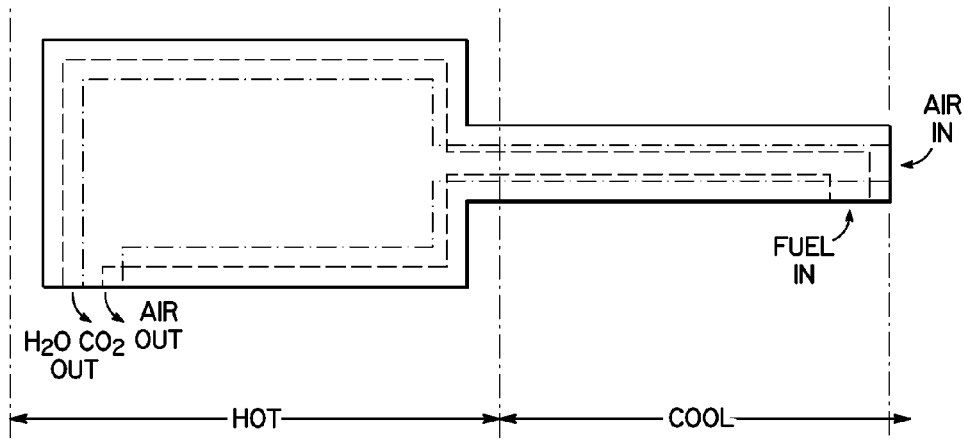
Figure 27B:
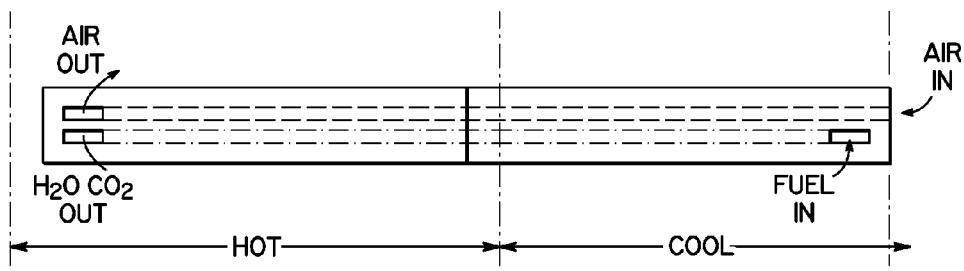

In another embodiment of the invention, depicted in top plan view in FIGS. 25A and 27A and in side view in FIG. 27B, an Fuel Cell Stick™ device 100 is provided having what may be referred to as a panhandle design. The Fuel Cell Stick™ device 100 has an elongate section 102, which may be similar in dimension to the Fuel Cell Stick™ devices 10 depicted in prior embodiments, that has a CTE in one dominant axis, i.e., it is substantially longer than it is wide or thick. The Fuel Cell Stick™ device 100 further has a large surface area section 104 having a width that more closely matches the length. Section 104 may have a square surface area or a rectangular surface area, but the width is not substantially less than the length, such that the CTE does not have a single dominant axis in section 104, but rather has a CTE axis in the length direction and the width direction. The large surface area section 104 is located in the hot zone 32, whereas the elongate section 102 is at least partially located in the cold zone 30 and the transition zone 31. In an exemplary embodiment, a portion of the elongate section 102 extends into the hot zone 32, but this is not essential. By way of example, the fuel and air supplies 34, 36 may be connected to the elongate section 102 in the manner depicted in FIG. 6B, as well as the electrical connections.

Figure 26A:
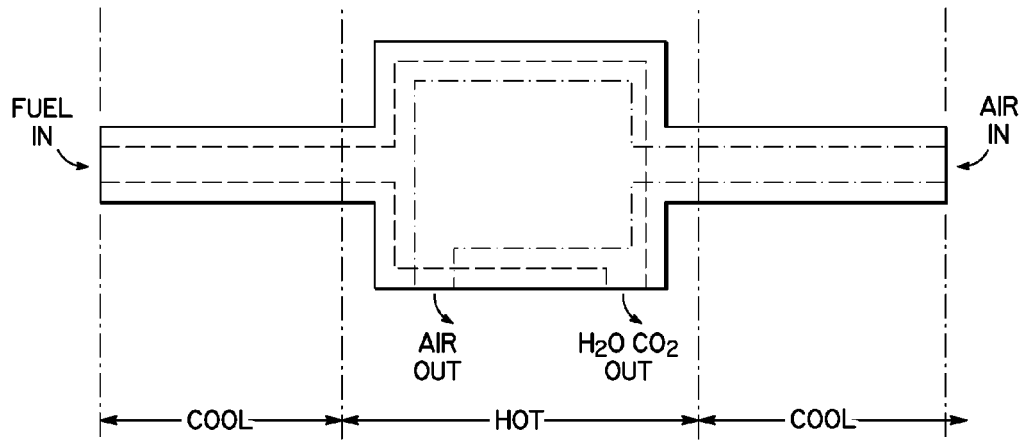
Figure 26B:
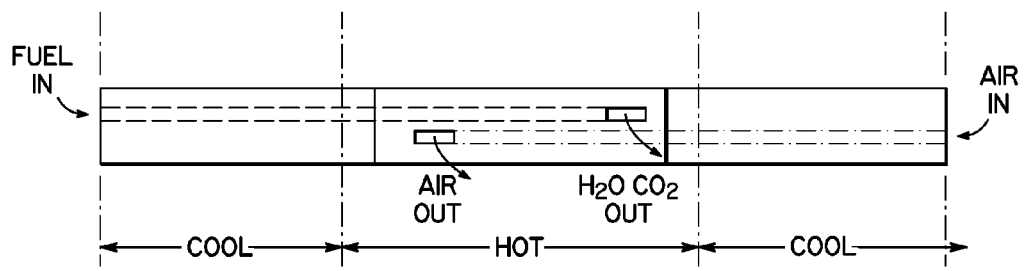

In FIGS. 25B and 26A, a top plan view is provided and in FIG. 26B a side view is provided of an alternative embodiment similar to that shown in FIGS. 25A, 27A and 27B but further having a second elongate section 106 opposite the elongate section 102 so as to position the large surface area section 104 between the two elongate sections 102 and 106. Elongate section 106 is also at least partially located in a cold zone 30 and a transition zone 31. In this embodiment, fuel may be inputted into elongate section 102 and air inputted into elongate section 106. By way of example, the air supply 36 and the fuel supply 34 could then be connected to the elongate sections 106 and 102, respectively, in the manner depicted in FIG. 2 or FIG. 3B. As depicted in FIG. 25B, the air output may be located in the elongate section 102 adjacent the fuel input, and the fuel output may be located in elongate section 106 adjacent the air input. Alternatively, one or both of the air and fuel outputs may be located in the large surface area section 104 in the hot zone 32, as depicted in FIGS. 26A and 26B in top and side views, respectively. It may be appreciated that in the embodiments of FIGS. 25A and 25B, the surface area of the opposing anode 24 and cathode 26 with intervening electrolyte 28 may be increased in the hot zone 32 to increase the reaction area, thereby increasing the power generated by the Fuel Cell Stick™ device 100.

Figure 28A:
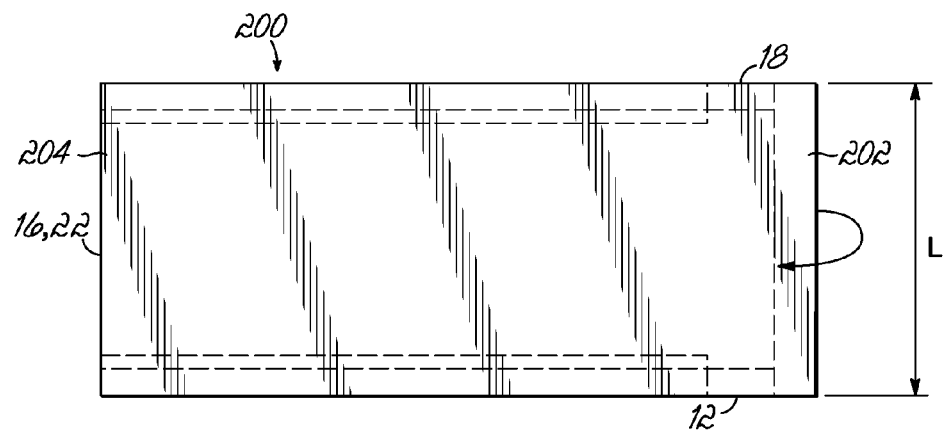
FIGS. 28A-28D depict a Fuel Cell Stick™ device according to one embodiment of the invention, having a spiral or rolled, tubular configuration, where
Figure 28B:
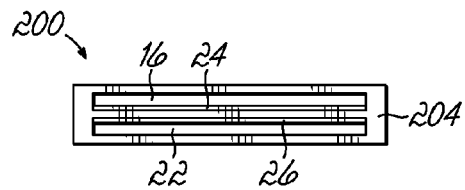
Figure 28C:
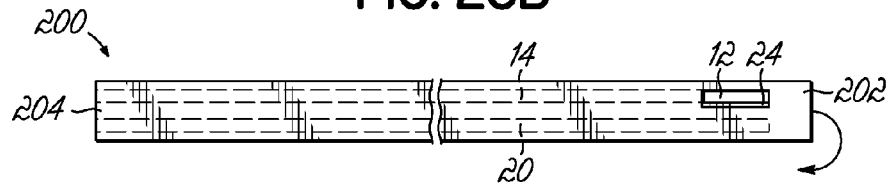
Figure 28D:
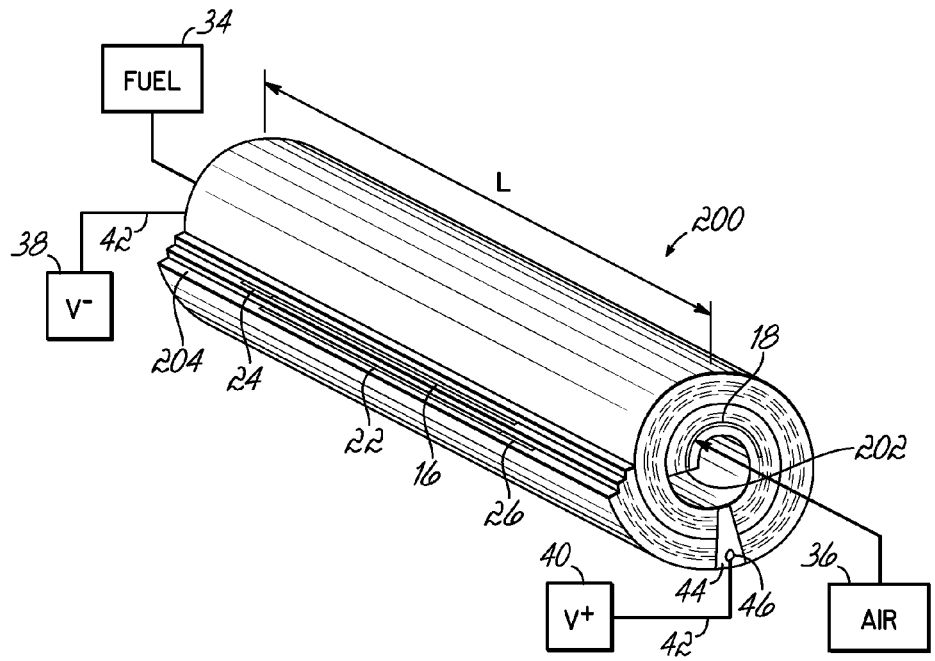

Another benefit of the Fuel Cell Stick™ devices 10, 100 of the invention is low weight. Typical combustion engines weigh on the order of 18-30 lbs per kW of power. A Fuel Cell Stick™ device 10, 100 of the invention can be made with a weight on the order of 0.5 lbs per kW of power. FIGS. 28A-28D depict an alternative embodiment of a Tubular Fuel Cell Stick™ device 200 of the invention, having a spiral or rolled, tubular configuration. FIG. 28A is a schematic top view of device 200, in the unrolled position. The unrolled structure of device 200 has a first end 202 and a second end 204 of equal length L that will correspond to the length of the rolled or spiral Tubular Fuel Cell Stick™ device 200. Fuel inlet 12 and air inlet 18 are shown on opposing sides adjacent first end 202. Fuel passage 14 and air passage 20 then extend along the width of the unrolled structure of device 200 to the second end 204 such that the fuel outlet 16 and air outlet 22 are at the second end 204, as further shown in the schematic end view of the unrolled structure of device 200 in FIG. 28B and the schematic side view of the unrolled structure of device 200 in FIG. 28C. The fuel passage 14 and air passage 20 are shown as extending nearly the length L of the unrolled structure of device 200 so as to maximize fuel and air flow, but the invention is not so limited. To form the spiral Tubular Fuel Cell Stick™ device 200, first end 202 is then rolled toward second end 204 to form the spiral tube structure of device 200 depicted in the schematic perspective view of FIG. 28D. Air supply 36 may then be positioned at one end of the spiral Tubular Fuel Cell Stick™ device 200 for input into air inlet 18, while the fuel supply 34 may be positioned at the opposite end of the spiral Tubular Fuel Cell Stick™ device 200 to input fuel into the fuel inlet 12. The air and the fuel will then exit the spiral Tubular Fuel Cell Stick™ device 200 along the length L of the device 200 through fuel outlet 16 and air outlet 22. The voltage nodes 38, 40 can be soldered to contact pads 44 formed on or adjacent to opposing ends of the spiral Tubular Fuel Cell Stick™ device 200.

Figure 29A:
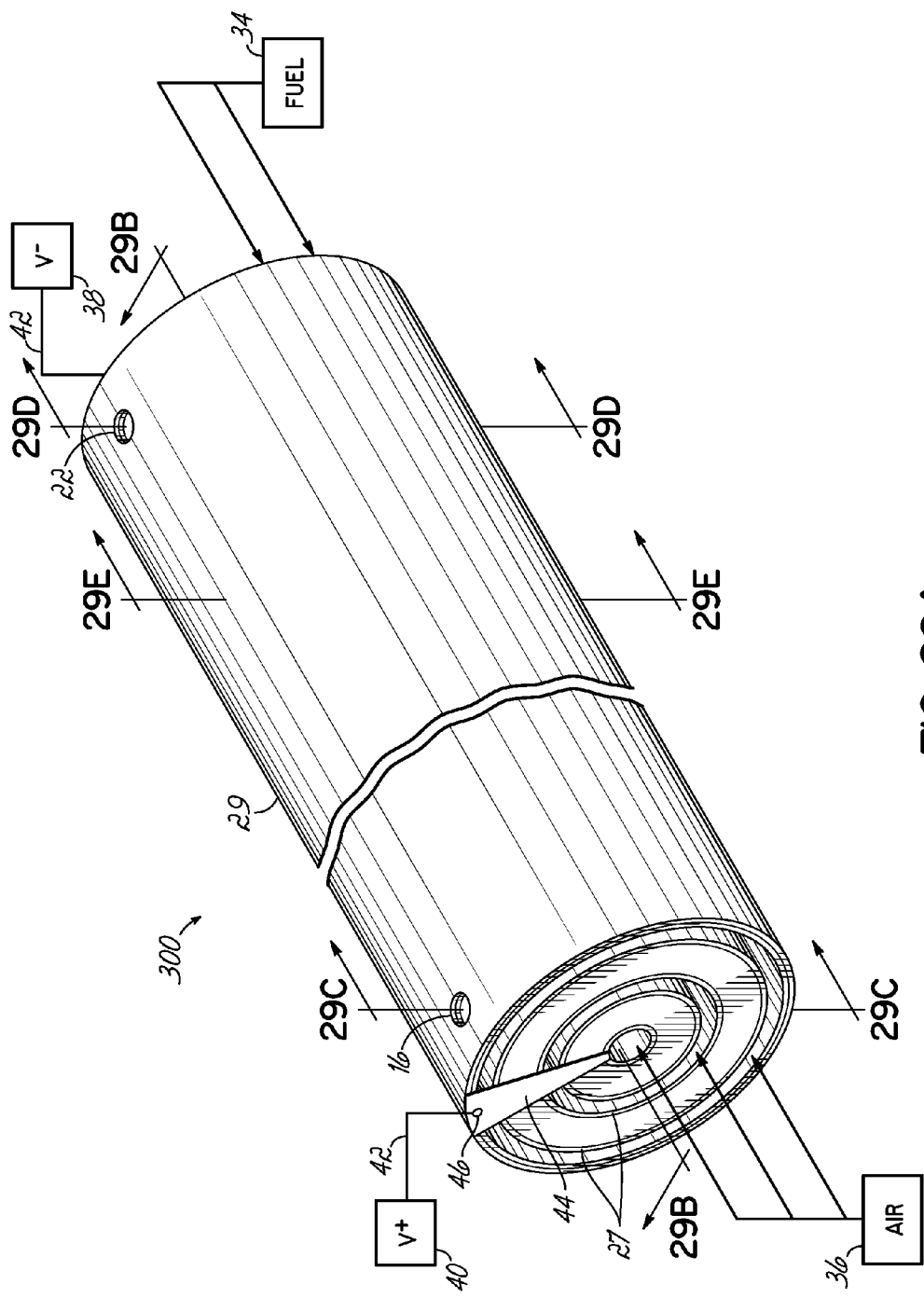
FIGS. 29A-29G depict another alternative embodiment of the invention wherein the Fuel Cell Stick™ device has a tubular concentric form, and where
Figure 29B:
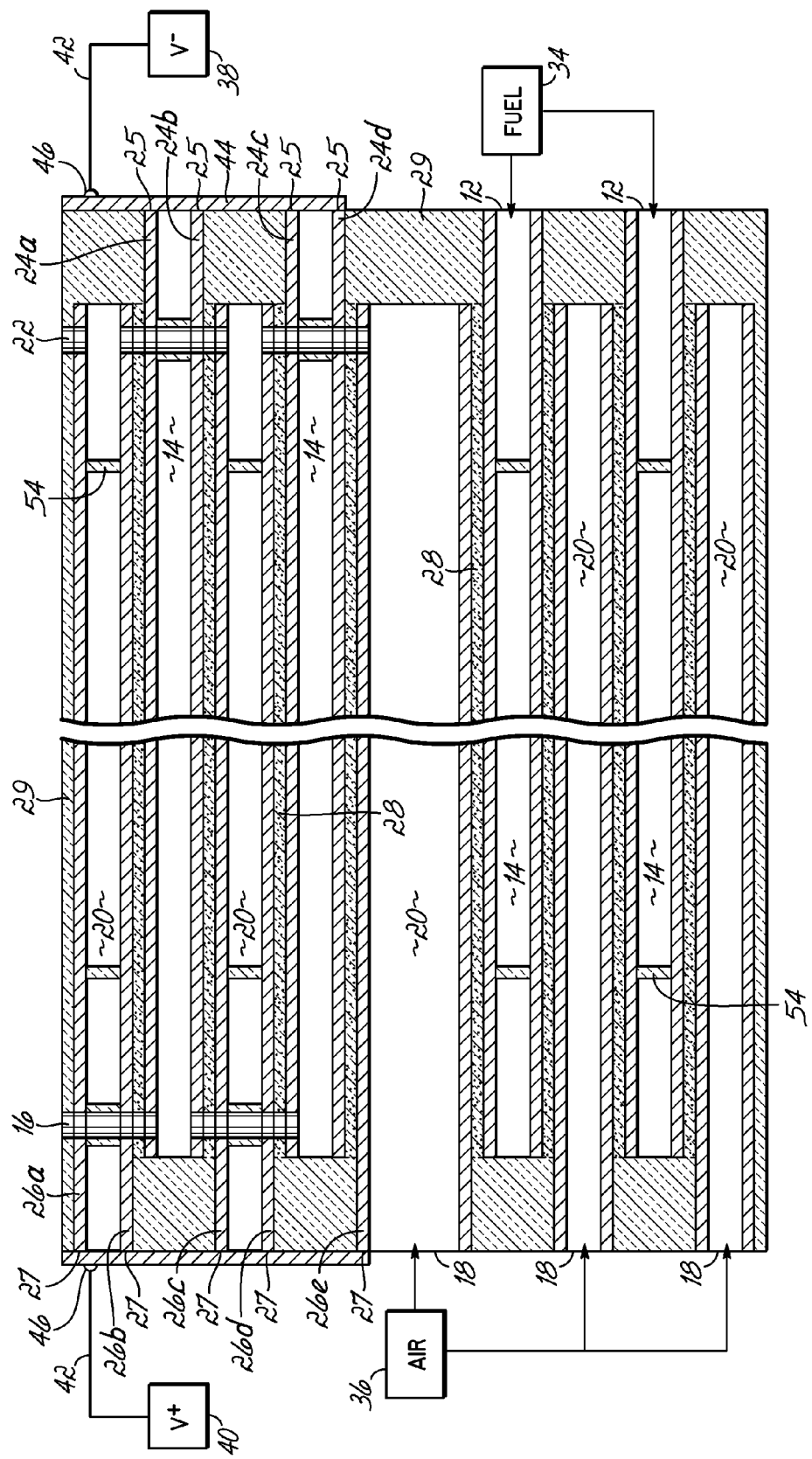
Figure 29C:
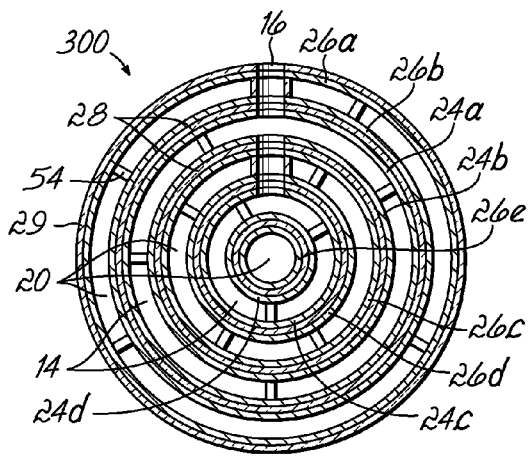
Figure 29D:
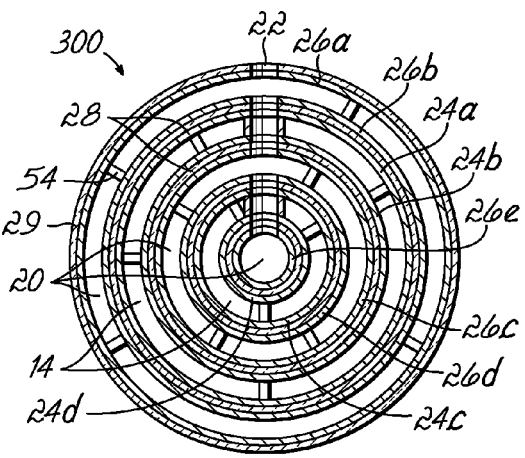
Figure 29E:
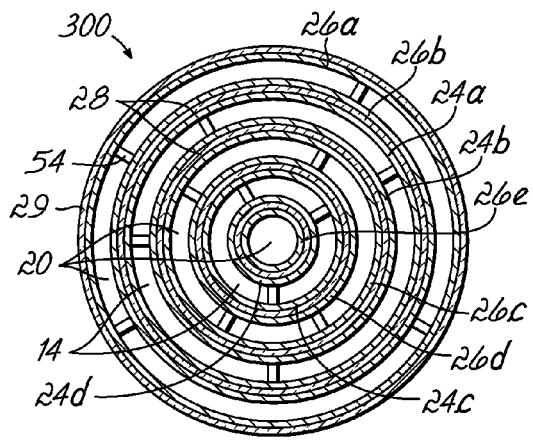
Figure 29F:
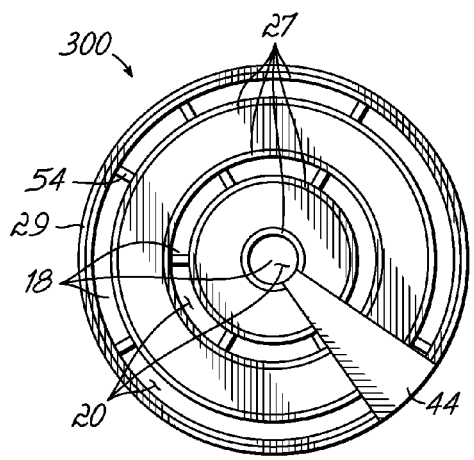
Figure 29G:
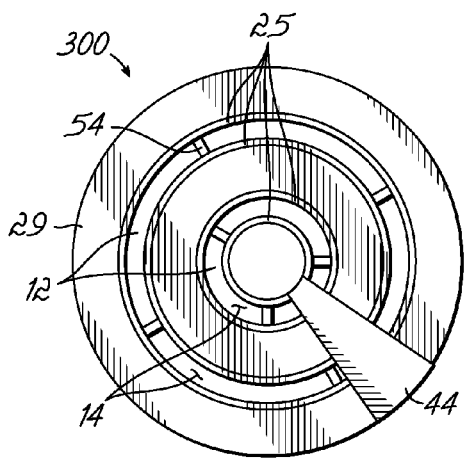

FIGS. 29A-29G depict an alternative embodiment of the invention wherein the Fuel Cell Stick™ device is in a tubular concentric form. FIG. 29A depicts in schematic isometric view a concentric Tubular Fuel Cell Stick™ device 300. FIGS. 29B-29E depict cross-sectional views of the concentric device 300 of FIG. 29A. FIG. 29F depicts an end view at the air input end of the device 300, and FIG. 29G depicts an end view at the fuel input end of device 300. The particular embodiment shown includes three air passages 20, one being in the center of the tubular structure and the other two being spaced from and concentric therewith. The concentric Tubular Fuel Cell Stick™ device 300 also has two fuel passages 14 between and concentric with the air passages 20. As shown in FIGS. 29A-29D, the concentric Tubular Fuel Cell Stick™ device 300 includes a fuel outlet 16 connecting the fuel passages 14 at one end and an air outlet 22 connecting the air passages 20 at the other end opposite their respective inlets 12, 18. Each air passage 20 is lined with cathodes 26 and each fuel passage 14 is lined with anodes 24, with electrolyte 28 separating opposing anodes and cathodes. As shown in FIGS. 29A-29B and 29F-29G, electrical connection may be made to the exposed anodes 25 and exposed cathodes 27 at opposing ends of the concentric Tubular Fuel Cell Stick™ device 300. Contact pads 44 may be applied to the ends to connect the exposed anodes 25 and exposed cathodes 27, and although not shown, the contact pads 44 can be run along the outside of the device 300 to permit the electrical connection to be made at a point along the length of the device 300 rather than at the ends. Concentric Tubular Fuel Cell Stick™ device 300 may include support pillars 54 positioned within the air and fuel passages 14, 20 for structural support.

In the embodiments of the invention having two cold zones 30 at opposing ends 11a, 11b, with air input and fuel output at one end and fuel input and air output at the opposing end, the spent fuel or air is in a heated state as it exits the central hot zone 32. The heated air and fuel cool as they travel through the transition zones 31 to the cold zones 30. Thin layers of electrodes and/or ceramic/electrolyte separate an air passage 20 from a parallel fuel passage 14, and vice-versa. In one passage, heated air is exiting the hot zone 32, and in an adjacent parallel passage, fuel is entering the hot zone 32, and vice-versa. The heated air, through heat exchange principles, will heat up the incoming fuel in the adjacent parallel passage, and vice-versa. Thus, there is some pre-heating of the air and fuel through heat exchange. However, due to the rapid loss of heat outside the hot zone 32, as discussed above, heat exchange may not be sufficient to pre-heat the air and fuel to the optimal reaction temperature before it enters the active region in the hot zone 32. In addition, in embodiments where the Fuel Cell Stick™ device 10 includes one cold end (cold zone 30) and one hot end (hot zone 32), fuel and air are inputted into the same cold end 30 and exit through the same opposing hot end 32, such that there is no cross-flow of fuel and air for heat-exchange to occur. Only limited heat exchange to the incoming fuel and air is available from the electrode and ceramic materials of the Fuel Cell Stick™ device 10.

FIGS. 30A-33C depict various embodiments of an Fuel Cell Stick™ device 10 having integrated pre-heat zones 33a for heating the fuel and air before it enters an active zone 33b in which the anodes 24 and cathodes 26 are in opposing relation. These embodiments include Fuel Cell Stick™ devices 10 in which there are two cold ends 30 with an intermediate hot zone 32 and fuel and air input at opposing cold ends 30, and Fuel Cell Stick™ devices 10 in which there is one hot end 32 and one cold end 30 with fuel and air input both at the single cold end 30. In these embodiments, the amount of electrode material used can be limited to the active zone 33b with only a small amount leading to the cold zone 30 for the external connection to the voltage nodes 38, 40. Another benefit in these embodiments, which will be described in more detail later, is that the electrons have the shortest possible path to travel to the external voltage connection, which provides a low resistance.

Figure 30A:
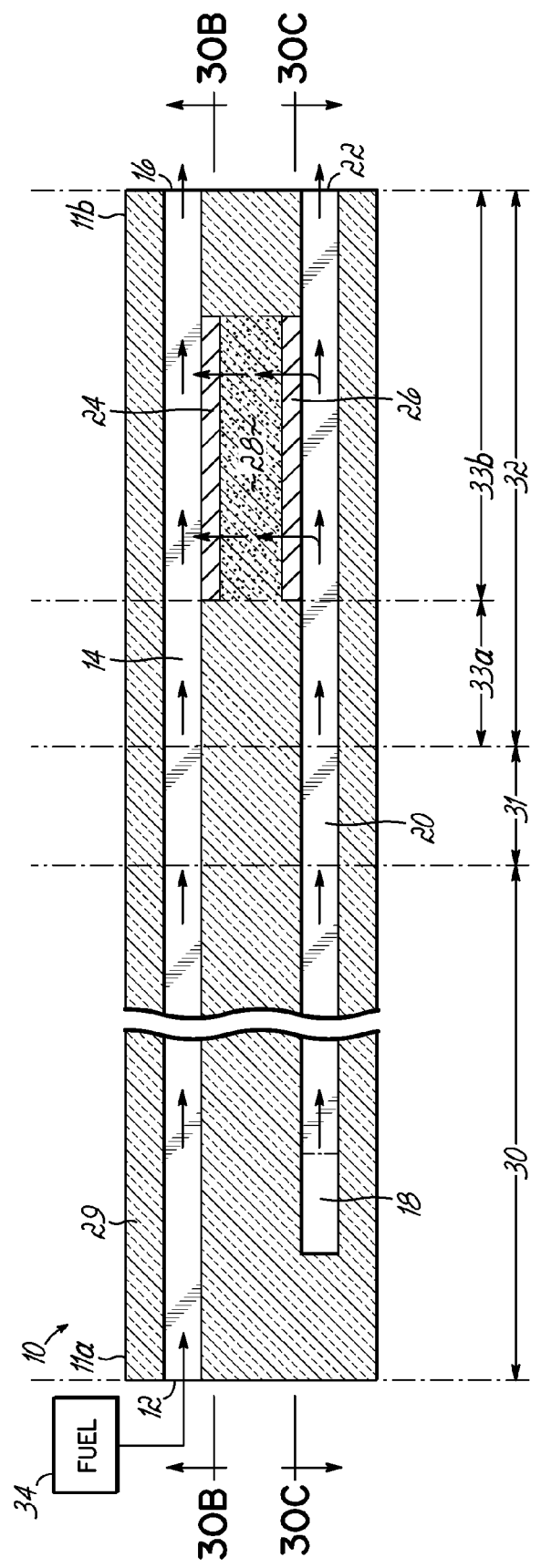
FIG. 30A depicts in schematic cross-sectional side view an embodiment of a Fuel Cell Stick™ device of the invention having an integrated pre-heat zone preceding an active zone in the hot zone.
Figure 30B:
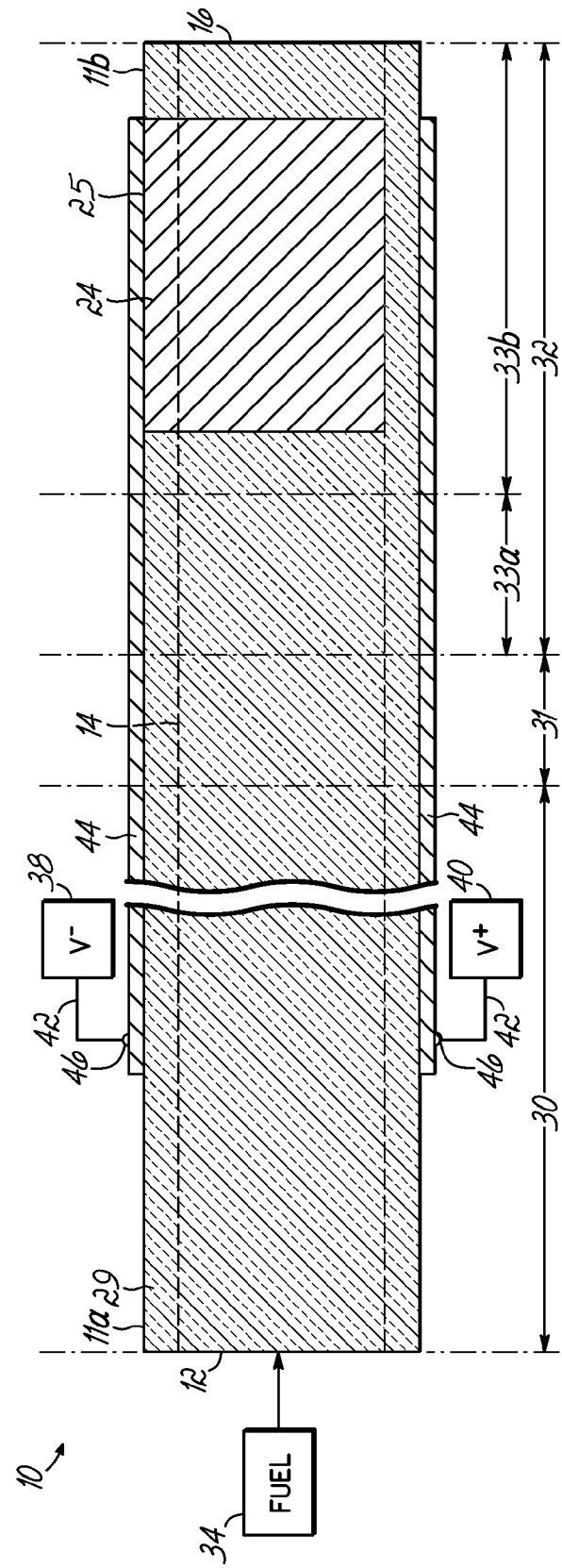
FIGS. 30B and 30C depict the device of FIG. 30A in schematic cross-sectional views taken along lines 30B-30B and 30C-30C, respectively.
Figure 30C:
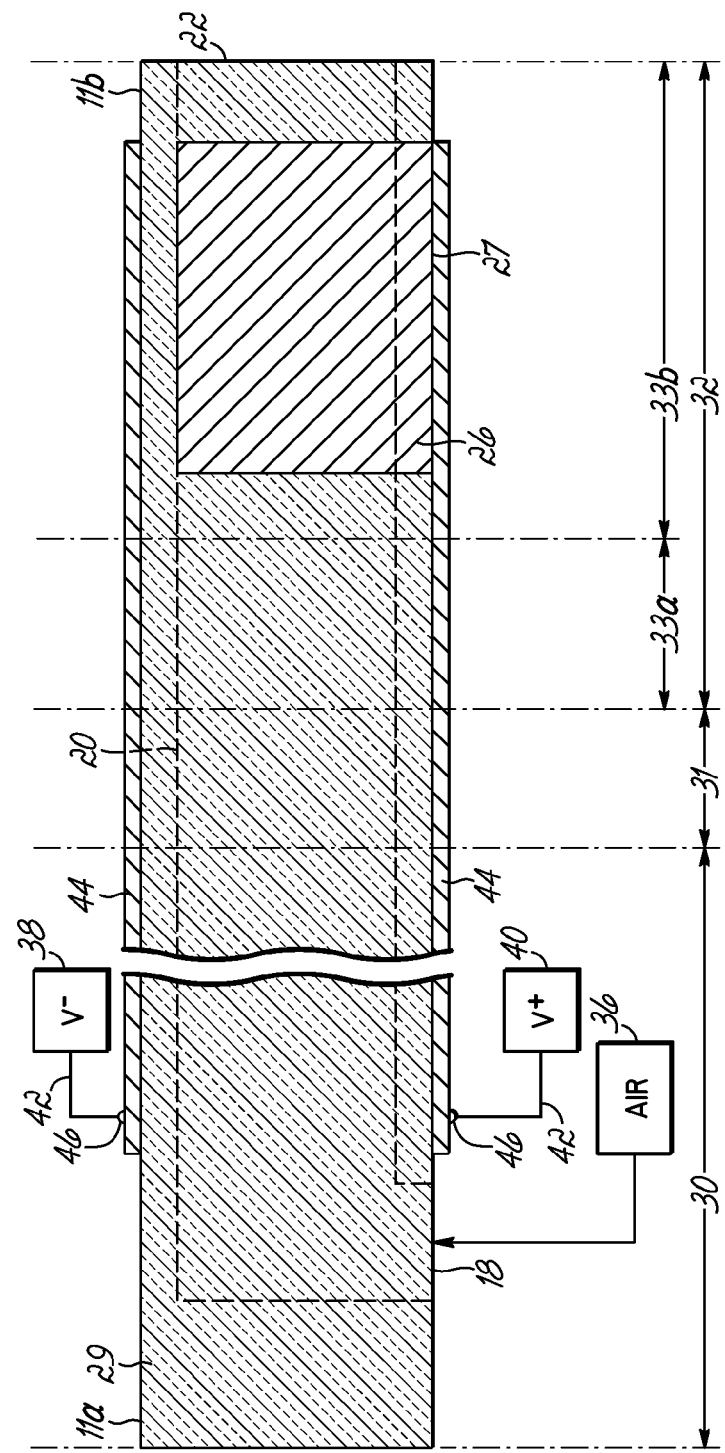

FIG. 30A depicts a schematic cross-sectional side view of a first embodiment of an Fuel Cell Stick™ device 10 having one cold zone 30 and one opposing hot zone 32 with an integrated pre-heat zone 33a. FIG. 30B depicts in cross-section a view through the anode 24 looking up toward the fuel passage 14, and FIG. 30C depicts in cross-section a view through the cathode 26 looking down toward the air passage 20. As shown in FIGS. 30A and 30B, the fuel from fuel supply 34 enters through fuel inlet 12 and extends along the length of the device 10 through fuel passage 14 and exits from the opposite end of the device 10 through fuel outlet 16. The cold zone 30 is at the first end 11a of Fuel Cell Stick™ device 10 and the hot zone 32 is at the opposing second end 11b. Between the hot and cold zones is the transition zone 31. The hot zone 32 includes an initial pre-heat zone 33a through which the fuel first travels, and an active zone 33b that includes the anode 24 adjacent the fuel passage 14. As shown in FIG. 30B, the cross-sectional area of the anode 24 is large in the active zone 33b. The anode 24 extends to one edge of the Fuel Cell Stick™ device 10 and an external contact pad 44 extends along the outside of the device 10 to the cold zone 30 for connection to the negative voltage node 38.

Similarly, as shown in FIGS. 30A and 30C, the air from air supply 36 enters through the air inlet 18 positioned in the cold zone 30 and the air extends along the length of the Fuel Cell Stick™ device 10 through air passage 20 and exits from the hot zone 32 through the air outlet 22. Because the air and fuel are entering at the same end and traveling along the length of the Fuel Cell Stick™ device 10 in the same direction, there is limited pre-heating of the air and fuel by heat exchange prior to the hot zone 32. The cathode 26 is positioned in the active zone 33b in opposing relation to the anode 24 and extends to the opposite side of the Fuel Cell Stick™ device 10 where it is exposed and connected to an external contact pad 44 that extends from the active hot zone 33b to the cold zone 30 for connection to the positive voltage node 40. It is not necessary, however, that the exposed cathode 27 be on an opposite side of the device 10 as the exposed anode 25. The exposed anode 25 and exposed cathode 27 could be on the same side of the device 10 and the contact pads 44 could be formed as stripes down the side of the Fuel Cell Stick™ device 10. By this structure, the air and fuel are first heated in the pre-heat zone 33a, where no reaction is taking place, and the majority of the anode and cathode material is limited to the active zone 33b where the heated air and fuel enters and react by virtue of the opposed anode and cathode layers 24, 26.

Figure 31A:
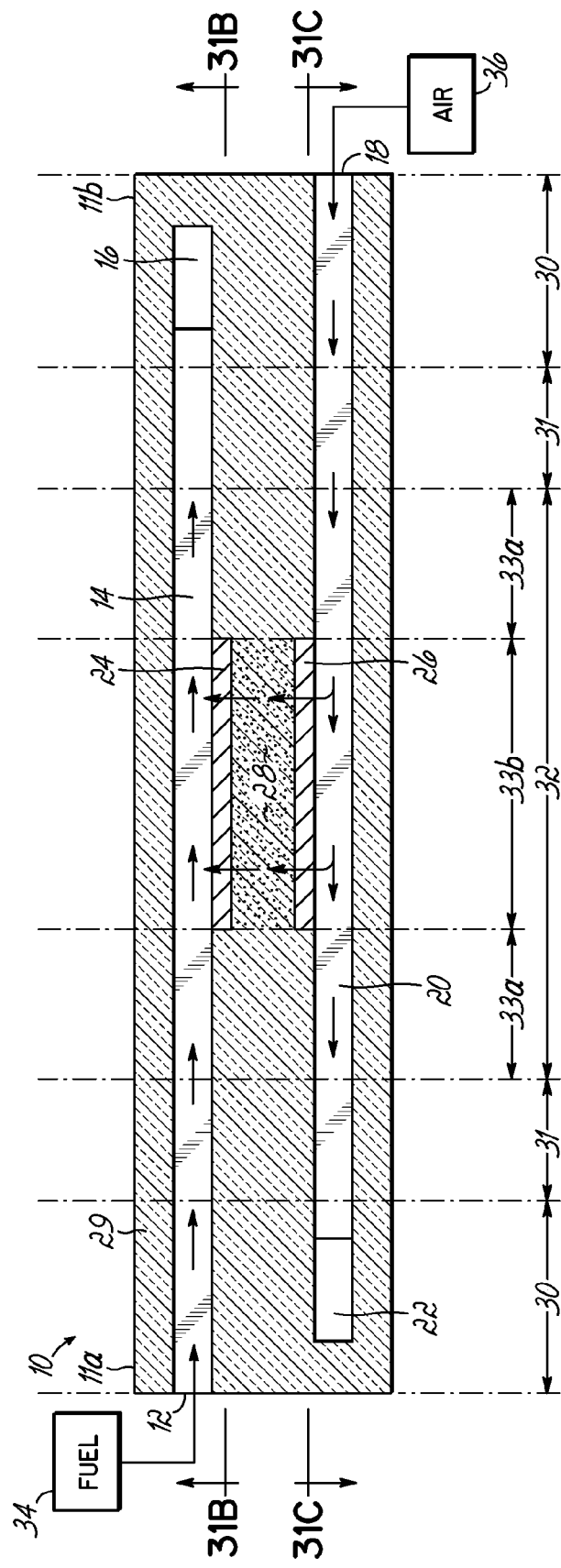
FIGS. 31A-31C are similar to FIGS. 30A-30C, but depict two cold zones with a central hot zone.
Figure 31B:
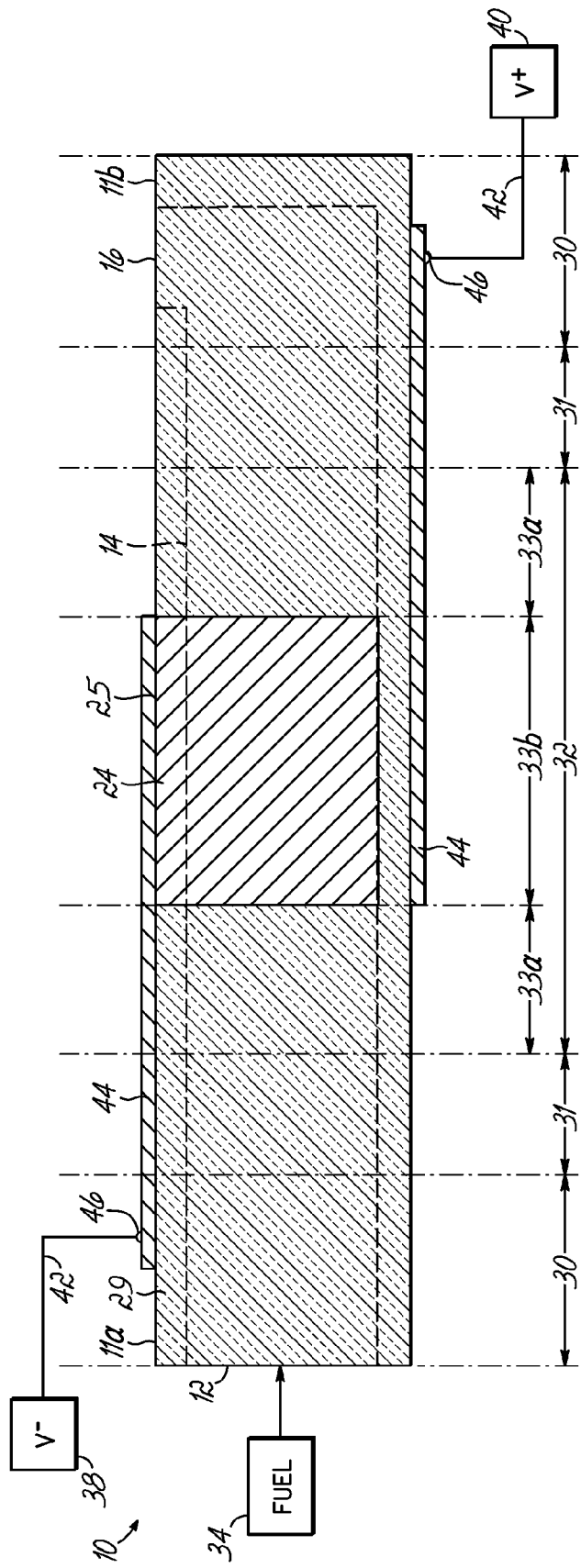
Figure 31C:
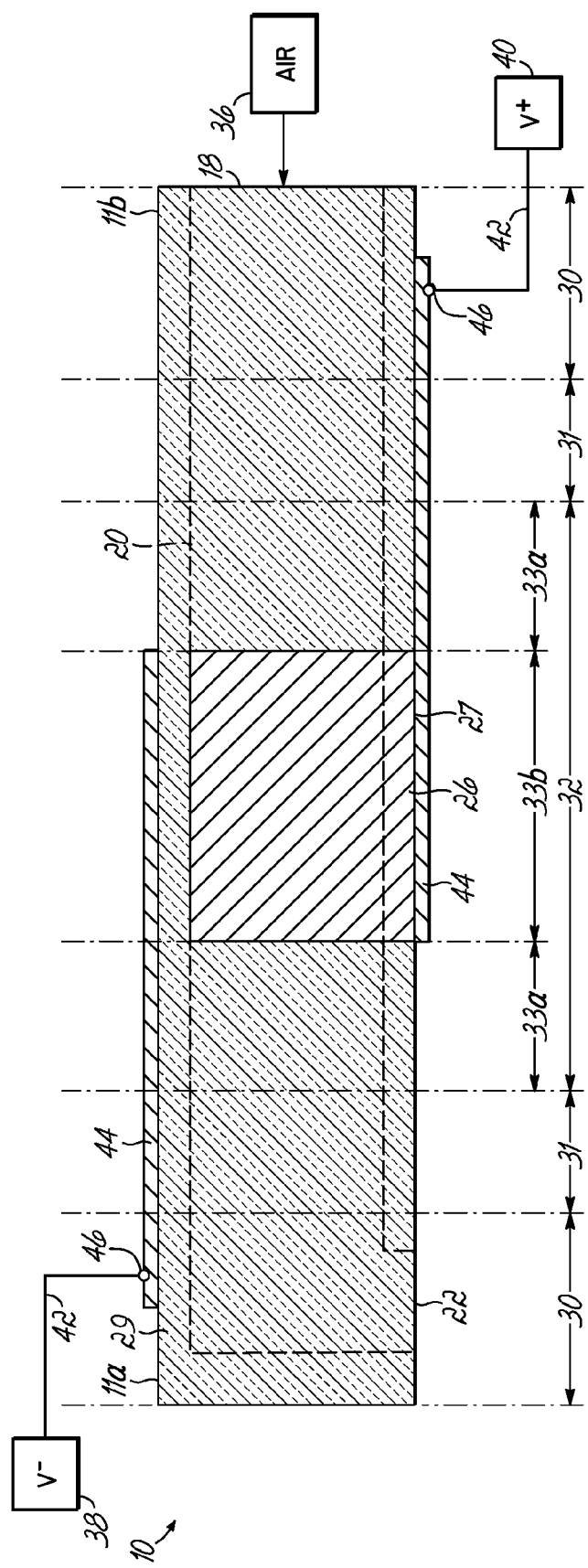

The embodiment depicted in FIGS. 31A-31C is similar to that depicted in FIGS. 30A-30C, but rather than having one hot end 32 and one cold end 30, the embodiment of FIGS. 31A-C includes opposing cold zones 30 with a central hot zone 32. Fuel from fuel supply 34 enters through the first end 11a of device 10 through fuel inlet 12 in the cold zone 30 and exits from the opposite second end 11b through fuel outlet 16 positioned in the opposing cold zone 30. Similarly, air from air supply 36 enters through the opposite cold zone 30 through air inlet 18 and exits at the first cold zone 30 through air outlet 22. The fuel enters the hot zone 32 and is pre-heated in pre-heat zone 33a, while the air enters at the opposite side of the hot zone 32 and is pre-heated in another pre-heat zone 33a. There is thus a cross-flow of fuel and air. The anode 24 opposes the cathode 26 in an active zone 33b of hot zone 32 and the reaction occurs in the active zone 33b involving the pre-heated fuel and air. Again, the majority of electrode material is limited to the active zone 33b. The anode 24 is exposed at one edge of the Fuel Cell Stick™ device 10, and the cathode 26 is exposed at the other side of device 10. An external contact pad 44 contacts the exposed anode 25 in the hot zone 32 and extends toward the first cold end 11a for connection to negative voltage node 38. Similarly, an external contact pad 44 contacts the exposed cathode 27 in hot zone 32 and extends toward the second cold end 11b for connection to positive voltage node 40.

The pre-heat zones 33a provide the advantage of fully heating the gas to the optimal reaction temperature before it reaches the active region. If the fuel is colder than the optimum temperature, the efficiency of the SOFC system will be lower. As the air and fuel continue on their paths, they warm up. As they warm up, the efficiency of the electrolyte 28 increases in that region. When the fuel, air and electrolyte 28 reach the full temperature of the furnace, then the electrolyte 28 is working under its optimal efficiency. To save money on the anode 24 and cathode 26, which may be made out of precious metal, the metal can be eliminated in those areas that are still below the optimal temperature. The amount of the pre-heat zone 33a, in terms of length or other dimensions, depends on the amount of heat transfer from the furnace to the Fuel Cell Stick™ device 10, and from the Fuel Cell Stick™ device 10 to the fuel and air, as well as whether any heat exchange is occurring due to cross-flow of the fuel and air. The dimensions further depend on the rate of flow of fuel and air; if the fuel or air is moving quickly down the length of the Fuel Cell Stick™ device 10, a longer pre-heat zone 33a will be advantageous, whereas if the flow rate is slow, the pre-heat zone 33a may be shorter.

Figure 32A:
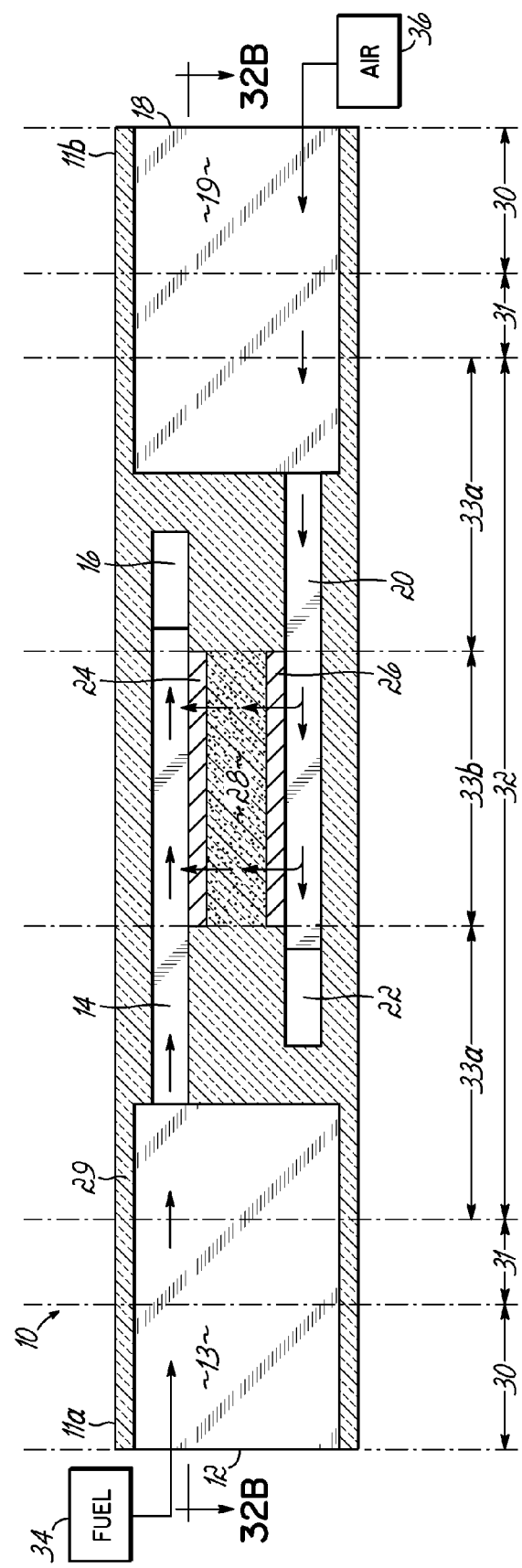
FIGS. 32A-32B depict in schematic cross-sectional side view and schematic cross-sectional top view taken along line 32B-32B of FIG. 32A, respectively, an embodiment similar to that depicted in FIGS. 31A-31C, but further including pre-heat chambers extending between the fuel inlet and the fuel passage and between the air inlet and the air passage, each pre-heat chamber extending from the cold zone into the pre-heat zone of the hot zone.
Figure 32B:
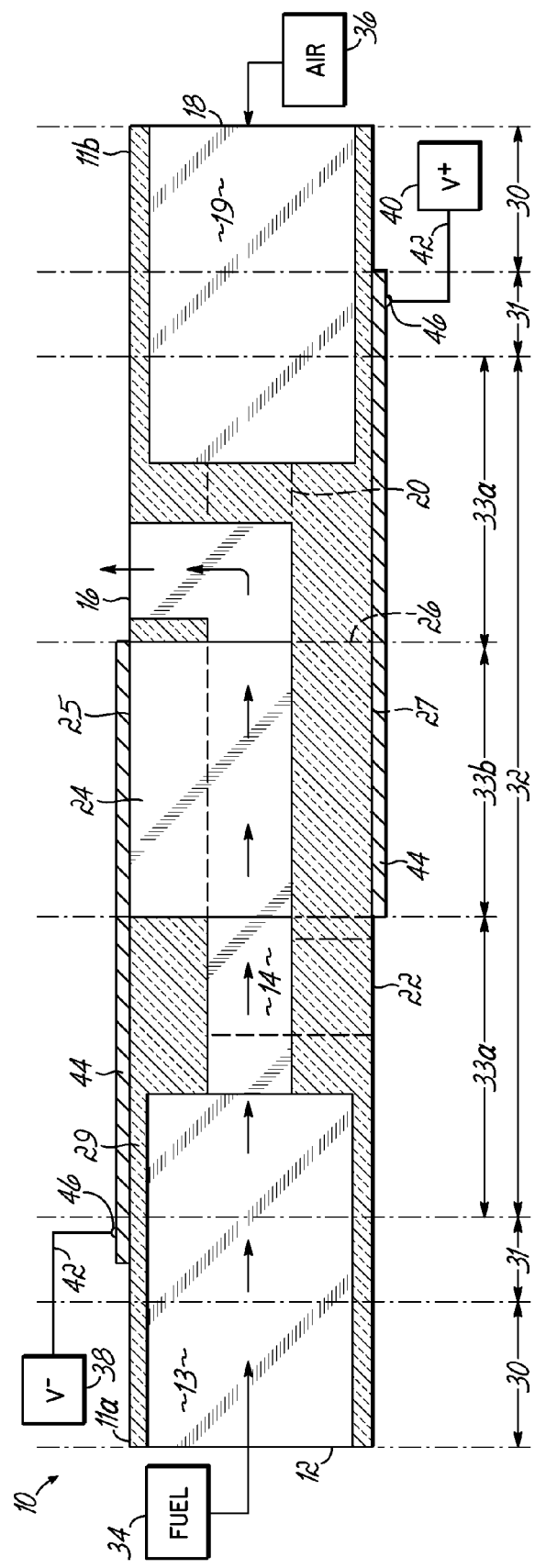

FIGS. 32A and 32B depict an embodiment similar to that shown in FIGS. 31A-31C, but the Fuel Cell Stick™ device 10 includes a pre-heat chamber 13 between the fuel inlet 12 and fuel passage 14 that extends into the hot zone 32 for pre-heating in the pre-heat zone 33a a large volume of fuel before it passes through the more narrow fuel passage 14 into the active zone 33b. The Fuel Cell Stick™ device 10 similarly includes a pre-heat chamber 19 between the air inlet 18 and the air passage 20 that extends into the hot zone 32 for pre-heating a large volume of air in the pre-heat zone 33a before it passes through the more narrow air passage 20 to the active zone 33b. As disclosed in embodiments above, the Fuel Cell Stick™ device 10 may include multiple fuel passages 14 and air passages 20, each of which would receive flow from a respective pre-heat chamber 13, 19.

With respect to a high-volume pre-heat chamber 13, 19 instead of a pre-heat channel, it may be imagined, by way of example only, that if it takes 5 seconds for a molecule of air to heat up to the optimal temperature, then if the molecules of air are traveling down the Fuel Cell Stick™ device 10 at 1 inch per second, the Fuel Cell Stick™ device 10 would need a pre-heat channel that is 5 inches in length before the air enters the active zone 33b. If, however, a large volume chamber is provided instead of a channel, the volume permits the molecules to spend additional time in the cavity before entering the more narrow channel to the active zone 33b, such that the air molecules are heated in the chamber and then a short length of channel may be used for feeding the heated air molecules to the active zone 33b. Such a cavity or pre-heat chamber 13, 19 could be prepared in a number of different ways, including taking a green (i.e., before sintering) assembly and drilling into the end of the assembly to form the chamber, or by incorporating a large mass of organic material within the green stack as it is formed, whereby the organic material is baked out of the Fuel Cell Stick™ device during sintering.

Figure 33A:
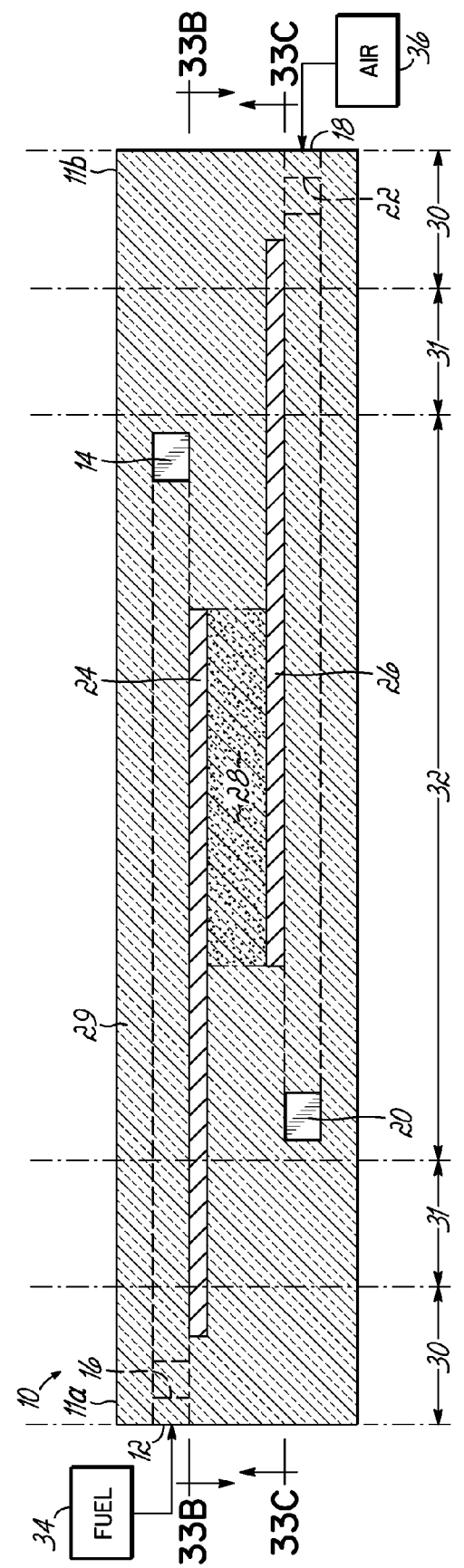

FIGS. 33A-33C depict yet another embodiment for pre-heating the air and fuel prior to the air and fuel reaching the active zone 33b. FIG. 33A is a schematic cross-sectional side view, essentially through the longitudinal center of the Fuel Cell Stick™ device 10. FIG. 33B is a cross-sectional top view taken along the line 33B-33B where the fuel passage 14 and anode 24 intersect, while FIG. 33C is a cross-sectional bottom view taken along the line 33C-33C where the air passage 20 intersects the cathode 26. The Fuel Cell Stick™ device 10 has two opposing cold zones 30 and a central hot zone 32, with a transition zone 31 between each cold zone 30 and the hot zone 32. Fuel from fuel supply 34 enters the first end 11a of Fuel Cell Stick™ device 10 through fuel inlet 12 and travels through the fuel passage 14, which extends toward the opposite end of the hot zone 32, where it makes a U-turn and travels back to the cold zone 30 of first end 11a, where the spent fuel exits through fuel outlet 16. Similarly, air from air supply 36 enters the second end 11b of Fuel Cell Stick™ device 10 through the air inlet 18 and travels through the air passage 20, which extends toward the opposing end of the hot zone 32, where it makes a U-turn and travels back to the second end 11b, where the air exits from the cold zone 30 through air outlet 22. By means of these U-turned passages, the portion of the fuel passage 14 and air passage 20 from the initial entry into the hot zone 32 through the bend (U-turn) constitute a pre-heat zone for heating the fuel and air. After the bends, or U-turns, in the passages 14, 20, the passages are lined with a respective anode 24 or cathode 26, which are in opposing relation with an electrolyte 28 therebetween, which region constitutes the active zone 33b in hot zone 32. Thus, the fuel and air is heated in the pre-heat zone 33a prior to entry into the active zone 33b to increase the efficiency of the Fuel Cell Stick™ device 10, and to minimize the usage of electrode material. The anode 24 is extended to the exterior of the device 10 in the cold zone 30 for connection to negative voltage node 38. Similarly, cathode 26 is extended to the exterior of the device 10 for electrical connection to positive voltage node 40. The fuel and air outlets 16 and 22 also may exit from the cold zones 30.

In many of the embodiments shown and described above, the anodes 24 and cathodes 26 travel within the layers of the Fuel Cell Stick™ device 10, essentially in the center area of each layer, i.e., internal to the device, until they reach the end of the device. At that point, the anodes 24 and cathodes 26 are tabbed to the outside of the Fuel Cell Stick™ device 10 where the exposed anode 25 and exposed cathode 27 are metallized with a contact pad 44, such as by applying a silver paste, and then a wire is soldered to the contact pad 44. For example, see FIGS. 4A-4B. It may be desirable, however, to build up the layers in the Fuel Cell Stick™ device 10 into higher voltage combinations, for example as shown in FIGS. 8A-9B. If it is desired to make a Fuel Cell Stick™ device 10 that produces 1 KW of power, the power is divided between the voltage and the current. One standard is to use 12 volts, such that 83 amps would be needed to create the total 1 KW of power. In FIGS. 8B and 9B, vias were used to interconnect the electrode layers to form parallel or series combinations.

Alternative embodiments for interconnecting the electrode layers are depicted in FIGS. 34A to 37. Rather than interconnecting the electrode layers in the interior of the Fuel Cell Stick™ device 10, these alternative embodiments use exterior stripes (narrow contact pads), for example of silver paste, along the sides of the Fuel Cell Stick™ device 10, in particular, multiple small stripes. Using the striping technique, a simple structure is formed that can provide series and/or parallel combinations to achieve any current/voltage ratios needed. Moreover, the external stripes will have loose mechanical tolerances compared to the internal vias, thereby simplifying manufacturing. Also, the external stripes will likely have a lower resistance (or equivalent series resistance) than the vias. Lower resistance in a conductor path will result in lower power loss along that path, such that the external stripes provide the ability to remove the power from the Fuel Cell Stick™ device 10 with a lower loss of power.

Figure 34A:
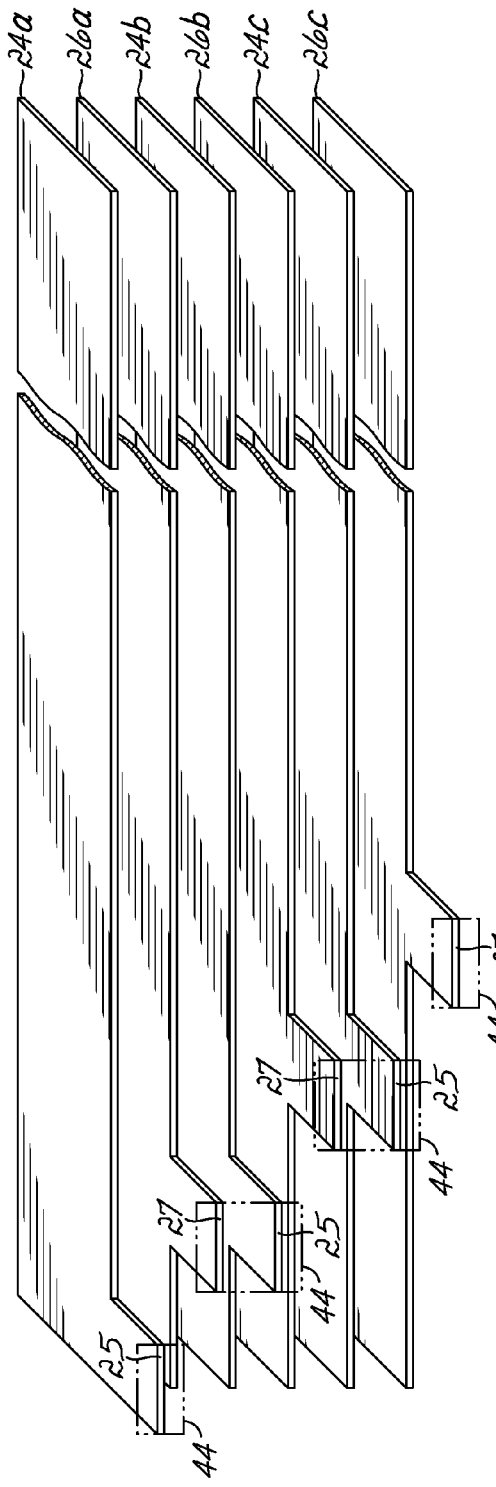
FIGS. 34A and 34B depict in schematic oblique front view and schematic side view, respectively, an embodiment having multiple anodes and cathodes interconnected externally in series.
Figure 34B:
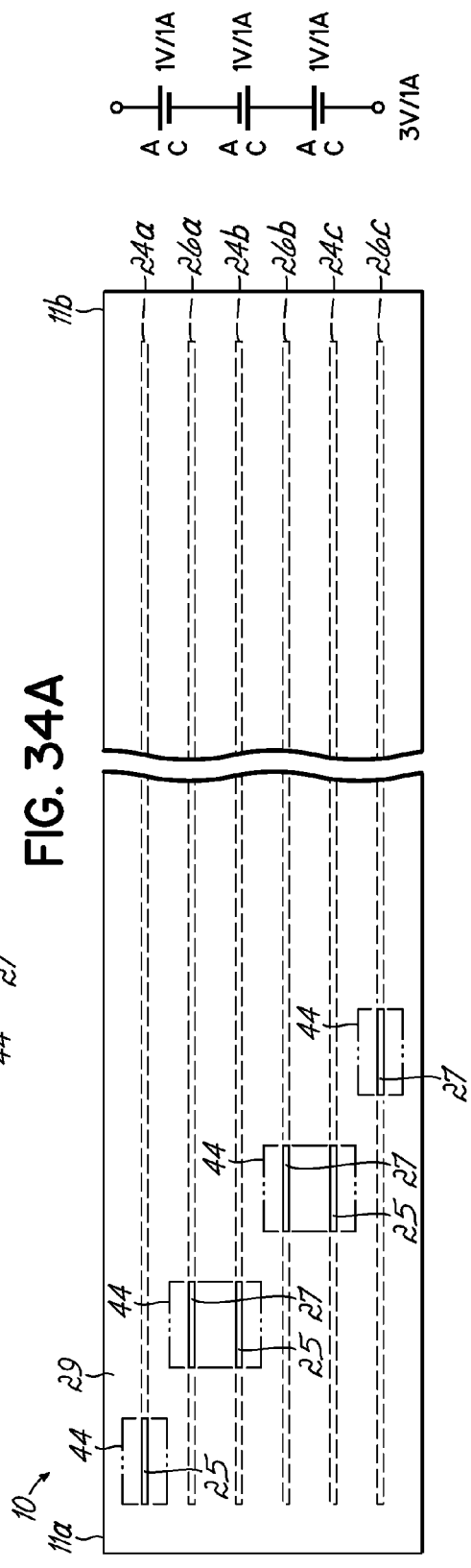
Figure 35:
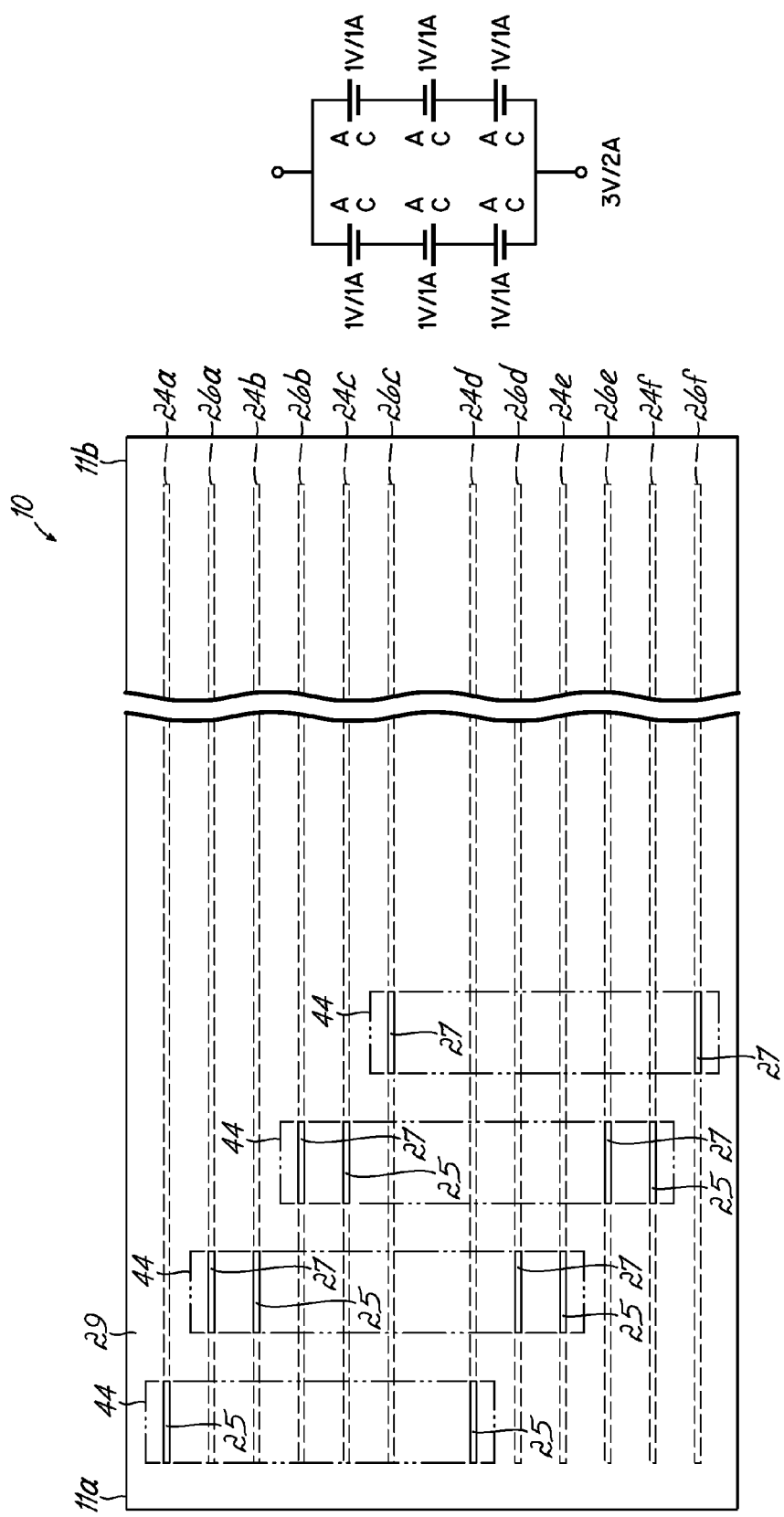
FIG. 35 depicts in schematic side view the structure of FIG. 34B doubled with the two structures connected externally by metal stripes to provide a series-parallel design.

Referring now specifically to FIGS. 34A and 34B, an external anode/cathode interconnect in series is depicted. FIG. 34A provides a schematic oblique front view of the alternating anodes 24a, 24b, 24c and cathodes 26a, 26b, 26c. Along the length of the Fuel Cell Stick™ device 10, the anodes 24a, 24b, 24c and cathodes 26a, 26b, 26c include a tab out to the edge of the device 10 to provide the exposed anodes 25 and exposed cathodes 27. An external contact pad 44 (or stripe) is then provided on the outside of the Fuel Cell Stick™ device 10 over the exposed anodes 25 and cathodes 27, as best shown in the schematic side view of FIG. 34B. By connecting the three pairs of opposed anodes 24a, 24b, 24c and cathodes 26a, 26b, 26c in series, the Fuel Cell Stick™ device 10 provides 3 volts and 1 amp. In FIG. 35, the structure is doubled and the two structures are connected by long stripes down the sides of the device 10, thereby providing an external anode/cathode interconnect in a series parallel design that provides 3 volts and 2 amps.

Figure 36A:
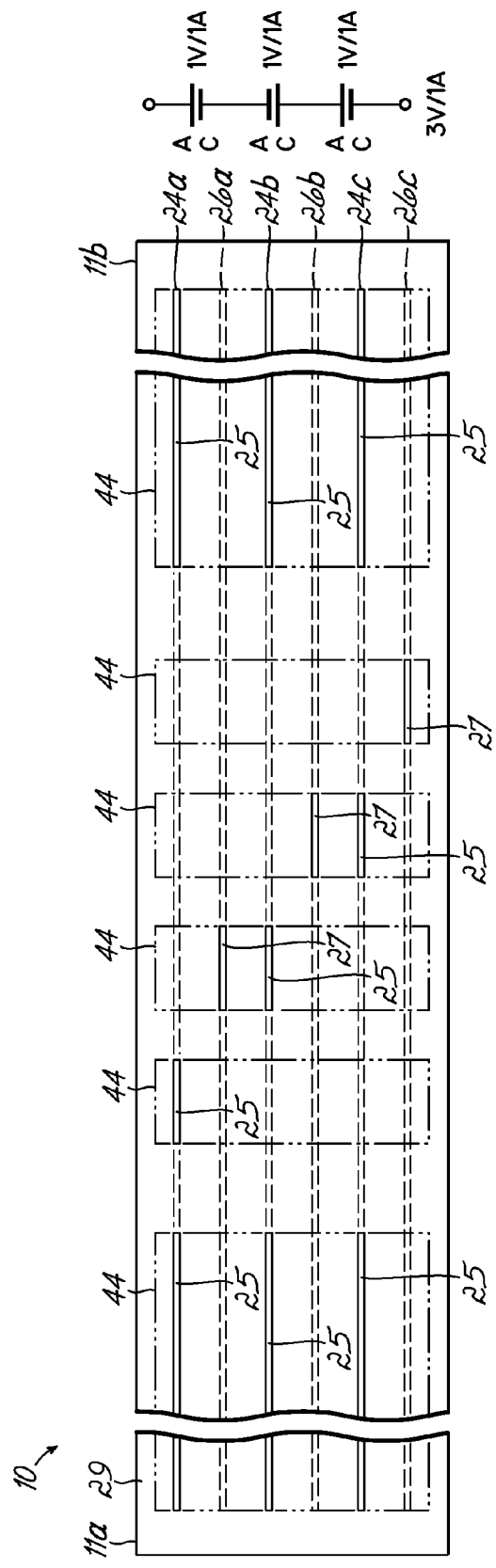
FIGS. 36A and 36B depict in schematic side view and perspective view another embodiment of the invention including metal stripes to connect anodes and cathodes in series and/or parallel in the hot zone and long metal stripes extending from the hot zone to the cold zone for making low temperature connection in the cold zones to the positive and negative voltage nodes.
Figure 36B:
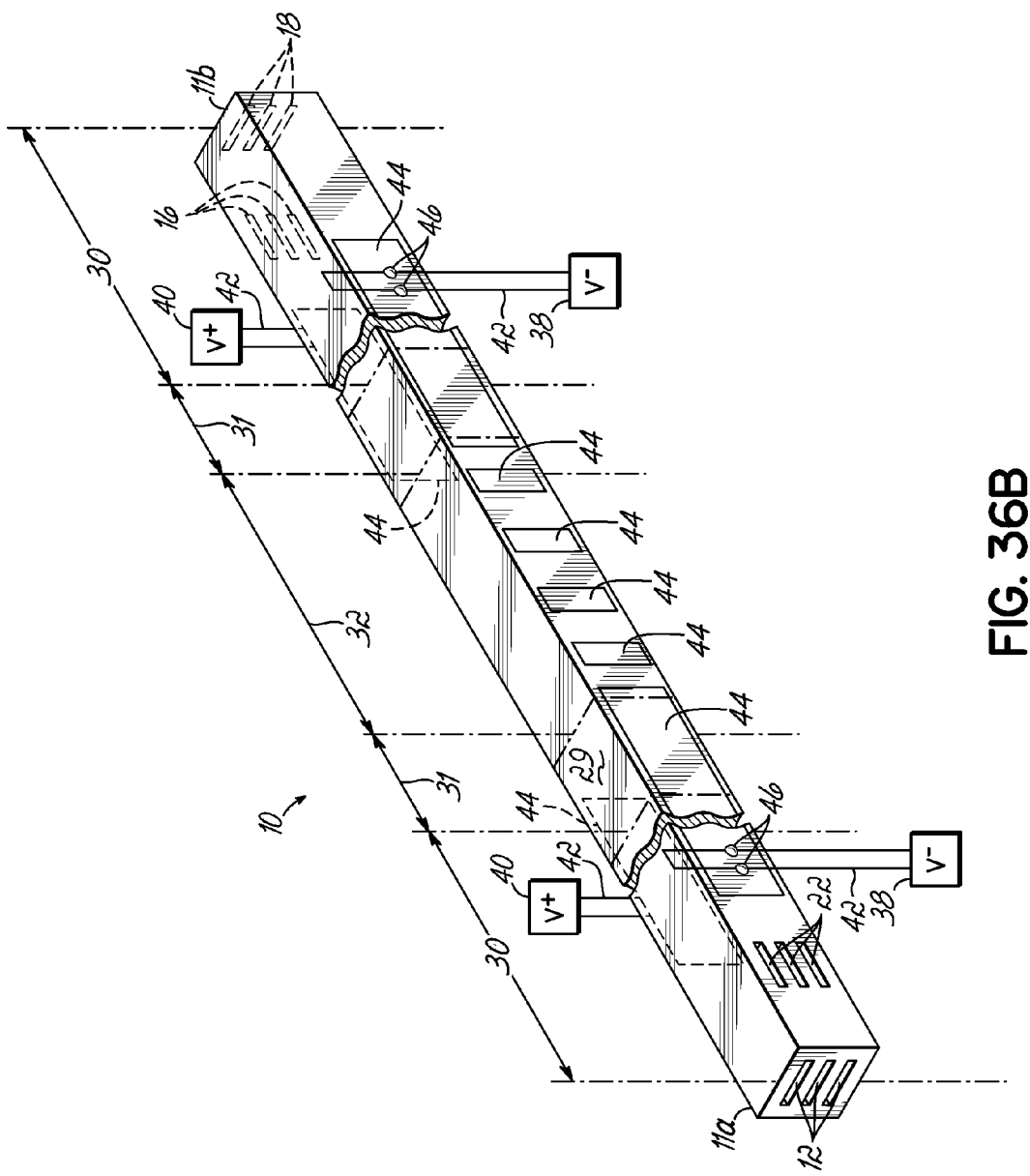

FIGS. 36A and 36B provide an embodiment for a low equivalent series resistance path for providing low power loss. In this embodiment, the hot zone 32 is in the center of the Fuel Cell Stick™ device 10 with the first end 11a and second end 11b being in cold zones 30. Fuel is inputted through fuel inlets 12 in first end 11a and air is inputted through air inlets 18 in second end 11b. Within the hot zone 32, which is the active area of the Fuel Cell Stick™ device 10, the anodes 24 and cathodes 26 are exposed to the sides of the device 10, with the anodes 24 exposed to one side, and the cathodes 26 exposed to the opposite side. Contact pads 44 (or stripes) are applied over the exposed anodes 25 and cathodes 27. Then, the edges of the Fuel Cell Stick™ device 10 are metallized along the length of the sides of the device 10 until the metallization reaches the cold zones 30, where the low temperature solder connection 46 is made to the negative voltage node 38 and the positive voltage node 40. The anodes 24 and cathodes 26 cannot be optimized only for low resistance because they have other functions. For example, the electrodes must be porous to allow the air or fuel to pass through to the electrolyte 28, and porosity increases resistance. Further, the electrodes must be thin to allow for good layer density in a multi-layer Fuel Cell Stick™ device 10, and the thinner the electrode, the higher the resistance. By adding thicker contact pads 44 to the edges (sides) of the Fuel Cell Stick™ device 10, it is possible to provide a low resistance path toward the solder connection 46. The thicker the contact pad 44, the lower the resistance. If an electron must travel 10 inches, for example, down the electrode within the Fuel Cell Stick™ device 10, past all the voids in the electrode layer, the path of least resistance would be to travel 0.5 inch, for example, to the side edge of the device 10, and then travel the 10 inches down the external non-porous contact pad 44. Thus, the long contact pads 44 along the exterior of the Fuel Cell Stick™ device 10 that extend to the cold zones 30 allow for the power to be removed from the Fuel Cell Stick™ device 10 with a lower loss by providing a lower resistance conductor path. Thus, the striping technique may be used in the active area (hot zone 32) of the Fuel Cell Stick™ device 10 for making series and parallel connections to increase power, and a long stripe down the side of the device 10 to the cold ends 30 allows that power to be efficiently removed from the Fuel Cell Stick™ device 10.

Figure 37:
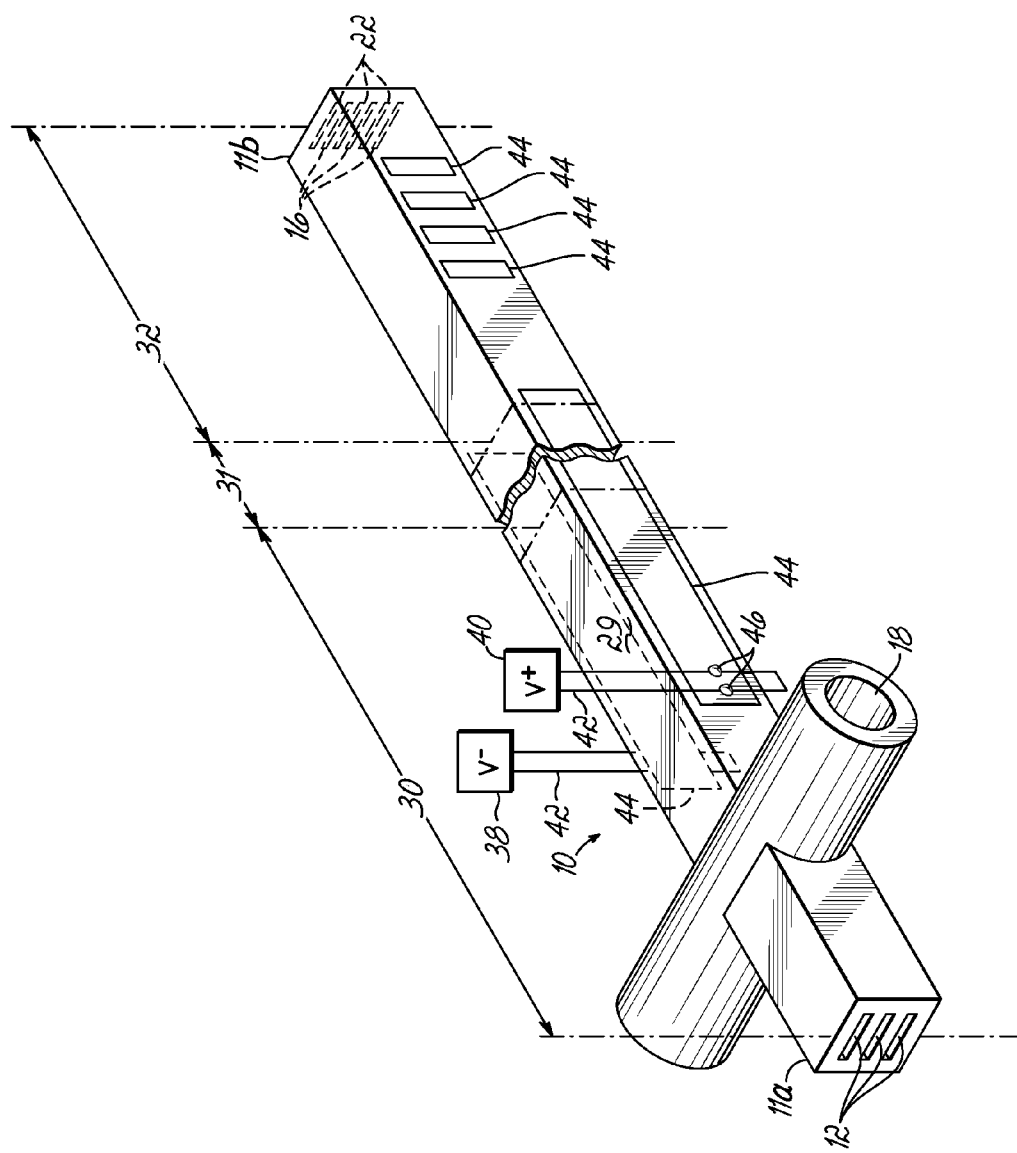
FIG. 37 depicts in schematic isometric view an embodiment similar to that of FIG. 36B, but having a single cold zone for the air and fuel supply connections and for the voltage node connection.

FIG. 37 depicts, in schematic isometric view, an embodiment similar to that depicted in FIG. 36B, but having a single cold zone 30 at the first end 11a of the Fuel Cell Stick™ device 10, with the hot zone 32 being at the second end 11b of device 10. Multiple vertical stripes or contact pads 44 are provided within the hot zone 32 to make the series and/or parallel connections, and the horizontal long stripes or contact pads 44 down the sides of the device 10 are provided from the hot zone 32 to the cold zone 30 for making the low temperature solder connections 46 to the positive voltage node 40 and negative voltage node 38.

One method for forming the fuel passages 14 and air passages 20 is to place an organic material as a sacrificial layer within the green, layered structure that can then bake out during a later sintering step. To build individual Fuel Cell Stick™ devices 10 having high power output, such as 1 KW or 10 KW output, the Fuel Cell Stick™ device 10 must be long, wide and have a high layer count. By way of example, the Fuel Cell Stick™ devices may be on the order of 12 inches to 18 inches long. When baking the green structure to sinter the ceramic and remove the sacrificial organic material, the organic material used to form the fuel passage 14 must exit through openings 12 and 16 that form the fuel inlet and fuel outlet, respectively. Similarly, the organic material used to form the air passage 20 must bake out through the openings 18 and 22 that form the air inlet and air outlet, respectively. The longer and wider the devices, the more difficult it is for the organic material to exit through these openings. If the device is heated too fast during bake-out, the various layers can delaminate because the decomposition of the organic material occurs faster than the material can exit the structure.

FIGS. 38A and 38B depict, in schematic cross-sectional top view, an alternative embodiment that provides multiple exit gaps for bake-out of the organic material (sacrificial layer) 72. As shown in FIG. 38A, multiple openings 70 are provided on one side of the Fuel Cell Stick™ device 10 to provide multiple bake-out paths for the organic material 72 to exit the structure. As depicted in FIG. 38B, after bake-out, the multiple openings 70 are then closed by applying a barrier coating 60 to the side of the Fuel Cell Stick™ device 10. By way of example, the barrier coating 60 may be a glass coating. In another example, the barrier coating 60 may be a glass containing a ceramic filler. In yet another embodiment, the barrier coating 60 may be a contact pad 44, for example filled with paste, which would then also serve as the low resistance path for the generated power. The silver paste may also contain glass for increased adhesion. In an exemplary embodiment, the bake-out paths for the cathode 26 are vented to one side of the Fuel Cell Stick™ device 10 and the bake-out paths for the anode 24 are vented to the opposing side of the device 10 to avoid shorting between opposite electrodes.

In an alternative embodiment for an Fuel Cell Stick™ device 10, 100, 200, 300, rather than having an open air passage 20 and fuel passage 14 lined with a cathode 26 or anode 24, respectively, the cathode and air channel may be combined and the anode and fuel channel may be combined through use of porous electrode materials that permit flow of the air or fuel. The cathodes and anodes must be porous anyway to permit the reaction to occur, so in combination with forced air and fuel input, sufficient flow could be achieved through the Fuel Cell Stick™ device to permit the power generating reaction to occur.

Figure 39:
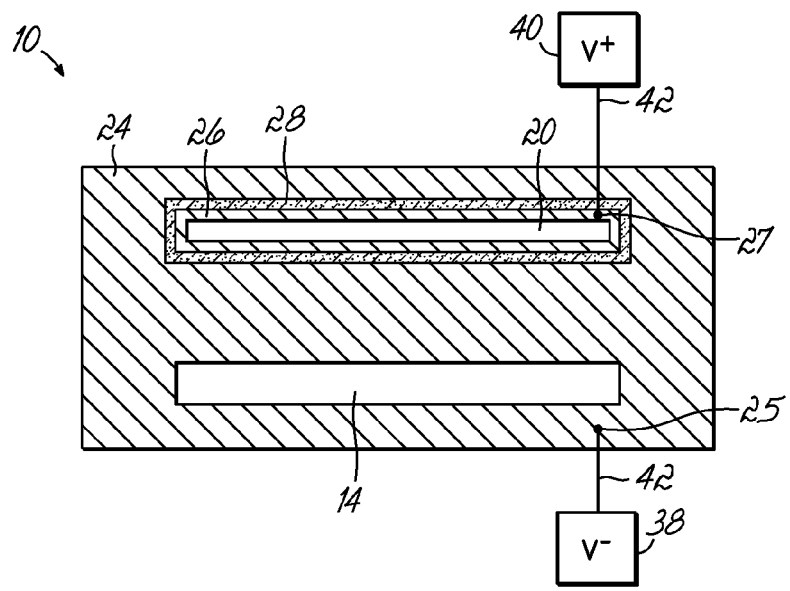
FIG. 39 depicts in schematic cross-sectional end view another embodiment in which anode material is used as the supporting structure, referred to as an anode-supported version of a Fuel Cell Stick™ device.

Another embodiment of the present invention is depicted in schematic cross-sectional end view in FIG. 39. This embodiment is essentially an anode-supported version of an Fuel Cell Stick™ device 10. As with other embodiments, the Fuel Cell Stick™ device 10 may have a hot end 32 and a cold end 30, or two cold ends 30 with an intermediate hot zone 32. Rather than having the device 10 supported by ceramic 29, the anode-supported version uses the anode material as the supporting structure. Within the anode structure, a fuel passage 14 and an air passage 20 are provided in opposing relation. The air passage 20 is lined with an electrolyte layer 28, and then with a cathode layer 26. Chemical vapor deposition could be used to deposit the internal layers, or by using solutions of viscous pastes.

Figure 40A:
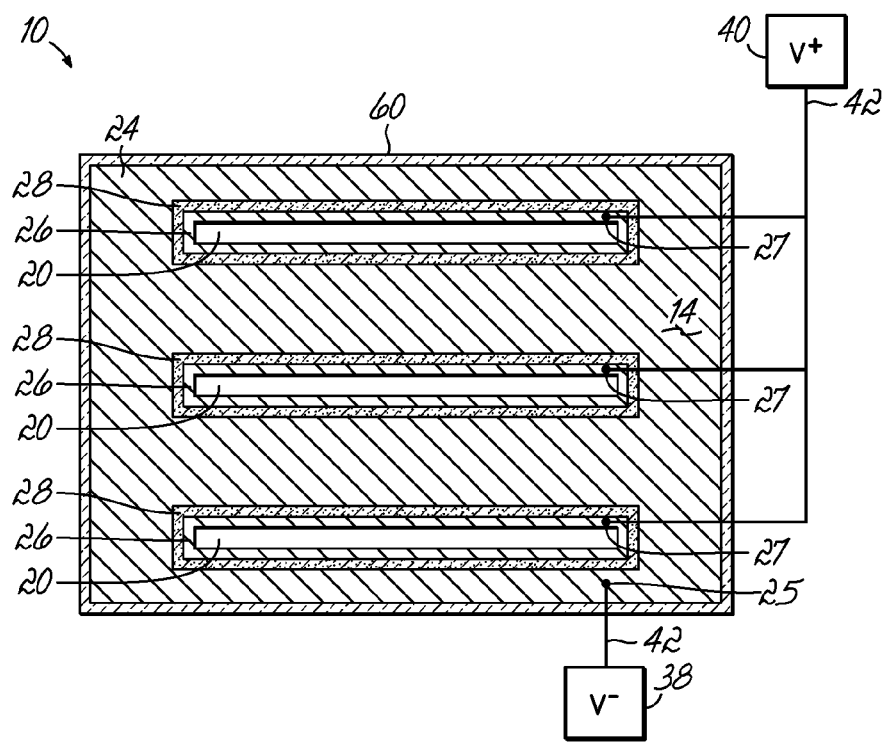
FIGS. 40A and 40B depict in schematic cross-sectional end and side views, respectively, an anode-supported version according to another embodiment in which an open fuel passage is eliminated in favor of a porous anode that serves the function of conveying the fuel through the device.
Figure 40B:
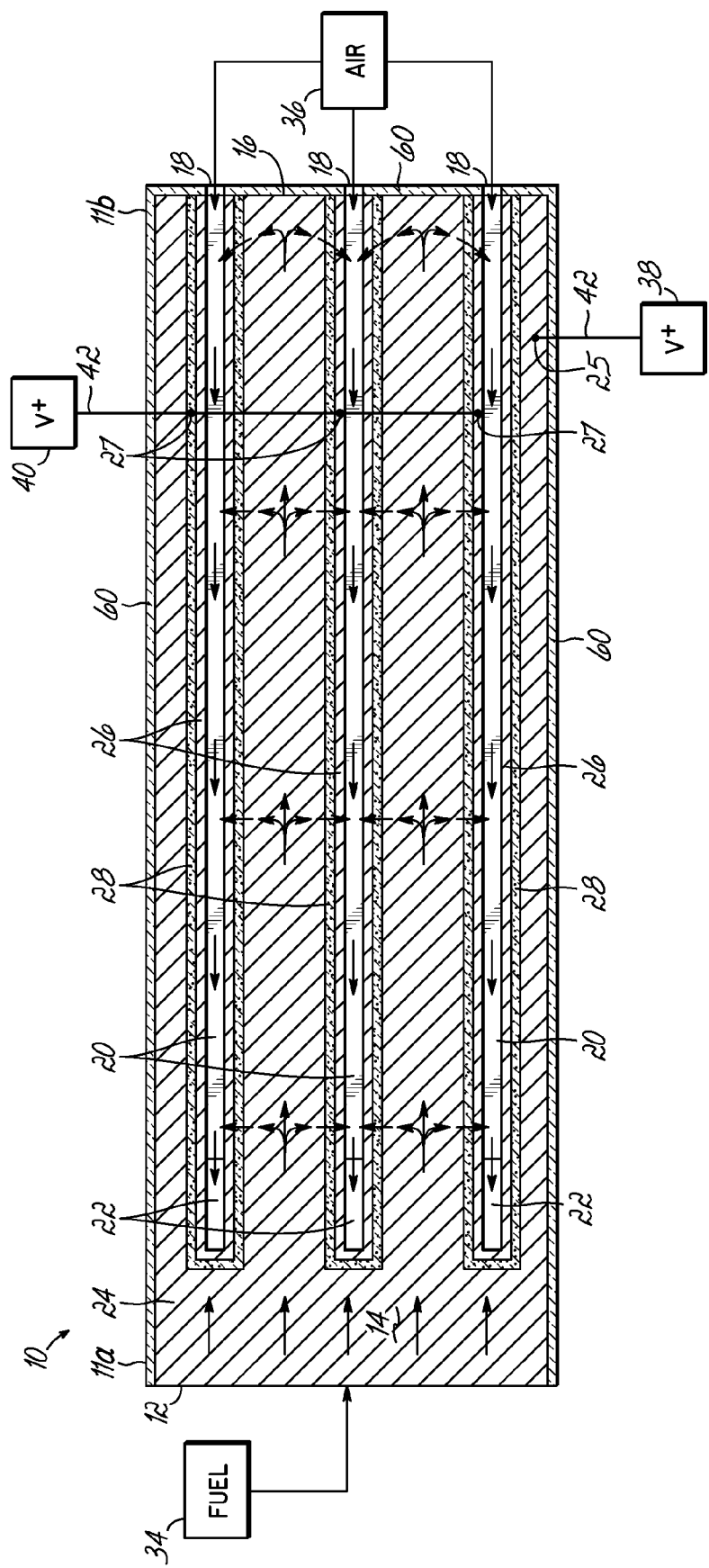

In FIGS. 40A and 40B, a further embodiment is shown for an anode-supported version of the Fuel Cell Stick™ device 10. In this embodiment, the separate open fuel passage 14 is eliminated, such that the porous anode 24 also serves as the fuel passage 14. In addition, the Fuel Cell Stick™ device 10 is coated with a barrier coating 60, such as a glass coating or a ceramic coating, to prevent the fuel from exiting out the sides of the device 10. The Fuel Cell Stick™ device 10 may have as many air passages 14 with associated electrolyte 28 and cathode 26 in the anode structure as desired. As depicted in FIG. 40B, the fuel from fuel supply 34 is forced into first end 11a through the porous anode 24, which serves as the fuel passage 14, and passes through the electrolyte layers 28 and the cathodes 26 to react with air from air supply 36, and the spent air and fuel can then exit out the air outlet 22.

Figure 41A:
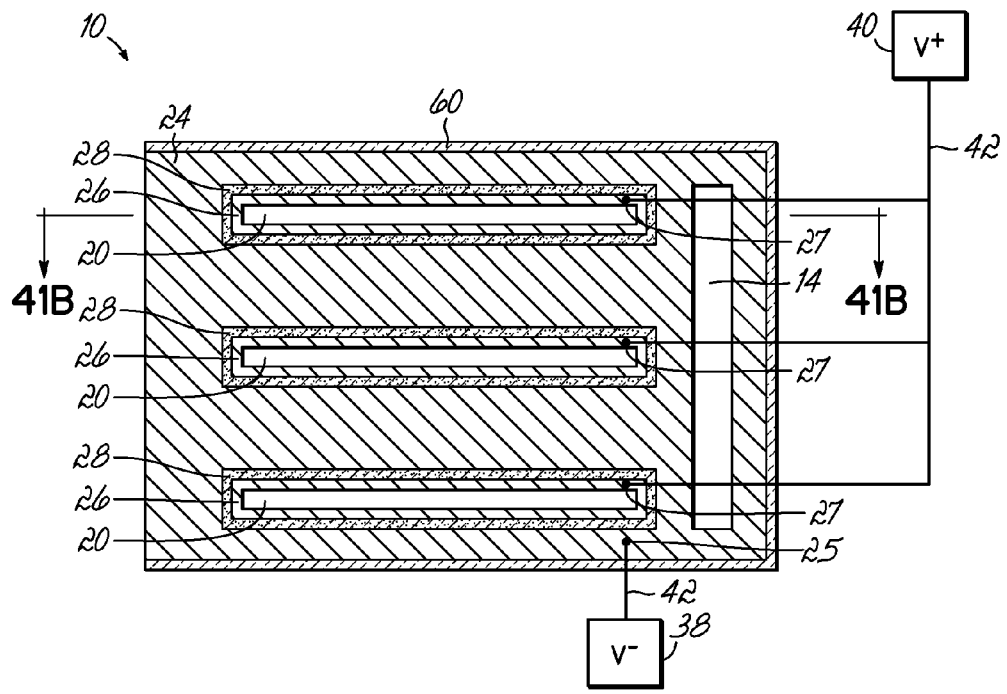
FIGS. 41A and 41B depict in schematic cross-sectional end and top views, respectively, another embodiment of an anode-supported version in which multiple air passages are provided within the anode-supporting structure, and a single fuel passage is provided normal to the multiple air passages.
Figure 41B:
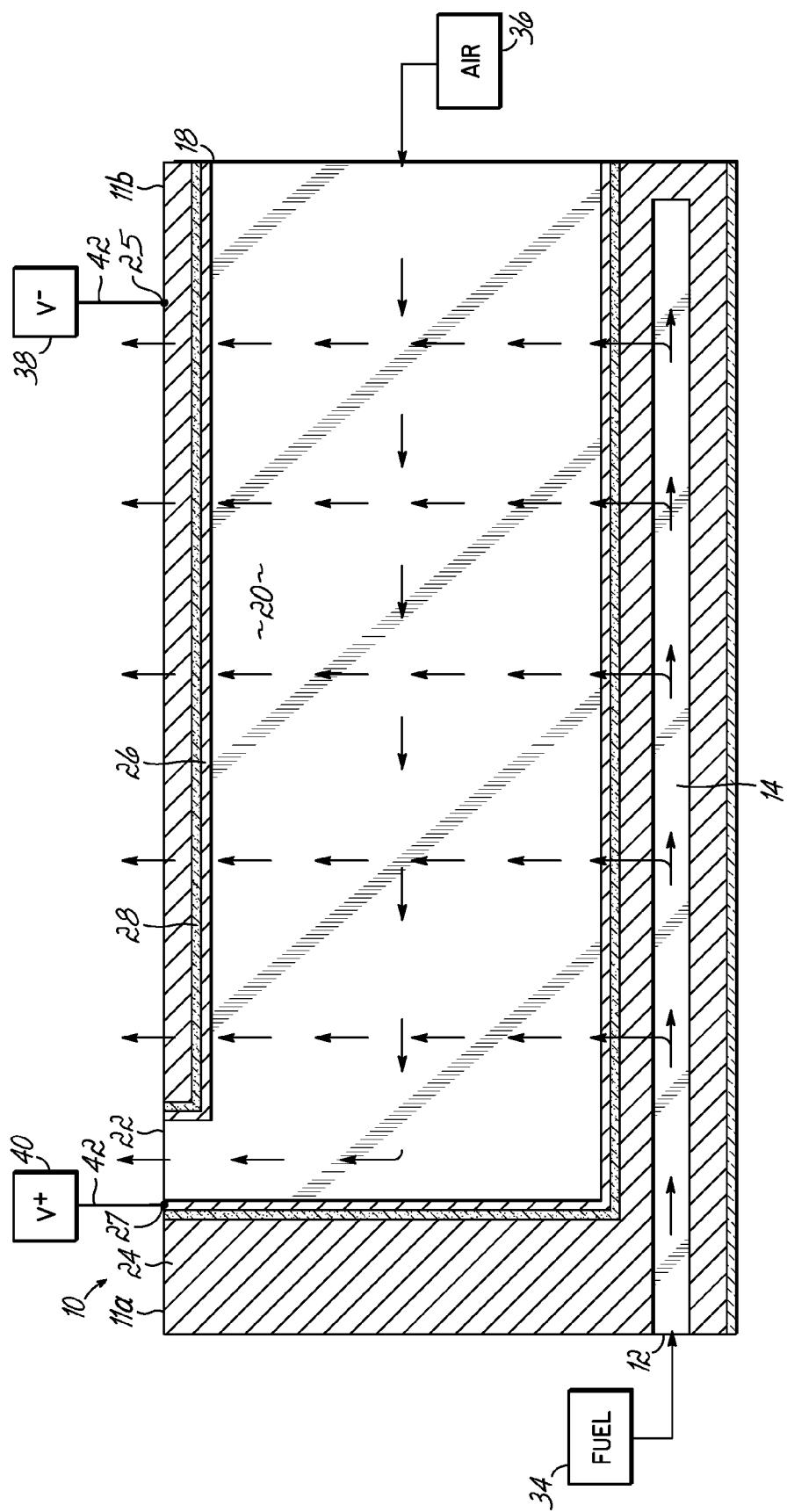

In another embodiment depicted in a schematic cross-sectional end view in FIG. 41A and a schematic cross-sectional top view in FIG. 41B, the Fuel Cell Stick™ device 10 may include a plurality of air passages 20 provided within the anode-supporting structure, and a single fuel passage 14 normal to the multiple air passages 20 for feeding fuel from the fuel supply 34 through the single fuel inlet 12 to multiple air passages 20. Again, the air passages 20 are lined first with an electrolyte layer 28 and then with a cathode 26. The fuel passes from the single fuel passage 14 through the anode structure 24, through the electrolyte 28, and through the cathode 26 to react with the air in the air passage 20, and the spent fuel and air exits from the air outlet 22. The spent fuel can also seep out the side of the Fuel Cell Stick™ device 10 that does not include the barrier coating 60, which uncoated side would be located on the opposing side of the device 10 from the orientation of the single fuel passage 14.

In the embodiments pertaining to an anode-supported structure, it may be appreciated that the structure may be essentially reversed to be a cathode-supported structure. Fuel passages 14 coated with an electrolyte layer 28 and an anode layer 24 would then be provided within the cathode structure.

A separate air passage 20 or multiple air passages 20 could also be provided, or the porosity of the cathode 26 could be used for the air flow.

Figure 42A:
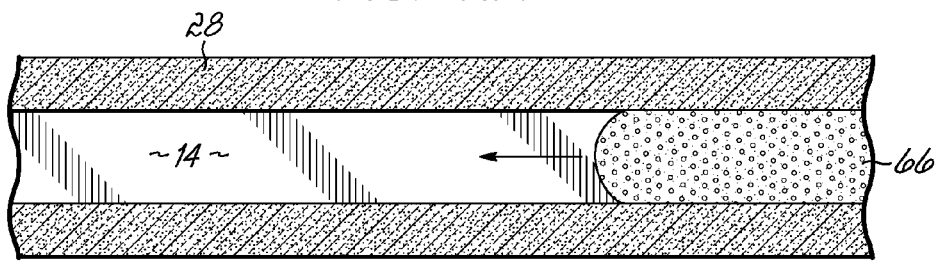
FIGS. 42A-42C depict in schematic cross-sectional views a method for forming an electrode layer in a passage of a Fuel Cell Stick™ device of the invention, according to one embodiment.
Figure 42B:
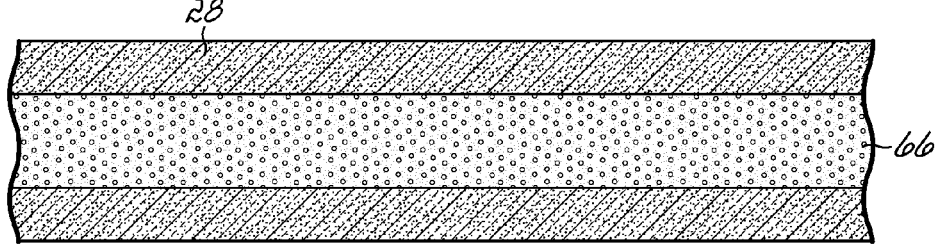
Figure 42C:
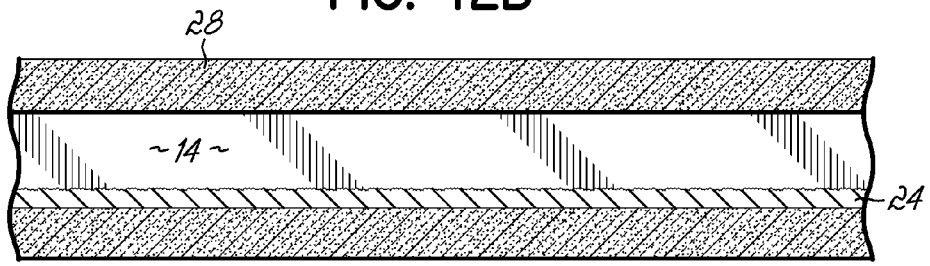

FIGS. 42A-42C depict a method for forming the electrodes within the air passages 20 and fuel passages 14. Taking the fuel passage 14 and anode 24 as an example, rather than building up a green structure layer by layer using layers of green ceramic and metal tape layers, or printing metallizations, in the present embodiment, the Fuel Cell Stick™ device 10 is first built without the electrodes. In other words, green ceramic material is used to form the electrolyte 28 and ceramic supporting portions 29 of the Fuel Cell Stick™ device 10 and the organic material is used to form the passages, such as fuel passage 14. After the Fuel Cell Stick™ device 10 has been sintered, the fuel passage 14 is filled with an anode paste or solution. The paste may be thick like that of a printing ink, or runny like that of a high-content water solution. The anode material can be filled into the fuel passage 14 by any desired means, such as sucking it in via a vacuum, by capillary forces, or forcing it in via air pressure.

Alternatively, as shown in FIGS. 42A-42C, the anode material is dissolved in solution, flowed into the fuel passage 14, and then precipitated. For example, through a change of pH, the anode particles can be precipitated and the solution drawn out. In another alternative, the anode particles can be simply allowed to settle, and then the liquid dried or baked out of the fuel passage 14. This settling can be accomplished by creating an ink or liquid carrier that will not keep the particles in suspension for any extended period of time, for example, due to low viscosity. A centrifuge could also be used to force the settling. The centrifuge can easily allow preferential settling of most particles onto one surface of the fuel passage 14 to thereby conserve electrode material and to ensure that only one surface of the fuel passage 14 acts as an electrolyte.

As shown in FIG. 42A, the anode particle-containing solution 66 is pulled into the fuel passage 14 until the passage 14 is completely filled, as shown in FIG. 42B. The particles then settle to the bottom of the passage 14 to form an anode layer 24, as shown in FIG. 42C. Flooding in of the solution 66 can be accelerated by gravity, vacuum, or centrifuge, as compared to normal capillary forces. Of course, while the anode 24 and fuel passage 14 were used as an example, any of these alternative embodiments may also be used with a cathode paste or solution to create a cathode layer 26 in an air passage 20.

In another alternative, a ceramic electrode material (anode or cathode) could be infused into the passage (fuel or air) in a liquid sol-gel state, and then deposited inside the passage. It is also possible to repeat the filling operation multiple times, such as in the case where the concentration of the desired electrode material in the liquid is low, or to provide a gradient of properties in the electrode (such as to provide a different amount of YSZ in the electrode close to the electrolyte versus the amount of YSZ in the electrode farther from the electrolyte), or if there is a desire to put multiple layers of dissimilar materials together (such as a cathode made of LSM near the electrolyte, and then silver over the top of the LSM for better conductivity).

Figure 43:
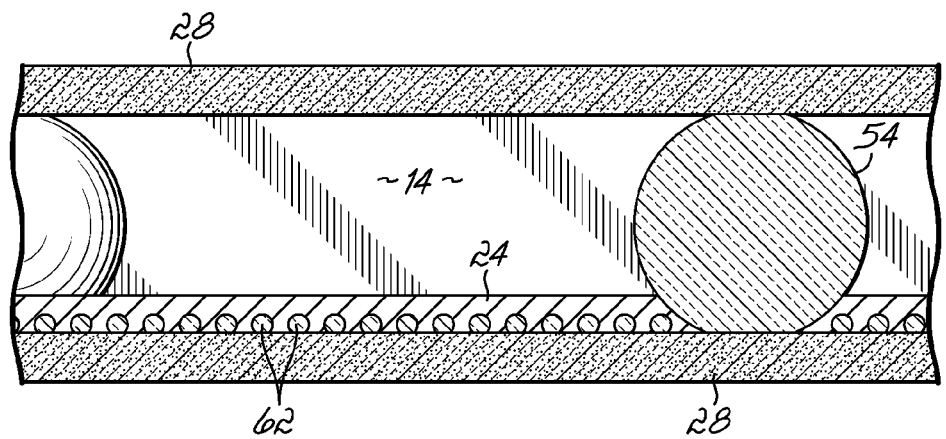
FIGS. 43 and 44 depicts in schematic cross-sectional side views alternative embodiment in which the electrolyte layer is provided with an uneven topography to increase the surface area available to receive an electrode layer.

Referring back to FIGS. 7C and 7D, in which ceramic spheres or balls were used to provide structural support to the air and fuel passages 20, 14, ceramic particles may also be used to increase the effective surface area for a greater reaction area, thus giving a higher output. Very fine-sized ceramic balls or particles can be used inside the fuel passage 14 and the air passage 20 prior to applying the electrode layer. As shown in FIG. 43 in schematic cross-sectional side view, surface particles 62 line the passage 14 to provide the electrolyte layer 28 with an uneven topography that increases the surface area available to receive the electrode layer. The anode 24 is then applied over the uneven topography with the anode material coating all around the surface particles 62 thereby increasing the reaction area.

Figure 44:
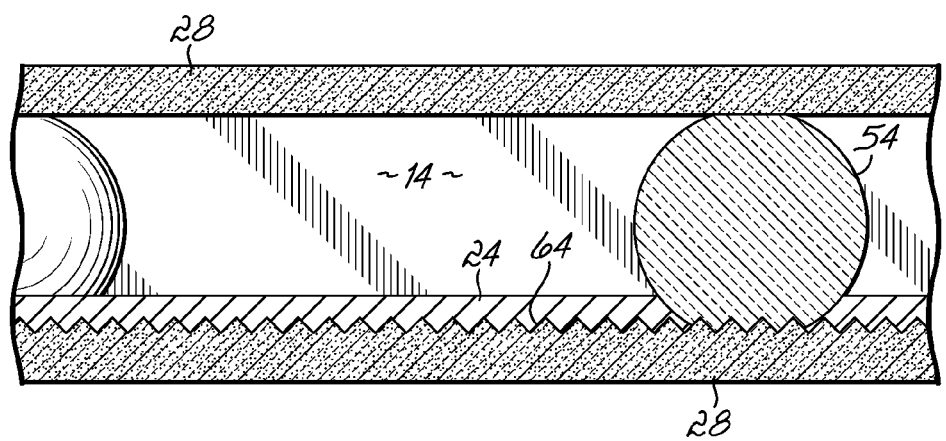

In an alternative embodiment, depicted in schematic cross-sectional side view in FIG. 44, the electrolyte layer 28 may be laminated so as to provide the uneven topography or textured surface layer 64, such as by pressing the green electrolyte layer against a fine grading having a V-shaped pattern, which pattern is then imparted to the electrolyte layer 28. After the electrolyte layer 28 is sintered to solidify the ceramic and the textured surface layer 64, the anode layer 24 may then be applied, such as by using the backfill process described above in FIGS. 42A-42C, to provide an anode with a high reaction area.

Figure 45B:
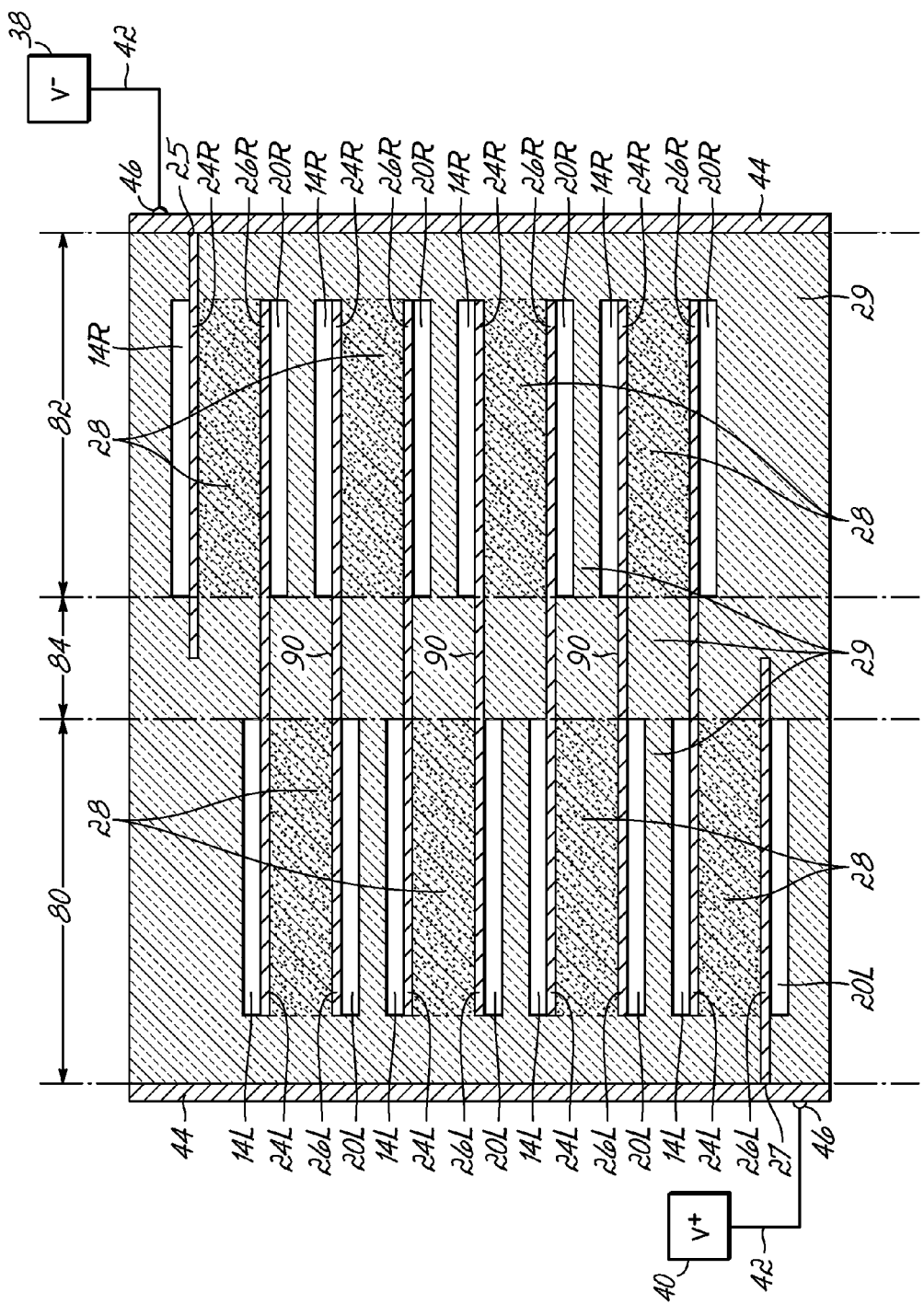

Yet another embodiment of the invention is depicted in FIGS. 45A and 45B. FIG. 45A is a schematic top view depicting the air and fuel flow through air and fuel passages and the arrangement of the electrodes, and FIG. 45B is a cross-sectional view through the hot zone 32. Along the length of Fuel Cell Stick™ device 10, the device is divided into a left side 80 and a right side 82 with an intermediate or bridging portion 84 therebetween. A plurality of air passages 20L extend from the first end 11a of Fuel Cell Stick™ device 10 along the length through the left side 80 and exit out the left side 80 adjacent second end 11b, and a plurality of air passages 20R extend from first end 11a along the length through the right side 82 and exit the Fuel Cell Stick™ device 10 on the right side 82 adjacent the second end 11b. The air passages 20L are offset from the air passages 20, as best shown in FIG. 45B. A plurality of fuel passages 14L extend from the second end 11b of Fuel Cell Stick™ device 10 along the length through the left side 80 and exit on the left side 80 adjacent first end 11a, and a plurality of fuel passages 14R extend from second end 11b along the length through the right side 82 and exit the right side 82 adjacent first end 11a. The fuel passages 14L are offset from the fuel passages 14R. In addition, with the exception of one fuel passage and one air passage, each fuel passage 14L is paired with and slightly offset from an air passage 20R and each air passage 20L is paired with and slightly offset from a fuel passage 14R. For each offset pair of fuel passages 14L and air passages 20R, a metallization extends along each fuel passage 14L from the left side 80 to the right side 82, where it then extends along the slightly offset air passage 20R. Similarly, for each offset pair of fuel passages 14R and air passages 20L, a metallization extends along each air passage 20L from the left side 80 to the right side 82, where it then extends along the slightly offset fuel passage 14R. The metallization serves as an anode 24L or 24R when the metallization extends along a fuel passage 14L or 14R, and the metallization serves as a cathode 26L or 26R when the metallization extends along an air passage 20L or 20R. In the bridging portion 84 of the Fuel Cell Stick™ device 10, where the metallizations do not extend along any air or fuel passage, the metallization simply serves as a bridge 90 between an anode and a cathode. In one embodiment of the present invention, the metallization may comprise the same material along its length, such that the anode 24L or 24R, the bridge 90 and the cathode 26L or 26R each comprise the same material. For example, the metallizations may each comprise platinum metal, which functions well as either an anode or a cathode. Alternatively, the metallization may comprise different materials. For example, the cathodes 26R or 26L may comprise lanthanum strontium manganite (LSM), while the anodes 24R or 24L comprise nickel, NiO, or NiO+YSZ. The bridges 90 may comprise palladium, platinum, LSM, nickel, NiO, or NiO+YSZ. The present invention contemplates any combination or type of materials suitable for use as a cathode or an anode, or a bridging material therebetween, and the invention is not limited to the specific materials identified above.

On one side of the Fuel Cell Stick™ device 10, shown here at the right side 82, a fuel passage 14R is provided with an associated anode 24R that extends to the right edge of the Fuel Cell Stick™ device 10 to provide the external exposed anode 25. There is no offset air passage 20L associated with this fuel passage 14R, and the anode 24R need not extend into the left side 80. As depicted in FIG. 45A, an external contact pad 44 is applied over the exposed anode 25 and extends along the length of the Fuel Cell Stick™ device 10 into the cold zone 30. Negative voltage node 38 can then be connected by wire 42 and solder connection 46 to the contact pad 44. The anode 24R could extend, as shown, to the right edge throughout the hot zone 32, or could just extend in a small tab portion to reduce the amount of electrode material used. Also, the anode 24R could extend to the right edge of the Fuel Cell Stick™ device 10 along the length of the fuel passage 14R, although such embodiment would involve an unnecessary use of electrode material.

Similarly, on the other side of the Fuel Cell Stick™ device 10, shown as the left side 80, a single air passage 20L is provided with an associated cathode 26L that extends to the left side of the Fuel Cell Stick™ device 10 to form the exposed cathode 27. This air passage 20L is not associated with an offset fuel passage 14R, and it is not necessary that the cathode 26L extend to the right side 82. A contact pad 44 may be applied along the exterior of the left side 80 of the Fuel Cell Stick™ device 10 from the exposed cathode 27 to a cold end 30, where a positive voltage node 40 may be connected via wire 42 and solder connection 46 to the contact pad 44.

In FIG. 45B, the single fuel passage 14R and associated anode 24R are shown at the top of the right side 82, while the single air passage 20L and associated cathode 26L are shown at the bottom of the left side 80 of the Fuel Cell Stick™ device 10. However, the invention is not limited to that arrangement. For example, air passage 20L and associated cathode 26L could be provided also at the top of device 10 on the left side 80, in a similar offset manner to the single fuel passage 14R and its associated anode 24R, but the metallization would not run from the left side 80 through the bridging portion 84 to the right side 82. Rather, the bridge 90 would be absent such that the anode 24R is electrically separated from the cathode 26L. Additional arrangements are contemplated in which a Fuel Cell Stick™ device 10 may be provided with two unique air pathway stacks and two unique fuel pathway stacks within a single Fuel Cell Stick™ device 10, with the cells connected in series. The embodiment depicted in FIGS. 45A and 45B has an advantage of raising the voltage without raising the current, and while maintaining a low resistance. Further, this embodiment provides a high density within the Fuel Cell Stick™ device 10.

In FIGS. 46A and 46B, an alternative embodiment is depicted in schematic perspective view and schematic cross-sectional view, respectively. Previous embodiments (e.g., FIG. 37) provided external stripes along the exterior sides or edges of the Fuel Cell Stick™ device 10 from the hot zone 32 to the cold zone(s) 30 to provide a path of low resistance for the electrons to travel to the cold-end. In the embodiment of FIGS. 46A and 46B, instead of stripes down the sides or edges of the device 10, a contact pad 44 is applied along one side and one of the top and bottom surfaces for the external connection to the anode 24 and another contact pad 44 is applied along the opposing side and the other of the top and bottom surfaces for the external connection to the cathode 26. Thus, the electrons have a large or wide path along which to travel, thereby providing an even lower resistance. These large contact pads 44 that are applied on two adjacent surfaces could be used in any of the embodiments disclosed herein.

Figure 47:
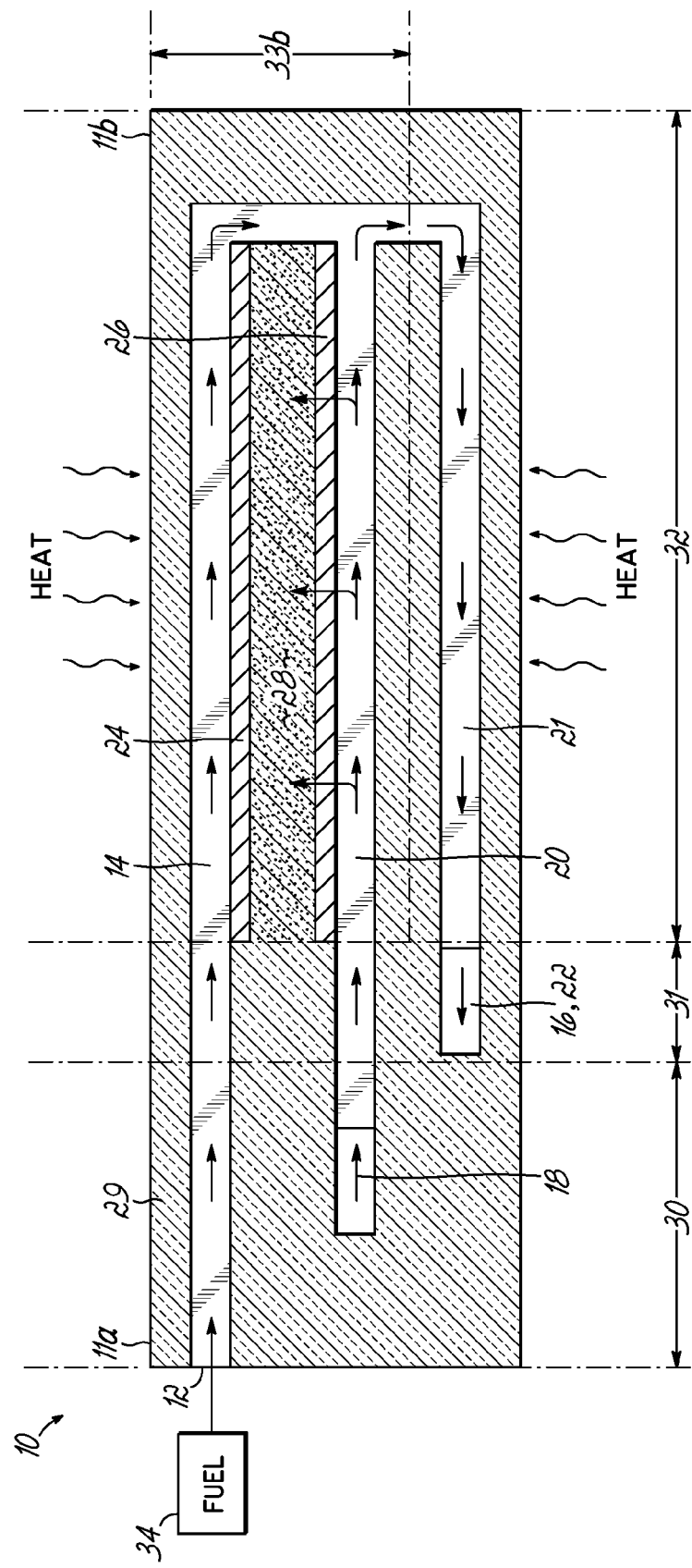
FIG. 47 depicts in schematic cross-sectional side view a Fuel Cell Stick™ device according to another embodiment of the invention having a single exhaust passage for both spent fuel and air.

In FIG. 47, yet another embodiment is depicted, in schematic cross-sectional side view, of a Fuel Cell Stick™ device 10 that takes advantage of heat exchange principles. After the heated air and fuel pass through the active zone 33b of the hot zone 32 (i.e., the portion of the hot zone 32 where the anode 24 is in opposing relation to the cathode 26 with an electrolyte 28 therebetween), the fuel passage 14 and air passage 20 are joined into a single exhaust passage 21. Any un-reacted fuel will burn when combined with the heated air, thus producing additional heat. The exhaust passage 21 travels back toward the cold zone 30 adjacent the active zone 33b, with the direction of flow of the exhaust (spent fuel and air) being opposite that of the incoming fuel and air in the adjacent fuel and air passages 14, 20. The additional heat generated in the exhaust passage 21 is transferred to the adjacent passages 14, 20 to heat the incoming fuel and air.

FIGS. 48A-48C depict an "end-rolled Fuel Cell Stick™ device" 400 having a thick portion 402 having a greater thickness than a thin portion 404, as depicted in FIG. 48A. The fuel and air inlets 12, 18 are positioned adjacent first end 11a, which is at the end of thick portion 402, and while not shown, the air and fuel outlets (16, 22) may be provided at the sides of the device 400 adjacent opposing second end 11b, which is at the end of the thin portion 404. The thick portion 402 should be thick enough to provide mechanical strength. This may be achieved by providing thick ceramic 29 around the adjacent fuel and air inlets 12, 18. The thin portion 404 will include the active zone 33b (not shown) that includes an anode (not shown) in opposing relation to a cathode (not shown) with an electrolyte (not shown) therebetween (as in prior embodiments). The thin portion 404 should be thin enough to permit it to be rolled while in the green (unfired) state, as shown in FIG. 48B. After the thin portion 404 is rolled to a desired tightness, the device 400 is fired. The rolled thin portion 404 can then be heated to cause the reaction, while the thick portion 402 is a cold end, as discussed in other embodiments. The end-rolled Fuel Cell Stick™ device 400 is a large surface area device that can fit in a small space by virtue of rolling the thin portion 404. Moreover, the thin cross-section of the active zone (33b) in the thin portion 404 reduces the heat transfer out along the ceramic and allows good temperature cycle performance.

In embodiments in which the anode 24 and cathode 26 are exposed at the edges (sides) of the Fuel Cell Stick™ device 10 in the active (reaction) zone 32 and/or 33b, the ceramic 29 at the top of the device 10 may be recessed in the area of the active zone 32 and/or 33b. This allows access to both the cathode 26 and anode 24 from the top for making the electrical connections. Contact pads 44 (e.g., metallization stripes) may then be applied along the top surface of the Fuel Cell Stick™ device 10 from the active zone 32 and/or 33b to the cold zone(s) 30 to provide connections to outside of the hot zone chamber/furnace.

In another embodiment in which the Fuel Cell Stick™ device 10 includes two cold zones 30 at the opposing ends 11a, 11b and the hot zone 32 in the middle, contact pad(s) 44 (e.g., metallization stripes) for the anode(s) 24 and/or the cathode(s) 26 can go from the hot zone 32 out toward both ends 11a, 11b of the Fuel Cell Stick™ device 10, for example, as shown in FIG. 36B. Two separate electrical connections can then be made to each of the anode(s) 24 and cathode(s) 26. By way of example and not limitation, one set of connections can be used to monitor voltage output from the cell, while the other set of connections can connect the load and allow the current flow. The ability to measure voltage separately, at the cell itself, has the advantage of giving a better idea of the total power output from the cell.

For the contact pads 44 (e.g., metallization stripes), any suitable conducting material known to those of ordinary skill in the art may be used. Examples include silver, LSM and NiO. Combinations of materials may also be used. In one embodiment, non-precious metal materials may be used along the surface of the Fuel Cell Stick™ device 10 in the hot zone 32. LSM, for example, may be used where the atmosphere of the hot zone chamber/furnace is oxidizing NiO, for example, may be used where the atmosphere of the hot zone chamber/furnace is reducing. In either case, however, the non-precious metal materials lose conductivity if the material extends outside the hot zone chamber/furnace such that the metallization material must be transitioned to a precious metal or corrosion resistant material just before the Fuel Cell Stick™ device 10 exits the hot zone chamber/furnace. Silver paste is a convenient precious metal material. By way of further explanation, certain materials such as LSM will become non-conducting as the temperature drops from the reaction temperature to room temperature, and other materials such as nickel will become non-conducting when exposed to air at the cold end 30 of the device 10. Thus, the metallization material for the contact pads 44 in the cold end regions 30 of the Fuel Cell Stick™ device 10 must be conductive in air (i.e., no protective atmosphere) and at low temperature. Precious metals such as silver work across the temperature/atmosphere transition area, such that the metallization material can be transitioned to the precious metal before the Fuel Cell Stick™ device 10 exits the hot zone chamber/furnace. The use of a combination of materials allows for material selection based on the particular needs of conductance in a hot zone 32 versus a cold zone 30, and allows for reducing cost by reducing the amount of expensive precious metals used.

Figure 49A:
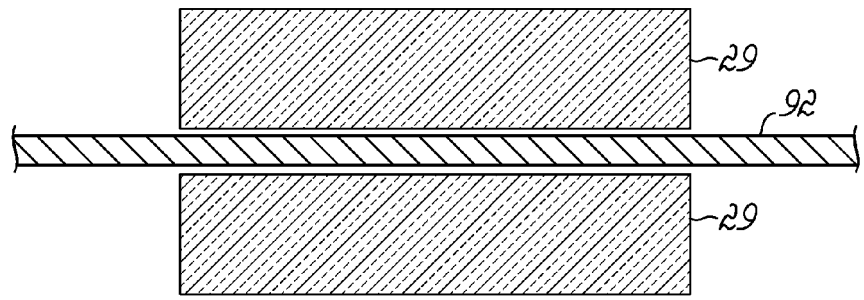
FIG. 49A depicts in schematic cross-sectional side view an embodiment for building a Fuel Cell Stick™ device using a wire between two ceramic layers.
Figure 49B:
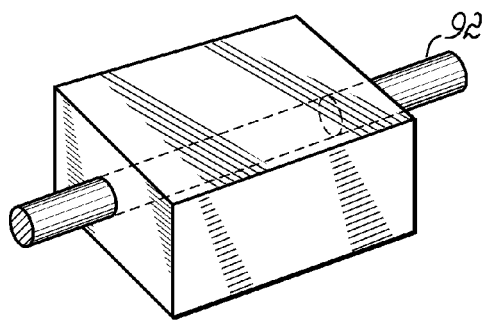
FIG. 49B depicts in schematic perspective view the device of FIG. 49A after lamination.
Figure 49C:
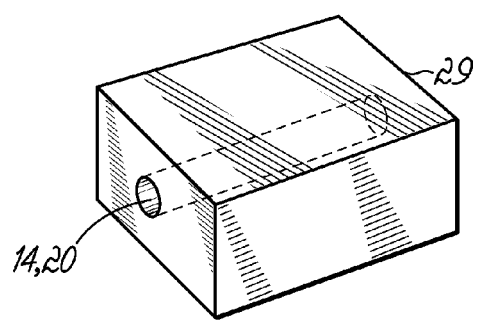
FIG. 49C depicts in schematic perspective view the device of FIG. 49B after the wire has been removed.

As depicted in FIGS. 49A-49C, wire 92 or other physical structure is placed into the device during the process of building up the green layers (FIG. 49A), the layers are then laminated with the wire 92 in place (FIG. 49B), and then the wire 92 is removed after lamination (FIG. 49C). This is useful, for example, at the entrance point of fuel or air, where the Fuel Cell Stick™ device 10 may have a length of several inches before the gas flow passage 14, 20 enters the hot zone 32 (reaction region) of the Fuel Cell Stick™ device 10. Instead of printing a polymer that must bake out slowly in the process to form the passage, the wire process may be used to remove the bake-out challenge from that part of the Fuel Cell Stick™ device 10. By way of example and not limitation, a wire 92 with a 0.010 inch diameter may be used, which will pull out easily. The wire 92 may also be rolled flat, to form a ribbon-like physical structure that has a similar volume as the wire, but is shorter in cross-section. Because the ribbon has more surface area, a release agent may be applied to the surfaces thereof to keep it from sticking to the ceramic layers during lamination. Thus, the term "wire" is intended to broadly include various physical structures that are long and then narrow, whether circular, oval, square, rectangular, etc. in cross-section.

Figure 50A:
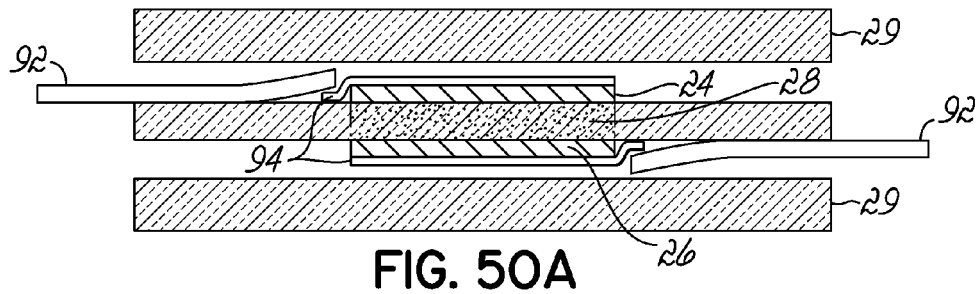
FIGS. 50A-50C depict in schematic cross-sectional views another embodiment for building a Fuel Cell Stick™ device using a combination of wire and gap-forming tape.
Figure 50B:
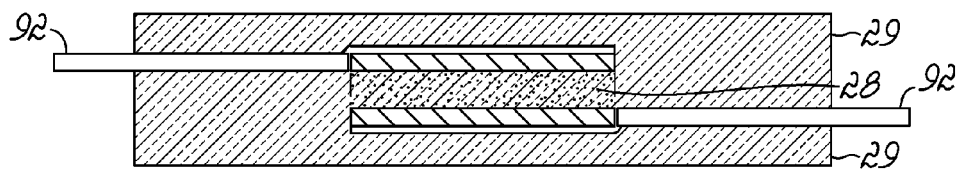
Figure 50C:
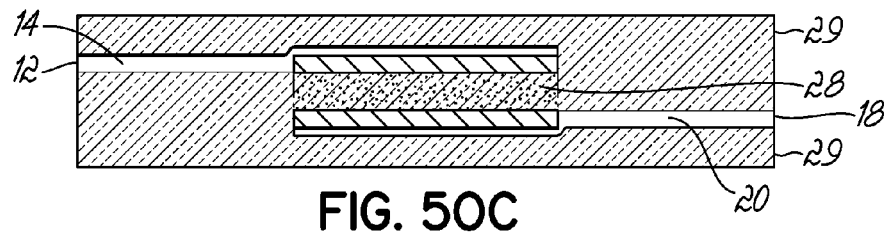

FIGS. 50A-50C depict an example of forming entrance channels for a 1 layer Fuel Cell Stick™ device 10. In this example, rather than using a gap-forming tape 94 (e.g., polymer or wax tape) to form the entire fuel and oxidizer passages 14, 20, the gap-forming tape 94 is only used in the active zone 33b, i.e., in the regions where the anodes 24 and cathodes 26 are positioned in opposing relation with electrolyte 28 therebetween. In the non-active regions where the fuel and oxidizer passages 14, 20 do not have an associated opposed anode 24 and cathode 26, wires 92 are used instead of the gap-forming tape 94. As shown, the wires 92 touch or overlap the gap-forming tape 94 so that the passages 14, 20 formed by the wire 92 and the gap-forming tape 94 are continuous from the inlets 12, 18 to the outlets 16, 22 (not shown).

As Fuel Cell Stick™ devices 10 become more and more complicated, it can be more and more useful to use this wire concept, for example, the complex bake-out challenge of a multi-layer Fuel Cell Stick™ device 10 (e.g., 50 layers) can be simplified. This is in part because the challenge for binder removal, especially in complicated structures, is that the binder bake-out products must travel from the location that they are generated (from the decomposition of polymer) to the outside of the Fuel Cell Stick™ device 10. After a wire 92 is pulled out of the structure, however, the path along this void is free and clear. If wires 92 (or other suitable physical structure) can be put into a complicated structure, and then pulled out, the voids created thereby can allow many regions within the structure for bake-out products to quickly find a path out of the structure.

Another useful purpose for the wire concept is to help with pressure distribution within the Fuel Cell Stick™ device 10. When a single tube is supplying air or fuel to the Fuel Cell Stick™ device 10, then different flow rates may exist along the many passages/channels within the Fuel Cell Stick™ device 10. For example, if there are 50 air passages 20 in the Fuel Cell Stick™ device 10, corresponding to 50 active layers, then there may be one passage that has a slightly larger sectional area, and one passage that has a slightly smaller sectional area. This can arise from random variation in the dimensions of the gap-forming materials. One solution is to limit the sectional area of the exit from each layer. If the cross-section of the exit point from each layer can be precisely made, so that those sectional areas are equal, and if the sectional area of the exit point is less than the area of the flow channel, and if the area of all those exit points is less that the sectional area of the input tube, then the flow will be equal on each layer. This corresponds with the practicalities of gas and fluid flow. The wire concept enables this solution. At the exit point of each layer, a wire 92 is inserted to make the final passage of the gas to the outside world. For 50 layers, 50 short wire pieces are inserted. When they are pulled out, each layer has a precision exit dimension (for example, a 5 mil diameter passageway).

Thus, the present invention contemplates a multilayer Fuel Cell Stick™ device 10 in which the exit points of each layer are smaller in sectional area than the flow path sectional area itself. The present invention further contemplates a multilayer Fuel Cell Stick™ device 10 in which the exit points of each layer are precision machined so that they have exactly the same cross-sectional area at some given location. The present invention yet further contemplates a multilayer Fuel Cell Stick™ device 10 where all exit areas put together are smaller than the sectional area of the input. In these embodiments, the sectional area of the exit point is defined as being at some location in the flow path that is beyond the end of the active portion of the layer, but before the end output point of the Fuel Cell Stick™ device 10. In other words, this neckdown point in the flow path does not have to be exactly at the exit point from the Fuel Cell Stick™ device 10, just somewhere downstream from the active area.

Figure 51:
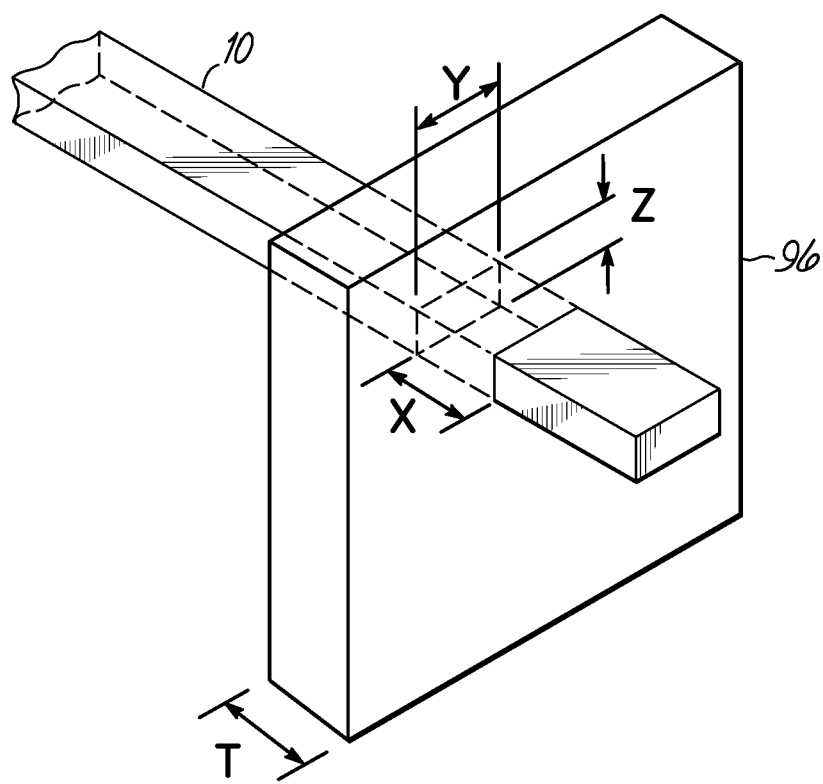

In previous embodiments, the hot zone 32 and hot zone chamber have been discussed. The hot zone chamber may also be referred to as a furnace. The cold zone or cold end regions 30 are positioned outside of the furnace. The transition zone 31 is a region of the Fuel Cell Stick™ device 10 adjacent the region inside the furnace. As depicted in FIG. 51, the furnace wall 96 has a total thickness T. The Fuel Cell Stick™ device 10 passes through this furnace wall 96. The length of the Fuel Cell Stick™ device 10 in the wall 96 is the X dimension and is equal to thickness T. The width of the Fuel Cell Stick™ device 10 as it passes through the wall 96 is the Y dimension. The thickness of the Fuel Cell Stick™ device 10 is the Z dimension. For purposes of this embodiment, Z is less than or equal to Y.

According to an embodiment of the invention, for optimal conditions, the furnace wall thickness T should be greater than the width, Y, of the Fuel Cell Stick™ device 10 as it passes through the wall 96. If T is less than Y, then the stress on the Fuel Cell Stick™ device 10 as it passes through the wall 96 may be too high, and the Fuel Cell Stick™ device 10 could crack.

In another embodiment, depicted in FIGS. 52A-52C, dimension L is the maximum dimension in a plane transverse to the direction of the length of the device 10 (i.e., in the Y-Z plane) of the Fuel Cell Stick™ device 10, (100, 200, 300 or 400) at the portion where it passes through the furnace wall 96. For a rectangular Fuel Cell Stick™ device 10 (100, 400), the maximum dimension L may be the diagonal, as shown in FIG. 52B. For a tubular Fuel Cell Stick™ device 200, 300, the maximum dimension L may be the diameter. For optimal conditions, the dimensions should be such that $T \geq \frac{1}{2}L$.

Figure 53:
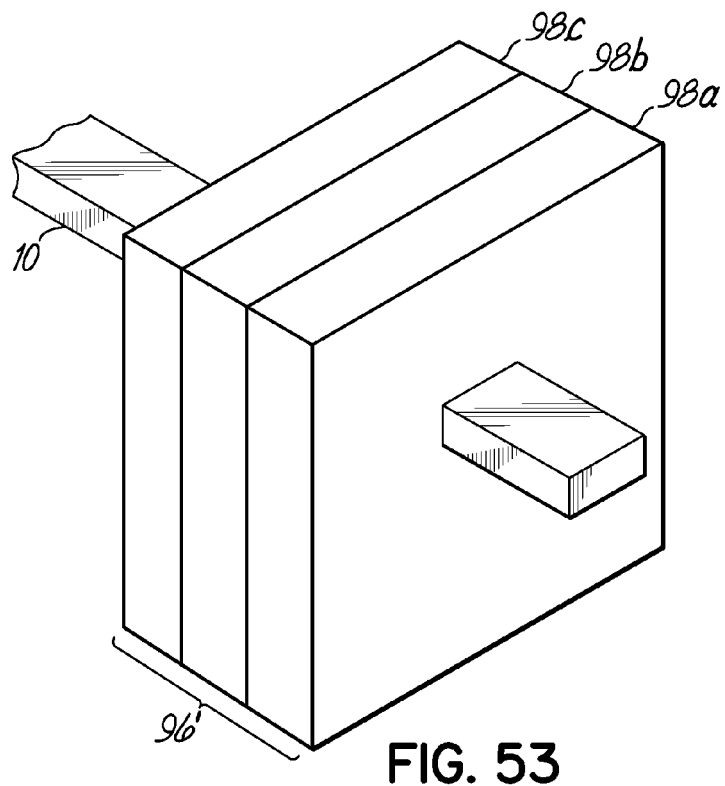
FIG. 53 depicts in schematic perspective view a Fuel Cell Stick™ device passing through a furnace wall made up of multiple layers.

The wall thickness T may be made from one uniform material (insulation) 98. Alternatively, as depicted in FIG. 53, the wall thickness T may also be made from multiple, graded insulation layers, such as three insulation layers 98a, 98b, 98c, such that the heat transfer properties are optimized in each layer to give the best possible temperature transition results. In the case of a multiple-layer furnace wall 96', the total thickness T of all layers put together should be greater than Y and/or greater than or equal to $\frac{1}{2}L$, but the thickness of one layer of the wall 96' could be less than Y and/or less than $\frac{1}{2}L$.

Figure 54:
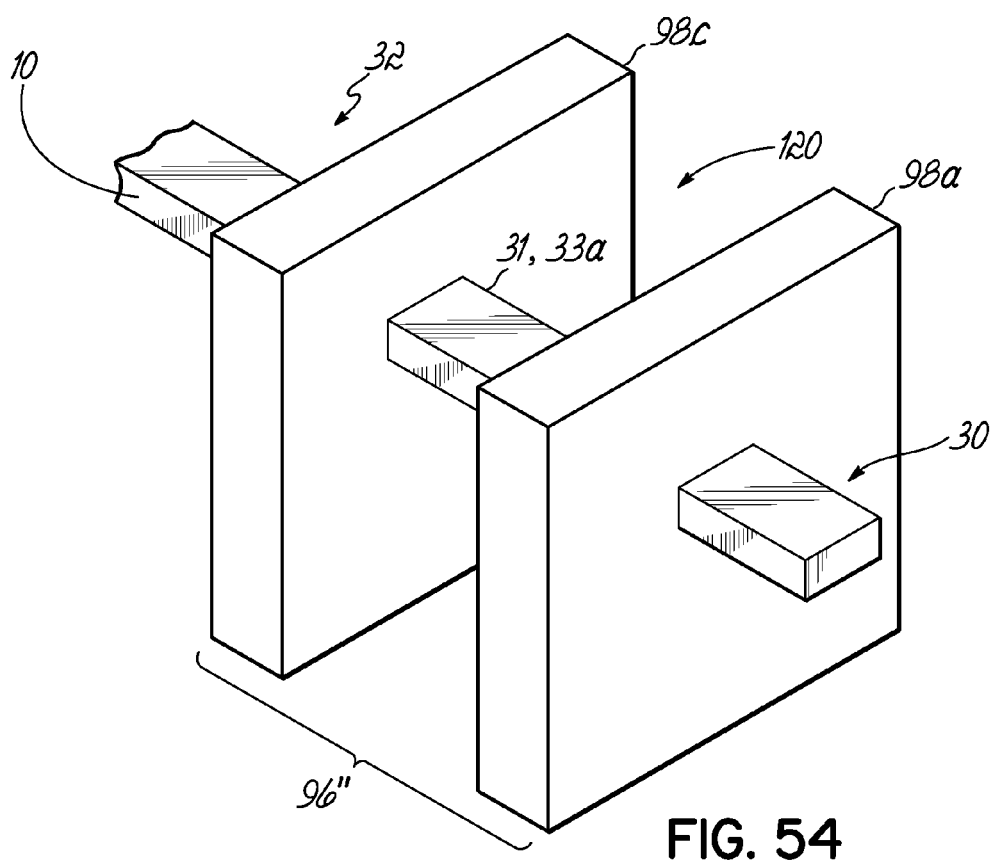
FIG. 54 depicts in schematic perspective view a Fuel Cell Stick™ device passing through a furnace wall made up of multiple layers and an air gap.

In another embodiment, depicted in FIG. 54, a multiple-layer furnace wall 96" is provided in which multiple layers of insulation 98a, 98c may be separated by air gaps 120. In this design, there could be a high-temperature insulation layer 98c close to the hot zone 32, and a lower temperature insulation layer 98a close to the cold zone 30. An intermediate (medium) temperature zone then lies between the two insulation layers 98a and 98c, for example, corresponding to transition zone 31 or a preheat zone 33a. This embodiment can enable a longer preheat area for the air that is flowing into the Fuel Cell Stick™ device 10, while not having to make the hottest area of the furnace larger. In this embodiment, the thickness of one layer of wall 96" could be made to be less than the Y dimension of the Fuel Cell Stick™ device 10 and/or less than $\frac{1}{2}L$ as it passes through the wall 96". But the total dimension T of the wall 96", including layers 98a and 98c, and the air gap 120 would be larger than the Y dimension of the Fuel Cell Stick™ device 10 and/or greater than or equal to $\frac{1}{2}L$. This embodiment further contemplates more than two insulation layers.

Discussed above is the idea of first making the Fuel Cell Stick™ device 10 without the anode and cathode, and then backfilling those elements later. The reason for doing this can be that a certain anode or cathode material will densify too much at the sintering temperature of Zr, and if it is too dense then it will not allow a good reaction. Or, to say it more generically, backfilling can be necessary if the different components of the system do not want to sinter optimally with the same temperature profile.

It is more difficult, however, to provide the current collectors on the top portions of the anode or cathode. A current collector 122, as shown in FIGS. 55A-55E discussed below, is known to those skilled in the art to be a high-density electrode positioned as a surface portion of an anode or cathode. It generally is a highly electrically conductive layer or matrix, like a fine wire, that can collect the electrons and move them where they need to go. The current collector 122 may be made of NiO, or LSM, or some other low cost material, or even precious electrodes. Following a backfill process for forming the anodes and cathodes, it is difficult to put on a precise current collector in a uniform way. But the challenge of a current collector is different than that of an anode or cathode. It is desirable for the anode and cathode to be porous, which causes the danger of over-firing; whereas the collector is desirably dense (for good conductivity), so potentially, it can be co-fired with the Zr. While the current collector 122 could be placed on the electrolyte 28 before back-filling, such that the current collectors are under the anode and cathode, touching the electrolyte 28, this arrangement blocks active area on the electrolyte 28, which is needlessly wasteful of active area.

Figure 55A:
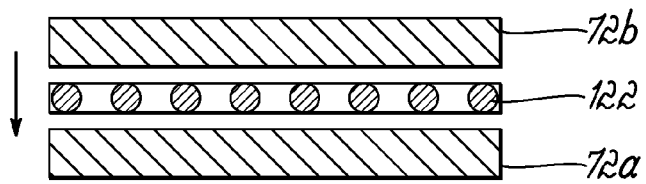
FIGS. 55A-55E depict in schematic cross-sectional views the assembly of a Fuel Cell Stick™ device having a floating current collector.
Figure 55B:
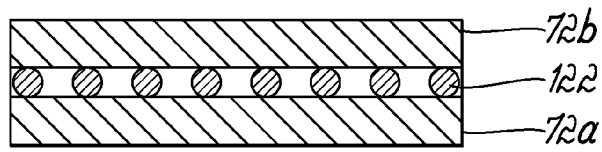
Figure 55C:
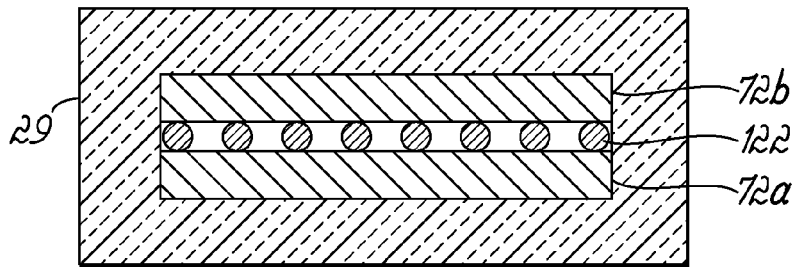
Figure 55D:
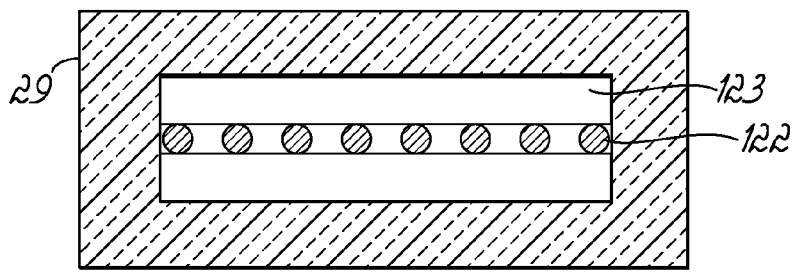
Figure 55E:
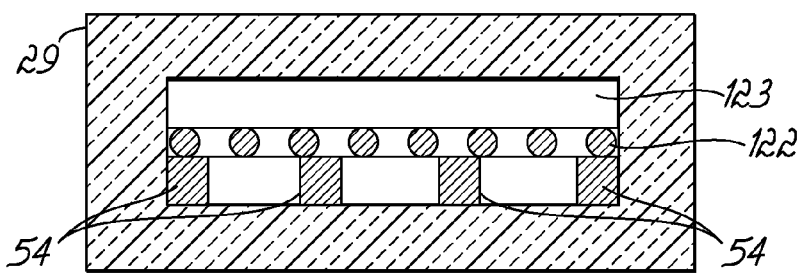
Figure 56A:
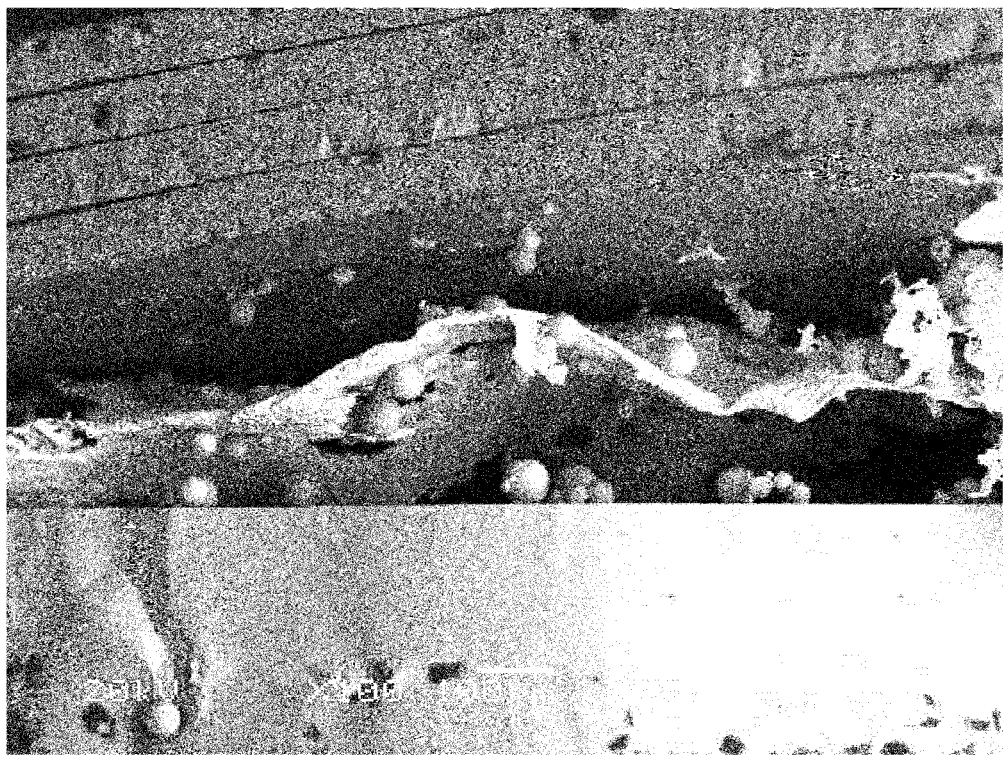
FIGS. 56A and 56B are micrographs depicting zirconia balls supporting a floating current collector.
Figure 56B:
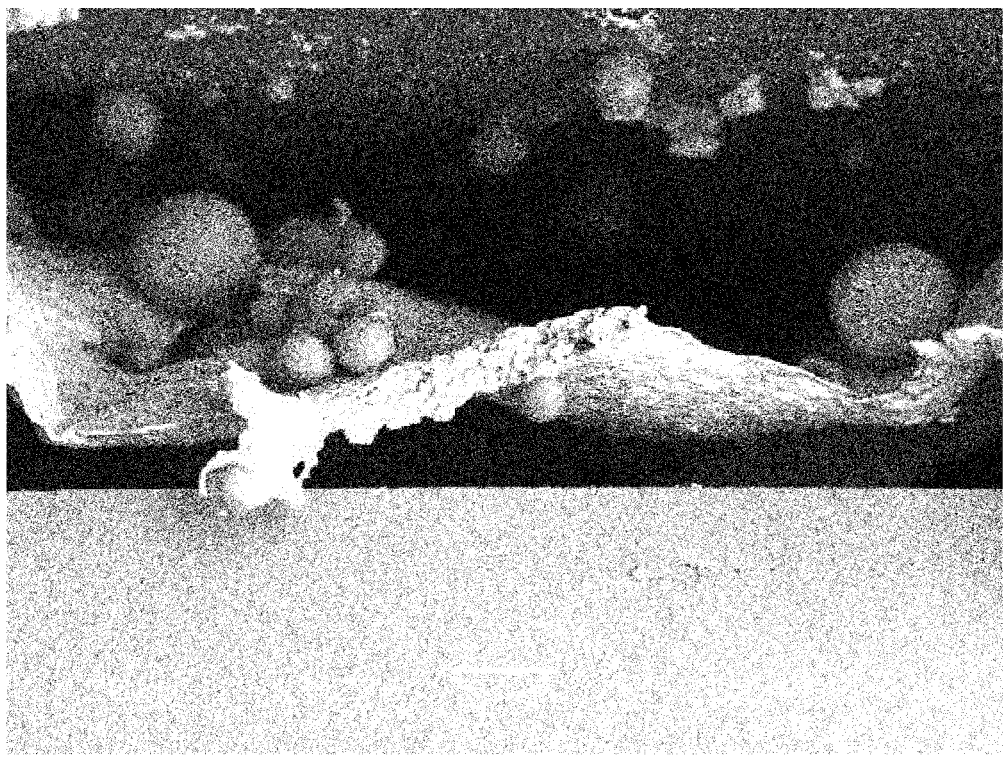
Figure 57A:
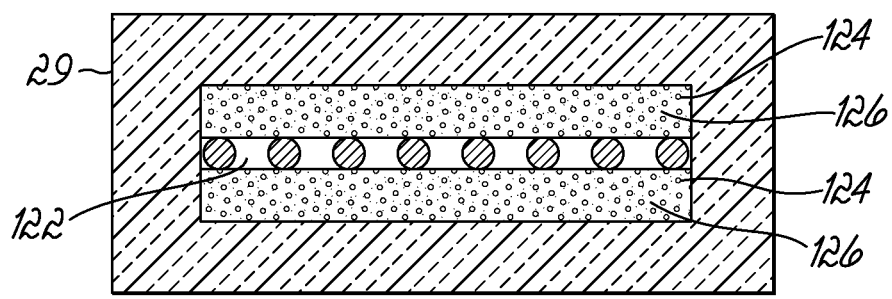
FIGS. 57A and 57B depict in schematic cross-sectional views the backfilling of the structure of FIG. 55D with anode or cathode particles suspended in a viscous liquid to form an anode or cathode.
Figure 57B:
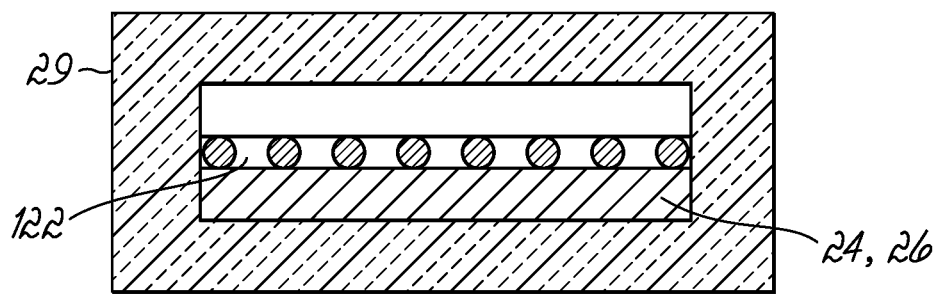

In accordance with an embodiment of the invention, and as depicted in FIGS. 55A-55E, the current collectors 122 are positioned and co-fired so as to have them floating in space within the Fuel Cell Stick™ device 10. This may be accomplished by printing the current collector 122 on top of a sacrificial first organic layer 72a (e.g., polymer), and then coating a sacrificial second organic layer 72b (e.g., polymer) over the top of the current collector 122 as shown schematically in FIG. 55A. The current collector 122 is thereby sandwiched between two sacrificial organic layers 72a, 72b, as shown in FIG. 55B. The Fuel Cell Stick™ device 10 is built, including placing the sacrificial layers/current collector structure within a ceramic supporting structure 29, as shown in FIG. 55C, and then sintered, whereby the sacrificial organic layers 72a, 72b disappear to form a gap 123 and the current collector 122 is left floating in space within the gap 123, as shown in FIG. 55D. It is then easy to backfill the porous anode or cathode into the gap 123, to complete the anode or cathode formation. The use of support pillars 54, as described above, may also be used, such that the floating current collector 122 rests on the support pillars 54, as shown in FIG. 55E, to provide mechanical support or to standardize the location. To achieve this, periodic via holes or small gaps may be created in the first sacrificial layer 72a of polymer, so that the current collector material would periodically print down into a hole. After binder removal, this filled hole becomes a support pillar 54. Alternatively, zirconia balls may be added into the sacrificial polymer gap material. As the sacrificial polymer dissolves, the current collector 122 would stick to those balls, and the balls would stick to the ceramic supporting structure 29, as shown in FIGS. 56A and 56B, thus providing the support. The porous anode 24 or cathode 26 then can be backfilled into the space, as shown in FIGS. 57A and 57B, in which the electrode particles 124 are held in viscous liquid 126 for the back-fill, then the device is dried and the particles settle and are sintered to form the anode 24 or cathode 26. The anode or cathode particles can be selectively deposited onto one side, if that is useful (by gravity or by centrifuge).

Figure 58A:
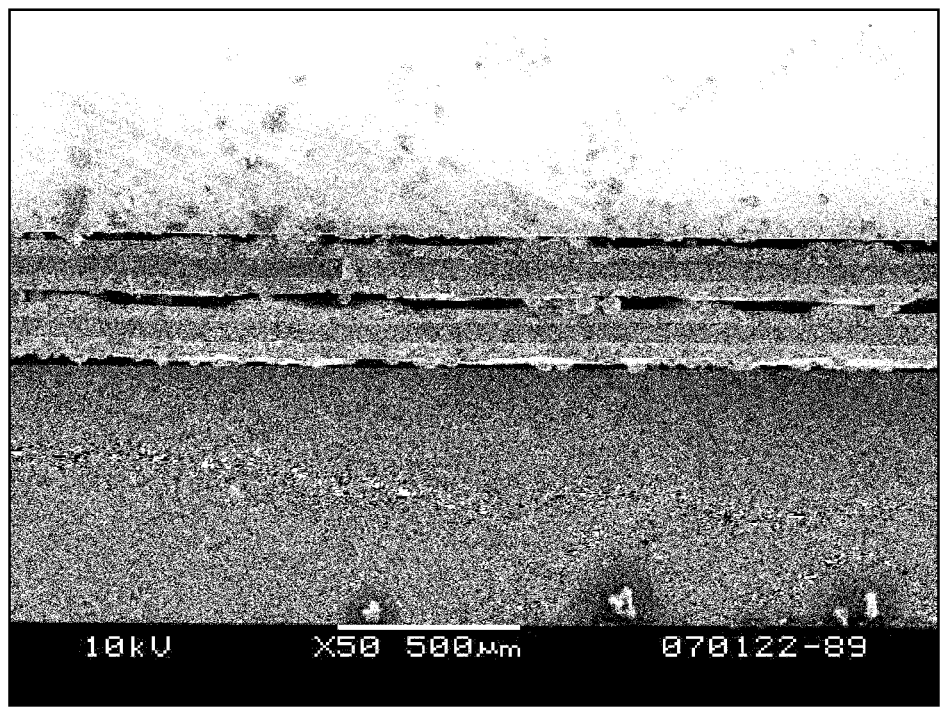
Figure 58B:
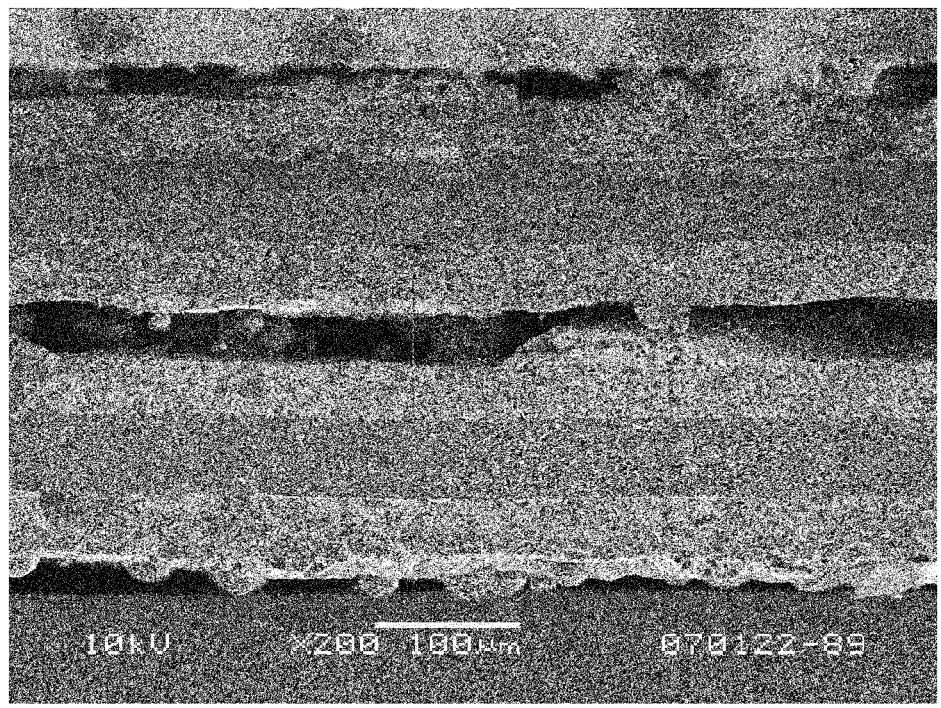
Figure 69:
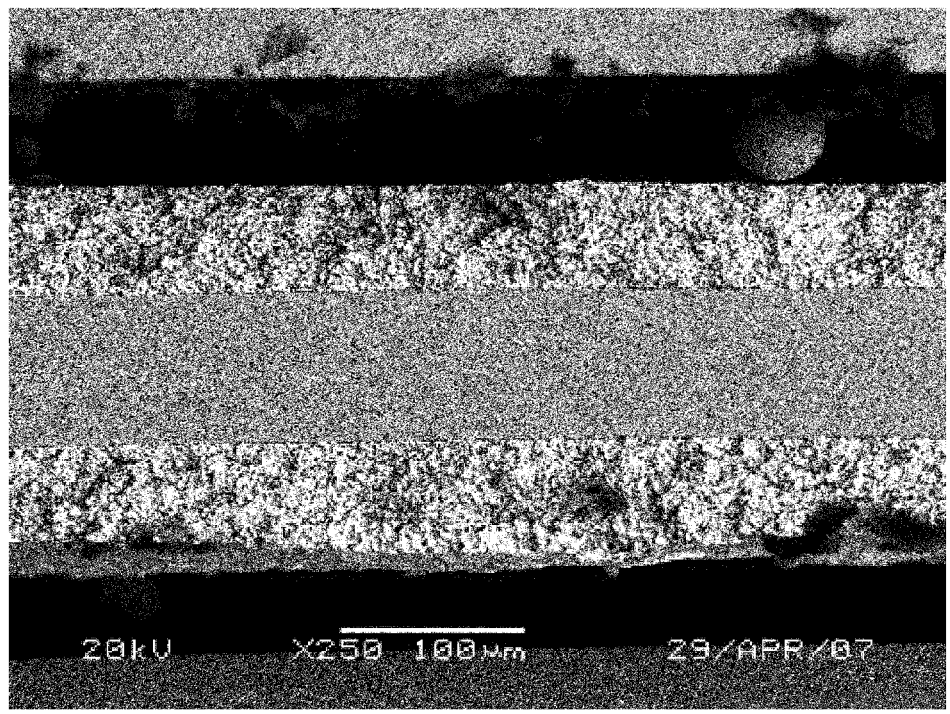
FIG. 69 is a micrograph depicting a current collector trace recessed into a porous anode or cathode.

With a current collector style that uses printed hatch lines, there may be some variation in the gap dimension of the air or fuel passage 14, 20 resulting in the passage becoming pinched or blocked at the current collector 122. This variation occurs due to random dimensional changes during sintering. FIGS. 58A-58C are micrographs that show an example of a current collector 122 that is nearly causing a blockage of a passage 14, 20. The goal for the passage 14, 20 is to have clear flow. It is possible to make the passages larger, but this will unnecessarily decrease the density of the Fuel Cell Stick™ device 10 (thicker passages and thicker layers lower the power density of the multi-layer device). According to one embodiment of the invention, to reduce the possibility of the passages 14, 20 being blocked at the current collector 122, the current collector lines may be buried within the porous anode 24 and cathode 26. As depicted in FIGS. 59 and 60, in which FIG. 59 shows the current collectors 122 on the surfaces of the anode 24 and cathode 26 and FIG. 60 shows the current collectors 122 buried into the surfaces of the anode 24 and cathode 26, if the current collectors 122 are buried into the thickness of the porous anode and cathode 24, 26 (or substantially buried into the anode/cathode) then the current collector 122 will be less likely to block the path of gas flow. FIG. 69 shows an actual current collector trace that has been recessed into the porous anode or cathode.

Figure 61A:
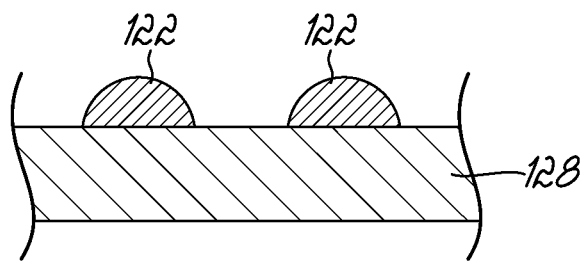
FIGS. 61A-61C depict a method of burying a current collector in an anode or cathode.
Figure 61B:
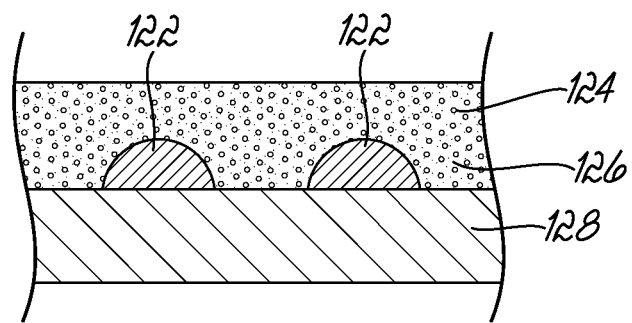
Figure 61C:
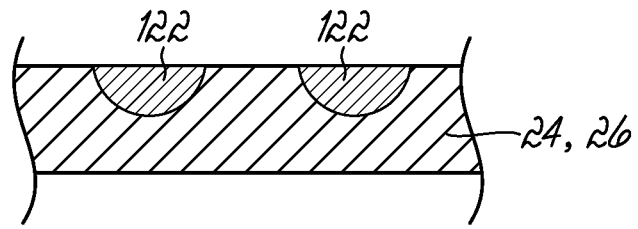

A method of burying the current collector 122 is shown in FIGS. 61A-61C. First, dispense or print the current collector 122 onto a temporary substrate 128. Then, cover this current collector 122 with the electrode material such as by printing a paste or backfilling with a viscous liquid 126 containing electrode particles 124 and drying. Finally, remove the temporary substrate 128. The temporary substrate 128 may be a piece of plastic with only moderate adhesion to the electrode material after drying such that the dried electrode-on-plastic can be turned over and the plastic peeled off. The same or similar result may be achieved by putting the current collector 122 and anode/cathode 24,26 onto the gap-forming tape 94 that is inserted into the stack, and during bake-out and sintering, the gap-forming tape 94 will disappear, leaving the same end result.

When printing the anode 24 or cathode 26 over the top of the current collector 122, if the current collector 122 tends to dissolve a little and spread out, materials with different solubilities may be used (in the extreme case, the current collector 122 can contain resin material that is soluble in polar solvents, and the porous electrode ink can have a resin material soluble in non-polar solvents). It is desirable to limit this spreading, because too much spreading of the current collector 122 will work to reduce the diffusion of gases into the porous anode 24 or cathode 26. So, it is possible that some spreading of the current collector 122 will happen, but at least a portion of the current collector 122 is desirably buried in the porous material. Thus, this invention contemplates a current collector path where some portion of the current collector 122 is recessed into the porous anode 24 or cathode 26 in order to reduce the protrusion of the current collector 122 in to the fuel passage 14 or air passage 20.

In the active zone 33b of the multilayer Fuel Cell Stick™ device 10, one would like to have the electrolyte 28 be as thin as possible, for example, 10 μm. But a super-thin electrolyte increases the possibility of having a leak between the air and fuel sides of the device. Thinner electrolyte can give higher power, but too thin will allow a crack or leak, and give zero output from the layer. According to one embodiment of this invention, a key to the minimum allowable thickness of the electrolyte 28 in the active zone 33b is that the anode and cathode thickness also contribute to the total thickness, and therefore to the total strength. By way of example only and not limitation, if 100 μm of thickness is desired to prevent cracking, and each anode 24 and cathode 26 measures 45 μm, then a 10 μm electrolyte thickness will work well. (45+45+10=100).

In the passive area (areas without an opposing anode and cathode) of a multilayer Fuel Cell Stick™ device 10, there is a different thickness required. This passive area is responsible for distribution of air and fuel. This has been shown in many of the drawings as air and fuel distribution passages that overlap. The requirement here is also to have a certain thickness to prevent cracking, but without the anode 24 and cathode 26, the ceramic 29 here must be thicker than the ceramic electrolyte layer 28 in the active zone 33b. So in the example above, the ceramic 29 in the passive area must be 100 μm while the ceramic electrolyte layer 28 in the active zone 33b can be thinner, such as 10 μm.

Figure 62:
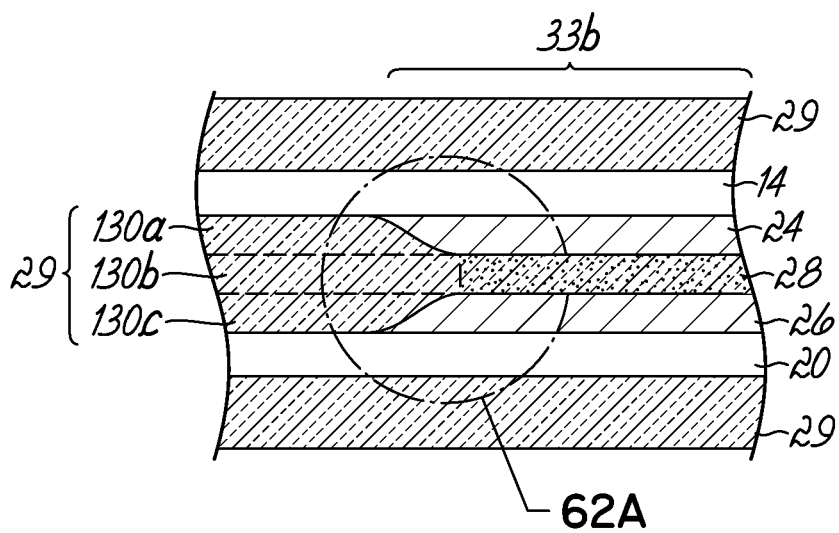
FIG. 62 is schematic cross-sectional view depicting a method of achieving an individual layer of electrolyte having two thicknesses.
Figure 62A:
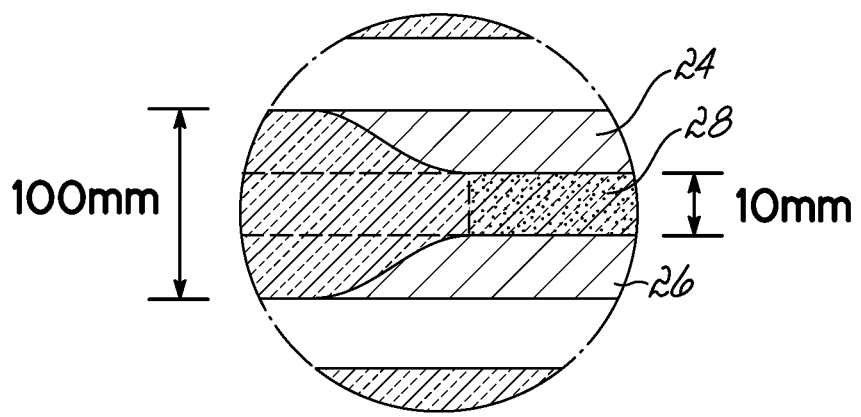
FIG. 62A is a detailed view of FIG. 62.

According to an embodiment of the invention, a method is provided for achieving an individual layer of ceramic electrolyte 28, 29 with two thicknesses: thicker ceramic 29 in the passive gas passages area, and thinner ceramic electrolyte 28 in the active zone 33b. The method, depicted in FIGS. 62-62A, uses three pieces of ceramic tape 130 to create the ceramic 29 in the passive gas flow region, where two of the tape pieces 130a, 130c end and only the center tape 130b continues into the active zone 33b to serve as ceramic electrolyte 28 between the opposing anode 24 and cathode 26.

Numerous ideas are presented above in the context of an elongate structure that exits the furnace for low temperature connections. However, many of the ideas also may be used in multi-layer fuel cell devices that do not exit the furnace and/or that have a plate shape or the like. The densities of the devices achievable in the present invention may be achieved in other Fuel Cell devices and systems where connections are made to the hot Fuel Cell device in a furnace. For example, concepts disclosed herein that may be used in other fuel cell devices include polymer tape, polymer tape filled with round balls, a wire used to form exit or entrance passages, one passage serving two electrodes, a paddle-shaped device, drying the electrode suspension towards one side by using gravity or centrifuge, side gaps for termination and series design.

The current collector 122 has a purpose of allowing electrons that are produced or consumed in the electrodes (anode 24 and cathode 26) to travel in a low-resistance path on their way to the load (voltage nodes 38, 40). The optimal electrode design is not very conductive because it must allow several things to happen at once: there are pores to allow the gases to flow, there is ceramic in the electrodes to allow the oxygen ions to flow toward the electrolyte, and there are electronic conductors to let the electrons flow. The presence of the pores and the ceramic means that the electrode overall will have higher resistance than if it was only made of electronic conductor.

Once the electron is liberated, it is important to allow it to travel on a high conductivity path. Existing designs for current collectors are based on removing the electrolyte ceramic from the conductor, but still leaving the porosity. This creates a more conductive layer. This is printed over the entire anode or cathode. One disadvantage of this design in a multilayer structure is that if the anode/cathode materials have to be added after sintering, it can be difficult to create two distinct layers, as described. The advantage of co-firing a current collector is described above.

Figure 63:
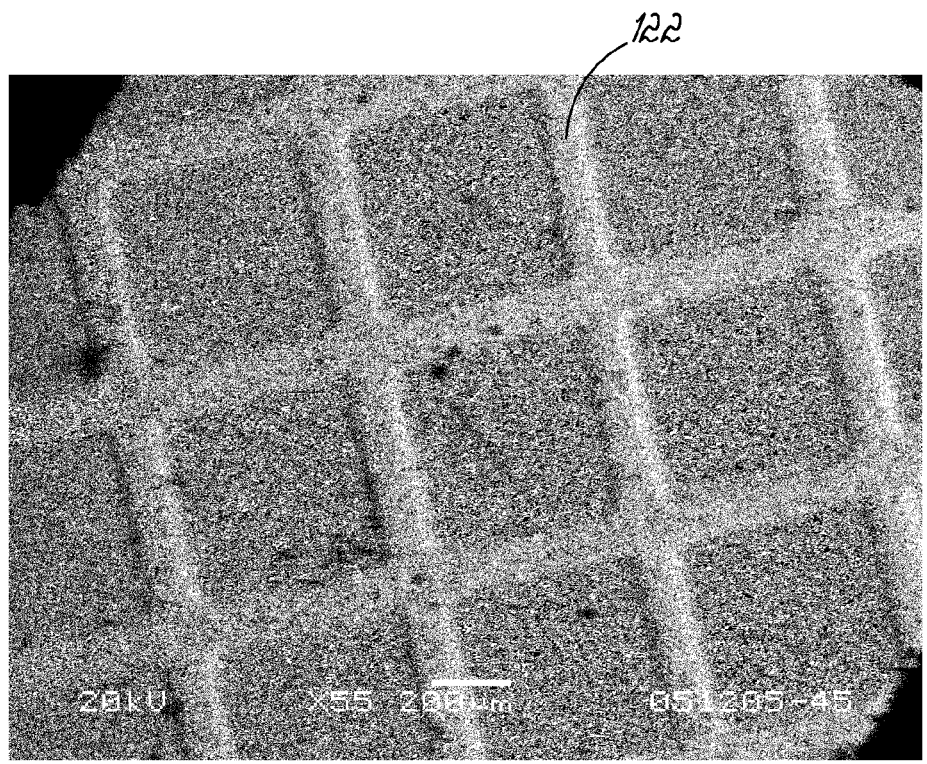
FIG. 63 is a micrograph depicting a top view of a current collector in a hatch pattern.
Figure 64:
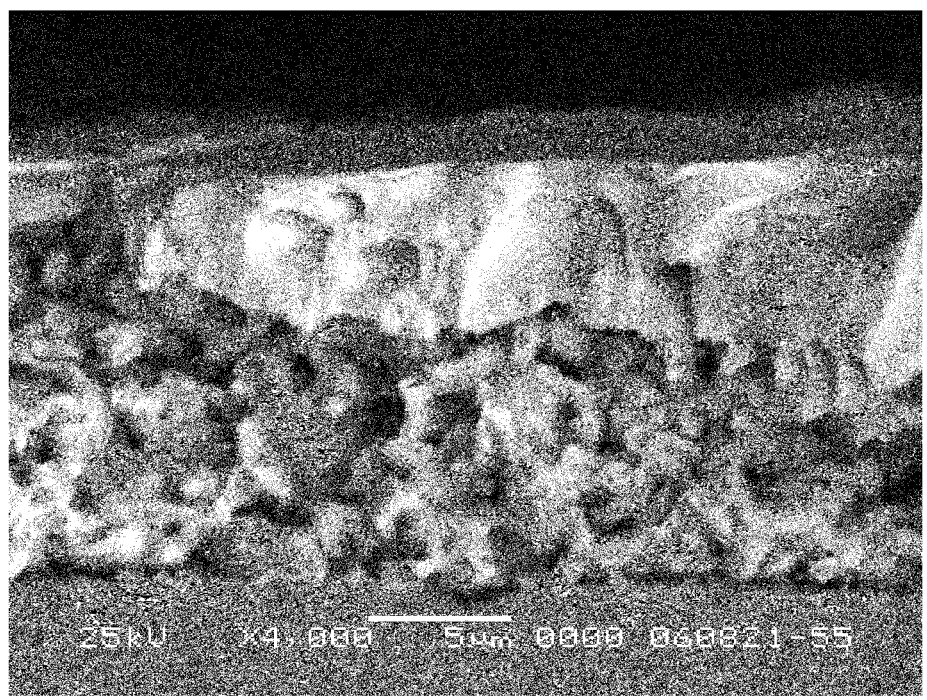
FIGS. 64 and 65 are micrographs depicting side and angled cross-sectional views of a current collector over a porous anode or cathode.
Figure 65:
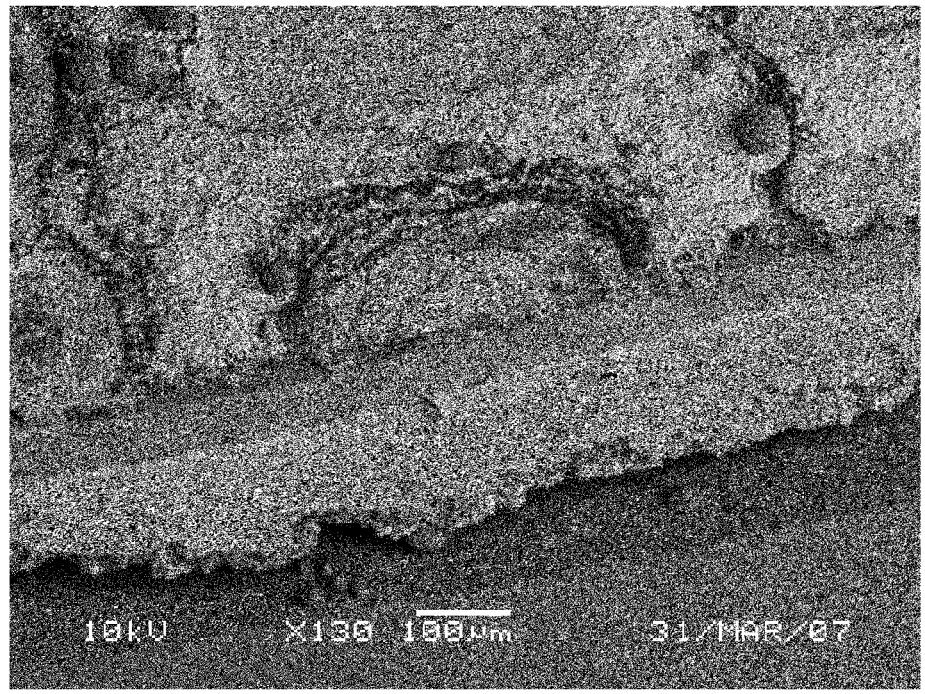

According to an embodiment of the invention, a current collector 122 may be used that comprises a high-density conductor material (i.e., little or no porosity, such that if it was printed over the entire anode 24 or cathode 26 it would inhibit the reaction), which is printed in a hatch pattern. In one embodiment, the collector is printed in a rectilinear pattern, also referred to as a hatch pattern, leaving open space between the hatch marks for the gas to penetrate. Gas permeability in the porous anode 24 and cathode 26 is such that the gas that enters the porous material between hatch lines will also flow under the hatch lines. By varying the pitch from line to line, and the line width itself, it is possible to find an optimal geometry. By way of example, a 0.006" line width and a 0.030" line pitch may be used. FIG. 63 depicts a top view of a current collector 122 with a hatch pattern. FIG. 64 depicts a side view of the current collector 122 over porous anode or cathode. FIG. 65 depicts an angled view, showing in order from top to bottom: current collector hatch, top porous electrode, electrolyte, and bottom electrode (sticking out from electrolyte because of fracture). As the active area becomes larger, it would also be possible to vary the line width in different regions. Small conductor lines could feed into larger conductor lines, and larger lines could feed into still larger conductor lines.

Figure 66A:
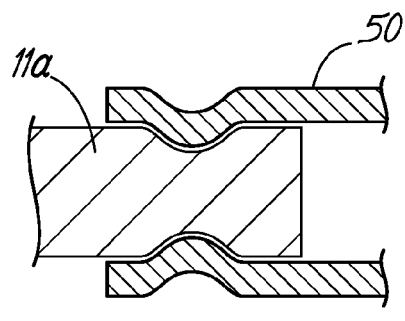
FIG. 66A is a schematic cross-sectional view of a tube slipped over the end of a Fuel Cell Stick™ device.
Figure 66B:
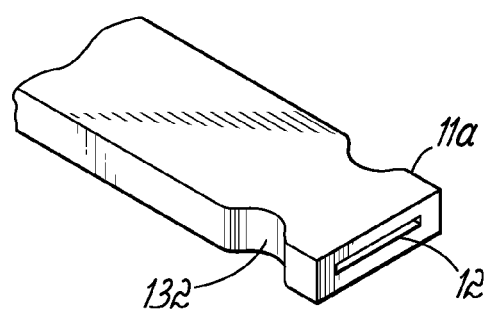
FIG. 66B is a schematic perspective view of the end of the device of FIG. 66A.

Flexible supply tubes 50 have been described above for connecting the fuel and air supplies 34, 36 to the Fuel Cell Stick™ device 10. By stretching the supply tube 50 open, it can be slipped over one of the ends 11a, 11b of the Fuel Cell Stick™ device 10. An adhesive can hold it in place. An alternative, according to one embodiment of the invention, is to form the end 11a (and/or 11b) of the Fuel Cell Stick™ device 10 with indentations 132 on the sides, as depicted in FIGS. 66A-66B, so that the Fuel Cell Stick™ device 10 will mechanically hold the supply tube 50 in place. This is achieved most conveniently in the green state by machining the Fuel Cell Stick™ device 10 with a router or end mill.

Figure 67A:
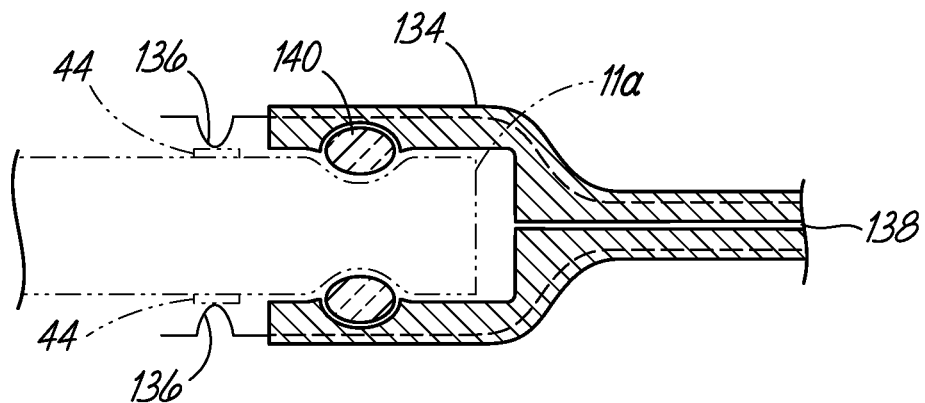
FIG. 67A is a schematic cross-sectional view of a connector, including spring electrical contacts, positioned on the end of a Fuel Cell Stick™ device.
Figure 67B:
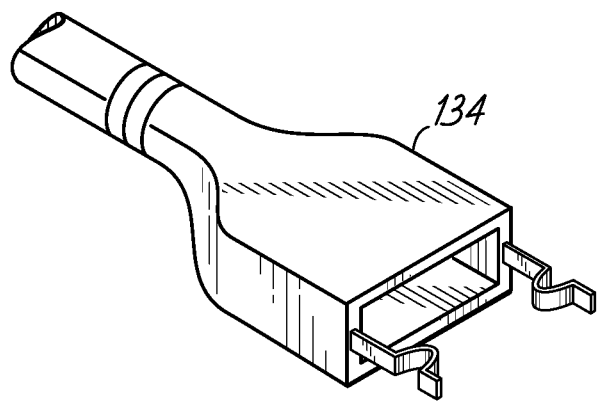
FIG. 67B is a schematic perspective view of the connector of FIG. 67A.

Based on this, a connector 134 may also be used that can clamp on to the end 11a (and/or 11b) of the Fuel Cell Stick™ device 10, as depicted in FIGS. 67A-67B, in top schematic cross-sectional and perspective view, respectively. The connector 134 may be a molded plastic with integrated electrical contacts 136 and a gas flow pathway 138, either one or two, depending on the design of the Fuel Cell Stick™ device 10, and a gas-tight seal, such as in the form of an o-ring 140, and either one or two electrical contacts 136 for contacting the contact pad(s) 44. If the Fuel Cell Stick™ device 10 is a two ended Fuel Cell Stick™ device 10, such that one polarity is exiting the Fuel Cell Stick™ device 10 at each end of the Fuel Cell Stick™ device 10, then the connector 134 could still have two or more electrical contacts 136 at each end of the Fuel Cell Stick™ device 10 in order to give lower resistance contacts. The electrical contacts 136 could be on the sides of the Fuel Cell Stick™ device 10 or on the top and bottom of the Fuel Cell Stick™ device 10, the latter of which would give lower resistance because the contacts are wider.

Although not shown, the connector 134 could have two o-rings, thereby providing two sections of sealing within the connector 134: one for air, the other for fuel. Such a connector could be used as a single connector on a single-ended Fuel Cell Stick™ device 10, which provides positive and negative contacts, and air and fuel delivery.

Figure 68A:
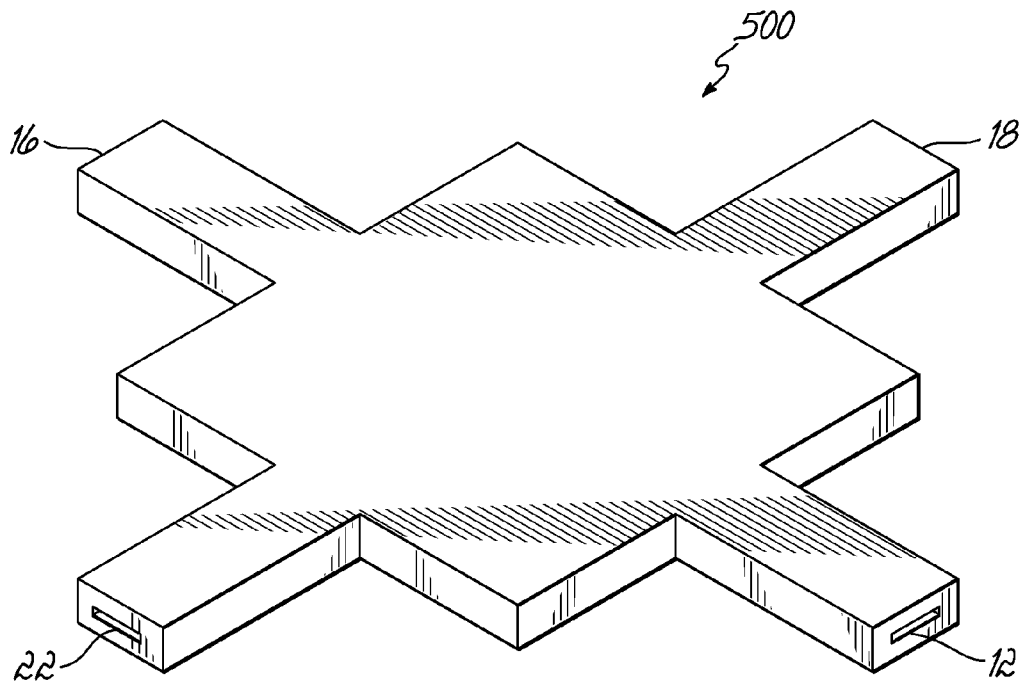
FIGS. 68A and 68B are schematic perspective views depicting Fuel Cell Stick™ devices having four points of exit.
Figure 68B:
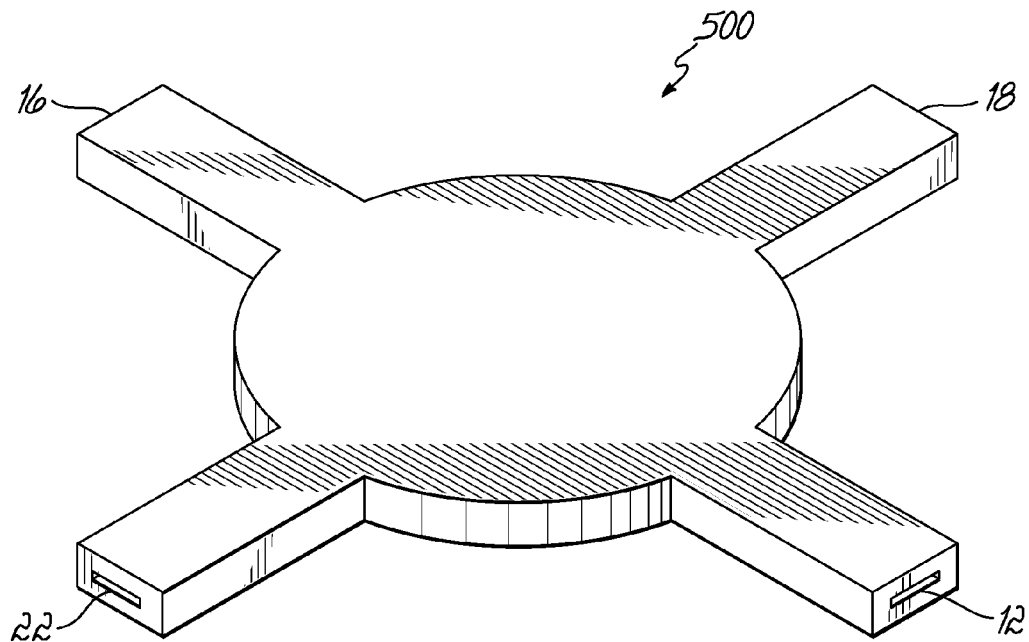

The embodiments described above included two opposing ends 11a, 11b for the device. However, the concepts of the Fuel Cell Stick™ device 10 describe above could be applied to a device 500 that has more than two ends or exit points leaving the furnace. For example, FIGS. 68A-68B depict devices having four points of exit. The four locations could provide the air inlet 18, air outlet 22, fuel inlet 12, and fuel outlet 16. This could make it easier to recycle unburned fuel into the furnace heating operation. Exit points other than two and four may be used, such as three or six.

The use of support balls (see FIGS. 7C-7D) may be used in fuel cell devices other than Fuel Cell Stick™ devices 10, for example, square plate devices. The support balls allow large areas to be created in the multilayer structure, without having the different layers collapse on each other. The device could have large, open areas within a generic multilayer plate. Or, the device could have paths that were 0.5 inch wide, but many inches long, filling the area. In either case, the ball technology disclosed herein would be advantageous.

A key idea of the balls is that they are rounded, which can prevent puncture. Because there is a need to make the electrolytes, anodes and cathodes thin (for density, and for higher performance), it is possible for punctures to arise from the use of irregularly shaped materials. Sand or grit could dig into the electrolyte and cause a leak. On the other hand, the electrolyte can gently deform around the balls without causing leaks or tears. Similarly, the pillar concept of FIGS. 7A-7B can be used in a multilayer fuel cell structure other than the Fuel Cell Stick™ device 10 form.

In FIGS. 38A-38B, we show the use of multiple bake-out ports that can later be sealed over. This is an advantageous concept for any multilayer approach to the SOFC or other fuel cell device. Again, regarding the large plate, the designer will have large areas of gas passages that are being created, and the need to remove the organic material that fills those spaces. Typically, however, there is only one fuel entrance point, and one fuel exit point. The same is true of the air side. With such large areas of organic material, but so few exit points, it is likely that one of the largest manufacturing challenges will be to avoid delaminations.

The solution to this is to create numerous bake-out points, small openings that can allow bake-out gases or liquids (in the case that wax is used) to come out of the structure with minimum stress on the entire structure. After the multilayer structure is sintered, it is easy to come back later and fill in those small bake-out points with a solid material to prevent leaks (such as a glass-ceramic combination).

The wire 92 concept is a lot like the bake-out port concept above, and very useful for a multilayer structure. Imagine making a 4 inch square plate, with 20 or 50 active layers in the plate. You would like to create the bake-out ports for easier organic removal. But it would be even better if these convenient bake-out ports could reach into the center of the plate. By inserting the wire 92 and then pulling it out after lamination, this can be accomplished. The wire 92 could cut across several areas that otherwise might have very long distances to go between the middle of the plate and the outside world. The concept does not have to be a wire exactly, as discussed above. That is just the most convenient form, because it has a low surface area. The physical piece could be flat, for example 0.002" thick by 0.200" wide. In that case, it might need to be covered with a release agent to prevent the layers from sticking. Regardless, the idea is a physical piece that is inserted into the structure and then removed in order to facilitate organic removal.

Figure 70:
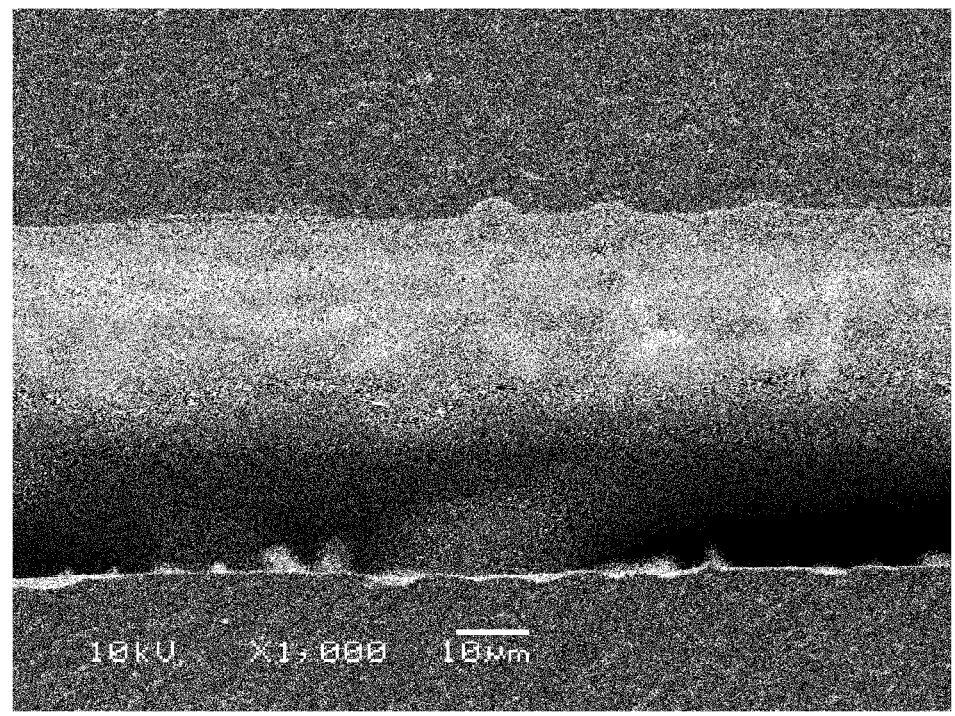
FIG. 70 is micrograph depicting a gap left after removing a carbon-wax sacrificial material.

In another embodiment, carbon tape with wax is used as a gap-forming tape 94. A challenge is to have the gap-forming material come out evenly without causing splitting or delamination in the Fuel Cell Stick™ devices 10. It would be better if the material could magically disappear at the right time, leaving open channels so that the other polymer materials in the anode 24 and cathode 26 and electrolyte 28 could bake out. One approach is to use wax. The waxes that are used for investment casting (the so-called lost wax method) work well melting at around 90° C., above the lamination temperature used to laminate the multilayer structure, but below the binder burnout temperatures of 150-300° C. But wax is not ideal because if you cast it into a 2-mil thick sheet, it does not have desirable strength. It is brittle to the touch. The wax should be stronger in the thin section. The solution to this is to combine the wax with some kind of fiber to give it strength. One choice is carbon fiber. The carbon fiber can be purchased in a random fiber configuration, called mat, or in a woven fiber configuration, that resembles actual cloth. Other fibers may also be possible. By impregnating the wax into carbon fiber, optimal properties can be obtained. The carbon/wax composite can be put into the multilayer structure to form a gap. After lamination, the temperature is raised to the melting point of the wax, and the wax then turns to liquid and runs out of the Fuel Cell Stick™ device 10. This leaves open-air pathways within the carbon fibers, which allows easy bake-out of the surrounding polymer materials inside the structure. The carbon fiber does not volatilize (turn to CO2) until temperatures near 750° C. Thus, it is possible to make a structure where one of the chief gap formation materials disappears before binder burn-out occurs, thereby leaving clear paths for binder removal. Then, at the mid temperatures, the polymer itself can volatilize. Finally, at the high temperatures, the carbon fibers can disappear. FIG. 70 is an image of the gap left once the wax and carbon fibers are gone after sintering using this carbon-wax combination.

It is desirable to achieve high current connections within a multilayer device. One method of interconnecting within a multilayer device is to use a via hole. The via hole can be made by drilling a hole through a piece of ceramic tape 130, and then filling it to form a via 56 as shown in FIG. 71, or it can be made through a printed layer of insulator, but after drying the effect is the same. In FIG. 71, the via 56 connection is shown, connecting two electrodes (either anodes 24 or cathodes 26) together. In the following description, in the interest of simplicity, an embodiment of two anodes 24 will be used. The via 56 is good for carrying an electrical signal, such as a data transmission, but it is not ideal for carrying power or high current. For power or high current, multiple vias 56 in parallel would be needed to have the effect of lowering the total resistance. According to an embodiment of the invention, an improved method for carrying power or high current is to remove entire areas of the green tape used to separate the conductors of interest. With this method, the interconnect can be based on a large area. In FIG. 72, the interconnect is shown between two electrodes (anodes 24) by completely removing the ceramic tape 130 or material between the two electrodes (anodes 24). The deformation occurs because the layers are soft in the green state (either as tape layers or printed layers). If needed or desired, extra ceramic material can be put above the interconnect area in order to maintain overall flatness of the ceramic during the buildup process.

A slight variation is to punch a large hole 142 in a piece of green ceramic tape 130, as shown in FIG. 73A, and then insert the ceramic tape 130 into the multilayer buildup, or alternately, to print an insulating layer with a large hole 142 in it, and then print conductors over the top. In the multilayer method, the electrode from above deflects down into the hole 142, creating a large area of contact, as shown in FIG. 73B (the electrode from below may also deflect upward into the hole 142). This embodiment is distinct from a via hole in that via holes are small in area and must be filled independently. In addition, with via holes, the electrodes on top and bottom do not distort into the hole.

Thus, embodiments of the invention contemplate a multilayer Fuel Cell Stick™ device 10 where electrical interconnects are made by removal of insulating material, or otherwise providing an area void of insulating material, wherein the conductors on either side (e.g., above and below) of the insulating material distort into the voided area to contact each other. The voided area in which the conductors meet may extend from the interior of the Fuel Cell Stick™ device all the way to the edge of the device. The insulating area may be removed in a specific area, such as by punching a hole or by cutting out a specific shape, such as a rectangle.

According to another embodiment, series connections of cells are made across a single layer, which is useful for increasing the voltage output of the Fuel Cell Stick™ device, and which makes the power produced easier to work with. For example, if a stick is producing 1 KW of power, it is easier to design electronics and to design a balance of plant that can handle 1000V at 1 A rather than 1V at 1000 A. As shown schematically on a small scale in FIG. 74A, a section of green ceramic (e.g., zirconia) tape 130 is used in the center, and on the top and bottom are anodes 24 and cathodes 26. The single-hatching pattern, the same as used for anodes 24 and cathodes 26 in previous figures, represents porosity in the anodes 24 and cathodes 26, while the cross-hatching pattern represents non-porous conductors (e.g., conductive ceramic, precious metal, or non-oxidizing metal alloy). The cell exists between just the porous areas 144, as shown by the single-hatching pattern because the non-porous areas 146 don't have access to fuel or air.

FIG. 74B conceptually shows how multiple pieces can be put together (conceptual because they will not remain slanted as shown after lamination, but the conceptual depiction is intended to show the overlapping nature of the design). In this group of three cells, for purposes of discussion and not limitation, the top side of each cell (or section) could contain the anode 24, and the bottom side of each cell (or section) could contain the cathode 26. If each cell is visualized as a small battery, then the string of three cells can be seen as three batteries in series. Fuel supply 34 would be present on one side of this series design, on the top where the anodes 24 are on the top, and air supply 36 would be present on the other side, the bottom where the cathodes 26 are on the bottom. Gas leakage should be avoided from one side to the other, which may be achieved by providing the non-porous area 146 at the end of each cell (or section). Many cells (or sections) could be put together in this way, to achieve any voltage desired.

Figure 74D:
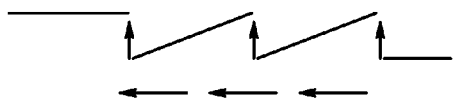

FIG. 74C shows a more accurate version of the layers after lamination. They will be substantially flat, but with extra thickness at the points of overlap. FIG. 74D shows a conceptual schematic of the 3 cell (or section) design. Vertical arrows each represent one cell, with the direction of the arrow defining polarity. Lines without arrow heads represent an interconnect that does not generate any voltage. The horizontal arrow lines along the bottom represent the overall direction of current flow. The invention is not limited to a 3 cell design. The embodiment depicted in FIGS. 74A-D, referred to herein as the overlapping method, may be used to join two or more cells in series, for example, five or more cells, 10 or more cells, 20 or more cells, etc.

Figure 75A:
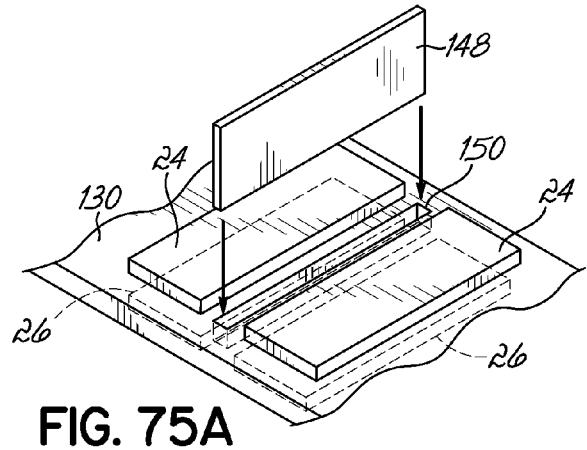
FIGS. 75A-75E depict in perspective and schematic cross-sectional views another embodiment of a method for creating a series interconnection between cells using a plunging conductor method.

FIGS. 75A-E depict an alternate method for creation of a series design, referred to herein as the plunging conductor method. Instead of cutting ceramic tape 130 into sections and overlapping the sections to form series of cells, a continuous sheet of ceramic tape 130 is used having areas of anode 24 on one side, and opposing cathodes 26 on the other side. A connector electrode 148 (e.g., conductive ceramic, precious metal, or non-oxidizing metal alloy) in sheet form (also referred to as the interconnect piece, the conductor tape, or the plunging conductor) is inserted through the ceramic tape 130. The conductor tape 148 could be a piece of green tape made with LSM, for example. A slit 150 is made in the ceramic tape 130, as shown in FIG. 75A, and the short section of conductor tape is inserted half way through the ceramic tape 130.

Figure 75B:
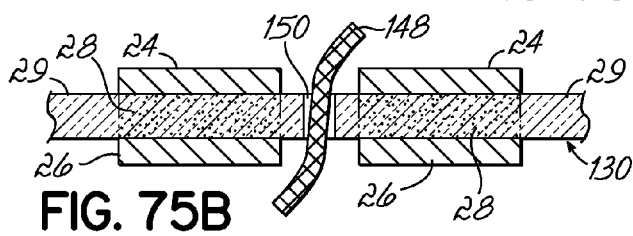
Figure 75C:
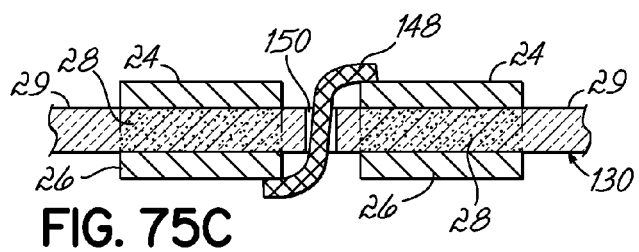
Figure 75D:
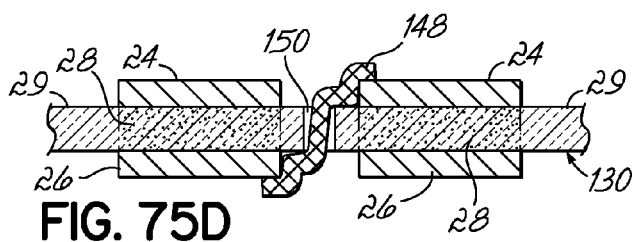
Figure 75E:
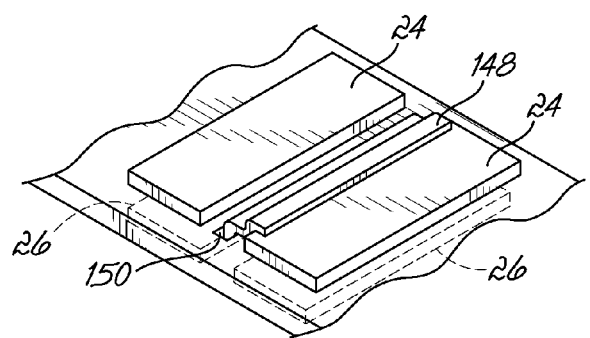

In FIG. 75B, a side view of the continuous sheet of ceramic tape 130 is depicted. In this discussion, the term "electrolyte sheet" or "electrolyte tape" is understood to be the same as ceramic tape 130. On the top surface of the electrolyte sheet 130 are two sections of anode 24. On the bottom surface of the electrolyte sheet are two sections of cathode 26 respectively opposing the two sections of anode 24. To connect the two sections in series and with reference to FIGS. 75A and 75B, first the conductor tape 148 is inserted through the slit 150 in the electrolyte tape 130, whereby it may be said to plunge through the electrolyte. Next, as shown in FIG. 75C, the conductor tape is bent over the anode 24 of one section (or cell) and the cathode 26 of the other section (or cell). Then, as shown in FIG. 75D, the connector electrode is pressed against the anode 24 and cathode 26, i.e., the cells are laminated in series. FIG. 75E depicts the laminated cell series in top perspective view, to more clearly show the full area of the overlap. It may be advantageous to have individual cells be made from short, wide sections, in order to reduce the resistance from one cell to the next.

Figure 76:
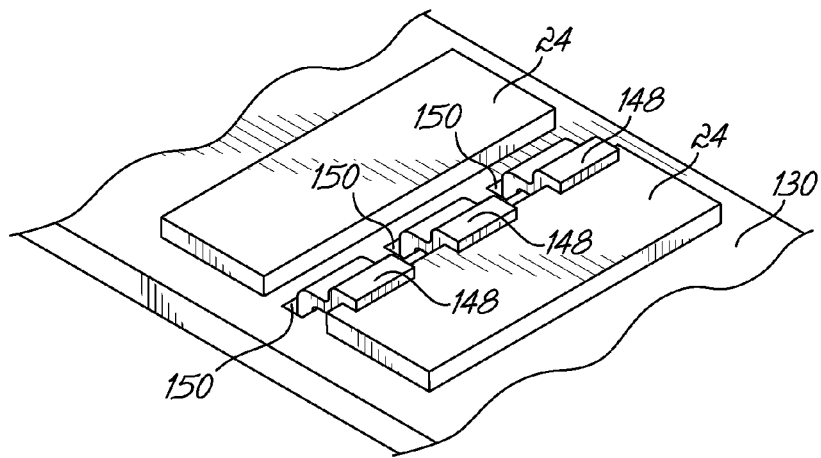
FIG. 76 depicts in schematic perspective view another embodiment of series interconnection using multiple plunging conductors.

In accordance with another embodiment, it may be useful to have the interconnect piece 148 (conductor tape) broken into several sections. Instead of a single slit 150 in the green electrolyte tape 130, multiple shorter slits 150 would be used through which the several sections of conductor tape 148 are inserted, respectively, as depicted in FIG. 76. There are thus provided multiple plunging conductors.

Figure 77:
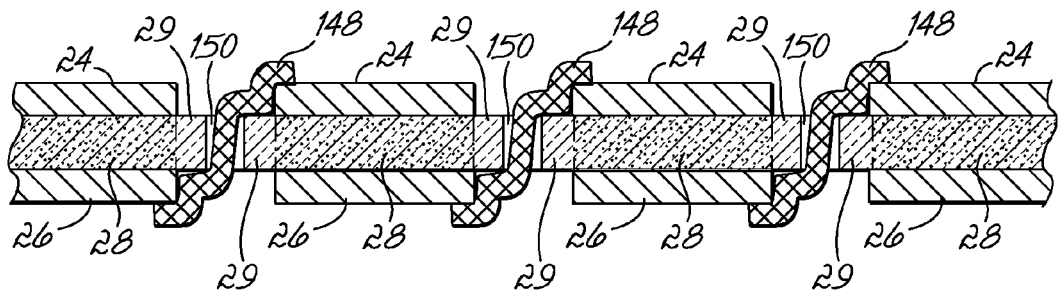
FIG. 77 depicts in cross-sectional view multiple cells in series connection in accordance with any one of the embodiments of FIGS. 75A-76.

In FIGS. 75A-E and 76, the conductive interconnect material that plunges through the electrolyte should be of a non-porous nature, to prevent or impede gases from flowing from one side of the electrolyte to the other. The anodes 24 and cathodes 26, on the other hand, can be porous, either completely porous without a non-porous area or they can have a non-porous area 146 at the ends where the interconnect piece 148 overlaps. It may be simpler to have the anodes 24 and cathodes 26 be completely porous, so that the material can be produced with fewer process steps. FIG. 77 schematically shows in side view four sections (or cells) connected in series by joining the cells with interconnect pieces 148 inserted through the electrolyte according to the embodiments of FIGS. 75A-E and 76. Thus, the interconnect pieces 148 may be used to join any number of cells in series, including two or more cells, for example, five or more cells, ten or more cells, twenty or more cells, etc.

Figure 78A:
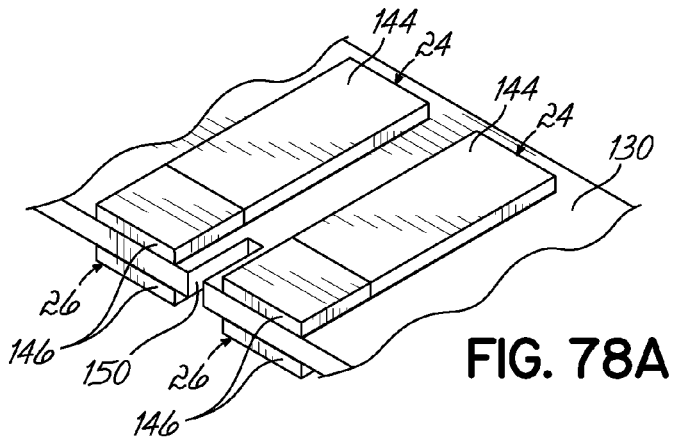
FIGS. 78A-78C depict in schematic perspective views a variation of the plunging conductor method.
Figure 78B:
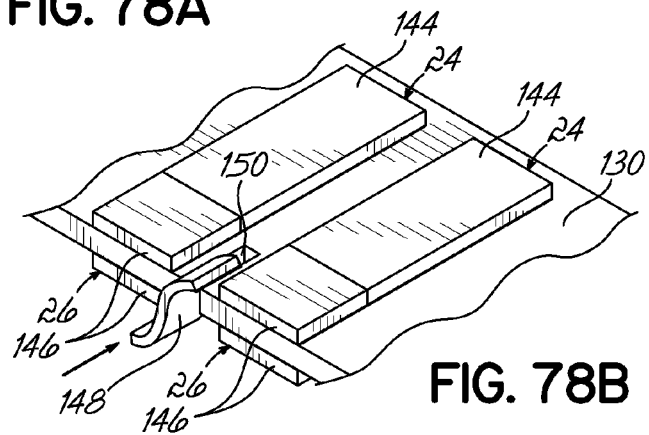
Figure 78C:
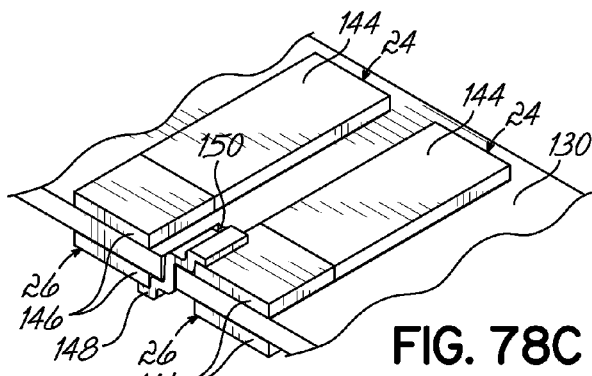

FIGS. 78A-C show a variation of the above plunging conductor technique for connecting cells in series along a single layer of a multilayer cell. In this embodiment, as shown in FIG. 78A, the anode 24 and cathode 26 sections each have a non-porous area 146 that extends to the side of the Fuel Cell Stick™ device 10, away from the fuel and air flow paths. The slit 150 in the electrolyte tape 130 is made into the side of the Fuel Cell Stick™ device 10 instead of within the periphery of the Fuel Cell Stick™ device 10. The conductor tape 148 that connects anode 24 and cathode 26 through the electrolyte tape 130 can then be placed in just the side margin, away from the flow paths, as shown in FIG. 78B before lamination and in FIG. 78C after lamination.

Figure 79A:
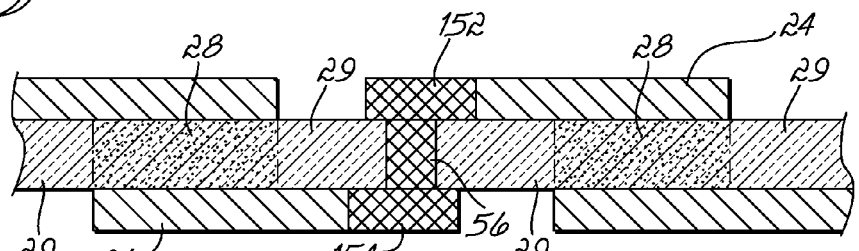
FIGS. 79A-79D depict in schematic cross-sectional and perspective views embodiments for series interconnections using vias.

Prior embodiments, for example FIG. 71, detail the use of vias 56 formed by creating a via hole in a piece of green ceramic tape 130 and printing the electrode to fill the hole. In an alternative embodiment of the invention for connecting anodes 24 and cathodes 26 in series along a single layer of a multilayer structure, depicted in FIG. 79A, a first conductor 152 may be printed on one side of the Fuel Cell Stick™ device 10 from the filled via 56 to the electrode (e.g., anode 24) in one cell or section, and a second conductor 154 may be printed on the other side of the Fuel Cell Stick™ device 10 from the filled via 56 to the opposite electrode (e.g., cathode 26) in the adjacent cell or section. Filled via 56 may be filled with material other than that used for the electrodes. In the embodiment illustrated, via 56 is filled with nonporous conductor.

Figure 79B:
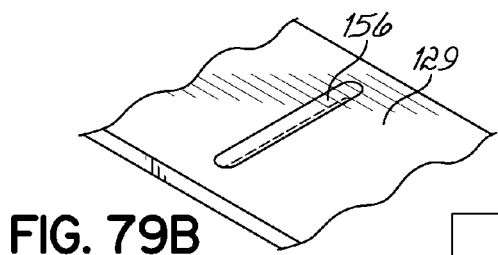

An alternate to the plunging electrode is a wide via, or oblong via 156, as shown in FIG. 79B, which could be created by forming an oblong via hole in an electrolyte tape 130. The oblong via 156 is distinct from a normal via 56 in that the traditional via hole is round. The oblong via hole can be made as wide as necessary, for example on the same scale as the slits 150 for the plunging electrodes 148 shown in FIG. 75E or FIG. 76. The oblong via 156 should be filled in a way that it does not allow gas to flow from one side of the electrolyte layer to the other.

Figure 79D:
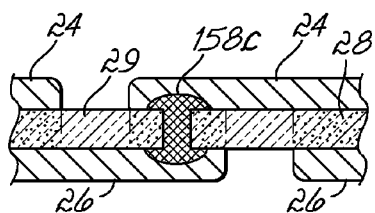
Figure 79C:
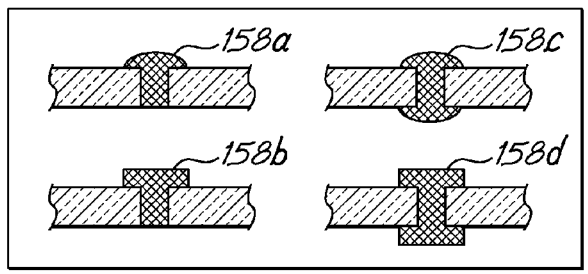

A potential problem with via holes is that the shrinkage of the material in the hole can be non-uniform, or can be greater than the shrinkage of the tape material, which will allow gas to pass from one side to the other. Thus, an alternate or further embodiment, a via hole, whether round or oblong, includes a plug on the top and/or bottom to improve the leak resistance. Examples of improved vias with plugs are depicted in FIG. 79C. The plug may create an extra seal on only one side, for example the top, as in plugs 158*a* and 158*b*, or an extra seal on both sides as in plugs 158*c* and 158*d*. The plug 158*a,b,c,d* could be achieved in one or more printing steps, or through dispensing operations. According to exemplary embodiments, the material for the via plug is such that it would stop gas transfer, as in a material that is not porous. When combined with the porous anodes 24 and cathodes 26, the final section may look as depicted in FIG. 79D, where the tightly hatched material is non-porous, and the material identified by hatching as in previous figures, is porous.

Figure 80:
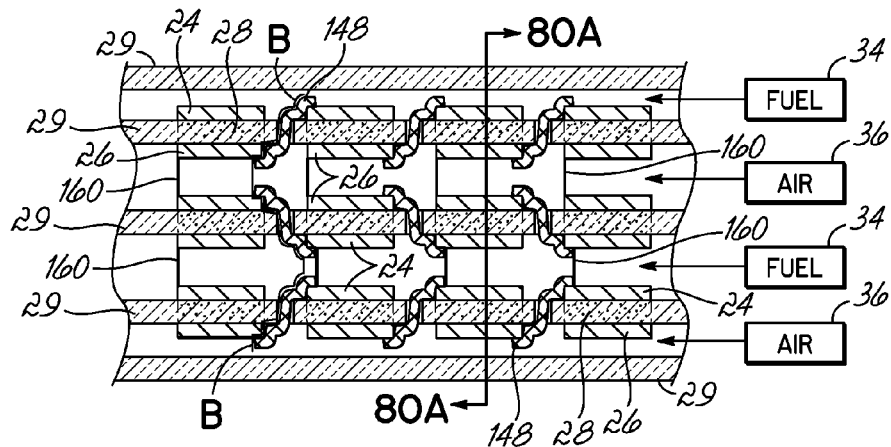

Expanding on the embodiments above for connecting single layers in series, parallel-series connections may be formed using multiple layers in a Fuel Cell Stick™ device 10. FIG. 80 shows a stacked group of single layers connected in series, where the stacked layers are also connected in parallel with each other, the parallel electrical connections being shown by a vertical line 160 between some pairs of anodes and cathodes. Plunging conductors 148 are depicted for the series connections, although other connection means may be used. In the particular embodiment shown, there are three active layers, each made from four cells (sections) in series. Thus, there are 12 total cells shown. Increased density may be achieved by using one fuel path to feed two different cell paths. The polarity of the cells is opposite from layer to layer: In the top and bottom layers, the direction from cathode to anode would be an arrow in the upward direction; and in the middle layer, the direction from cathode to anode would be an arrow in the downward direction. This characteristic of inverting directions of polarity from layer to layer using common fuel channels to serve pairs of electrodes provides a means for achieving a higher density Fuel Cell Stick™ device, in this and other embodiments.

Figure 81:
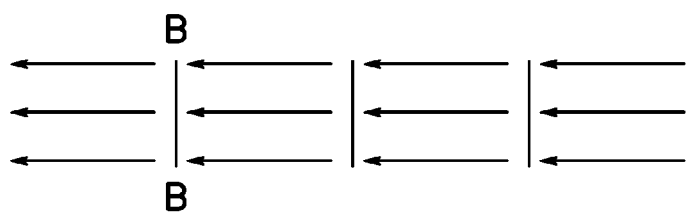
FIGS. 80-81 depict in schematic cross-sectional views and schematic views one embodiment of parallel multiple layer connections among single layer series connections.
Figure 80A:
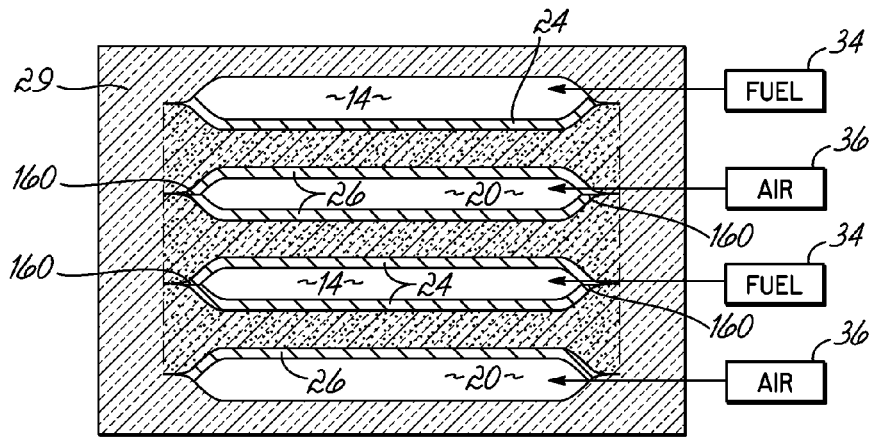
Figure 80B:
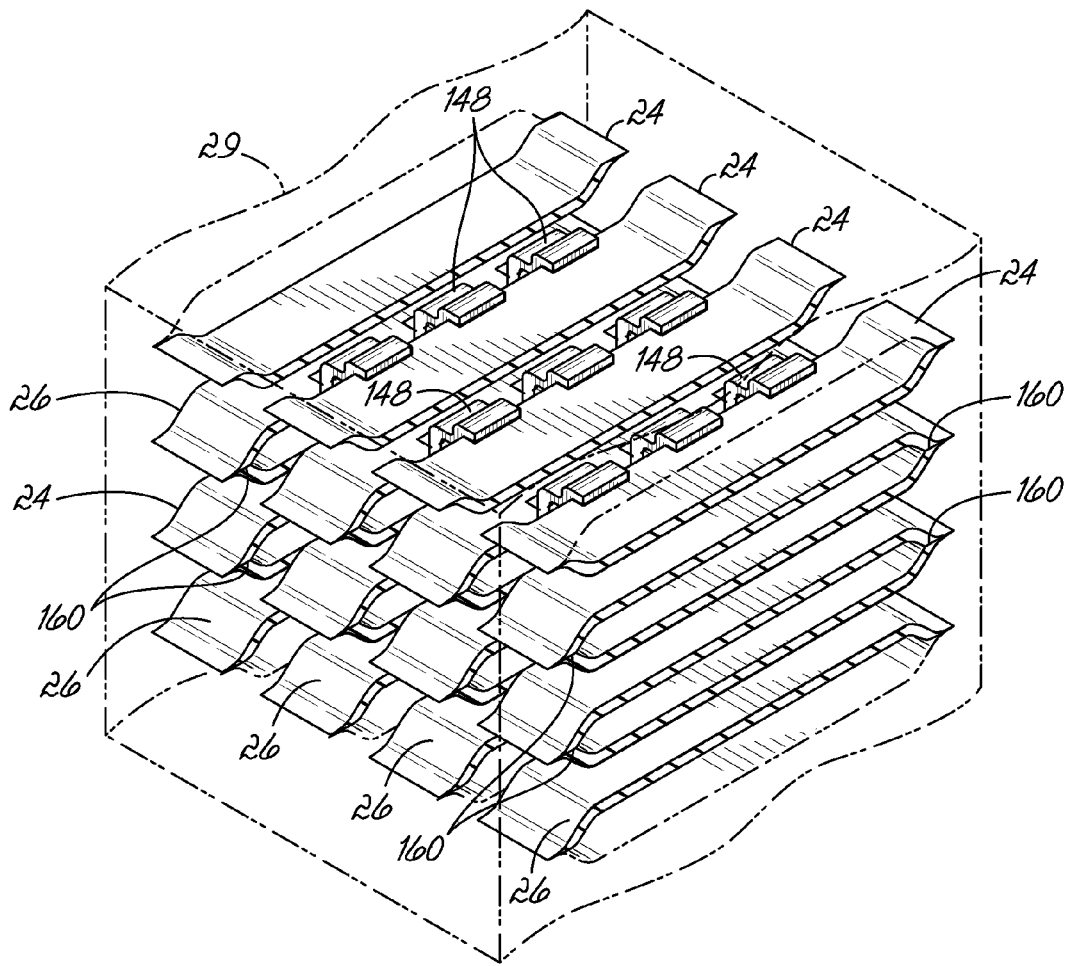

The parallel connection between two cathodes 26 or two anodes 24 is shown in cross-section in FIG. 80A, taken along line 80A-80A of FIG. 80, and in FIG. 80B shown in perspective view. The pairs of anodes or cathodes can be easily joined creating an edge connection 160, by allowing the pairs to touch at the edges of the fuel or air channels, respectively. The vertical lines in FIG. 80 represent the edge connections 160. In the embodiment shown in FIG. 80A, the edge connections 160 are on both sides (left and right in FIG. 80A); however, being connected on only one side would also achieve the electrical connection. This connection puts the two anodes 24 or cathodes 26 in parallel, electrically. Via connections or other connection means may also be used. Referring to the path from point B to point B, in FIG. 80, the points B are connected by conductors, such that the path B is all at the same potential. In FIG. 81, the path B is represented as a straight line. The net effect of the arrangement of cells in FIGS. 80, 80A, and 80B is a massive series and parallel combination, as shown schematically in FIG. 81. This arrangement can be useful for diverting power if one cell or interconnect within the device begins to fail. The current and voltage can flow around the damaged or degraded area to another functioning cell.

Figure 82:
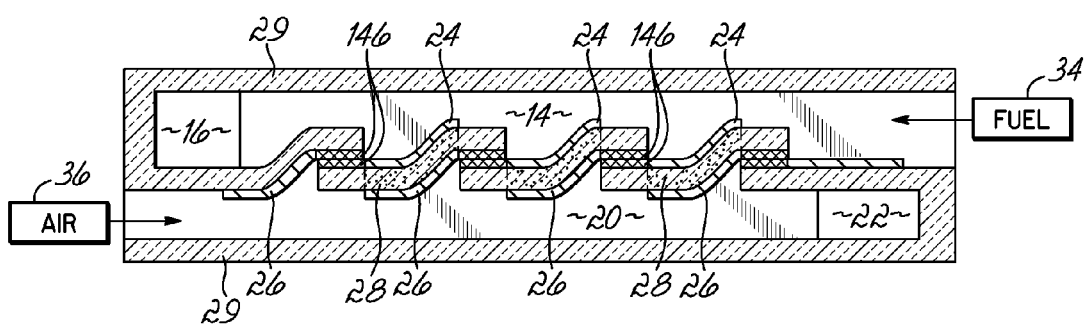
FIG. 82 depicts in schematic cross-sectional view a single layer Fuel Cell Stick™ device incorporating the series structure of FIG. 74C.
Figure 83B:
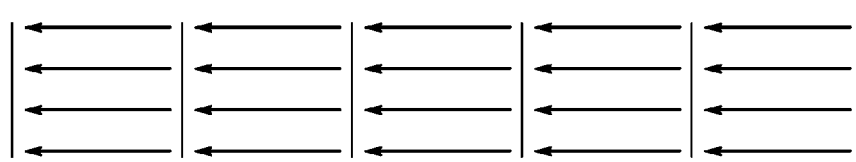
FIGS. 83A-83B schematically depict an embodiment of a series-parallel combination for the device of FIG. 82.
Figure 83A:
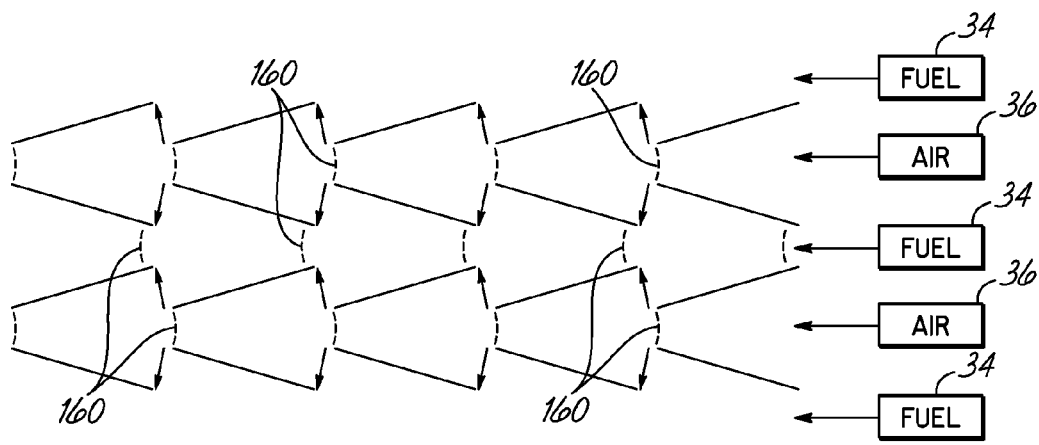

FIG. 82 schematically shows in cross-section a single layer Fuel Cell Stick™ device 10 with the series structure of overlapping layers, as previously shown in more detail in FIG. 74C. Ceramic 29 forms top and bottom covers, and idealized air passage 20 and idealized fuel passage 14 are shown. As in FIG. 1, air outlet 22 and fuel outlet 16 are normal to the plane of the drawing. As schematically shown in FIGS. 83A-83B, this device also can be put together in a massive series-parallel combination, just as in the previous embodiments depicted in FIGS. 80-81. In FIG. 83A, the dashed lines could be made from air and fuel channel edge connections 160, as shown in FIGS. 80A and 80B. Again, a high-density structure is provided where cells are both in series and in parallel, with alternating polarity between layers of cells, as shown by the arrows, and thereby having the benefit that if a particular cell fails, the current flow can be carried by the paths around it, as shown in FIG. 83B.

Figure 84A:
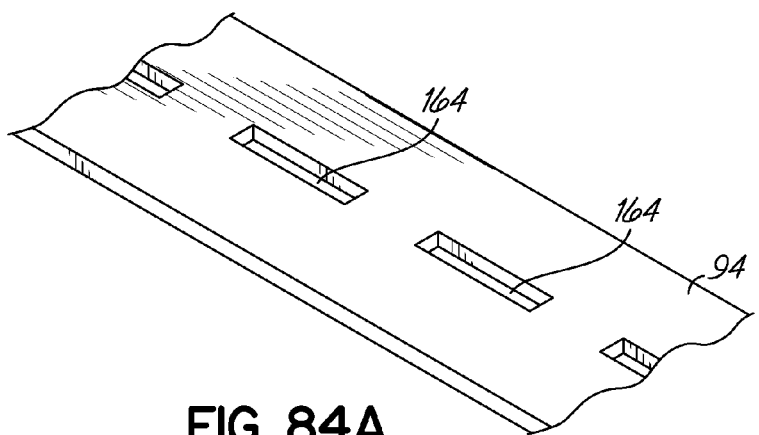
FIGS. 84A and 84B show in schematic perspective and schematic cross-sectional views another embodiment for providing parallel connection between two electrodes that are on the same gas pathway.
Figure 84B:
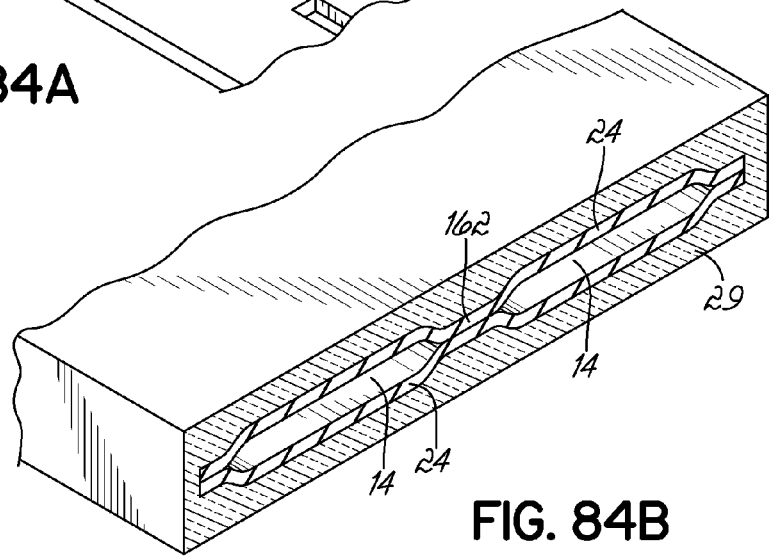

In FIGS. 84A and 84B, another embodiment is depicted for providing convenient parallel connection between two electrodes that are on the same gas pathway. This can be done for either two anodes 24 or two cathodes 26 on either side of a fuel passage 14 or an air passage 20 respectively. In FIG. 84B, the example of two anodes 24 is used. The anodes 24 are connected in the center region of the fuel passage 14, not just at the sides of the passage 14, as was shown in FIG. 80A. The center connection 162 can be made easily by placing a hole or gap 164 in the sacrificial gap tape 94 used to form the gas passages. The hole can be circular or long (e.g., a slit as shown in FIG. 84A), and there can be many of them. After lamination and firing, the top and bottom cathodes or anodes will touch in the region where the gap 164 existed. Advantageously, the center connection 162 is formed such that it does not significantly reduce the active area of the fuel cell area.

Figure 85A:
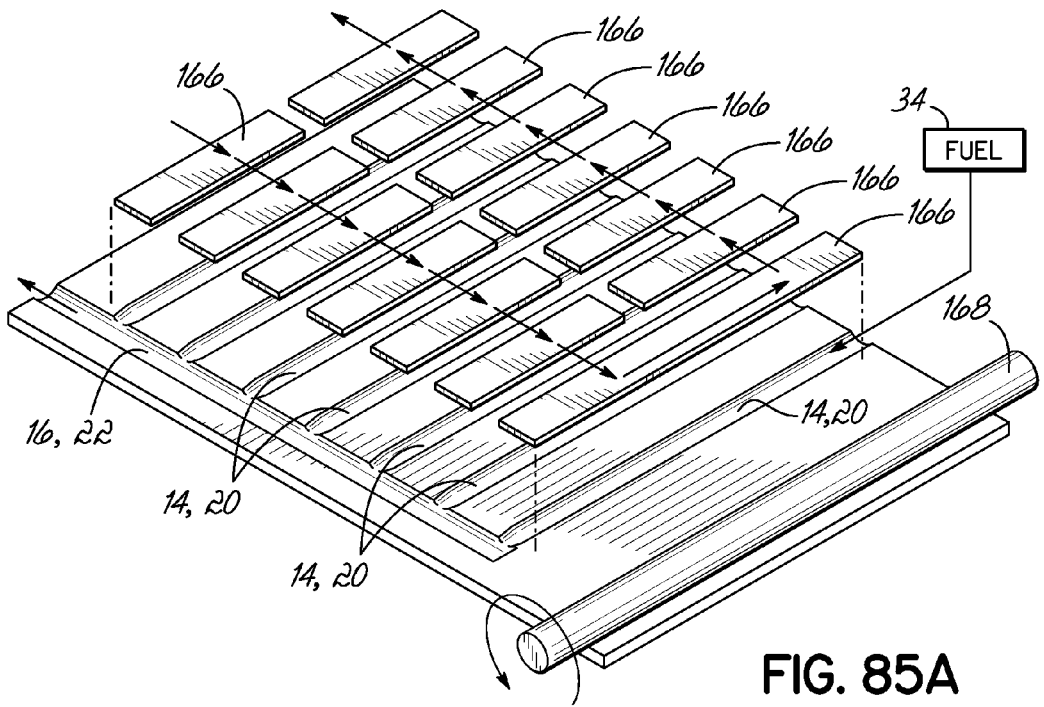

For a multilayer spiral Tubular Fuel Cell Stick™ device 200, discussed generally above in relation to FIGS. 28A-28D, where a series design is used, it is advantageous to have both electrical connections happen on the outside of the spiral Tubular Fuel Cell Stick™ device 200. This allows easiest access from the anode and cathode points to the cold zone. If the spiral Tubular Fuel Cell Stick™ device 200 is wrapped so that one end of the series group is at the outside of the wrap, and one end is at the inside, then the inside connection is more difficult to deal with. This is because the gas connection tube is placed over the end of the spiral Tubular Fuel Cell Stick™ device 200, but the electrical connection would need to be on the inside. Thus, it is better if both electrical connections can be on the outside. In FIG. 85A, showing the spiral Tubular Fuel Cell Stick™ device 200 schematically in the un-rolled configuration, the series connection (also shown schematically by the arrows) is achieved by having the series design start and end at the outside of the wrapped area, and then travel inward and form a U-turn.

Individual cells 166 are shown as separate rectangular blocks. The blocks are short and wide, so that they have low resistance (short conductive lengths from end to end, but wider areas to allow more current per cell). This design is compatible with both of the methods of forming series connections described above (overlapping sections, or with plunging conductor(s) traveling through the electrolyte layer). For the layout of the fuel passage 14 and air passage 20, it may be most convenient to make the pathways come in from the sides and then join up to exit together along a common pathway 167 as shown. A mandrel 168, over which the spiral Tubular Fuel Cell Stick™ 200 device is to be rolled, is shown. This mandrel 168 can be covered with sacrificial wax and then removed after lamination and melting of the wax. In the final form, depicted in FIG. 85B, the spiral Tubular Fuel Cell Stick™ 200 device will have a series connection path traveling from the outside in toward the center, and then coming back out. This is shown by the arrows representing individual cells 166.

Another method for forming a spiral Tubular Fuel Cell Stick™ device 200 with series connections is to form the series string down the length of the Tubular Fuel Cell Stick™ device 200. The series path would be as shown schematically by the arrows in the unrolled structure depicted in FIG. 86A. Because the active areas are very wide, after rolling, a particular cell 166 will extend from the inside of the tube to the outside. In this embodiment, the series connections are made using the plurality of short conductors 148 that plunge through the electrolyte. The separate plunging conductors 148 allow for greater strength in the electrolyte layer during the forming, rolling and lamination steps. However, the overlapping sections as depicted in FIG. 74C may also be used to form the series connections. FIG. 86B schematically depicts this embodiment in the final rolled form. As in FIG. 85B, the arrows represent individual cells 166.

Figure 87A:
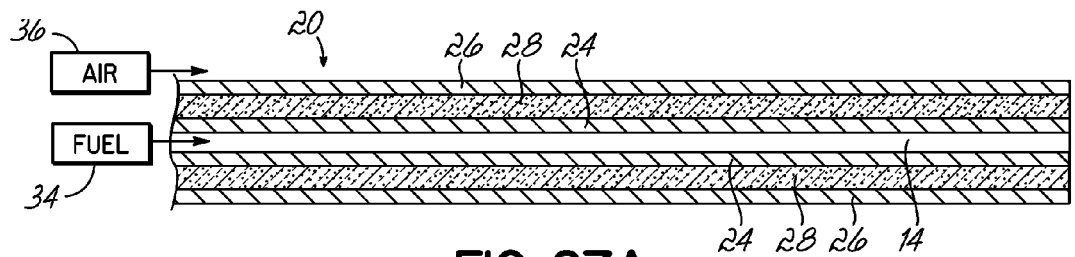
FIGS. 87A and 87B are schematic detail cross-sectional views of the embodiment of FIGS. 86A and 86B.
Figure 87B:
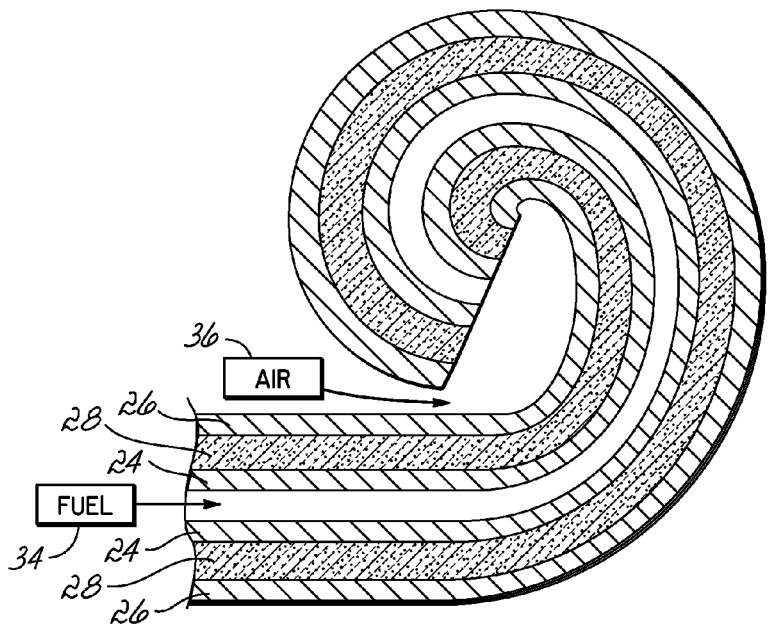

For this rolled design in particular, it would be useful to use two layers in series in order to increase the volume density of the Tubular Fuel Cell Stick™ device 200. However, it may not be necessary to have more than two layers in parallel, because of the way that the layers fold back on themselves. FIG. 87A is a schematic side view of one long individual cell 166 of FIG. 86B, going from left to right. When the two-layer structure (two electrolyte layers 28, two cathodes 26, two anodes 24, one air passage 20, one fuel passage 14) is rolled onto itself, as shown in FIG. 87B, the bottom cathode 26 touches the air passage 20 on the top. Thus, any more than two layers would be redundant. One skilled in the art may appreciate, based upon the teachings of the embodiments described above, that it may be possible to have the Tubular Fuel Cell Stick™ 200 device design contain a combination of many series designs working in parallel.

Figure 88A:
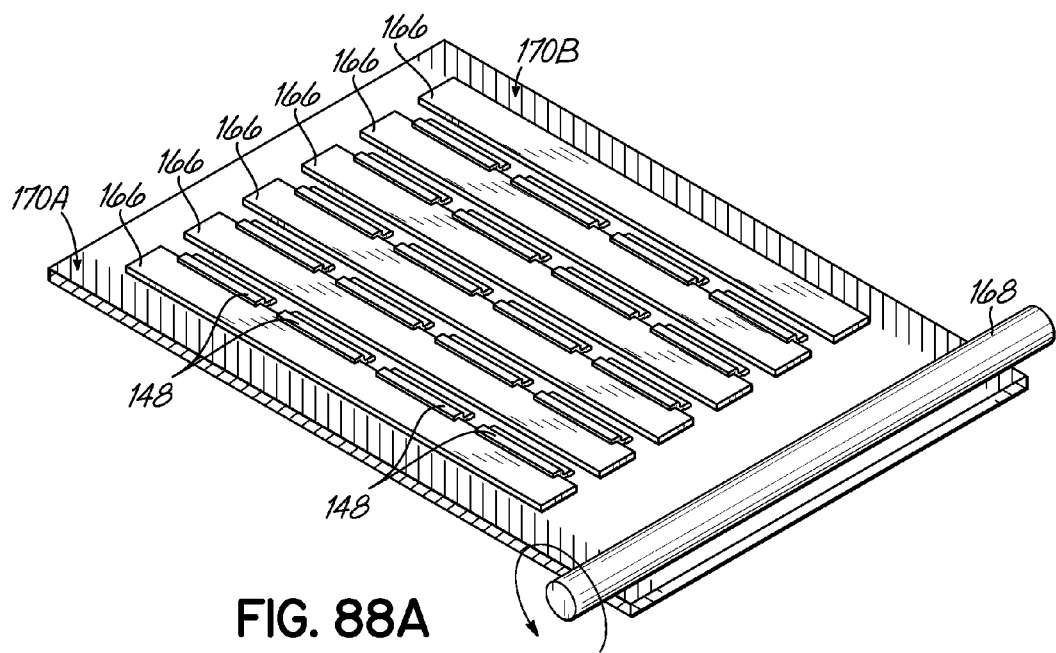
FIGS. 88A and 88B depict in schematic perspective views an embodiment for providing the electrical connection in a Tubular Fuel Cell Stick™ device.
Figure 88B:
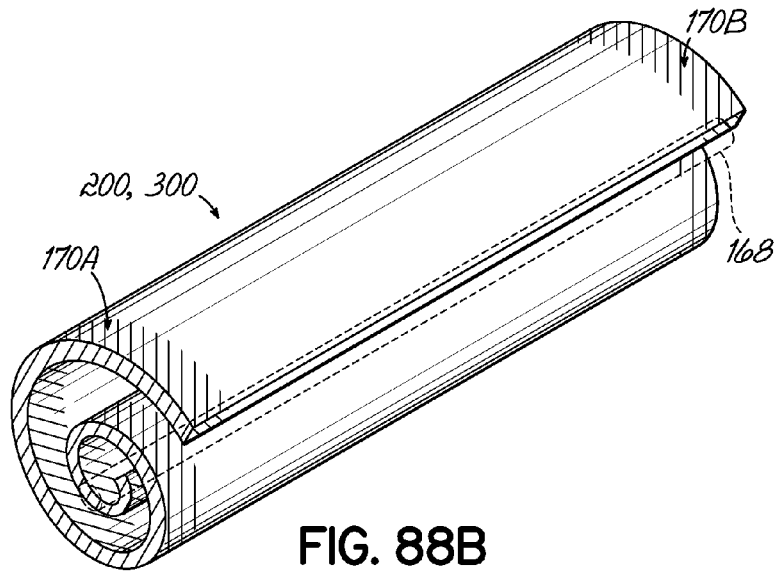

According to another embodiment of the invention for providing the electrical connection to the spiral Tubular Fuel Cell Stick™ device 200 or the concentric Tubular Fuel Cell Stick™ device 300, the entire end(s) of the Fuel Cell Stick™ device may be made into conductive ends 170a, 170b, as shown in the unrolled schematic structure of FIG. 88A and the rolled, spiral (for example) tubular structure of FIG. 88B. To achieve this, a conductive material is substituted for the insulating ceramic material at the end of the Tubular Fuel Cell Stick™ device 200, 300. This conductive material is shown as the hatched area, and may be, for example, LSM or a shrinkage matched material that is a combination of two or more independent materials, such as an LSM and YSZ combination, that would better match the shrinkage during sintering of the ceramic 29 that comprises the majority of Tubular Fuel Cell Stick™ device 200, 300. In particular, for the first and last cell in the series design, the center of the wound electrode must be able to make contact to the connection to the outside world, just as well as the outermost winding of that cell. The conductive end areas 170a, 170b, shown with hatching, would efficiently allow this connection to be made. An alternate method (not shown) to make contact to an inner electrode section would be to drill into the Fuel Cell Stick™ device and then back fill with conductive material.

Figure 89:
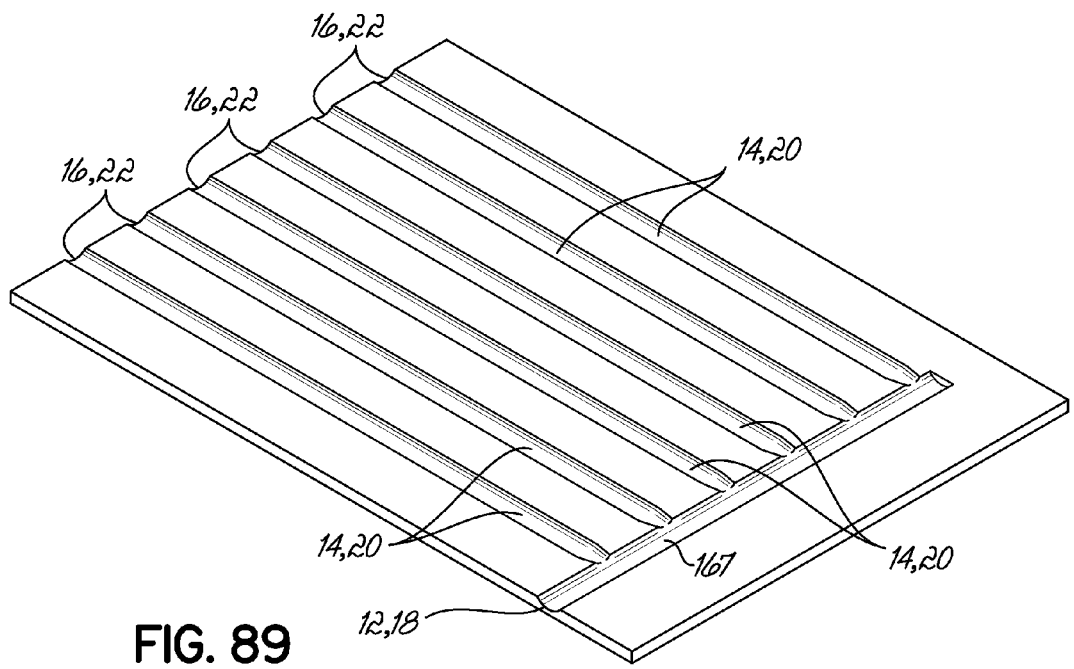
FIG. 89 depicts in perspective schematic view the layout of a gas flow pathway.

For the embodiments of FIGS. 86A and 88A, the layout for the gas flow pathways 14, 20 may be as depicted in FIG. 89. To feed the active areas, the gas could enter the stick at inlet 12, 18 to a large common pathway 167, and then branch off to serve each individual cell 166. In FIG. 89, gas enters at a common pathway 167 and exits at a plurality of small branches, whereas in FIG. 85A it is the opposite.

Figure 90:
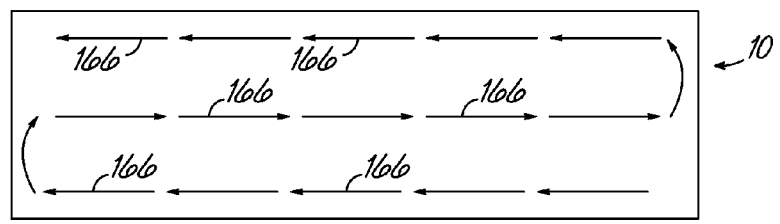
FIG. 90 is a schematic of cells in series using folded pathways.

In a Fuel Cell Stick™ device 10 containing sections (or cells 166) in series, it may be useful to have a higher voltage (more sections) than will easily fit into the length of one Fuel Cell Stick™ device 10. In that case, according to another embodiment of the invention, the series sections may be oriented to double back and forth along the length of the stick, before exiting the stick to supply power to the outside world. FIG. 90 is a side view of a Fuel Cell Stick™ device 10 schematically showing how 15 sections (cells 166) connected in series could be put into one device, by essentially folding the pathway in two places. It would also be possible to put multiple sections like this into one Fuel Cell Stick™ device 10, so that there were groups of 15 in parallel with each other.

Figure 91:
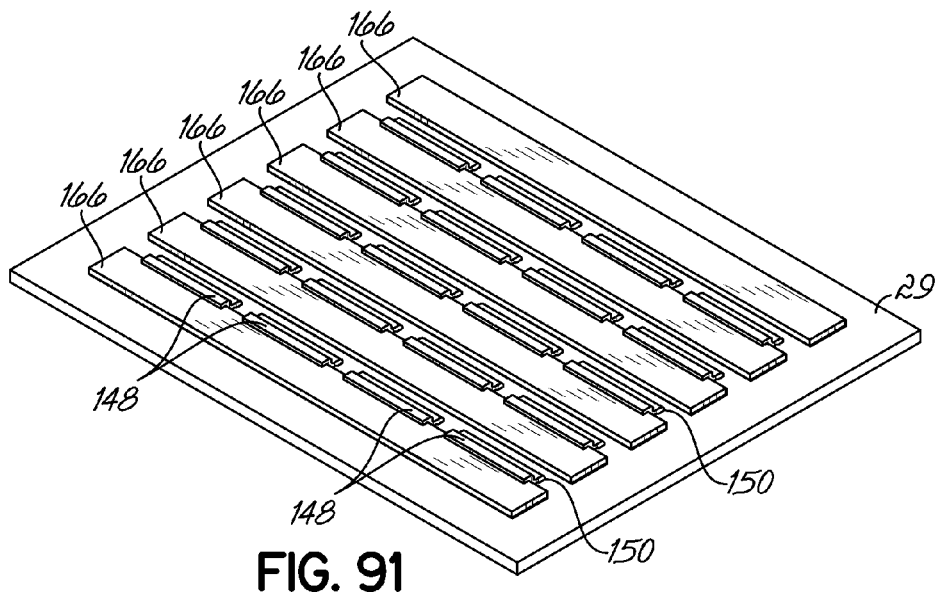
FIGS. 91-92B depict in schematic perspective and cross-sectional views an embodiment of a Fuel Cell Stick™ device with many layers in series, using a folded stack design.
Figure 92A:
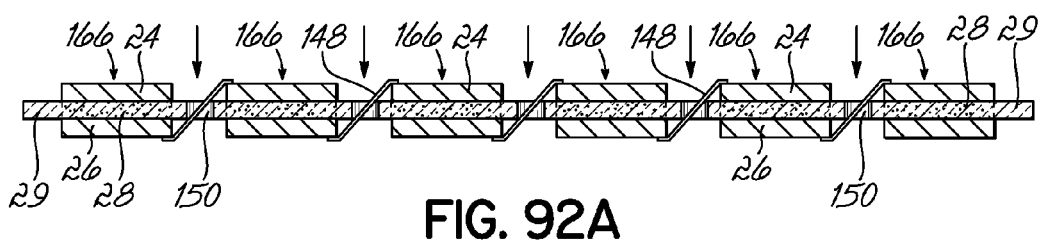
Figure 92B:
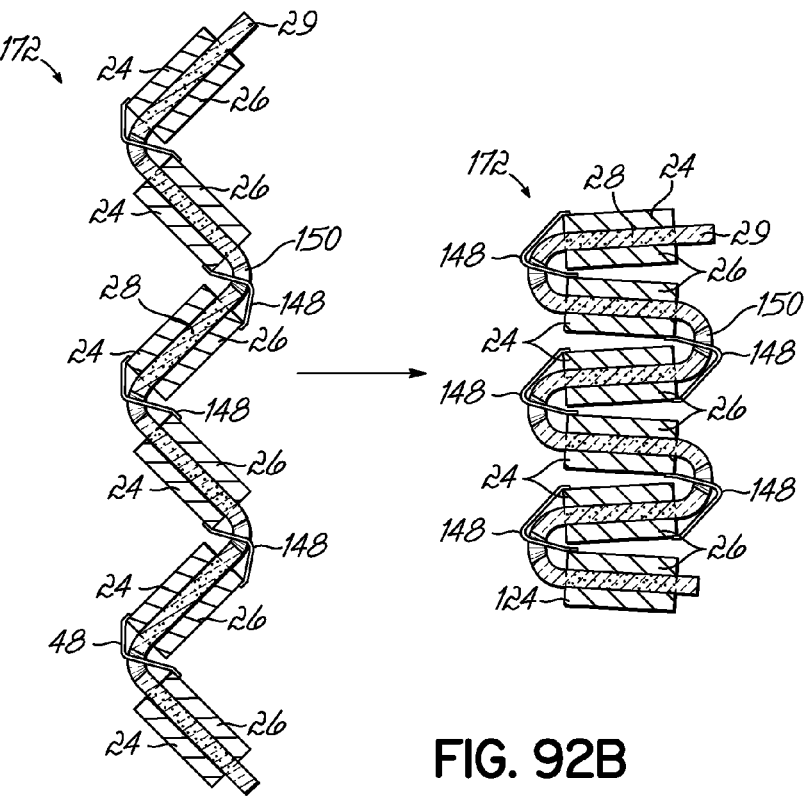

According to another embodiment, a folded design provides another way to make a Fuel Cell Stick™ device 10 with many layers in series. FIG. 91 shows in perspective view an electrolyte layer 29 with six cells 166 in series. These cells could be connected in series either with the overlapping method or with the plunging conductor method as shown. To fit this sheet structure into a Fuel Cell Stick™ device 10, the electrolyte layer 29 is folded, for example, in the manner of an accordion. Looking at the sheet structure on end, FIG. 92A identifies the bend points between the cells 166, shown with arrows. Bending along the arrows, the cell group begins to form a folded stack shown on the left of FIG. 92B. Compressing the folds progressively more, a compressed folded stack 172 is formed as illustrated on the right of FIG. 92B. This compressed folded stack 172 can then be conveniently placed into a Fuel Cell Stick™ device or multilayer fuel cell. The number of cells in series is limited only by the designer's preference. Multiple folded stacks 172 could be placed in the Fuel Cell Stick™ device 10 in parallel (i.e., electrically parallel), either by arranging the groups horizontally or vertically. Gap-forming material, for example gap-forming tape 94, would be placed on the anodes 24 and cathodes 26 and then sacrificially removed to form air passages 20 and fuel passages 14.

For coefficient of thermal expansion (CTE) matching purposes, it may be useful to have one or both sides of the folded stack 172 free from attachment to the surrounding device material (meaning the top covers or the side margins), such that there are free floating areas. In this embodiment of the folded stack design, the first and last cells in the folded stack 172 are attached at or near the top and bottom covers of the stick, but all or a portion of the intermediate portion of the stack is free from attachment. In FIGS. 93A and 93B, cross-sections of the Fuel Cell Stick™ device 10 are shown. FIG. 93A shows a design where the left side of the folded stack 172 is free from attachment to the left wall of the device, while the right side of the folded stack 172 is anchored to the right wall at the intermediate bend areas. This can allow compliance of the layers away from the walls, so that as the device sinters, the folded layers are allowed to shrink at a different rate than the cover material. In FIG. 93B, a similar construction is shown except that the folded stack 172 is free from attachment from both the left and the right wall of the stick except at the two end cells of the folded stack 172. In both embodiments, an advantage is the ability to provide gas (air or fuel) to many electrodes at once. While FIGS. 93A and 93B depict one large continuous active area that is folded, i.e., a folded stack 172, it may be appreciated that the series and parallel cell embodiments described above may be utilized to achieve the same or similar effect. FIG. 93A depicts a continuous anode 24 and a continuous cathode 26, whereas FIG. 93B depicts the plurality of spaced anodes 24 and cathodes 26 such that the bend areas are free of electrode material. As with FIG. 92B, FIG. 93B electrically connects the spaced electrodes and thus cells 166 in series using plunging conductors 148 that pass through the electrolyte 28 in the bend areas. Either embodiment, e.g., continuous electrodes or spaced electrodes, may be used for the free floating designs.

Figure 94A:
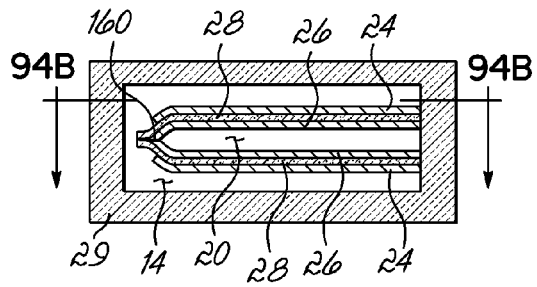
FIGS. 94A-94D depict in cross-sectional end and top views parallel active layers connected to one side of the device and free floating on the other side of the device.
Figure 94C:
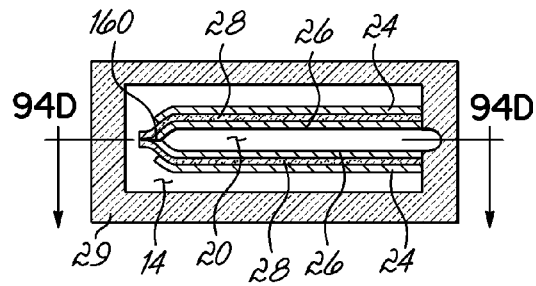
Figure 94B:
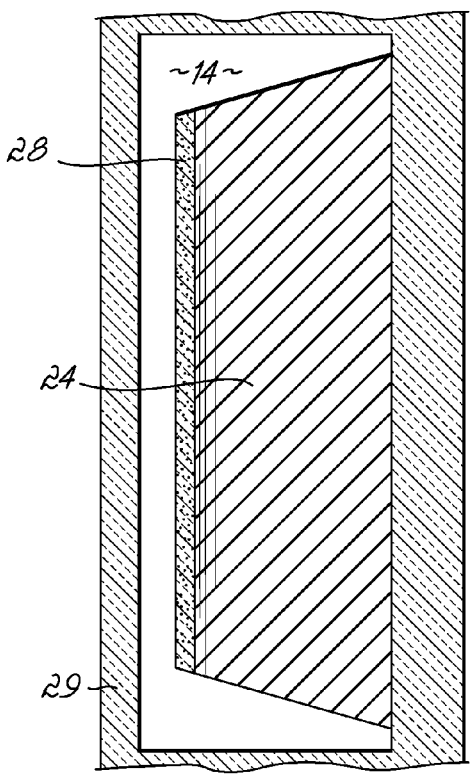
Figure 94D:
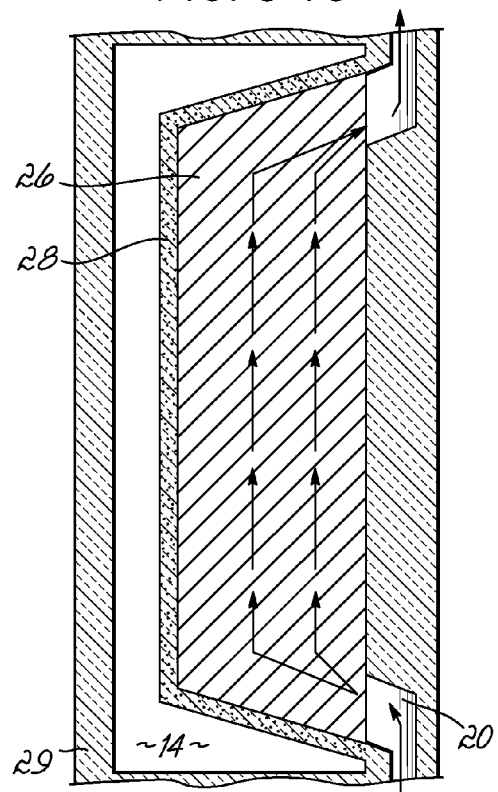

The benefit to a free floating layer is that if the CTE of the combined structure with anodes and cathodes is significantly different than the CTE of the rest of the body (side margins, top and bottom covers), then the free floating areas allow physical disconnect. It may be appreciated that other Fuel Cell Stick™ device 10 structures besides the folded structure can be made with this free-floating outcome. FIG. 94A depicts in cross-section two active layers (each layer comprising anode 24, electrolyte layer 28, and cathode 26) in parallel (as opposed to series, in FIGS. 93A and 93B) that are free at the side. FIG. 94B depicts a top sectional view of the Fuel Cell Stick™ device taken along line 94B-94B of FIG. 94A, showing the active layer free along three sides, and anchored on one side of the device. This geometry does not add complexity to the flow path of gas in the air passage 14 on the outside of the floating layer, but does add complexity of the gas flow in the air passage 20 within the floating layer. That complexity may be addressed by bringing the air passage 20 along the edge in the ceramic 29, and then turning in to the interior space, across the cathode 26 and back into the ceramic 29 as depicted in FIGS. 94C and 94D.

Various embodiments above have the advantage of sharing an air or fuel pathway, which provides an improvement in density. Where the gas flow path is serving anodes or cathodes that are operating in parallel, then those anodes or cathodes can be touching, either at the edge of the area or at multiple points in the center of the area. However, it may be useful in other embodiments to have one air or fuel pathway that is serving anodes or cathodes that are operating in series, and in these embodiments, the anodes or cathodes should be electrically isolated to prevent shorting in the device. An example of this is seen in the embodiment of FIG. 90, in which it is desirable to have one gas flow path serve electrodes on top and bottom while preventing the electrodes from shorting. To this end, a barrier layer 174 of material may be placed within the gas flow path to provide mechanical and electrical isolation between one electrode and another, as shown in cross-section in FIG. 95 for two cathodes 26. The barrier layer 174 can be continuous or have breaks in it to allow gas to pass from one side to the other. The barrier layer can exist only in the region of the active anode 24 and cathode 26, or it can extend further away in the multilayer structure and along the flow path. The barrier layer 174 prevents shorting between one electrode and another. The barrier layer 174 can be very thin, which might result in some distortion, so long as it maintains the electrical isolation. By way of example, the thickness of the barrier layer 174 could be between about 5 µm and about 50 µm. Non-conductive particles, such as zirconia or pre-sintered ceramic spheres in a sacrificial organic material 72 may be added to give the barrier layer 174 support, in a manner similar to that previously described for supporting other layers by pillars 54 with reference to FIGS. 7B, 7C, and 7D.

An alternative embodiment for preventing shorting between two anodes 24 or cathodes 26 in series is to place an insulating layer 176 on top of the anode 24 or cathode 26, as shown in FIG. 96. The insulating layer 176 could be made out of zirconia or the electrolyte material, for example. The insulating layer 176 must be porous to allow the gas to pass through the insulating layer 176 into the anode 24 or cathode 26, and must also be non-conductive. Beneath this porous insulating layer 176, the anode 24 or cathode 26 would still need to have all the properties that it normally has: porosity, conductivity, and chemical reaction sites. By way of example, the thickness of the insulating layer 176 can be between about 1 μm and about 25 μm.

In advanced applications of multilayer fuel cells, the electrolyte, anode 24 and cathode 26 are thin enough that distortion after sintering becomes a characteristic of the materials. In the case that the above design shows distortion, and the insulating layers 176 do their job, then the above structure may appear as shown in FIG. 97. The fuel or air passage 14, 20 in this case is assumed not to have pinched closed completely because it is open somewhere else along its width. The result is that the anodes 24 or cathodes 26 are touching, but they are not shorted (i.e., electrically contacted) to each other because at least one of the insulating layers 176 is intact at the point of contact.

Figure 98B:
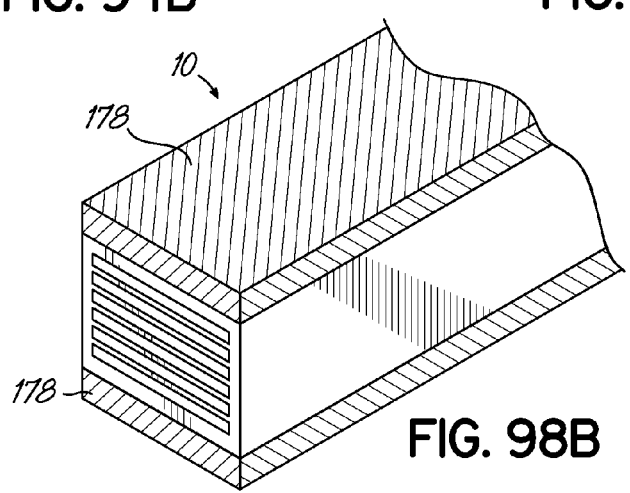
FIGS. 98A and 98B depict in cross-sectional and perspective schematic views an embodiment of power connection.
Figure 98A:
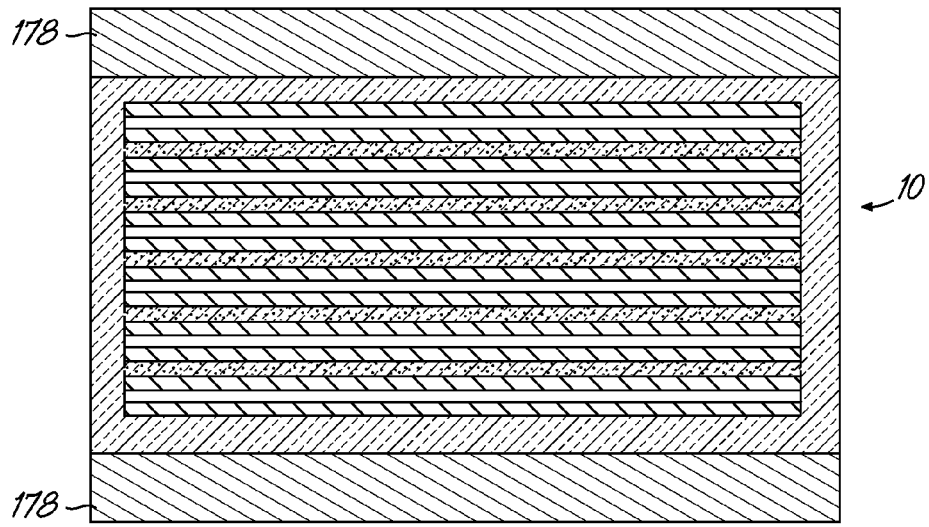

Regarding removal of power from a hot Fuel Cell Stick™ device 10, the use of LSM as a surface conductor may not be as conductive as a metal. For transporting power over long distances (many inches), the resistance of LSM can contribute to a loss of power. This power loss can be overcome by making the LSM conductor thicker. To that end, rather than screen-printing, it may be more useful to cast the LSM as an LSM tape 178, and then build the LSM tape 178 into the structure on the top and/or bottom of the Fuel Cell Stick™ device 10, as shown in cross-sectional and perspective views in FIGS. 98A and 98B, respectively. In this way, the thickness could be changed from several mils thick (0.001"-0.005") to several tens of mils (0.01"-0.05"), and could cover the full width of the stick. The CTE of LSM can become a challenge when co-firing a thick layer of one material to another, in which case the LSM can be mixed with YSZ (just as it is in the cathode), to more closely match the CTE of the overall stick. In addition, LSM is not conductive when it is at low temperature, so a precious metal, such as silver, or other low temperature conducting material should be placed on to the top of the LSM in areas of the Fuel Cell Stick™ device 10 that will lie outside of the furnace. While LSM has been discussed, it may be appreciated that the invention is not so limited. Any conductive ceramic, non-oxidizing alloy or precious metal could be used where LSM was cited, thus LSM tape 178 may actually be made of materials other than LSM.

Figure 99:
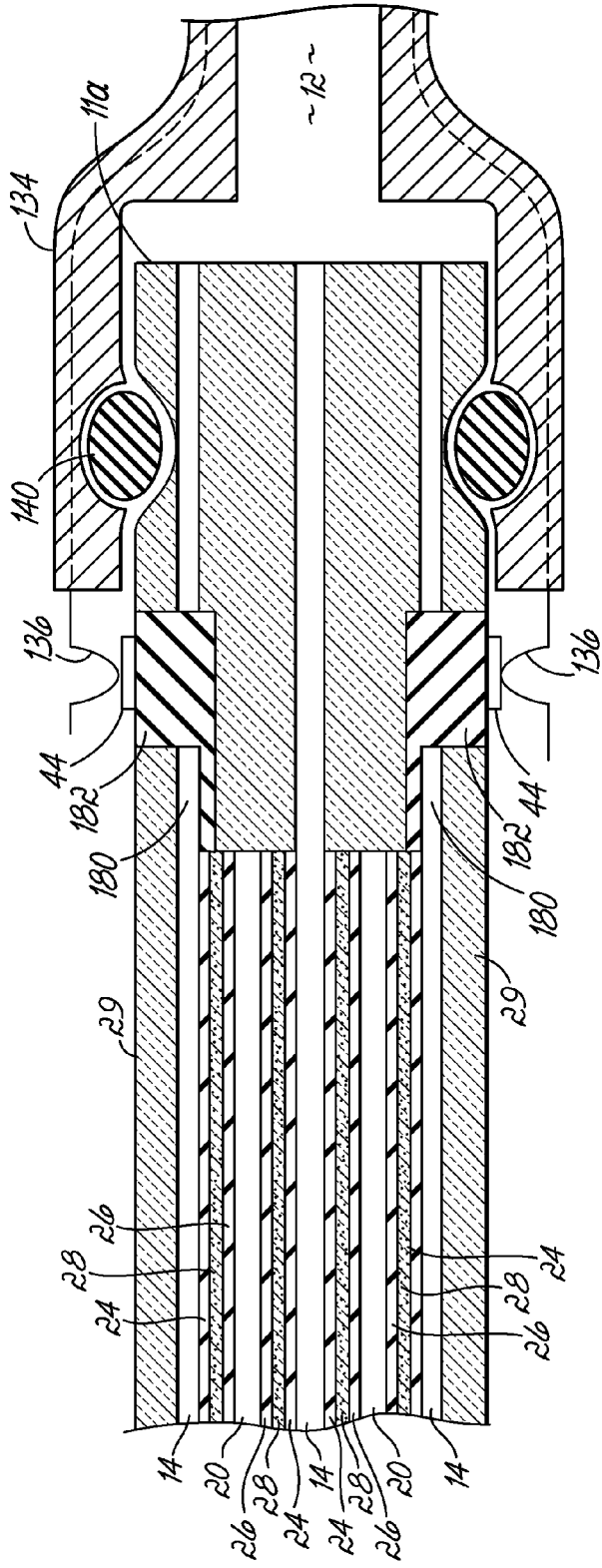
FIG. 99 depicts in schematic cross-sectional view an embodiment for a low resistance connection.

In accordance with another embodiment of the invention, a low resistance connection can be made to the end of the Fuel Cell Stick™ device 10 using nickel as a conductor. However, nickel is in an oxidized state whenever air is present, and oxidized nickel is non-conductive. The Fuel Cell Stick™ device 10 is advantageously used in air because the overall system is simpler and cheaper when the furnace operates with an air atmosphere. Thus, the challenge to using nickel as a conductor is that it must stay in a reduced state. So, to overcome the problem of oxidation of nickel, an interior channel 180 containing a nickel conductor 182 is used that travels to the end of the device, and the interior channel 180 is fed with fuel to prevent oxidation, as depicted in FIG. 99. Nickel has a conductivity that is lower than platinum, around 6 μohm-cm, so it is within an order of magnitude of the best conductors available (copper, silver). So by making the nickel conductor occupy a space within an interior channel 180 that is fed by fuel, the nickel will stay in a reduced state, thereby permitting its use. With further reference to FIG. 99, at the end of the nickel conductor 182, near the tube connection, the nickel conductor 182 may exit the device for electrical connection such as at a contact pad 44 and a connector 134 as shown in previous figures. By way of example, silver could be used here to transition from the reducing atmosphere to an air atmosphere. This embodiment has been illustrated in combination with a connector 134 as previously described in reference to FIGS. 67A-67B, but is in no way limited by this illustration.

Figure 100B:
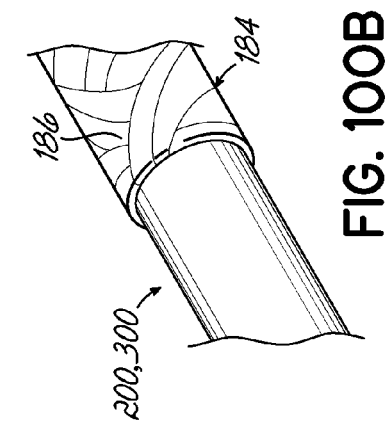
Figure 100A:
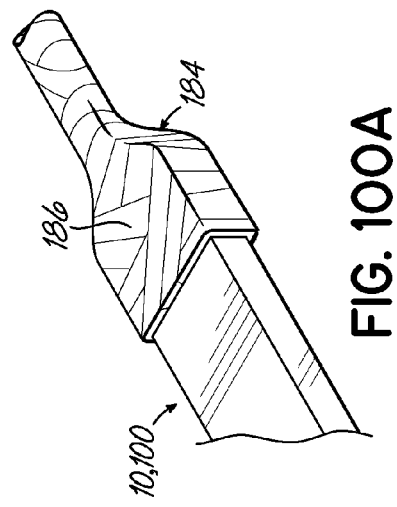

According to another embodiment of the invention, multilayer ceramic fuel cell structures, either Fuel Cell Stick™ devices 10, 100, 400, 500 or Tubular Fuel Cell Stick™ devices 200, 300, or other multilayer devices may be fabricated using green ceramic technology, and end tubes 184 can then be permanently attached. The end tubes 184 can lead from the hot zone to the cold zone where other forms of tubing or gas transport can be attached, such as supply tubes 50. Alternately, the end tubes 184 can lead to fuel and air supply, or exhaust removal facilities, without the use of supply tubes 50. The multilayer device (e.g., 10, 100, 200, 300) will sit in the hot zone, and end tubes 184 attached in a permanent manner transition out to the cold zone. As depicted in FIGS. 100A and 100B, a multilayer (Tubular) Fuel Cell Stick™ device 10, 100, 400, 500 (200, 300) or any other fuel cell structure with multiple air and fuel channels, is provided with a special wrapped end tube 186 that is one embodiment of an end tube 184. The active structure of the device 10, 100, 200, 300, 400, 500, i.e., the anodes, cathodes, electrolyte and fuel passages, is made by any of the various methods described herein, and then the wrapped end tube 186 connection is added. The wrapped end tube 186 is added with a wrapping technique, where the tube is made of tape, and then the tape is wrapped around the end of the stick with enough turns to give an adequately strong thickness, and the turns are continued to give a desired length to the end tube 184. A mandrel may be needed within the unsupported section of the wrapped end tube 186, in which case a temporary mandrel covered with release agent or wax can be used. The layers of tube can be laminated to achieve full strength and density. After lamination the mandrel can be removed. The permanent end tube 184 can provide both a mechanical and electrical attachment to the active structure. The permanently attached end tube 184 connection is substantially monolithic with the active structure, by virtue of co-sintering. This provides durability to the design. Thus, by co-firing the final device, the attached end tube 184 is sintered onto the multilayer device (e.g., 10, 100, 200, 300, 400, 500) so that they are substantially monolithic.

The end tube 184 can be made out of conductive ceramic, such as LSM, or out of nickel oxide. At the transition to the cold zone or to an air atmosphere, the end tube 184 can be covered with a conducting metal or alloy. This metal or alloy and the cold end of the final tube design can be applied as paint or as a wrapped tape. Alternately, instead of the wrapped end tube 186, the end tube 184 may be one made by rolling or extruding, for example. If the end tube 184 is soft in the green state, it can be attached by laminating to bond ceramic to ceramic. The wrapped tube 186 or added end tube 184 can also be a composite of two or more materials. In the case of LSM, for example, the LSM can be blended with YSZ to help it match the CTE and sintering properties of pure YSZ.

Figure 101:
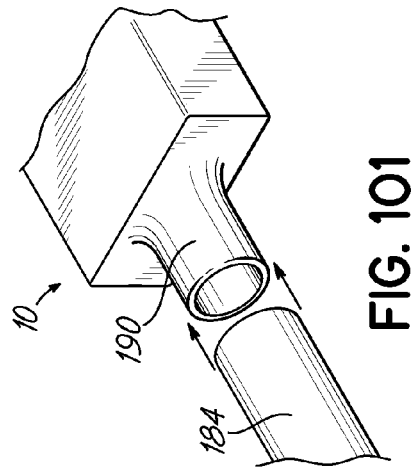

It may be desirable to make the complex active structure of the multilayer device and then sinter it, then attach permanent end tubes 184 to the ends, but this presents a physical challenge. It would be advantageous to shape the ends of the device to readily accept a tube connection, as shown in FIG. 101 for a device 10 (and also described as cylindrical end portions with reference to FIGS. 3A and 3B for a non-permanent tube attachment). The outside end of the active device 10 can be shaped, such as by machining (preferably in the green state), to form cylindrical end portions 190 that readily fit into a ceramic end tube 184 to provide attachment in the axial direction. Axial attachment of end tubes 184 is optimal for tight packing of Fuel Cell Stick™ devices 10 (or 100, 200, 300, 400, 500) in a larger system.

Figure 102A:
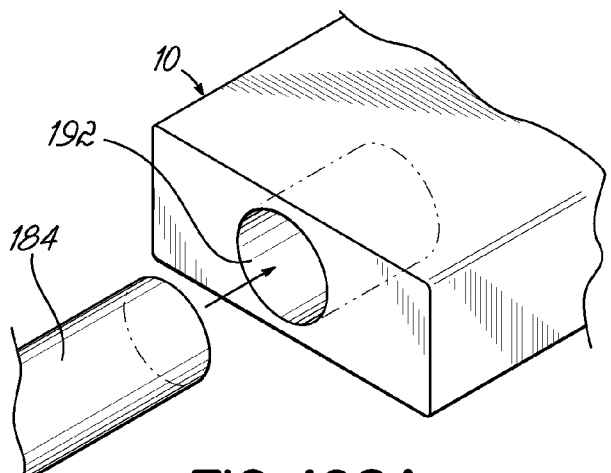
FIGS. 100A-103B depict in schematic perspective views various embodiments of fuel cell devices with permanently attached end tube connections.
Figure 102B:
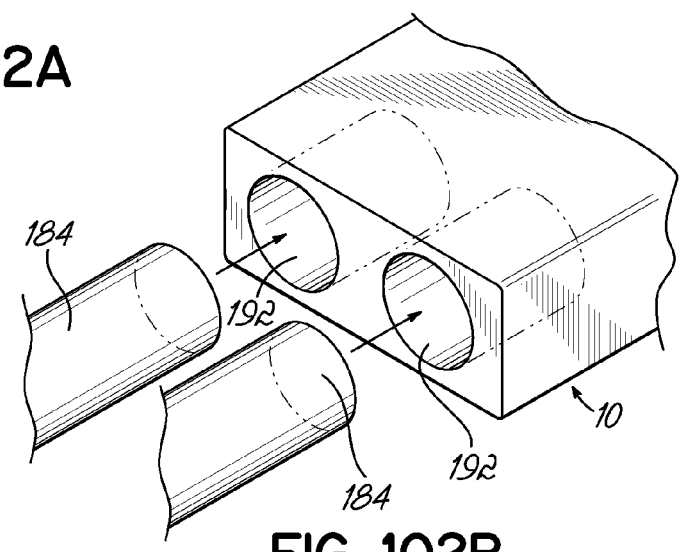

Alternatively, the inside of the ends 11a, 11b of the Fuel Cell Stick™ device 10 can be machined to form one or more end holes 192 into which one or more end tubes 184 can be inserted, as depicted in FIGS. 102A and 102B. Two or more end tubes 184 inserted side by side could be advantageous in many designs. Multiple inserted end tubes 184 could allow convenience in miniaturization (in hand-held devices, for example), or simplicity in balance of plant design.

Permanent attachment of end tube 184 may occur while both pieces (active device 10 and end tube 184) are green such that they can be co-sintered, or after both pieces are separately sintered, or while one is green and one is already sintered. If both are already sintered when the attachment occurs, then a glass or glass ceramic (or lower firing ceramic, such as YSZ with a sintering aid ceramic added such as alumina) could be used to form the bond. If the pieces are put together green, then lamination methods or the above joining materials could be used. If one is green and one is already fired, then all of these adhesion methods could be used.

Figure 103A:
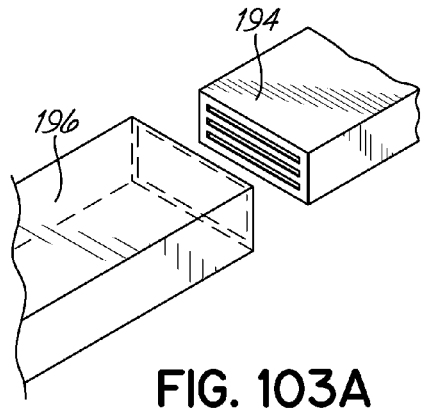
Figure 103B:
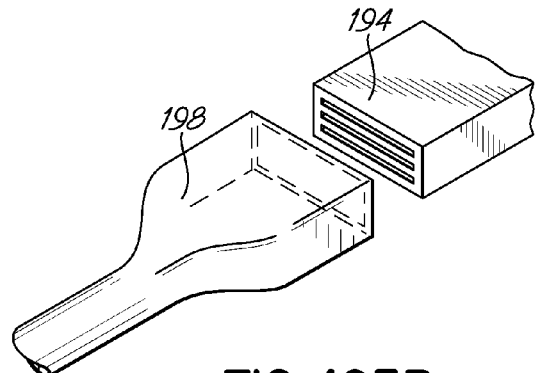

According to another embodiment for permanent tube attachment, depicted in schematic perspective view in FIG. 103A, a rectangular end portion 194 may be provided at the end of the active device, and a mating rectangular tube 196 is used for attachment thereto for exit from the furnace. Also, it would be possible to have an end tube 184 in which the mating piece is rectangular at the attachment end, and round at the other end. Such a shape-transitioning end tube 198, illustrated in FIG. 103B, could be made by casting or molding. In particular, the shape-transitioning end tube 198 could be made as a molded ceramic piece in a compliant form. The rectangular end could be easily laminated onto the rectangular end portion 194, and then this ceramic piece could change shape into a round or other shaped tube for its transition out of the furnace. Again, these tubes and exit paths can be made of conductive material so they may perform as an electrical connection as well as a gas connection to simplify the final design of the system, by reducing the number of components and have them perform more than one function.

The use of green tape has been described for building up the structures described in the various embodiments. However, the use of green tape is not required. An alternative is to screen print all the materials used in the structure. This eliminates the use of tape, but gives a final green device that looks very similar in layout. In practice, it would be very difficult to tell the difference between a layer of zirconia that is put down with a screen-printing technique and one that is put down as a sheet of tape. Another variant is to use dispensers to write the material. In the simplest form, this can be a tube that writes the material like a pen, although the exact methods for this will become more sophisticated as time goes on, and as the need for miniaturization continues, as may be appreciated by one skilled in the art. With the writing methods, complex structures can be made, with small channels and more complex 3D structures. However, in practice, these methods may be less useful than the multilayer ceramic technology. As structures are made smaller and smaller, with the same number of writing heads, then the amount of time needed to make a large device becomes longer. The method may defeat itself based on productivity issues. It is much more practical to build the device with tape and printing methods, as is demonstrated by current capacitor production methods, in which one factory can produce a billion small chips per week, each with 400 layers or more. Nonetheless, such means for building the Fuel Cell Stick™ devices of this invention are contemplated.

Microtubules may also be used instead of layers, within the multilayer device. The tubules could give a large area when combined. If a multilayer device contains thousands of microtubules, these tubes could be combined in order to step up the voltage by connecting them end to end, or side to side, or in larger grouping of strata during the buildup process. However, the complexity of the writing again may become a factor, slowing down production. Overall, however, use of the "willing form" in accordance with the invention allows this design to work. "Willing form" refers to devices of the invention having a physical structure within which the materials system is content to cooperate toward the overall design goals. Because the physical structure acts in harmony with the material properties, the device can accommodate dramatic temperature differences along the length of the device, allowing low temperatures and low cost connection points, simplifying construction and increasing durability.

Figure 104:
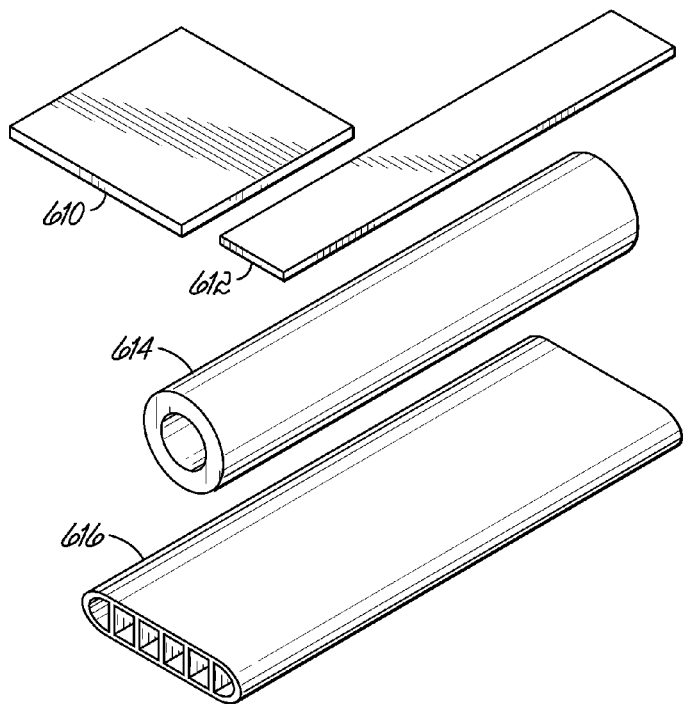
FIG. 104 depicts in schematic perspective view several forms of pre-sintered cores of ceramic.

In various embodiments described above, multiple layers of anodes, cathodes, electrolytes and gaps are used in a "willing form" design for an SOFC or other fuel cell device. This "willing form" design may also be used where the multilayer active structure of the Fuel Cell Stick™ device 10, 100, 200, 300 is built up onto a pre-sintered core of ceramic (nickel oxide, YSZ, LSM, or any other preferred material), having a plate 610, long plate 612, tube 614 or flat tube 616 configuration, for example, as shown in FIG. 104. The final form would look similar to previously described designs, but the manufacturing method would start with the solid under-material 610, 612, 614, or 616, and then add thick film layers to that (thick film refers to applying layers of paste, either by printing, dipping or writing).

Figure 105A:
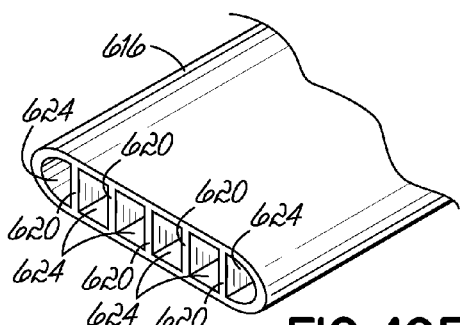
FIGS. 105A and 105B depict in schematic perspective views flat tubes having support members and channels.
Figure 105B:
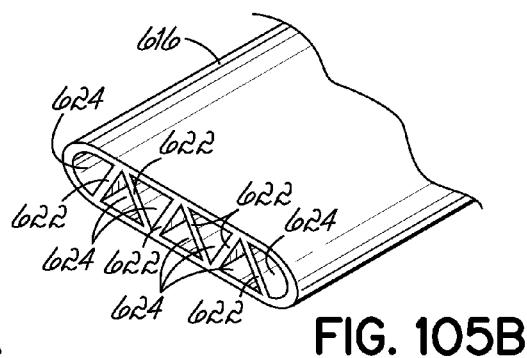
Figure 106:
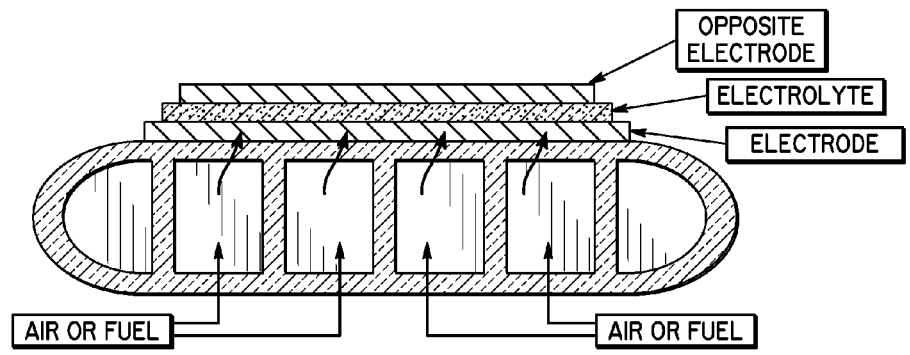
FIG. 106 depicts in schematic cross-sectional view a flat tube being used in a method of the prior art.

In the existing uses of flat tube 616 or round tube 614 design, the center of the tube contains one gas, and the outside surface of the tube is exposed to the other gas. To change the flat tube 616 or round tube 614 design to a multilayer design requires that the gas be controlled within the tube. The flat tube will be used as the example for additional discussion. In existing uses, the flat tube may have support members within, in order to control the flow of either air or fuel. The flat tube is porous, so that it allows its gas to diffuse outward to the electrodes 24, 26 and electrolyte 28. One embodiment of support members are ribs that give it structural strength, either in a vertical configuration (vertical ribs 620) shown in FIG. 105A or in an angled delta rib 622 configuration shown in FIG. 105B. Despite having the ribs, the interior of the flat tube 616 contains only one gas type in the channels 624. FIG. 106, clearly labeled as prior art, shows how the flat tubes are currently used, feeding one gas to one electrode. The curvy arrows show how the gas diffuses through the porous ceramic of the tube up toward the first electrode (can also diffuse downward, if electrodes are built on both sides of the flat tube).

Figure 107A:
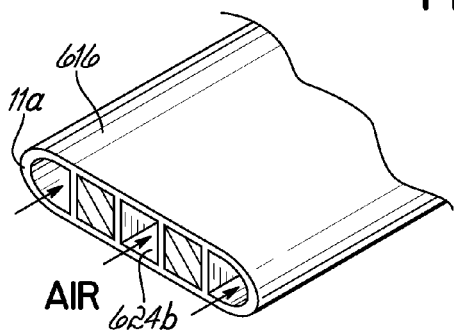
FIGS. 107A, 107B and 108 depict in partial perspective views use of flat tube channels in accordance with embodiments of the invention.
Figure 107B:
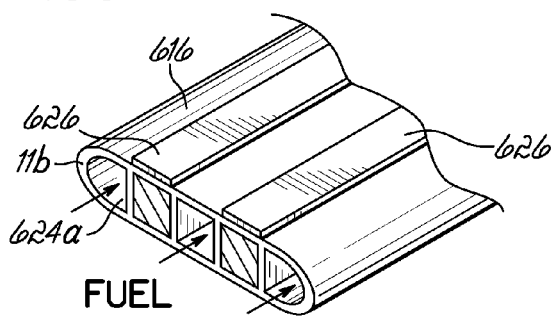
Figure 108:
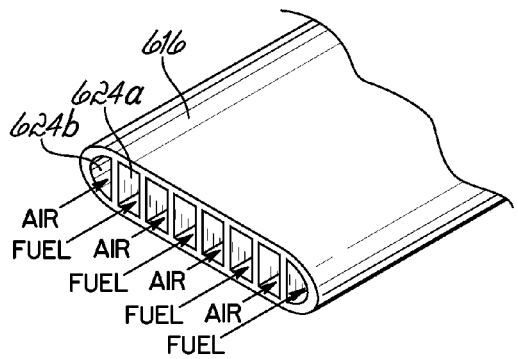

According to the present invention, the ribs 620 are used to divide the channels 624 into two alternating sets 624a, 624b so that some carry fuel (fuel channels 624a) and some carry air (air channels 624b), as shown in FIGS. 107A-107B. These flat tubes could be extruded for low cost, so alternating channels 624a, 624b could be sealed off at each end 11a, 11b to allow alternating flow of the gases in opposing directions. Sealing could be done with high temperature materials, such as glass or ceramic, or if in the cold region of the flat tube, it could be done with a low temperature material such as an organic or a silicone. Alternatively, the tubes could be molded in a way that seals off alternating channels at the time of manufacturing. As shown in FIG. 108, if desired, every channel 624a, 624b could be open at first end 11a such that both air and fuel enter and travel through neighboring channels 624a, 624b in the same direction. In this case, the ribs would need to be non-porous, and free of imperfections that would allow the two gases to mix. A connector could then be used to direct the correct gas to the correct channel 624a or 624b on the single end 11a, as shown in FIG. 108.

In addition, a cover 626 (a glass or dense ceramic, for example) could be applied to seal the flat tube in some areas, to control gas flow up through the porous tube, as illustrated in FIG. 107B. The uncovered porous surface could then allow the appropriate gas to diffuse upward into the appropriate pathways in the multilayer active structure. Any combination of the two could be incorporated—sealing off the surface of the porous tube, and allowing the porous areas to diffuse their appropriate gas up into the right areas.

Figure 111:
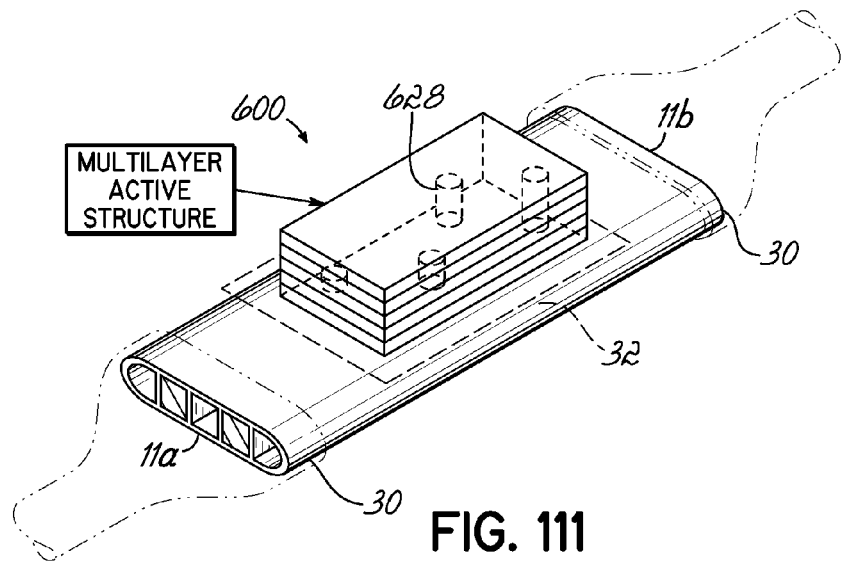
FIGS. 111-114 depict in schematic perspective views various embodiments for connection of a flat tube.

Alternatively, the flat tube 616 does not have to be porous in order to work in this design, as opposed to the one layer flat porous tube of the prior art. Instead, holes (an embodiment of which is later discussed with reference to FIG. 109) can be created that allow gas to leave the channels 624a, 624b and travel up into the multilayer active structure. These holes could be added to the flat tube 616 in the green state or the fired state. The flat tube 616 could extend out of the furnace so that one end 11a is easily manifolded in the cold area for one gas, and the other end 11b manifolded at the other end with the other gas (again at cold temperature) as seen in FIG. 111. Alternatively, a one-ended flat tube (e.g., as in FIG. 108) can exit the furnace, and both air and fuel could be provided into the channels 624a, 624b at that one cold end 11a. A complex connector can be used that meets the end 11a of the tube 11b, and provides both air and fuel into the appropriate channels 624a, 624b. In the furnace, holes within the flat tube 616 could allow gas to travel upward into the multilayer active structure. Air channels 624b could allow air flow into the multilayer active structure and fuel channels 624a could allow fuel flow in a similar manner. Individual holes could serve individual layers, or one hole could serve multiple layers.

Figure 110:
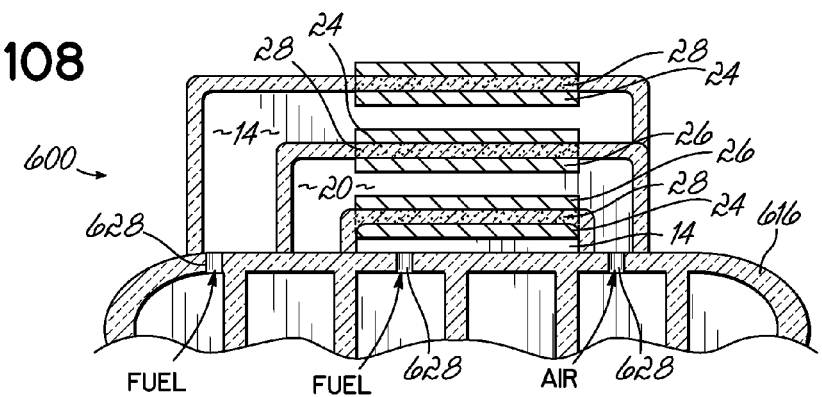
FIGS. 109 and 110 depict in schematic cross-sectional views embodiments of gas distribution from a flat tube to the layers of a multi-layer active structure.
Figure 109:
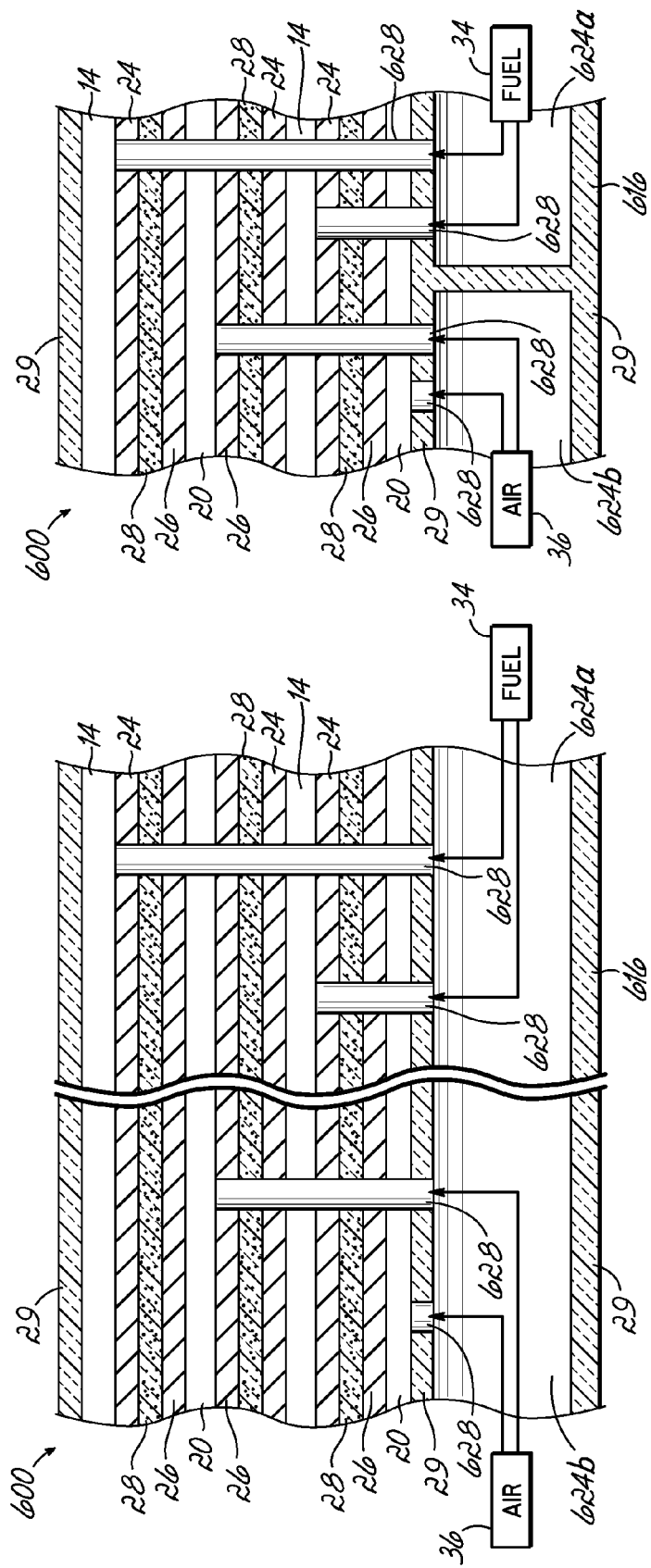

Within the multilayer active structure, it is possible to build any combination of series or parallel structures, as described in our previous drawings. As depicted in FIG. 109 for a Fuel Cell Stick™ device 600 of the present invention, it is possible to have the feed gas from within the flat tube enter into via paths 628, to take the gas up to the appropriate layer. Various techniques and designs can be used, such as columns, wall protrusions, offset passages, etc. so that the via path 628 can continue without the flowing gas leaving the via path. It should be noted that the bold vertical curved line is an illustration technique to point out that the illustration is not all in the same planar cross-section. An alternate method, depicted in FIG. 110, would be to have the gas passages 14, 20 distort at the side region of their extent, such that the gas path comes down to meet the flat tube 616. This might be simpler, given the way in which thick film materials will be added to the surface of the flat tube 616 to build up the multilayer active structure.

Figure 112:
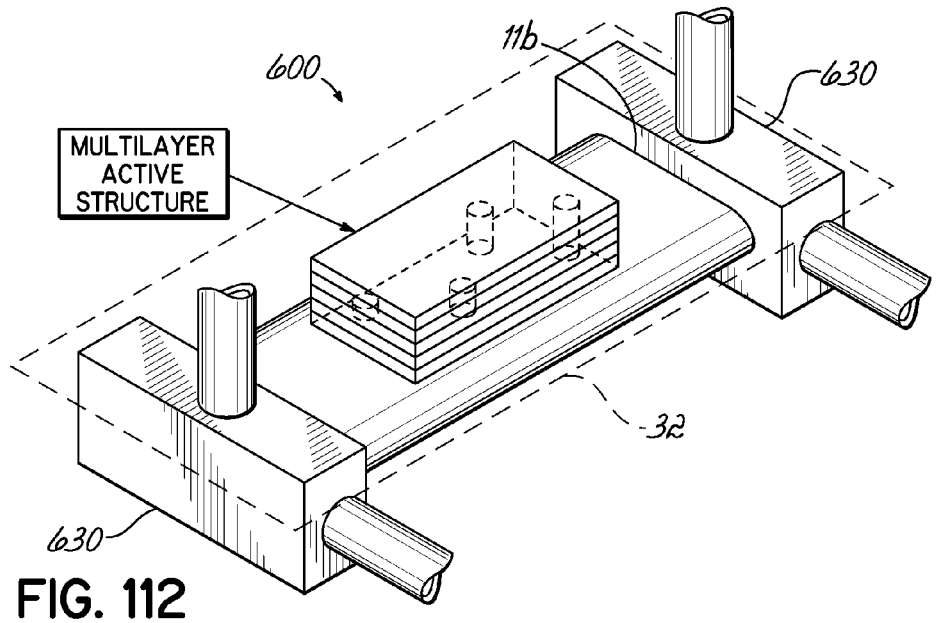

FIG. 111 depicts in perspective view a Fuel Cell Stick™ device 600 of the willing form where the ends extend out of the furnace, and more specifically a flat tube 616 positioned in a hot zone 32 with opposing ends 11a, 11b that emerge into a cooler zone 30 (could alternatively be one end emerging into a cooler zone), a multilayer active structure built up on the flat tube 616, and paths 628 for gas to diffuse up into the multilayer active structure. Alternatively, as depicted in FIG. 112 the ends 11a, 11b of the flat tube 616 could be inside the furnace, and attach to high temperature manifolds 630 for gas delivery.

Figure 113:
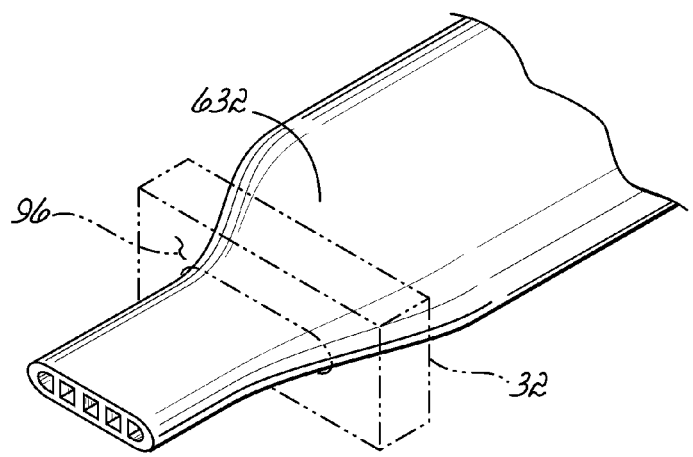

A variant of the flat tube 616 in the willing form according to the present invention would be a narrowing flat tube 632, wherein the width becomes less in the region where it passes through the furnace wall 96 as shown in FIG. 113. The interior design of the narrowing flat tube 632 could adapt the narrower end with the main area of the tube in a variety of ways. For example, the ribs could become spread out, from the narrow end to the main area so that all or some channels 624 increase in size, or, additional ribs 620, 622 could be in the interior, splitting the flow into additional channels 624 to feed more areas. By making the width of the narrowing flat tube 632 more narrow where it leaves the furnace, it would be less prone to cracking.

Figure 114:
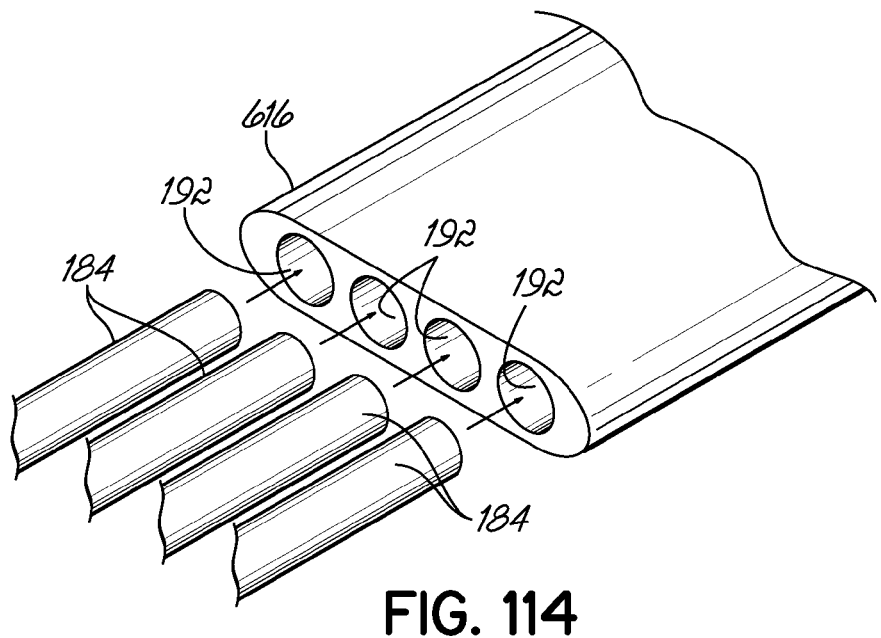

In the flat tube embodiments described herein, individual end tubes 184 could be inserted into the furnace to mate with the flat tube 616 (632) at end holes 192 as an alternative to manifolds 630, as shown in FIG. 114. Tubes 184 could be co-fired, could be permanently attached, or could be temporary and adhered with glass or mechanical pressure.

SOFCs operate well at high temperatures, traditionally at 800° C. According to an embodiment of the invention, it may be convenient to use what is called a see-through furnace for operation of the Fuel Cell Stick™ devices (10, 100, 200, 300, 400, 500, 600) of the present invention. One see-through furnace is the Trans Temp™ furnace made by Thermcraft, Inc. The tube furnace is an insulating tube with a heating element inside the tube, and with open ends. The center of the tube furnace can heat quickly to operating temperature. In the see-through furnace, the insulating tube is made out of multiple layers of quartz and/or glass tube, commonly two but possibly more, and the quartz layers can adequately insulate the furnace while allowing a person to see inside. Commonly, one of the quartz tubes is coated on the inside with a fine amount of reflective metal, such as gold, to reflect additional heat back into the furnace. The Trans Temp™ furnace is powered by a spiral electric coil in the furnace. In addition, the Trans Temp™ furnace could be heated by other means, such as gas-burning structures. Using the see-through furnace as a format for the operation of a Fuel Cell Stick™ device of the invention would allow easy inspection of the Fuel Cell Stick™ devices operating within the tube furnace.

By way of example, a motorcycle could be powered by SOFC technology, in which the tube furnace is positioned in the area that is typically used for the gas tank. A car could also be powered in this way. Similar to the concept of using a glass panel over the engine in the new Ferrari automobile designs so that people can see the engine, with a see-through SOFC furnace, people could look into the SOFC engine. Or in a house, an SOFC could power the entire house and use the see-through furnace. A century ago, the fireplace was the center of the house as the center of heating and cooking; in a modern house, the see-through SOFC furnace could be the psychological center of the house. In the car design, there might be more than one see-through furnace element. There could be four, side-by-side. Or four elements could be in the shape of a "+". Aside from aesthetics, the functional element of the see-through furnace design for SOFCs is the ability to view that the furnace is on and functioning properly. The artistic element of the design can inform other design aspects of the larger product or situation.

When the Trans Temp™ furnace is coated with gold, or is not coated, then the color of the furnace is substantially yellow-orange. According to the present invention, a different element may be used to coat the inside of the silica (quartz), or to dope the silica tube, whereby the color could be varied to blue, green or any other color imaginable.

Thus, the present invention contemplates a Fuel Cell Stick™ device wherein the hot zone 32 is provided by a furnace structure that has clear (see-through) walls 96, 96', or 96". In addition, the hot zone walls 96 may be coated or doped with an element that causes the hot zone 32 to glow substantially in a color that is not orange (blue, for example). The furnace (hot zone) 32 may be heated with burning fuel or with resistance wires. Also contemplated is a vehicle that is powered in whole or part by an SOFC, where the hot zone 32 for the SOFC is created using a see-through furnace, or multiple see-through furnaces. Also contemplated is a home heating furnace with see-through walls 96, 96', or 96" powered at least in part by Fuel Cell Stick™ devices as described herein. All embodiments above for Fuel Cell Stick™ devices, including tubular Fuel Cell Stick™ devices, can include a see-through hot zone 32.

The embodiments above have been described in detail in relation to SOFCs. However, the embodiments may also apply to molten carbonate fuel cells (MCFCs). The main difference in the concept is that the electrolyte has changed, from zirconia to molten carbonate (for example, lithium carbonate or sodium carbonate). The carbonate becomes molten at higher temperatures and is able to conduct oxygen ions across (in the form of $CO_3$). The molten carbonate is held in capillaries within a porous ceramic, such as $LiAlO_2$. The anode and cathode are both based on nickel in MCFCs, rather than the LSM generally used in SOFCs. The structural zirconia for SOFCs is replaced by the porous $LiAlO_2$ with carbonate in the pores. And, $CO_2$ is added with the air flow. The willing form, which is the overall structure for the Fuel Cell Stick™ devices of the present invention, can be adopted for MCFCs.

The present invention further contemplates using ammonia ($NH_3$) as the fuel for the Fuel Cell Stick™ device. Ammonia supplies the H+ ion on the anode side, just as a hydrocarbon or $H_2$ would. The advantage of using ammonia is that, like $H_2$, it does not emit any $CO_2$. A disadvantage of $NH_3$ as a fuel, however, is toxicity.

The present invention also contemplates the use of Fuel Cell Stick™ devices to convert a jet engine over to an electric engine configuration, by which it is possible to gain higher fuel efficiency. Use of Fuel Cell Stick™ devices to generate the engine power would reduce fuel consumption and also the fuel load necessary for a flight. Instead of being called jet engines, the propulsion device would be called ducted fans, or just fans if they don't have external cowlings. It is estimated that a ducted fan could replace a jet engine on a Boeing 737 if 10 MW of power were available. Using the advanced density goal of 1 MW/ft³ for a Fuel Cell Stick™ device assembly, it is reasonable to generate this kind of power on the airplane. Multiple separate units may be used to generate 10 MW, in particular, possibly 10 modules, each generating 1 MW. By having the power generation modules on the wings, they can be as close as possible to the engines, so that resistive losses within the wiring are reduced. An alternate design to having the SOFCs in the wings would be to have them in the fuselage. The vibration in the fuselage would be less than the vibration in the wings, thus the fuselage might prove to be a better location. The conductivity issue of delivering power from the fuselage to the wings could be overcome by operating at higher voltages when transmitting power. Or, it might be useful to use high temperature ceramic superconductors to travel that distance. Thus, according to the present invention, an aircraft is provided that uses an electric propulsion system, where the power generated to run the electric propulsion system is produced in multiple SOFC modules. One embodiment of an electric propulsion system would be a fan, either ducted or unducted. In addition, these modules may be located in the wings of the aircraft.

According to another embodiment of the invention, the air channel and the cathode are combined, and/or the fuel channel and the anode are combined, using tubes of micro or nano size. By combining these features, the Fuel Cell Stick™ devices can be made with higher power density (KW/L) and more rugged design. Instead of having an air passage 14, 20 for the flow of air and fuel adjacent the anode 24 and cathode 26, respectively, the flow gaps occur within the anodes and cathodes by providing microtubes or nanotubes (referred to collectively as micro/nano tubes) within the anode and cathode. This can significantly improve the gas distribution within the anode and cathode. Currently the anode and cathode are porous, and the gases diffuse throughout those pores. In practice, the gases may not diffuse quickly, possibly because the pores are randomly distributed so the gas flow must navigate a tortuous path. By having micro/nano tubes, which are defined as paths or channels within the anodes 24 and cathodes 26 that are significantly straighter and longer than the random pores themselves, improved fuel utilization can be achieved.

Figure 115A:
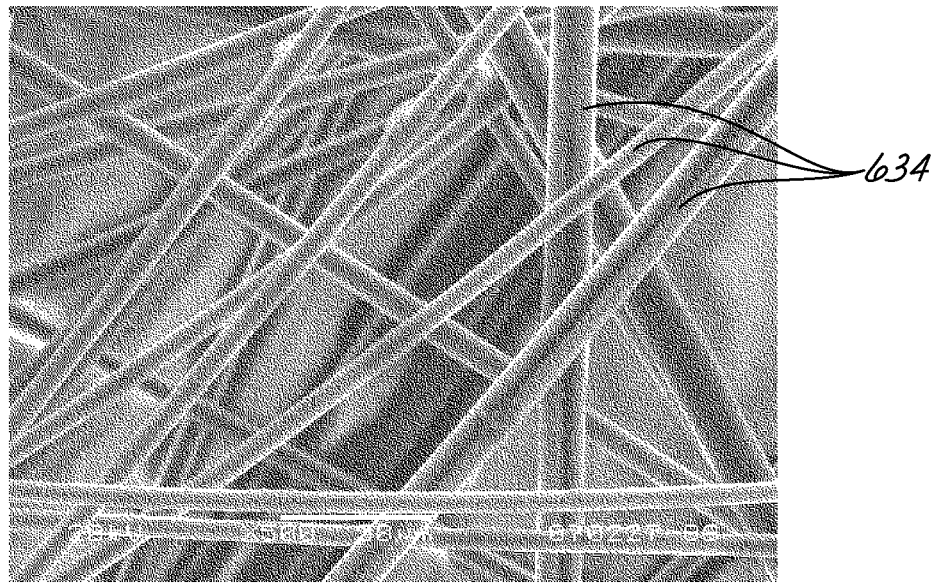
FIG. 115A is a micrograph at 500× magnification of fibers for forming microtubes.

In practice, fibers 634 may be inserted into the anode and/or cathode materials. By way of example, carbon fiber material may be used. The fiber may be a mat type cloth 636, such that the fibers are relatively short in length, randomly distributed, and crushed or pressed into a thin sheet, as shown in the micrographs of FIGS. 115A (500× magnification) and 115B (200× magnification). It is expected that any type of organic cloth or weave may be used. Alternatively, long particles may be distributed within the electrode paste to give long voids after firing. A carbon twill weave may be particularly useful because the majority of fibers can be easily oriented in the preferred flow direction.

Figure 115B:
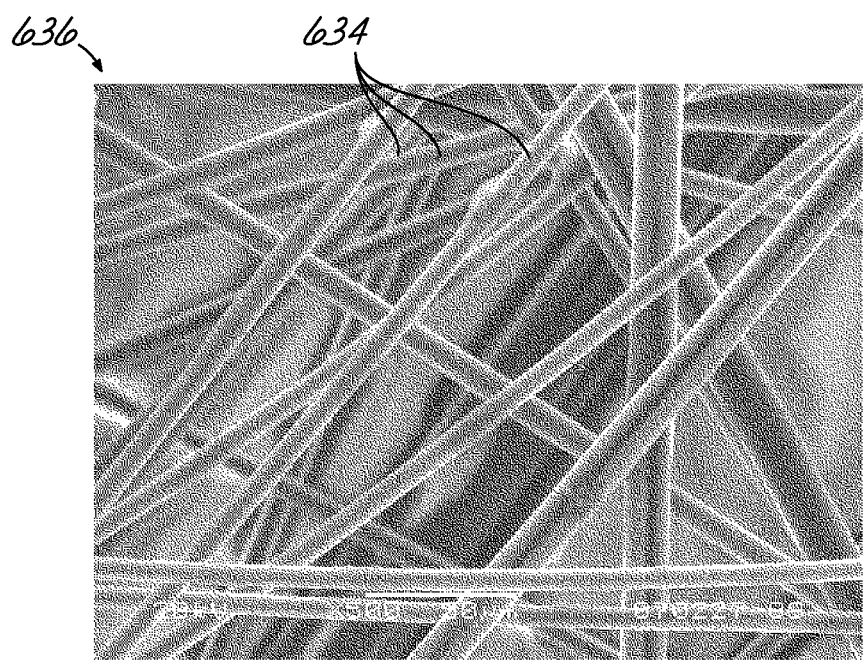
FIG. 115B is a micrograph at 200× magnification of fibers for forming microtubes.

In FIGS. 115A and 115B, the diameter of the fibers 634 is 5-10 μm. It would be possible to have them be much smaller, i.e., nano-sized, with a higher number of fibers per area. By way of example, nanotubes having a diameter in the range of 1-100 nm may be used. Alternatively, microtubes having a diameter in the range of 0.1-100 μm may be used. Generally, the tubes may have diameters as small as about 1 nm or less, and as large as about 100 for example in the range of 50 nm to 50 μm.

Figure 116A:
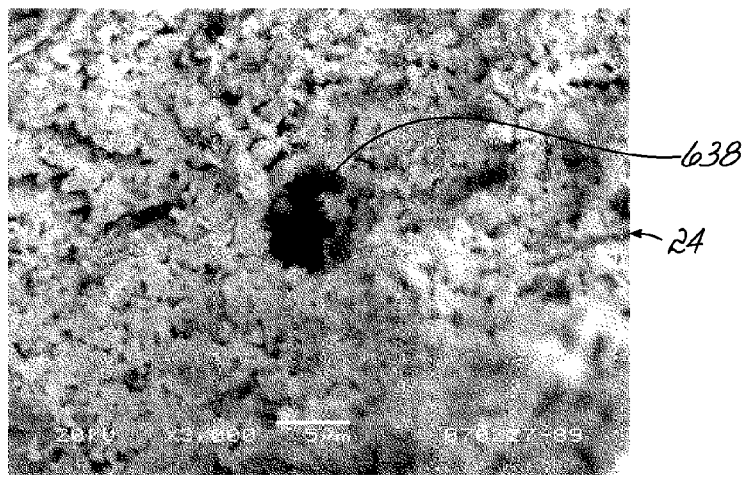
FIGS. 116A-116C are micrographs showing microtubes formed in a fired electrode.
Figure 116B:
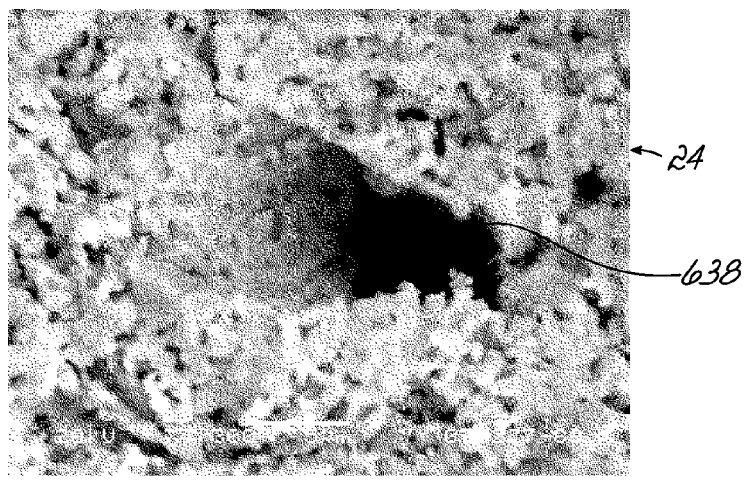
Figure 116C:
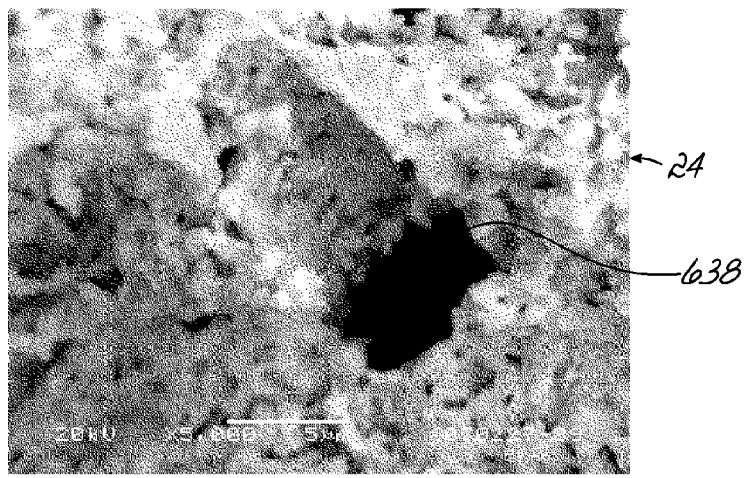

The fibers 634 can then be impregnated with the electrode paste. This paste is already of a porous nature, and includes graphite powder to help provide additional pores on the scale of 0.5-3 μM After bake-out and sintering, the fibers shown in FIGS. 115A and 115B and graphite powder will provide a network of pores and micro/nano tubes within the electrode that can increase gas distribution. For carbon fibers, they will disappear after about 750° C. during the firing profile. FIGS. 116A-116C are micrographs at increasing magnification showing microtubes 638 formed in a fired electrode, specifically three different channels formed in an anode 24 by bake-out of carbon fibers of 5-10 μm diameter.

This embodiment gives good distribution of fuel and air within the anode 24 and cathode 26, and allows for elimination of the fuel and air flow passages 14, 20 in the region of the anodes and cathodes, since there is no need to have the fuel and air flowing over the anode and cathode if the fuel and air can flow through the anode and cathode. Moreover, if the gaps over the anode and cathode are eliminated, then the anode and cathode can touch the next electrolyte 28 in the multilayer structure, giving dramatically improved strength to the multilayer structure.

It may be appreciated that the use of micro/nano tubes 638 may find use in any multilayer fuel cell structure, whether or not it is a structure with the willing form that travels from hot to cold. This embodiment can be used on square plates, or on the surface of tubes. It is especially powerful when designing a system that is multilayer in nature, or has 3D scale to the design.

In the multilayer Fuel Cell Stick™ device, samples have been made, for example, that are on the order of 0.010" pitch between successive layers of cells, i.e., 0.010" from electrolyte to electrolyte. That 10 mils includes about 2 mils of gap for the flow of fuel or air. By eliminating the 2 mils of gas flow thickness in accordance with the present embodiment, the power density (KW/L) can be increased by 20%, which is dramatic. However, it may be appreciated that the micro/nano tubes 638 in the anode and/or cathode may be used in combination with the air/fuel passages (gaps) to increase flow, rather than as a means to eliminate the gaps.

Figure 117:
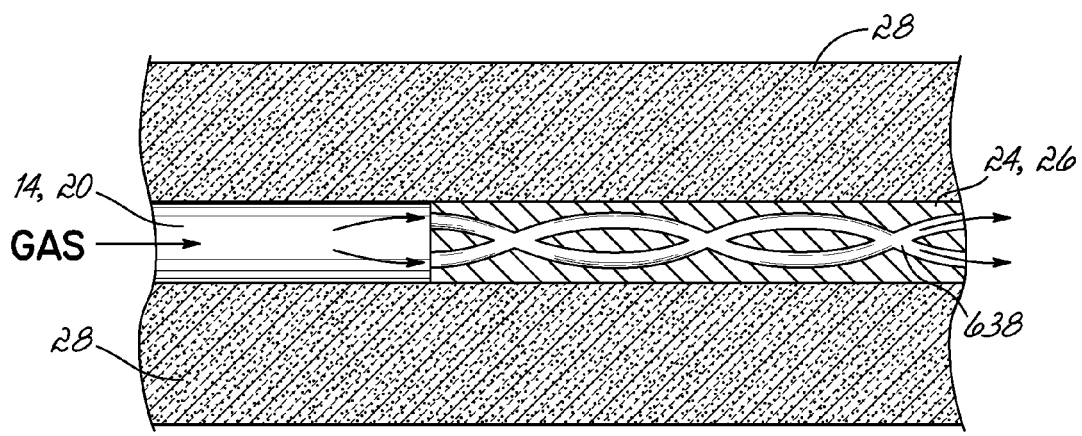
FIGS. 117 and 118 are detail cross-sectional schematic views of embodiments of a gas flow path intersecting an electrode having microtubes therein.
Figure 118:
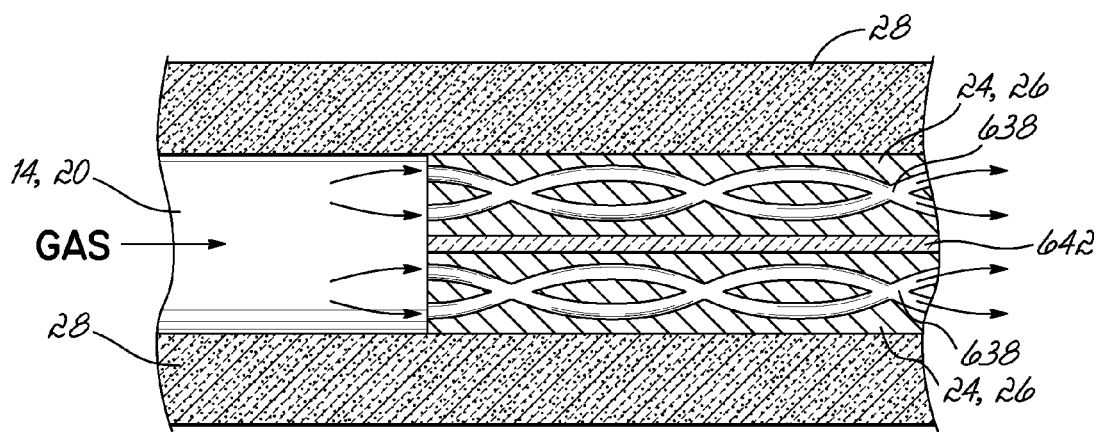

According to another embodiment for Fuel Cell Stick™ devices of the invention having a hot zone 32 and at least one cold zone 30, the method of making the fuel and air passages 14, 20 would stay the same in the region of the path from cold to hot, and in the hot zone, the fuel flow would occur through the pores and micro/nano tubes 638 in the electrodes. The open channels (14, 20), for example two mil (0.002") channels, provide convenient, low flow resistance paths for the gases to enter. Because these paths are on the order of the same thickness as the anodes 24 and cathodes 26, the open gas flow channels (14, 20) can come right up to the edge of the anode 24 and cathode 26 in the hot zone 32, as depicted in FIG. 117. The channels (14, 20) can be oriented to allow the air and fuel to enter the anode 24 or cathode 26 from the side, if desired. In FIG. 117, the anode 24 or cathode 26 serves two electrolytes 28 in a parallel schematic, one above and one below the anode 24 or cathode 26. For a series design, a divider 642 can be placed between two portions of the anode 24 or cathode 26, as shown in FIG. 118. The divider 642 would be an insulator, such as zirconia or electrolyte material.

Figure 119:
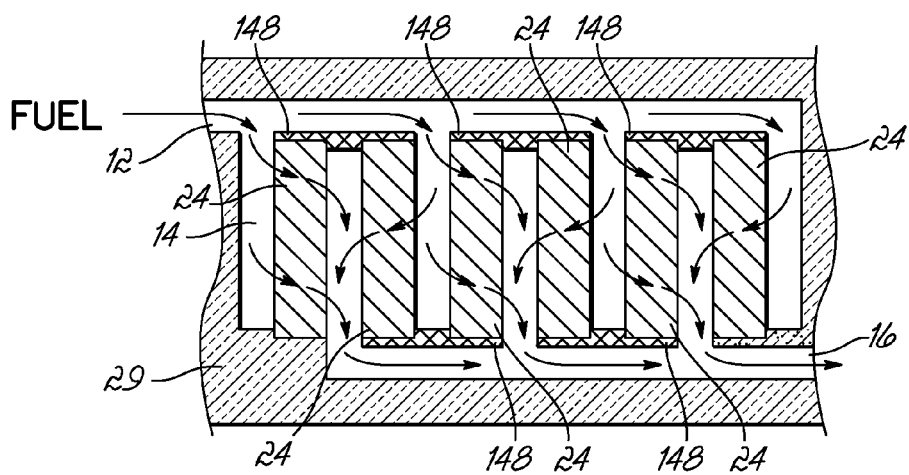
FIG. 119 is a top down schematic cross-sectional view of a series design in which gas flows through an electrode into other gas passages.

In a more complex format, such as a series design using connector electrodes 148, for example, this method can be used to feed many anodes 24 or cathodes 26 at once. It is optimal to have an individual cell be short and wide, in order to reduce the resistance. The micro/nano tubes 638 can be used in that regard, because the tubes will have a higher flow resistance than a large gap would, such that the short, wide nature of the cells will work well to allow adequate gas flow and improved fuel utilization, which is one of the major goals of any fuel cell. A top down schematic view of a series design is shown in FIG. 119, emphasizing the flow of gas into and out of the cells. For clearer description, the example of the fuel side will be used. Since this is a top down view, the surface being seen is that of an anode 24. The electrolyte 28 and the cathode 26 are hidden from view. The arrows represent fuel flowing into the anodes 24. The fuel enters the sides of the anodes 24 where a portion of it then turns towards the electrolyte, while some of it continues through the anode towards the fuel outlet 16. Again, the thickness of the combined regions of gas flow and anode or cathode is the same, and it is minimized, because the fuel passage 14 is alongside the anodes 24, not over them.

Small devices for low power production are also desirable in the art of fuel cells. For example, a miniature power supply that provides 20 W for 100 hours could be used by the military. To that end, one design for a Fuel Cell Stick™ device 700 is to have two stick-shaped entrances 702a,b coming into a large area 704 of the miniature device, but both from the same side, as shown in side view in FIG. 120. One stick entrance 702a handles air, the other stick entrance 702b handles fuel. The large area 704 is the active area positioned in a hot zone 32. By having both gases enter from the same side, the overall volume is reduced compared to having one entrance on each side of the Fuel Cell Stick™ device 700. In addition, the area is also reduced when compared to having a single longer entrance path, with sequential entrances for the air and the fuel. The size of the device 700 shown in FIG. 120 (in terms of the square area) might be 1" square, or 3"×3", for example.

According to another embodiment, the large area 704 of the Fuel Cell Stick™ device is split into multiple sections. If the Fuel Cell Stick™ device is designed with 20 active layers, each filling the large area shown in FIG. 120, then it would be advantageous for heat transfer to have the area split. The split area would be like pages in a book. The spine of the book, where the gas feed tubes enter, could be completely solid, or completely divided, or partially divided, as shown in top and perspective view in FIGS. 121A and 121B, respectively.

Figure 122:
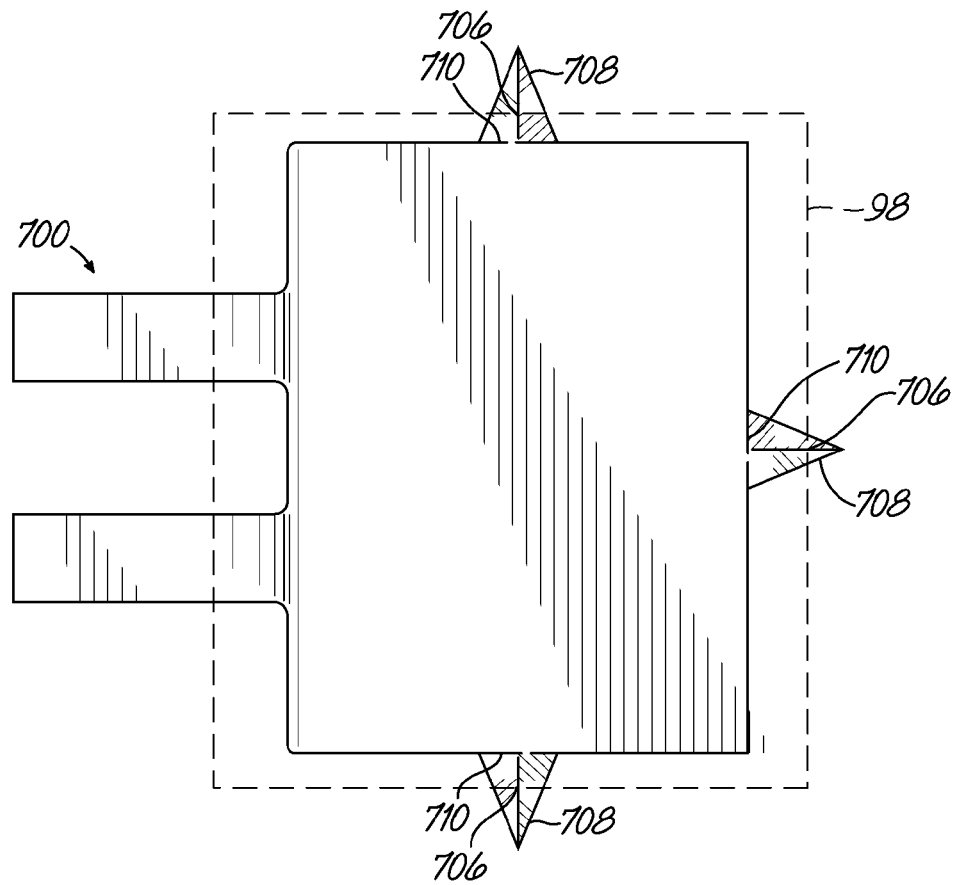
FIG. 122 is a schematic side view of the Fuel Cell Stick™ device of FIG. 120 having stabilization points thereon.

Finally, in a Fuel Cell Stick™ device 700 that is intended to be portable, it would be useful to have stabilization points 706 on the device, as shown in FIG. 122. These could take the shape of spines 708 that emerge from the device, but only serve to extend into the insulation 98 of a miniature furnace, and thereby dampen vibration and hold the Fuel Cell Stick™ device 700 steady. The spines 708 could take a variety of shapes, but ideally would be of small cross-section so that they do not conduct heat away from the device. They could be pointy for strength, with a larger connection 710 at the main body of the Fuel Cell Stick™ device 700. In addition, the stabilization spines 708 could be used in any of the embodiments described herein, regardless of whether the device will be portable.

As the size of the Fuel Cell Stick™ device becomes larger, so as to achieve higher power, one possible challenge is that gas and/or air flow can be restricted within the narrow passages (flow channels). As the flow passages become narrower, thinner and longer, the flow rate may be reduced. Without wishing to be bound by theory, the flow rate reduction seems to be a viscosity effect. In addition, the gas and/or air flow within a certain cross-section may be decreased as temperature increases.

Another consideration is that a certain amount of fuel flow is required to achieve each watt-second of power. By way of example and estimation only, preliminary investigation has found that hydrogen gas in a Fuel Cell Stick™ device of the invention can produce at least on the order of 11 watt-seconds/milliliter. At 0.1 ml/s flow rate of H2, a Fuel Cell Stick™ device of the invention can produce 1.1 watts. Based on this investigation, higher power requires higher flow rate.

Yet another consideration is that the overall density (kW/l) of the Fuel Cell Stick™ device depends on the thickness of the various components, including the flow passages. Any attempt to make the flow passages thicker for a higher power device would offset the density achievement of the smaller device and lessen the overall success of the design. Thus, there is a need to provide good flow rates when increasing the overall size of the Fuel Cell Stick™ device for higher power but without sacrificing density.

In the example of a short Fuel Cell Stick™ device, e.g., 2 inches long to 6 inches long, the wattage per layer is limited by the area, and therefore the thin flow passages are acceptable. In addition, embodiments have been described (e.g., FIGS. 32A-32B; FIGS. 117-118) in which thicker flow passages 14a (or pre-heat chamber 13) lead to the active area 33b, and then thinner flow passages 14b (or microtubes 638) extend through the active area 33b, as shown schematically in cross-section in FIG. 123, in order to maximize flow rate while not adding additional thickness to the Fuel Cell Stick™ device 10. For example, in an active area 33b, if the fuel passage 14b is one mil and the anode 24 is two mils (three mils total, or 0.003"), then a three mil fuel passage 14a can lead to the active area 33b without sacrificing overall density of the Fuel Cell Stick™ device 10. The three mil fuel passage 14a will allow greater flow rate (have less resistance to flow) than the one mil thickness of the fuel passage 14b in the active area 33b. So in the case of a short Fuel Cell Stick™ device 10 with individual gaps on each layer, where the milliliters per second of gas flow required to serve one layer is not great, it is still possible to have high power output per Fuel Cell Stick™ device 10 by increasing the layer count, to say 100 layers.

On the other hand, it is possible to have a much longer device, e.g., 20 inches or longer, where the total layer count is lower, say 20 layers, and the total power per layer is much higher. In that case, a different approach to the flow passages will be useful in providing the needed flow rates without sacrificing density.

According to one embodiment, a Fuel Cell Stick™ device is provided with larger flow passages outside of the active area, generally traveling down the length (i.e., in the x direction) of the Fuel Cell Stick™ device, and more narrow flow paths across the active areas, in the short direction (i.e. the width or y direction). The large flow passage provides a main artery to the Fuel Cell Stick™ device, and is thus referred to herein as an artery flow passage, while the side-to-side passages feed the active area, and are thus referred to herein as active flow passages, with a thin cross-sectional gap that improves overall density. The artery flow passage is large enough in cross-section (i.e., in thickness or z direction and width or y direction) that it does not suffer significant restrictions to flow, based on how much flow is desired to power the Fuel Cell Stick™ device. The thin cross-sections of the active flow passages across the Fuel Cell Stick™ device are useful in two ways, namely, they are short in distance (in the y direction) and they are wide in cross-section (in the x and z directions), giving low resistance to gas flow.

In the embodiment previously described and depicted in FIGS. 41A-B, a similar concept is disclosed, wherein a single fuel passage 14 feeds the reaction of multiple air passages 20. Also, in the tubular Fuel Cell Stick™ devices 200, 300 and series designs disclosed above, FIGS. 89 and 119 depict a single common fuel feed passage that feeds multiple branch passages.

FIGS. 124A-124C show a Fuel Cell Stick™ device 800 according to another embodiment having a flow path utilizing a main artery flow passage 814 down one side of the Fuel Cell Stick™ device 800, and then an individual active flow passage 815 or a plurality of active flow passages 815 across the active area 33b to the opposing side. (Passages for only one of the two gases, fuel and air, is shown for simplicity. In later embodiments, passages for both gases will be shown, where reference numeral 820 will be used for the artery flow passage of the second gas and reference numeral 821 will be used for the active flow passages of the second gas.) According to this embodiment of the invention, one larger artery flow passage 814 can serve active flow passages 815 on multiple active layers (e.g., shown in perspective view in FIG. 124A), and on one active layer, the artery flow passage 814 can serve multiple active flow passages 815 that are side by side (e.g., shown in top view in FIG. 124C) and spaced apart in the x direction (referred to also as "sub-passages" or "side-by-side passages"). The reduction in flow resistance is proportional to the effective width of all the side-by-side passages 815. There is expected to be an advantage to having many active flow passages 815 running in parallel in terms of gas flow: gas flow is expected to be slower in a thin, single active flow passage 815 that is 10 inches long and 0.5 inch wide running along the active length of the device compared to flow through 10 active flow passages each 1 inch long and 0.5 inch wide running along the width of the device. A contemplated design would have an artery flow passage 814 running in the x direction of the length of the Fuel Cell Stick™ device 800, and one or more active flow passages 815 running across the Fuel Cell Stick™ device 800 in the short y direction; however, the invention is not limited to that particular arrangement as other arrangements are possible without departing from the scope of the invention. In addition, multiple active flow passages 815 (i.e., the active flow passage 815 of an active layer comprises multiple "sub-passages") have the benefit of operating independently, such that if a failure occurs, such as a crack, in one of the active flow passages 815, the others continue to function. There would thus be a fractional loss of power rather than a total loss of power.

FIGS. 124A-124B show a semicircular gap that forms the artery flow passage 814, and a layer of green ceramic sheet 829 wrapped around the Fuel Cell Stick™ device 800 to help form the shell around the gap, as most clearly shown in perspective view in FIG. 124B. Another way to achieve this same design without the wrapping technique is to insert a gap-forming material into the Fuel Cell Stick™ device in an area where the internal sheets of green ceramic are less wide, or where some portion of the internal sheets are removed. Considering FIGS. 125A-125C, green ceramic sheets of different sizes can be used together with gap forming materials to build the green structure.

In FIG. 125A (partial green, assembled perspective view), by way of example only and not limitation, for a 1 inch wide Fuel Cell Stick™ device 800, a plurality of 1 inch wide green ceramic sheets 829 can be used, at full width for the top and bottom portions of the device 800, i.e., the portions above and below the artery flow passage 814. For example, 10 sheets each 2 mils thick could be used for each of the top and bottom (only three sheets are shown) for a 20 mil thickness in each portion. In the center portion, a 0.15 inch section can be removed from each of a plurality of green ceramic sheets 829 to leave a 0.1 inch section 829a and a 0.75 inch section 829b to be placed on either side of an artery gap-forming material 872 that is 0.15 inch wide. For example, 40 sheets each 2 mils thick could be used for the center portion (only 10 sheets are shown) for a 80 mil thickness in the center on each side of the artery flow passage 814. In place of one or more of the 0.75 inch sheets 829b, a thin gap-forming material 874 may be used to form the active flow passages 815 (two are shown). Upon lamination and firing, the artery and thin gap-forming materials 872, 874 are burned out of the device 800 to form a large side artery flow passage 814 down the length and active flow passages 815 across the width.

Figure 125B:
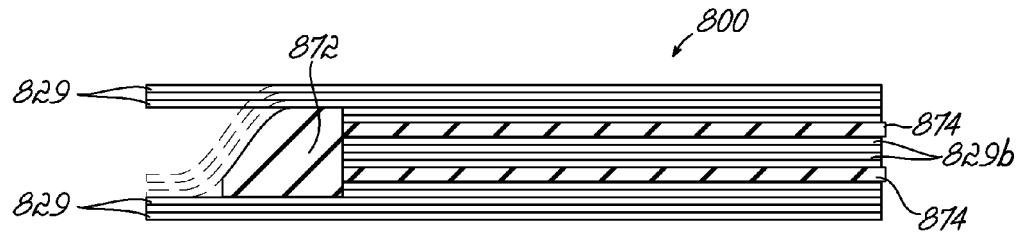
Figure 125C:
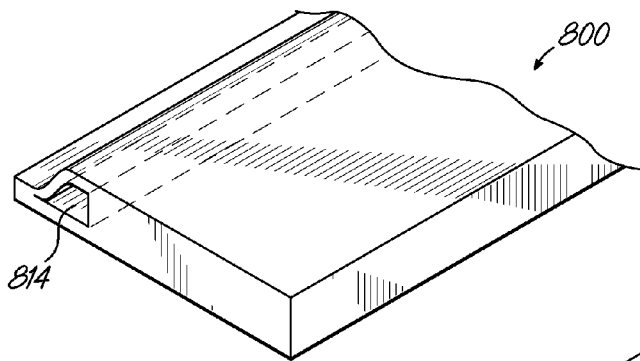
FIG. 125C depicts in perspective view the resulting device of the method of FIG. 125B.

In FIGS. 125B and 125C, depicting a partial green, assembled cross-sectional view and a schematic laminated, fired perspective view, respectively, a similar approach is used for the top and bottom portions of the Fuel Cell Stick™ device 800, but in the center portion, a plurality of 0.75 inch green ceramic sheets 829b are placed on one side (shown on right side) of the artery gap-forming material 872 and no ceramic is placed on the other side. Upon lamination, the green ceramic sheets 829 from the top (and/or the bottom, not shown) form around the artery gap-forming material 872 (shown on left side) to meet the 0.1 inch edge portion of the opposing bottom sheets 829. Upon firing, a contoured Fuel Cell Stick™ device 800 is formed, with a shaped artery flow passage 814.

To achieve interconnection from the artery flow passage 814 to the individual active flow passages 815, also shown in FIGS. 125A and 125B are thin strips of gap-forming material 874 extending from the artery gap-forming material 872 to the opposing side of the Fuel Cell Stick™ device 800 in the center portion. When all the gap-forming material 872, 874 is gone, then the flow connection is made. The gap-forming materials 872, 874 for both the artery flow passage 814 and the active flow passages 815 are discussed above, e.g., organics (including plastics), carbon, wax, or a solid piece coated with wax that is removed after lamination.

Figure 126A:
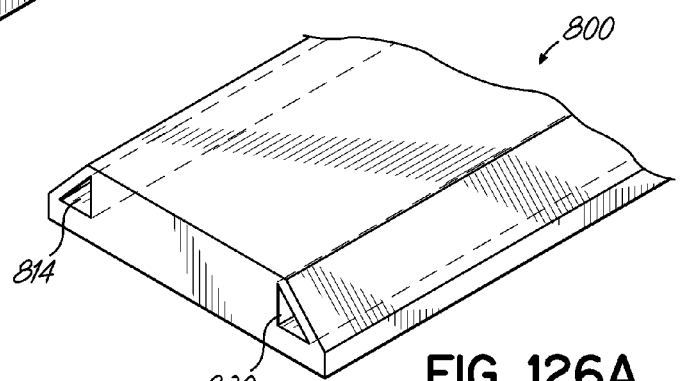
FIGS. 126A-126C depict in perspective views embodiments having shaped edges and shaped artery flow passages.
Figure 126B:
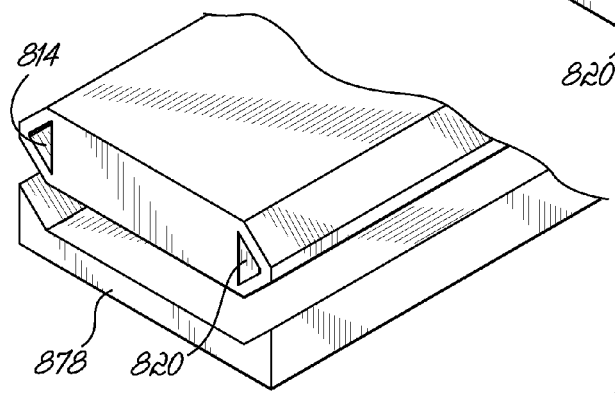

FIG. 126A shows in a partial perspective view a triangular artery flow passage 814. This shape can be achieved in a lamination process where the force of lamination is coming down from the top, and where the underside of the Fuel Cell Stick™ device 800 is supported by a fixed plate. This force is common for mechanical pressing or hydrostatic (also called isostatic) lamination. FIG. 126B shows in a partial perspective view a similar triangular artery flow passage 814, but one in which the final shape of the Fuel Cell Stick™ device 800 has been modified. By pressing into a fixed plate 878 that has been shaped, it is possible to create a final device form that is symmetric, giving better structural strength.

Figure 126C:
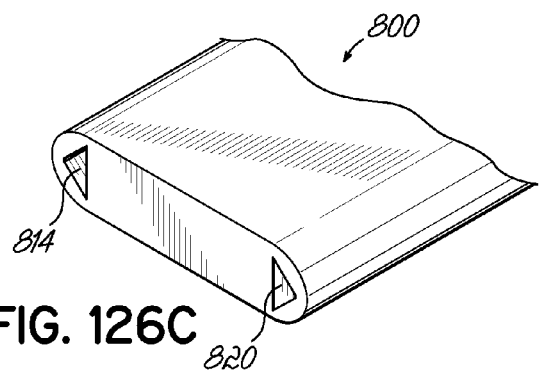

FIG. 126C shows in a partial perspective view a further modification of the final form, for example by machining, shaping or carefully laminating the Fuel Cell Stick™ device 800 to round all the edges. A completely rounded edge shape can reduce mechanical stress and reduce the risk of cracking.

In some embodiments, the artery flow passage design only helps the flow of one gas, for example, the gas that has a slower flow rate (higher seeming viscosity), while the other gas that flows faster uses a straight passage, as described in numerous prior embodiments. As shown in perspective view in FIG. 127, for example, hydrogen flows faster than air in equivalently sized passages, so it may be beneficial to flow air through an artery flow passage 820 to active flow passages 821, while fuel flows through a straight fuel passage 14.

In a further embodiment, exit (vein) pathways are provided that are similar to the entrance artery flow passages 814. This allows further control of the gases, if desired. FIGS. 128A-128B (perspective view and schematic top view, respectively) show an entrance and exit design (depicting only one gas type, for simplicity). As shown, gas flow proceeds through artery flow passage 814 along the length on one side of Fuel Cell Stick™ device 800 to the active area 33b, then across the width through one or more active flow passages 815, and then through the exit pathway 816 along the length on the other side of the device 800. The exit point can occur inside or outside the hot zone, emerging from the Fuel Cell Stick™ device 800 at any desired position.

In another embodiment, depicted in FIG. 129A in schematic cross-sectional view, smaller artery flow passages 814, 820 are placed individually on the active layers, without reducing the overall density of the Fuel Cell Stick™ device 800. If in the active region 33b of a Fuel Cell Stick™ device 800, on one side of an electrolyte 28, the anode 24 is 3 mils (0.003") thick and the fuel passage 14 (active flow passage 815) is one mil thick (0.001"), then the total thickness of those two features is 4 mils (0.004"). In the side margin, a gas artery flow passage 814 is provided at 4 mils thick total without adding to the overall thickness of the Fuel Cell Stick™ device 800. Similarly, cathode 26 and air passage 20 (active flow passage 821) have a total thickness and are served by an artery flow passage 820 of equal total thickness. Based on simple principles of fluid flow, the 4 mil artery flow passages 814, 820 on the sides will have much higher flow rate (lower resistance) than the 1 mil active flow passages 815, 821 (fuel passage 14 and air passage 20), and therefore will be able to serve a large area of 1 mil active flow passages 815, 821 traveling side to side in the Fuel Cell Stick™ device 800. FIGS. 129B and 129C further depict this embodiment in schematic perspective views showing a single artery flow passage 814 feeding a single active layer and multiple artery flow passages 814 feeding multiple active layers, respectively (the opposite flow passages are not shown for simplicity).

In practicing this embodiment, it might be useful to have two active layers be served by an 8 mil artery flow passage 814, or three layers be served by one 12 mil passage 814. In effect, there could be a compromise design between the design in FIG. 129C, where one artery flow passage 814 serves one active layer, and the design in FIG. 124A, where one artery flow passage 814 serves all the active layers (of a given type, anode or cathode), which could be tens of layers, or a hundred layers.

With the above concepts in mind, it may be contemplated that both gaseous materials could benefit from the higher capacity flow rates of the artery concept. A dual artery Fuel Cell Stick™ device 800 is shown in perspective view in FIG. 130. A first artery flow passage 814 enters from a first end 11a of the Fuel Cell Stick™ device 800, and a second artery flow passage 820 enters from a second end 11b of the Fuel Cell Stick™ device 800. Both flows exit out the sides. As set forth in prior embodiments, any combination of geometries are possible, such as a design where both gases enter from one end or both ends of the Fuel Cell Stick™ device 800.

In FIGS. 25A-27B described above, shaping of the Fuel Cell Stick™ devices 100 was described to allow larger active areas 104 (wider sticks), while still allowing for narrow elongate sections 102, 106 that exit from the furnace. This design can be used with the artery concept. In one method/device that would give simplicity to the overall system, the artery flow passages 814, 820 are straight and the Fuel Cell Stick™ device 800 is shaped in a different region, as shown in perspective views in FIGS. 131A-131C (not to scale). The shaping may be achieved by machining, for example. The Fuel Cell Stick™ device 800 in FIG. 131B is shaped to give an asymmetric shape with rotational symmetry. The artery flow passages 814, 820 can be in the center of the Fuel Cell Stick™ device 800 or on a side of the Fuel Cell Stick™ device 800. The placement of the artery flow passages 814, 820 can increase active areas within the Fuel Cell Stick™ device 800, and in some embodiments, it may be advantageous to have the artery flow passages 814, 820 down the center, serving active areas on both sides, as shown in FIG. 131C. According to one embodiment, the curved portions of the devices 800 remain in the hot zone 32, and only the narrow end regions 11a, 11b exit from the furnace and serve as the cold ends. Thus, although depicted as relatively short and wide devices, the drawings are not to scale, and the devices in actuality would likely be long and narrow with the shaped portions configured to permit the wide active portion to reside fully within the furnace and the narrow end portions to reside largely outside of the furnace.

In designing the layout of Fuel Cell Stick™ devices 800 with large artery flow passages 814, 820, careful consideration should be given to the design of the exits. If the side artery flow passage 814 is large, for example in the embodiment of FIGS. 124A-124C, then it may not be possible to have the active flow passages 815 exit through the opposite side of the Fuel Cell Stick™ device 800 because the exit path would intersect the opposite gas artery flow passage 820. To solve this problem for certain Fuel Cell Stick™ devices 800, a third dimension (the vertical z direction) is added to the flow paths such that the active flow passages 815, 821 terminate with vertical gas exit holes 817, 823, as depicted in FIGS. 132A (schematic end view) and 132B (schematic internal top-down view), and also referred to as vertical flow channels.

The vertical gas exit hole 817 must not intersect the opposing gas artery flow passage 820, and it must not intersect the opposing gas active flow passages 821 (and vice-versa). The shape of the two gas flow pathways, that feed the anode and cathode in FIGS. 132A-B, have rotational symmetry.

These vertical exit holes 817, 823 could be similar to traditional vias, punched in green tape and stacked to give paths to the surface. Alternatively, the vertical exit holes 817,823 could simply be drilled into the finished green Fuel Cell Stick™ device 800. Based on this design, it is useful to have the stacking of cell layers be aligned from bottom to top, with the active areas stacked uniformly over each other, so that each drilled hole can intersect multiple gas escape points.

Figure 133:
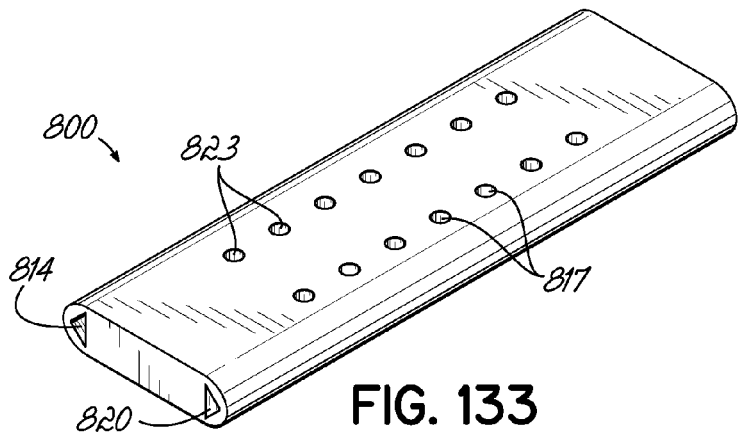
FIG. 133 is a perspective view of a dual artery Fuel Cell Stick™ device having vertical exit holes for each cell in a series design.

FIG. 133 shows the outside perspective view of the Fuel Cell Stick™ device 800 of FIG. 126C with a plurality of vertical exit holes 817, 823. Each hole in the row could relate to a separate cell in series with the others. On one side of the Fuel Cell Stick™ device 800 are the anode gas (fuel side) exit holes 817, and on the other side are the cathode gas (air side) exit holes 823.

Figure 134A:
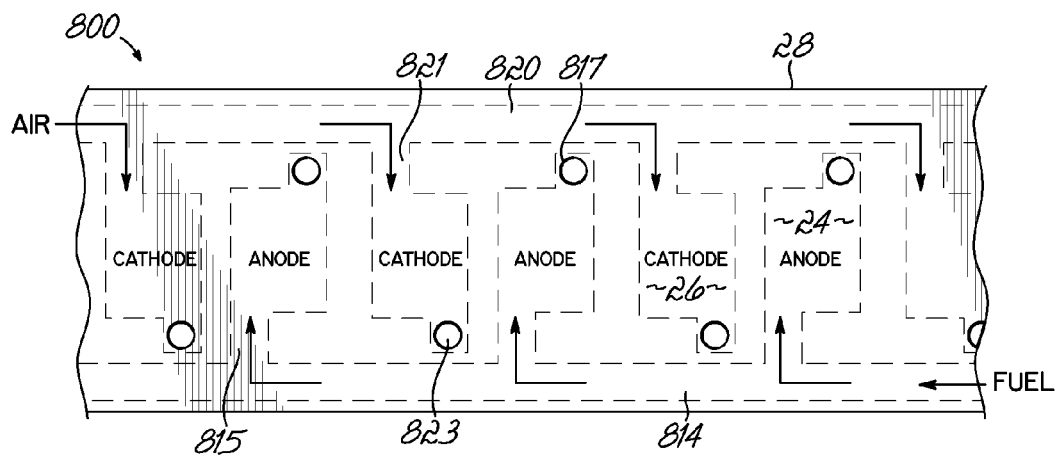
FIGS. 134A and 134B are schematic top and partial cross-sectional views, respectively, of one active layer having interconnected anodes and cathodes in series according to an embodiment.
Figure 134B:
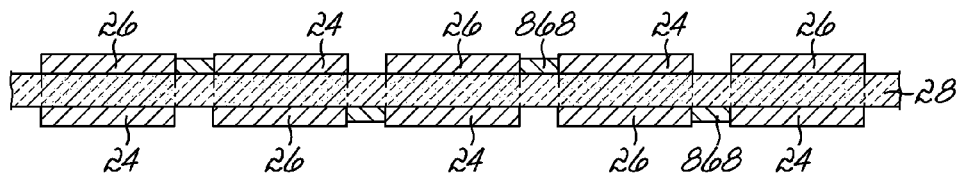

The gas flow and exit path design of FIGS. 132A-133 becomes very useful in a series cell design within the Fuel Cell Stick™ device 800. Using the technique is one way to have air and fuel flow on the same active level within the Fuel Cell Stick™ device 800. In FIGS. 134A-134B is shown one level within a Fuel Cell Stick™ device 800, in which an electrolyte 28 has alternating anodes 24 and cathodes 26 on the same layer (FIG. 134A is looking down on an individual electrolyte sheet, in the build-up of the multilayer Fuel Cell Stick™ device 800). In certain previous embodiments, such as those depicted in FIGS. 80, 92, and 119, the one side of an electrolyte 28 contained only air or fuel passages 20, 14, and multiple methods of interconnecting from top to bottom of the electrolyte 28 were demonstrated. In the embodiment of FIGS. 134A-B, the air/cathode 26 and fuel/anode 24 will alternate, on the same side of the electrolyte 28, so interconnects 868 can remain on one side of the electrolyte 28 and not have to go through the electrolyte 28, as shown in the schematic cross-sectional view of FIG. 134B (depicting only a single electrolyte layer 28 and opposing anodes 24 and cathodes 26). The pairs of opposing anode 24 and cathode 26 thus alternate in polarity along the electrolyte 28 with adjacent pairs electrically connected by interconnects 868 in alternating fashion from one side of the electrolyte 28 to the other, as can be seen clearly in FIG. 134B.

Figure 135B:
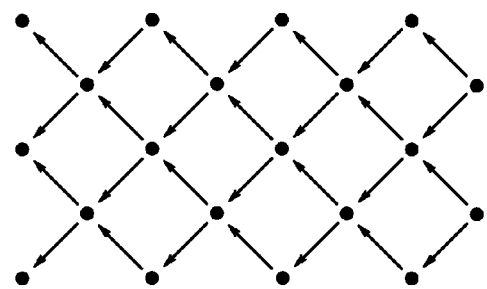
FIG. 135B is a diagrammatic representation of electron flow for the embodiment.
Figure 135A:
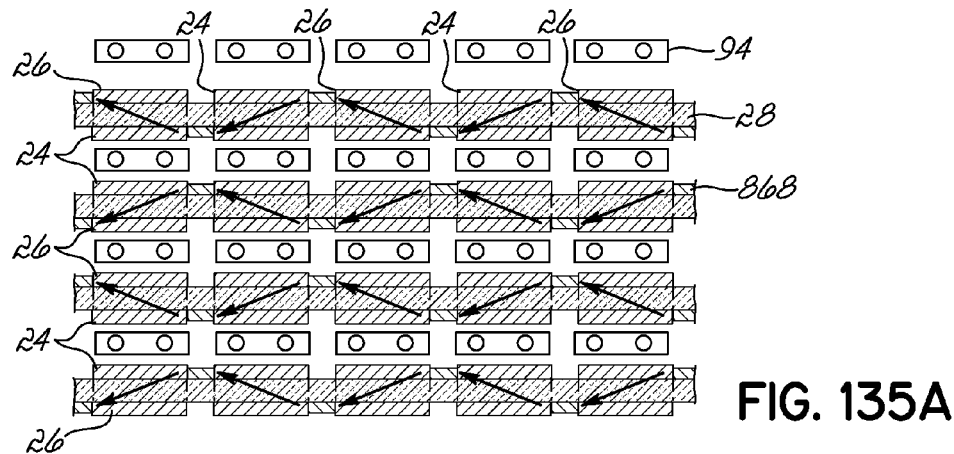
FIG. 135A is a partially exploded cross-sectional view of the components of FIG. 134B stacked with gap forming material to create the structure of FIG. 134A.

From this design, massively series and parallel configurations that are seen in FIGS. 81 and 83 are possible, although here the physical structure is slightly different. FIG. 135A depicts, in a partially exploded view, the stacking of a plurality of the structures in FIG. 134B with gap forming material 94 to create the active flow passages 815, 821, to form a multilayer structure having the general design of FIG. 134A. Note the use of common gas flow paths for anodes 24 and cathodes 26 (meaning that one gas flow path in the active area serves two anodes 24 or cathodes 26, top and bottom), and that the interconnect 868 between cells can provide contact from one layer to the next. The interconnects 868 short to each other between the gap forming material 94 when the structure is compressed thus shorting the cells in adjacent layers to each other where the interconnects 868 are opposed. FIG. 135B is a diagrammatic representation of the resulting electrical arrangement of cells, and electron flow from negative to positive. There may be differences in thickness that result when pressing together the layers shown in FIG. 135A. These differences in thickness can be overcome by adding additional material, for example, by adding sections of ceramic tape; by screen-printing ceramic ink, or by tape casting over other materials so that the slurry fills in deeper locations. Other methods can be envisioned that would help level the various layers through the addition of extra material.

Figure 136:
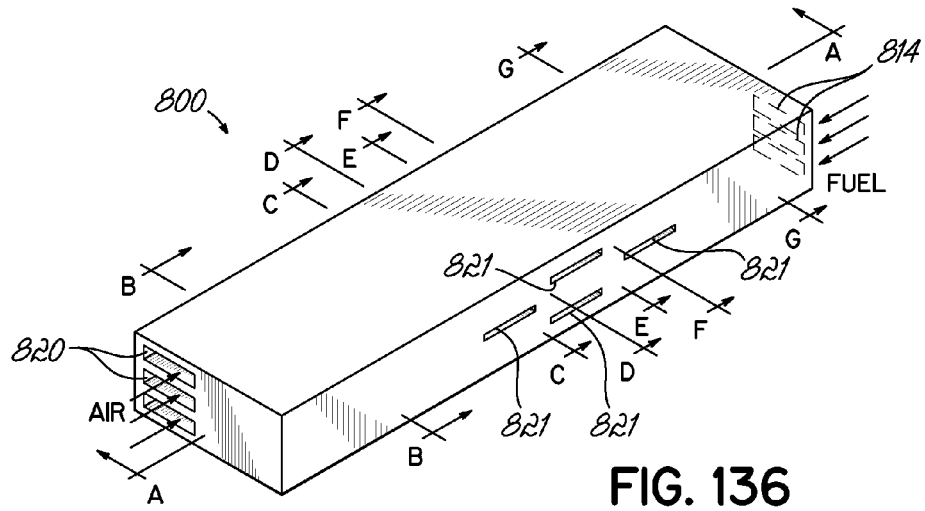
FIGS. 136 and 137 depict in perspective views additional embodiments of multilayer series-parallel devices according to embodiments.
Figure 136A:
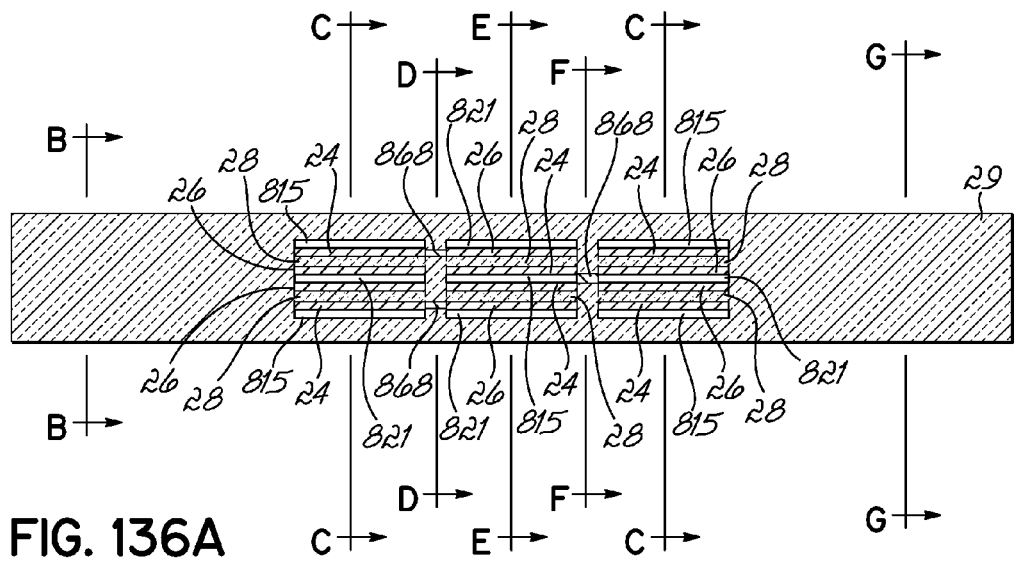
FIGS. 136A-G and FIGS. 137A-G depict cross-sectional views at various points A-G along the devices of FIGS. 136 and 137, respectively.
Figure 136B:
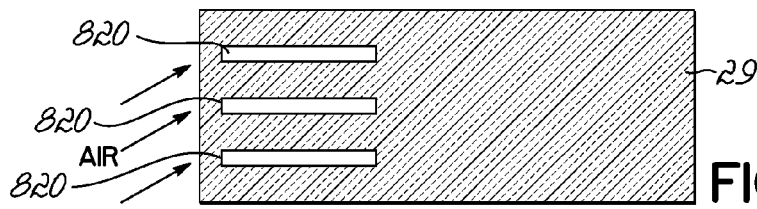
Figure 136C:
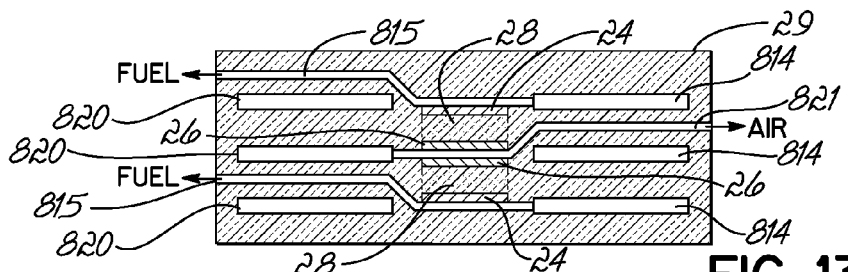
Figure 136D:
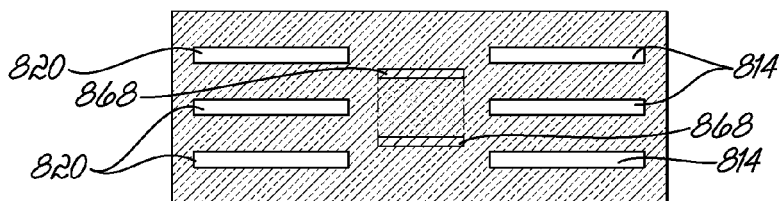
Figure 136E:
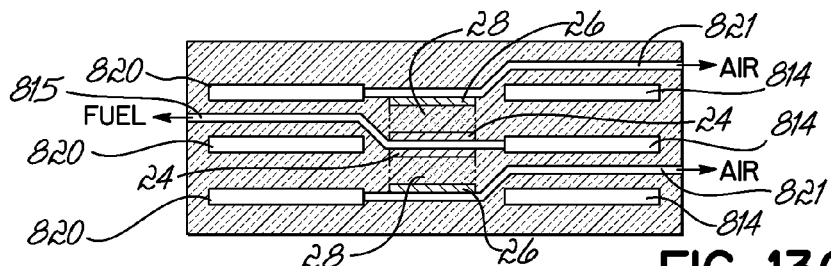
Figure 136F:
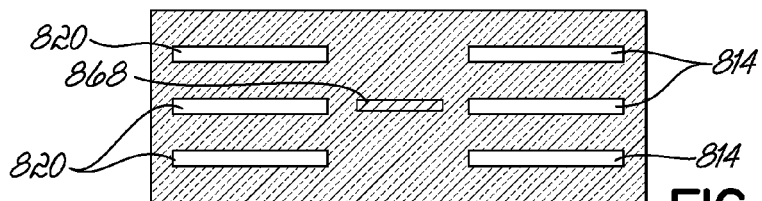
Figure 136G:
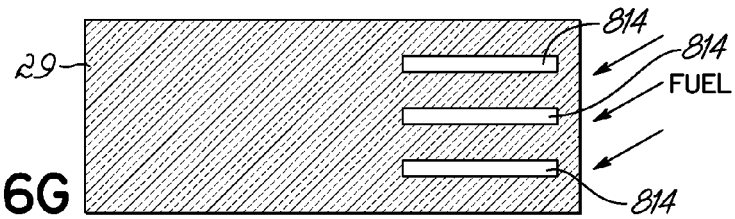
Figure 137:
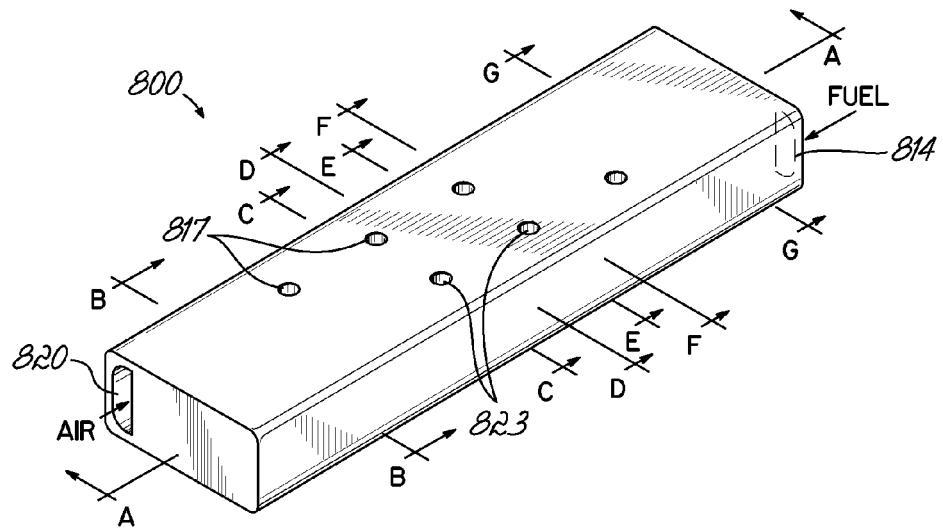
Figure 138:
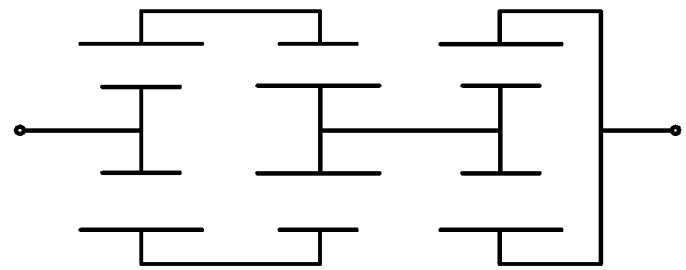
Figure 137B:
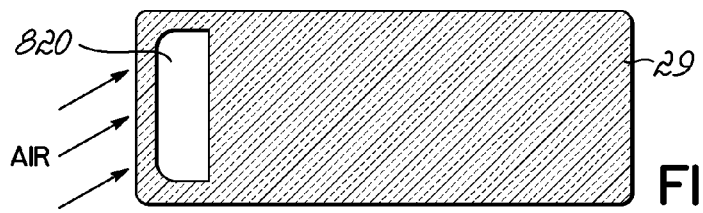
Figure 137C:
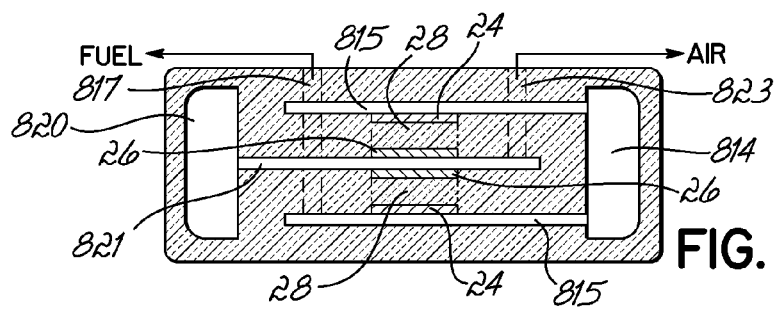
Figure 137D:
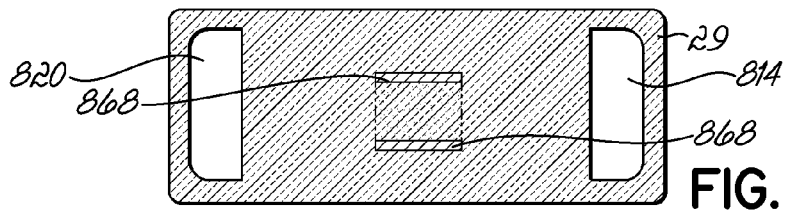
Figure 137E:
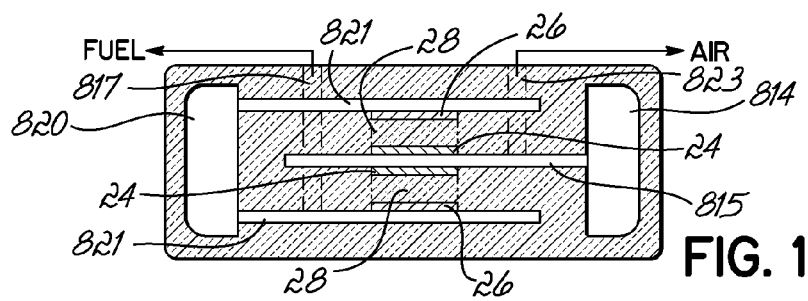
Figure 137F:
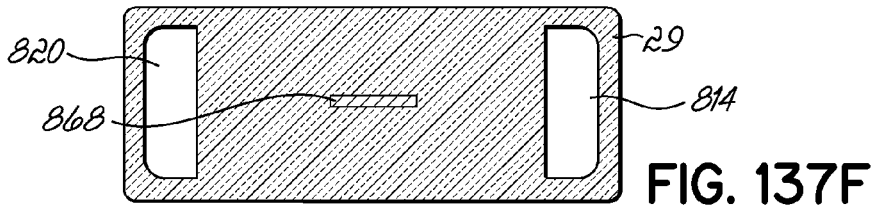
Figure 137G:
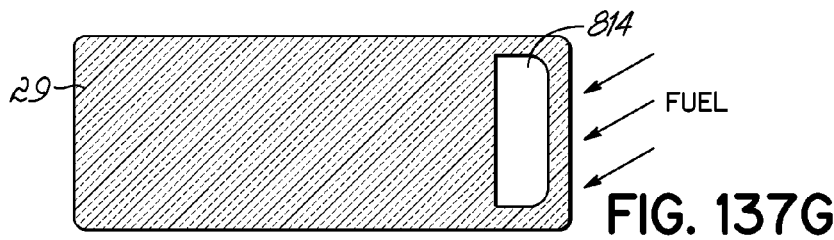
Figure 139:
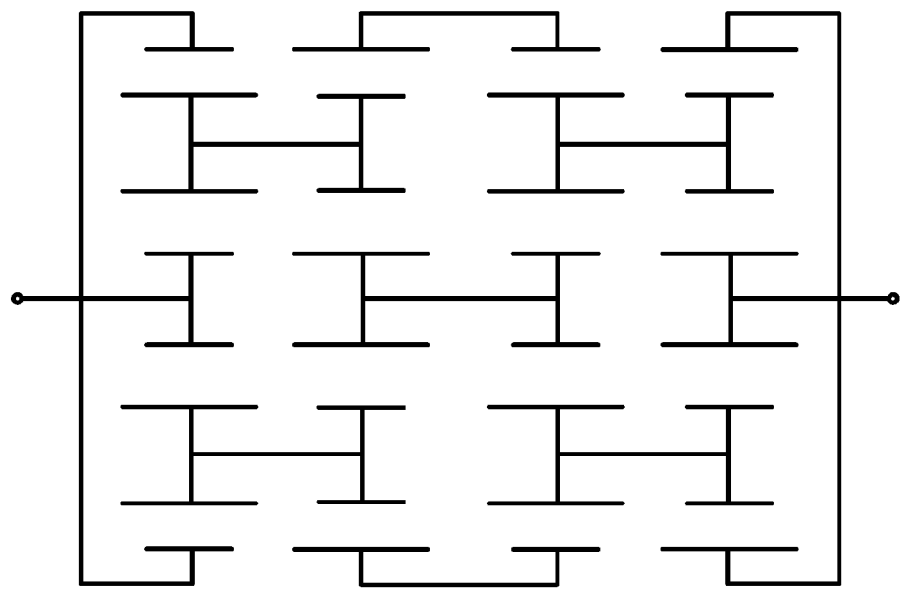
FIG. 139 is a diagrammatic representation of electron flow in a series-parallel design according to another embodiment.

FIGS. 136 and 137 each depict in perspective view additional embodiments of multilayer series-parallel Fuel Cell Stick™ devices using artery flow passages 814, 820 and active flow passages 815, 821. FIGS. 136A-G and FIGS. 137A-G depict the cross-sectional views at various points A-G along the Fuel Cell Stick™ devices 800 of FIGS. 136 and 137, respectively. Each device includes two active layers, with three cells per active layer, for a total of six cells. In FIGS. 136 and 136A-G, the exit paths for the fuel and air are along the side edges of the device 800, with each air and fuel active flow passage 821, 815 fed by a corresponding air or fuel artery flow passage 820, 814, there being three fuel artery and active flow passages 814, 815 and three air artery and active flow passages 820, 821. In FIGS. 137 and 137A-G, the exit paths for the fuel and air are vertical to the top of the device 800, with each of 3 air active flow passages 821 and vertical exit pathways 823 fed by a single air artery flow passage 820 and each of three fuel active flow passages 815 and vertical exit pathways 817 fed by a single fuel artery flow passage 814. It may be understood that the active flow passages 815, 821 in one layer can be either aligned with or staggered from the active flow passages 815, 821 in another layer. This allows an additional degree of freedom to the designer of the Fuel Cell Stick™ device 800. FIG. 138 is a diagrammatic representation of the series-parallel combination achieved by the electrode arrangement and interconnection in the Fuel Cell Stick™ devices 800 of FIGS. 136 and 137. FIG. 139 is a diagrammatic representation of a series-parallel combination achieved by a similar electrode arrangement and interconnection, but with four active layers, each with four cells in series, for a total of 16 cells. End connections are not shown but can be made as shown in earlier figures by bringing conductors out from the ends of the structure to a common connection point.

Figure 140A:
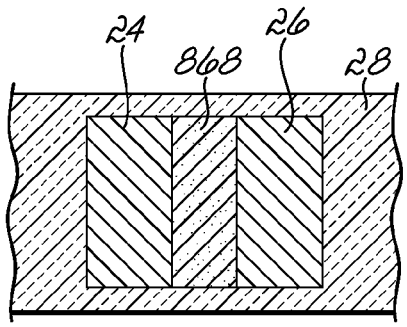
FIGS. 140A and 140B depict in top cross-sectional views embodiments for interconnecting anodes and cathodes in a series design.

With respect to the method of interconnecting the anodes 24 and cathodes 26 (i.e., providing the series connection between the anode 24 and cathode 26, which is like the contact between the positive side of one battery to the negative side of the next battery), a layer of conductive material can be printed as an interconnect 868 across the entire regions between anode 24 and cathode 26, as shown schematically in top cross-sectional view in FIG. 140A. The conductive material, called an interconnect 868 because it provides electrical connection between the anode 24 and cathode 26, can be made out of a variety of materials as previously described, e.g., conductive ceramic, precious metal, and non-precious metals including high temperature alloys.

While acceptable, there are several reasons why this structure might be subject to improvement. One reason is that the interconnect 868 must fire densely and not delaminate away from the electrolyte 28 above it and below it in the fired structure. The interconnect 868 travels across a sealed area that separates the air and fuel regions, but because the conductive material of interconnect 868 is not the same as the ceramic material of electrolyte 28, it might not have good adhesion in the fired state. Adhesion can be increased by adding YSZ ceramic to the conductor material, for example, but this lowers the conductivity of the material. Further to this, the interconnect 868 can be made in multiple layers, for example in a three layer sandwich with pure LSM as the inside layer, and with LSM-YSZ at the top and bottom layer, thereby giving good adhesion on the top and bottom to the YSZ-containing electrolyte 28, and good conductivity in the center of the three layers. But this solution might be excessively complex. Another possible disadvantage with the large interconnect 868 might be cost. It would be convenient to use precious metal to make the interconnect 868. The cost could be minimized by using palladium, or palladium-silver, taking advantage of the relatively low firing temperature of the YSZ with sintering additives in order to use an alloy of Pd and Ag. But still, it would be best overall to reduce the usage of the precious metal.

Figure 140B:
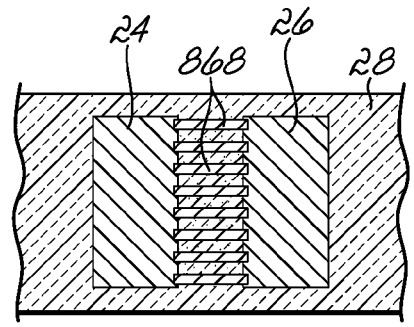

With these concerns in mind, an interconnect 868 is shown schematically in top cross-sectional view in FIG. 140B. Instead of placing conductive material across the entire gap between anode 24 and cathode 26, striped interconnects 868 are deposited across the gap. If the stripes have high conductivity, as from a pure metal (precious or non-precious), then the reduced area is still sufficient without creating resistive losses. Or, in the case of conductive ceramic LSM, which has higher resistivity, the stripes can still perform well if the distance from anode 24 to cathode 26, across the sealed area, is short enough. By way of example and not limitation, a distance of 0.2 inch between anode 24 and cathode 26 is adequate, but it should be made as short as possible in order to give low resistance losses.

According to a further embodiment, the striped interconnect 868 is printed or dispensed such that it overlaps onto the anode 24 and cathode 26. As a result, there is more room around each stripe for ceramic to laminate (the stripes are narrow, so that if there is good adhesion between ceramic layers on both sides of the stripe, then the need for high adhesion from ceramic to the interconnect 868 is reduced. Also, the striping technique uses less material than if the entire area between the anode 24 and cathode 26 is coated with conductive material, and this results in decreased usage of materials that may be expensive. This striped interconnect structure of FIG. 140B may also be referred to as a "comb interconnect" structure.

With respect to the series-parallel combinations described in FIGS. 134A-139, the internal electrodes (anodes 24 and cathodes 26) must be coupled to exterior surface contacts in a cold end region for connection to a voltage source. For example, at the beginning and end of the active structure, a conductor can emerge to contact surface conductors, which then run along the edges of the Fuel Cell Stick™ device 800 to a cold end. Many possible ways can be designed, and have been disclosed in prior embodiments, for example, via holes; wide conductor paths to the surface; conductors to the side that then wrap to the surface; and others.

Figure 141A:
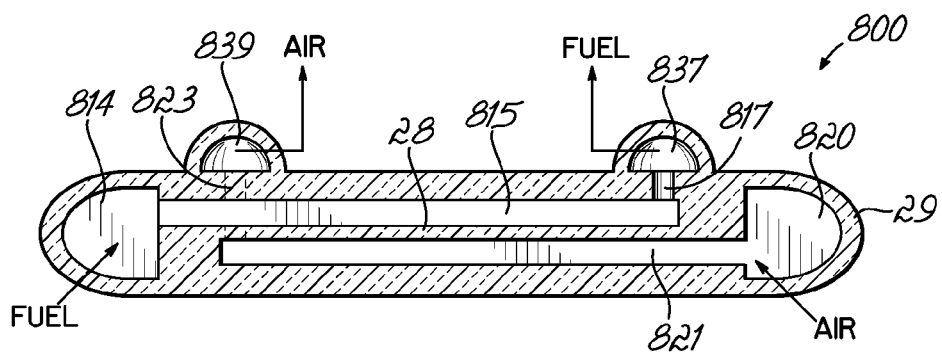

A variation on drilled hole exits and via hole exits is shown FIGS. 141A-141B (cross-sectional and perspective view, respectively). There can be a disadvantage of excess fuel exiting from Fuel Cell Stick™ device 800 in an uncontrolled way. If the fuel exits in the hot zone 32, it will instantly burn in an oxidizing atmosphere, releasing heat. In a case where the amount of excess fuel is great, then the heat will also be great; and this excess heat could cause mechanical stress on the device 800 due to local expansion, which in turn could potentially lead to a crack in the device 800. To counteract this potential negative event in the case of vertical exit holes 817, 823, one embodiment of the invention uses surface channels or arteries 837, 839 to direct the exiting excess or spent fuel and air to a desired exit location, whether that is outside of the furnace, or on a different point on Fuel Cell Stick™ device 800. This embodiment increases the number of main arteries by adding at least one surface artery 837, 839 for each type of internal artery flow passage 814, 820. By way of example and not limitation, surface arteries 837, 839 can be formed by laying an artery gap-forming material 872 (see FIG. 125B), for example of semi-circular shape, over the vertical exit holes 817, 823 and then overlaying that with green ceramic tape. Upon lamination and firing, the overlying green ceramic tape bonds to the underlying ceramic 29 of the device 800 on either side of the artery gap-forming material 872, while the artery gap-forming material 872 burns out leaving the surface artery 837, 839.

In another embodiment of the Fuel Cell Stick™ device 800, depicted in cross-section in FIG. 142, the device is surrounded by four symmetric arteries, two of which are entry artery flow passages 814, 820 for feeding the active flow passages 815, 821 with fuel and air and two of which are exit surface arteries 837, 839 for spent (excess) fuel and air.

In FIGS. 141A-142, it should be contemplated that the layout of the entrance and exit flows could be reversed. Specifically, the surface arteries 837, 839 (fuel and air) could become the entrance paths instead of the exit paths. In that reverse embodiment, the surface arteries 837, 839 would extend out of the hot zone 32, to the very ends 11a, 11b (or near the very ends) of the Fuel Cell Stick™ device 800. Also in this embodiment, the internal artery flow passages 814, 820 could become the exit paths for the used air and fuel. In a variation that is anticipated by a combination of FIGS. 141 and 142, it is possible that the entrance and exit paths for fuel and air could all occur through surface arteries 837, 839 (channels) on the surface of the Fuel Cell Stick™ device (of the style shown in 141A,B), with drilled holes 817, 823 providing access for air and fuel to enter and exit the center of the Fuel Cell Stick™ device 800. Finally, in a variation of FIG. 141, the device 800 could have four surface arteries on the top of the device, and not have internal artery flow passages at all, with interconnection made through drilled holes or via holes; or the device could have two surface arteries on the top side of the device, and two surface arteries on the bottom side of the device, again with no internal artery flow passage at all, and with interconnection made through drilled holes or via holes.

In certain embodiments of the invention described above, an effort is made to direct excess fuel to locations where the excess heat generated thereby is relatively benign. In one embodiment, exits along the side edge of the Fuel Cell Stick™ device 10, 100, 800, where a gap emerges from the side of the device, work well (see e.g., FIGS. 1, 3A, 18-19, 21-24, 25B-27B, 32A-B, 130 and 136). In another embodiment of the invention, depicted in schematic perspective view in FIG. 143A, an exit region 902 is formed in the side edge of the Fuel Cell Stick™ device 900 so as to protrude from the rest of the device 900. In an exemplary embodiment, the inside corners 904 of this side edge protrusion have a radius instead of sharp corners. The exit region 902, i.e., the side edge protrusion, where the fuel escapes, will become hotter, but that will cause expansion outward, away from the Fuel Cell Stick™ device 900, and there will be little unwanted stress on the device 900. By way of example and not limitation, on a Fuel Cell Stick™ device 900 that is 9 inches long, it may be useful to have the exit region 902 protrude out by 0.25 inches, although many combinations of dimensions are possible.

Figure 143D:

In another embodiment, shown in schematic perspective view in FIG. 143B, excess gas exits at the corners 912 or curved path 914 of a shaped Fuel Cell Stick™ device 910. More specifically, according to the specific embodiment shown, the end 916 of the Fuel Cell Stick™ device 910 is tapered along a curved path 914 from a first width $W_1$ (the width of the majority of the device 910) to a second, smaller width $W_2$ to provide a narrow end region 918. The excess gas exits either along the curved path 914 or at the corner 912 formed between the first width $W_1$ and the curved path 914 (as shown). Again, the expansion principles discussed for FIG. 143A dictate why this design is also beneficial. Also, again, the device 910 is not shown to scale, but is contemplated to be long and skinny, with the curved path advantageously residing in the furnace, and the narrow end region 918 transitioning the device 910 out of the furnace.

According to yet another embodiment, depicted in FIGS. 143C (schematic perspective view) and 143D (schematic side view), it may be useful to have a top exit protrusion 922 that provides an escape path that diverges upward from a Fuel Cell Stick™ device 920. In practice, this embodiment is believed to be most useful where the Fuel Cell Stick™ device 920 has one or very few active layers, because of internal geometric design limitations.

Figure 144:
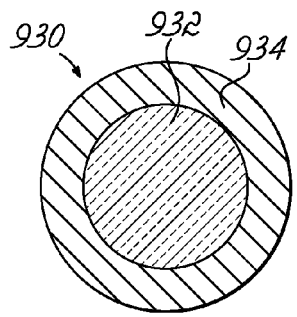
FIG. 144 depicts in cross-sectional view a conductive ball for use in various embodiments.

According to another embodiment, conductive balls 930 are used within the Fuel Cell Stick™ device 10 (100, 200, 300, 400, 500, 600, 700, 800, 900, 910, 920) (hereinafter "device 10 (et al.)"). FIG. 144 depicts a conductive ball 930 for use in the invention, comprising a ceramic ball 932 in the interior and an outer coating 934 that can be any conductive metal. There are various methods of making conductive balls 930 for use in the invention. One method is to coat ceramic balls 932. For convenience, the ceramic balls 932 could be coated with cathode conductor, such as LSM, or anode conductor, such as nickel oxide. Another method is to make the conductive balls 930 out of solid cathode conductor, or anode conductor, or precious metal. Yet another method is to coat the ceramic balls 932 with metal, through electroplating, sputtering, or thick film application, or various other metal coating methods.

Figure 137A:
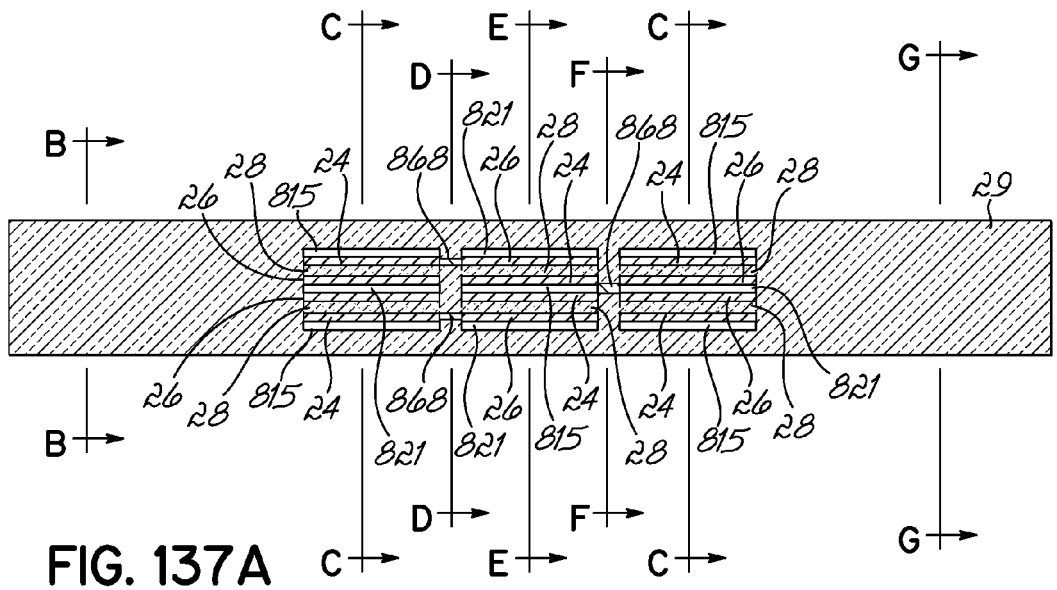

The usefulness of conductive balls 930 may be appreciated, for example, in the series parallel combinations depicted in FIGS. 135A, 136A and 137A. Conductive balls 930, applied into the active flow passages 815, 821 of the cell, can connect the two anodes 24 or cathodes 26 that face onto a single active flow passage 815 or 821. This helps form the series-parallel structure. The use of conductive balls 930 also eliminates the need to have the interconnects 868 actually touch each other. The use of conductive balls 930 is not essential, but gives additional degrees of freedom to the designer of the Fuel Cell Stick™ device 800.

According to another embodiment of the invention, the use of nano-sized powders can increase or improve the performance of the Fuel Cell Stick™ devices 10 (et al.) of the invention. Within the general field of ceramics, the use of nanoscale powders provides a variety of benefits. Finer particle size can give higher voltage breakdown strengths and higher mechanical strength. Finer particle size can also give higher surface area, which can aide in surface area limited reactions and transport phenomena. In addition, finer particle size can lower the required sintering temperature of a ceramic. All of these benefits for ceramics generally can translate to increased benefits in Fuel Cell Stick™ devices 10 (et al.) of the invention, in terms of total power, power density, and/or efficiency, or various other aspects of performance and properties.

By way of example, electrolyte powders with particle sizes of 25 nm and 50 nm may be used. As shown and described above for FIGS. 43 and 44, fine particulate materials may be used for the surface particles 62 on the surface of the electrolyte 28 to increase the transport of ions into the electrolyte 28. This fine particulate material may be nano-sized particles. Nano-sized particles could also be part of a fractal-type arrangement of particles on the surface of the electrolyte 28. In this design, small electrolyte features like those shown in FIG. 43 would be covered with smaller electrolyte features, and those in turn would be covered with even smaller electrolyte features, all the way down to the finest nano-sized particles. This fractal surface arrangement can result in higher transport of ions into the electrolyte 28.

Similarly, nano-sized particles are useful in the anodes 24 and cathodes 26 of the Fuel Cell Stick™ devices 10 (et al.) of the invention. Anodes 24 and cathodes 26 are required to carry out chemical reactions, and it may be understood that finer size particles will facilitate this by increasing the number of triple points (i.e., the meeting of electrons, ions, and gas), and by increasing the reactivity of a given material.

The multilayer green-ceramic manufacturing method may be the most cost effective and flexible means for producing Fuel Cell Stick™ devices 10 (et al.) of the invention. Multilayer ceramics have proven their superiority over other methods, in terms of scalability and productivity. For that reason, the embodiments discussed herein have primarily concentrated on the multilayer green-ceramic approach. However, other technologies could be used to achieve the same end goals. One such technology is direct writing, where pens dispense materials into certain shapes and three-dimensional geometries. Another technology is 3-D printing. Still another technology is the use of traditional thick-film printing, where all the materials are printed in paste form. As part of the technologies above, it should be understood that direct writing or various dispensing technologies can be used to dispense tubules that have cores and shells that exist at the time of dispensing, such as an anode inside of an electrolyte, or a cathode inside of an electrolyte. The use of direct written or dispensed tubules is a contemplated variation on the designs shown for the Fuel Cell Stick™ device 10 (et al.). In the final design, the tubules would simply be channels that are smaller in cross-sectional volume. There could be many of these tubules on one layer, together forming many gas passages in that layer, which is similar to designs discussed above that show more than one channel on a given layer. Similarly, it is anticipated that tubules placed inside of a Fuel Cell Stick™ device 10 (et al.) may be combined into series-parallel electrical structures.

The use of Fuel Cell Stick™ devices 10 (et al.) within the field of solid oxide fuel cells (SOFC) and molten carbonate fuel cells (MCFC) has been described above. However, the Fuel Cell Stick™ devices 10 (et al.) could also be useful in Solid Acid Fuel Cells (SAFC). In this new fuel cell type, the electrolyte is a solid that conducts protons. In one design, the SAFC electrolyte is made from $CsSO_4$. This material has been described as having properties similar to both a salt and an acid. At higher temperatures, it can conduct protons well, with the temperatures described as operating between 100° C. and 300° C. It is expected that the SAFC structure could benefit from the Fuel Cell Stick™ device's overall design, where the anode, cathode, electrolyte and gas pathways serve similar functions, but the component materials change. In fact, it is likely that other new types of fuel cells will be invented, where the materials change but the overall concepts remain the same, and that those new cell types would also benefit from the innovations described herein for the Fuel Cell Stick™ device 10 (et al.).

Figure 145:
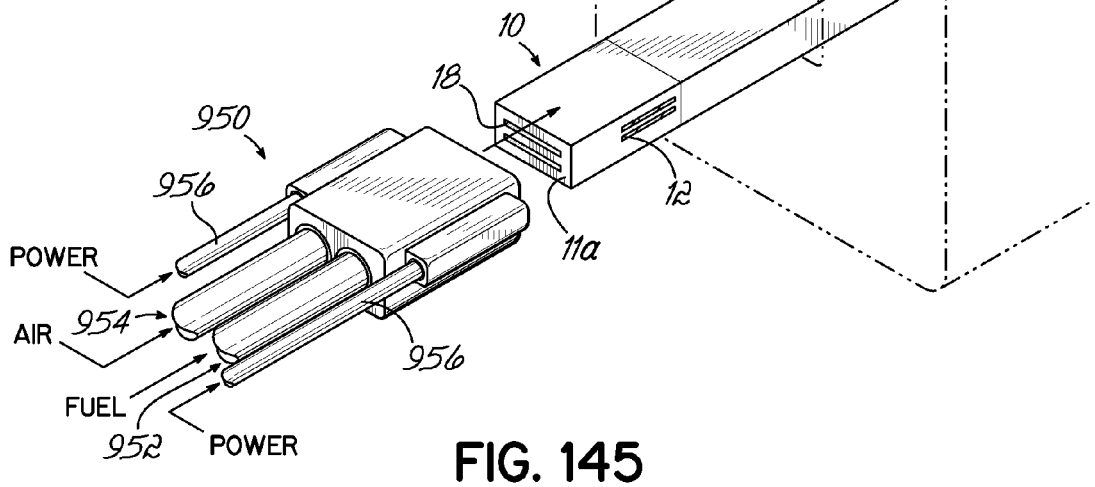
FIG. 145 depicts in schematic perspective view an air-fuel-power plug for use with Fuel Cell Stick™ devices.

Further to FIGS. 67A-B and related discussion, FIG. 145 shows a single plug design, referred to as an air-fuel-power (AFP) plug 950, for a Fuel Cell Stick™ device 10 having a single cold-end 11a outside a furnace 940. The AFP plug 950 serves both the air and fuel delivery functions by providing a fuel pathway 952 and an air pathway 954, as well as providing two conductors 956 for the electrical attachments. Thus, there are four paths of attachment to the plug 950 to carry the gases and electrical. The AFP plug 950 could contain spring contacts to allow tight mechanical contact for the conductors 956, and it could contain sealing devices, like o-rings, to seal the gases. It is also advantageous to shape the end 11a of the Fuel Cell Stick™ device 10, as discussed with respect to FIGS. 66A-B. The indentations 132 can provide extra ability for the AFP plug 950 to stay in position.

According to another embodiment of the invention, a single Fuel Cell Stick™ device is provided that has two or more discrete power levels for operation. For example, the Fuel Cell Stick™ device could operate in a 20 watt mode or a 200 watt mode. There may be applications where it is desirable to have a low (e.g., 20 watt) power supply, but with an extra capability of producing a higher power (e.g., 200 watts) total. By way of example and not limitation, in a military application, a dual-power supply capability may be useful for soldiers who are operating some electronic devices and charging batteries for other devices, thereby requiring power level changes. Another example is in unmanned aerial vehicles, where a higher power might be needed for gaining altitude, and then less power might be needed to remain in position. These power levels might be 100 W and 10 W, respectively, but they could be higher or lower.

Figure 146A:
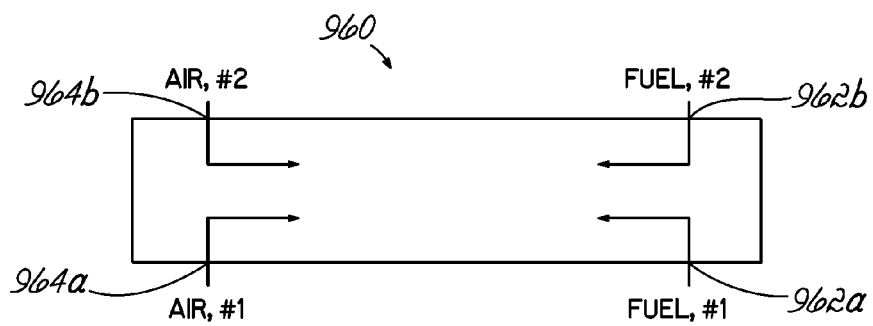

FIG. 146A schematically depicts in side view a dual-power supply Fuel Cell Stick™ device 960 having dual entries for both fuel and air. According to one example of a dual-power supply Fuel Cell Stick™ device 960, there may be 20 active layers at 10 watts each. For the 20 watt mode, there would be fuel and air entry points 962a, 964a that serve just two active layers. When the higher output is required, there would be separate entry points 962b, 964b that serve the additional layers. In a situation where the total power is desired, then air and fuel would each enter through two locations. FIG. 146B schematically depicts in side view a variation in which each end includes a groove 966 that separates the two entry points 962a and 962b, 964a and 964b and pathways thereby defining four end sections 968a,b and 970a,b, each capable of meeting a connector. Other geometries may be envisioned to meet the needs of the final system.

While referred to as a dual-power supply device, actually the device may be operable at three discrete power levels, low, medium and high, when one discrete power section has more active layers (higher wattage) than the other discrete power section (lower wattage). The low power level operates by feeding fuel and air to fuel and air entry points 962a, 964a that serve the discrete power section with fewer active layers. The medium power level operates by feeding fuel and air to fuel and air entry points 962b, 964b that serve the discrete power section with more active layers. The high power level operates by feeding fuel and air to fuel and air entry points 962a, 964a and 962b, 964b that serve both the discrete power sections such that all active layers are powered. So, in the example above, with 20 active layers at 10 watts each, if the first discrete power section includes five of the active layers, and the second discrete power section includes 15 of the active layers, then the device is operable at power levels of 50 watts, 150 watts, or 200 watts.

According to another embodiment, there may be more than two discrete power sections. For example, there may be one air connection that feeds all the active layers, and discrete fuel connections for different groups of active layers. Thus, the device may be operable at multiple power levels. In a further embodiment, one AFP (air-fuel-power) plug 950 could serve multiple inlets, such as on the device of FIG. 146A where it would serve two fuel or air inlets from one plug.

Discussed above are embodiments in which sacrificial material 72, 94, 872, 874 is used to form the flow passages 14, 20, 814, 815, 820, 821. When using organic materials to form thicker passages, such as artery flow passages 814, 820, bake-out of those organic materials becomes more challenging. For thicker passages, a slower bake-out profile is needed to remove the organics slowly to prevent delamination within device 10 (et al.). In one variation of the formation method, carbon mat (randomly oriented fibers of carbon) or carbon cloth (carbon fibers woven into a traditional cloth) loaded with wax is used, but thicker sections of this carbon-wax material can cause some delamination. Without being bound by theory, it may be that the wax expands upon melting, placing some pressure on the green ceramic tape, which can cause delamination.

One embodiment to prevent delamination caused by the wax is to use the carbon mat/cloth on its own, without the use of wax. The passages are thereby formed and remain open within the structure, even after lamination. Without the wax providing the firm support and geometrical structure during lamination, the carbon fiber will still give an open passage, but the ceramic surfaces on the top and bottom of the fired passage will have indentations from the fibers. Still, the green ceramic tape, upon lamination, will not squish into the carbon fibers and close off the passage. Basically, the carbon fibers provide a scaffold that props open the desired passage during the lamination process (typically 3000 to 5000 psi).

A variable in the process above, in terms of having the carbon fibers act as a scaffold, is that the green ceramic tape has a certain stiffness that prevents it from squishing into the interstices between the fibers. This stiffness of the tape can be controlled through variables in tape formation: higher ceramic loading and lower plasticizer amount would give higher stiffness, and vice versa. The same principles would apply to the anode and cathode layers in the active areas: the recipe for the electrodes may be selected to provide an appropriate stiffness that prevents the electrodes from squishing into the matrix of fibers to keep open the passages in the active areas (i.e., the active flow passages). In addition, this concept is not limited to carbon cloth and mat, but extends to any sacrificial fiber component regardless of fiber composition or regardless of how the fibers are placed into the structure.

By using the multilayer tape methods to build the Fuel Cell Stick™ devices 10 (et al.), it should be understood that the devices can logically be made in large wafers, and that the wafers will be diced after formation and lamination in the green state to give individual units. Thus, the fact that the Fuel Cell Stick™ devices 10 (et al.) are shown as single units should not be interpreted to preclude the method of making the devices from a wafer that is then diced and shaped as necessary.

According to another embodiment of the invention, in the building of the multilayer structure, the components can be fired in a reducing atmosphere. For example, nickel oxide may be used as an anode 24. When fuel is added at high temperature, the anode 24 is reduced to nickel metal, which results in high conductivity. Because zirconia has a high affinity for oxygen, it is possible to sinter the Fuel Cell Stick™ device 10 (et al.) in a reducing atmosphere condition without hurting the zirconia, and therefore build the device using nickel metal instead of nickel oxide. Sintering in a reducing atmosphere could also facilitate the use of high temperature alloys. There are interconnect metals that are resistant to oxidation, including high temperature specialty alloys, but to sinter these alloys it is necessary to keep the surface of the metal particles from oxidizing, which may be achieved by sintering in the reducing atmosphere.

When using thinner layers, the electrolyte 28 itself may be so thin that it may not have the strength to remain intact, crack-free and/or leak-free. However, a very thin electrolyte 28 in the active area 33b may be acceptable because the anode 24 and cathode 26 will add thickness to the electrolyte 28, raising the total thickness in the active area 33b to a level that does have the strength to remain crack-free during processing and use, as shown in cross-section in FIG. 147A. To build the complete device, however, the thickness of the electrolyte 28 must be increased in the regions adjacent to the active area 33b or else the active layer 33b could crack at the edge 976, where the transition occurs from thick active area 33b to thin electrolyte 28. So, as depicted in cross-section in FIG. 147B, thickness may be added to the electrolyte 28 beside the active area 33b using additional ceramic electrolyte material 29, for example extra layers of zirconia tape, or using some other inert material. If a misalignment occurs in stacking the electrodes 24, 26 and extra thickness material 29, a thin spot or gap 978 may occur along the edge 976 near the active area 33b, as depicted in cross-section in FIG. 147C, which can result in a defect.

Figure 147F:
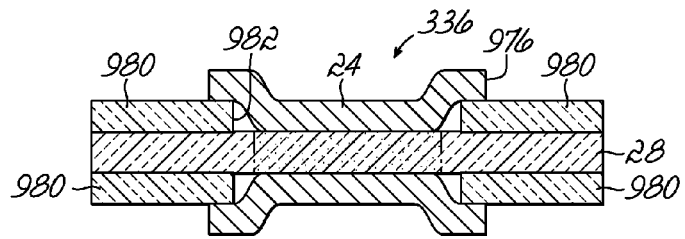

To prevent or reduce the likelihood of misalignment, extra material 980 may be added in accordance with an embodiment of the invention in a way so that it overlaps onto the active area 33b. For example, as depicted in exploded perspective view and cross-sectional view in FIGS. 147D and 147E, respectively, the extra material 980 may be placed over the electrode 24, 26 like a picture frame. The cutout 982 in the extra material 980 is the same shape but a bit smaller than the electrode 24, 26. When the extra material 980 is then placed onto the active area 33b (with the cutout 982 placed over the electrode 24, 26), the extra material 980 adjacent the cutout 982 overlaps onto the edges 976 of the active area 33b on all sides, ensuring that there are no thin spots at the edge 976 of the active area 33b due to misalignment. Upon lamination, the extra material 980 is pressed tight against the electrode 24, 26. This picture-frame approach in building up the device 10 (et al.) with green layers is tolerant of misalignments. An alternative to FIGS. 147D and 147E is to place the extra material 980 (i.e., the picture frame piece) down first, and then place the electrode 24, 26 on top of it (with the electrode 24, 26 placed over the cutout 982). The electrode material 24, 26 adjacent the cutout 982 overlaps onto the extra material 980, and when laminated, the electrode 24, 26 is pressed tight against the extra material 980, as shown in FIG. 147F, ensuring that there is no misalignment.

As discussed in various embodiments above, the drawings herein are not necessarily drawn to scale. For example, the length of Fuel Cell Stick™ device 10 (et al.) is often reduced to fit the device on the page, giving the appearance of a relatively short, wide device rather than a long, skinny device. It should be appreciated that the dimensions of the inventive devices are not limited to the scale shown, and that devices that are at least several times longer than wide or thick are particularly contemplated and may provide added benefits. For example, the devices may be 6-20 times longer than wide (at the widest point). Further, the thickness of the devices relative to the width (and length) is often exaggerated for purposes of clearly showing features of the devices, but it should be understood that devices that are thinner than they are wide, for example several times greater in width than thickness, are particularly contemplated and may provide additional benefits. In each embodiment, the length, width and thickness are adjustable to meet the design, manufacturing, cost, and performance needs, and so the embodiments described herein should not be limited to any particular dimensions unless the claims and/or specification expressly state an intent to be so limited.

Discussed above in relation to FIGS. 49 and 50 is the technique in which a wire 92 (or other physical structure) is placed in the device during build-up of the green layers, and removed after lamination to form a gas passage. Multiple wires may be used, each forming a gas passage. One particular advantage is that no wax coating over the wires is needed. Piano wire or stainless steel wire, for example, may be used, with a simple spray coating of a release agent to facilitate removal of the wire after sintering. For example, in one embodiment, the wires are sprayed with TFE or PTFE mold release. The release agent is believed to simply fill in the crevices on the surface of the metal, and reduce the adhesion of laminated tape to the surface, thereby enabling the wires to be pulled out with just a few pounds of force, such as a force applied with pliers.

Figure 148A:
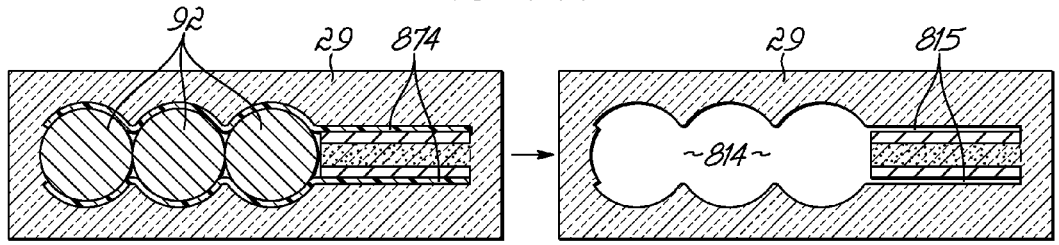
FIGS. 148A-148B depict in cross-section embodiments for the use of multiple wires for forming flow passages.
Figure 148B:
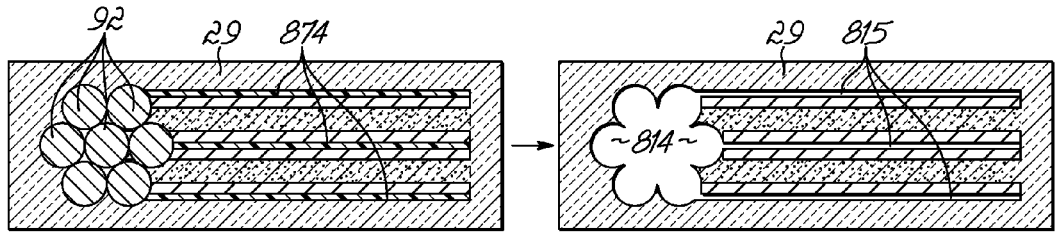

In accordance with a further embodiment of the invention, depicted in FIGS. 148A and 148B, multiple wires 92 may be used to form a single gas passage (e.g., artery flow passage 814, as shown). This may be especially useful in the series designs and designs having large artery flow passages 814, 820 that feed smaller active flow passages 815, 821. By way of example, a single layer of multiple wires 92 as shown in FIG. 148A may be used to form the gas passage, such as artery flow passage 814. Gap forming material 874, as shown, or single wires 92 may be used to form the active flow passages 815 branching off the main artery flow passage 814. By way of further example, 0.020" wires may be used, although bigger or smaller wires are contemplated. As the wire size increases, the adhesion of the wires 92 to the ceramic 29 will increase due to the larger surface on each wire 92, so it may be useful to place multiple small wires 92 into the device 10 for formation of the passages. In the design of FIG. 148A, three wires are shown side by side, although two or more may be used, for example, three, four or five. This gives three times the volume for flow, but still allows easy wire removal.

Another technique depicted in FIG. 148B is to use multiple wires 92 in a bundled form to form the gas passage, such as artery flow passage 814. The diameter of flow would be very large, but the wire removal would still be simple. In the example shown, seven wires are bundled, but any number of wires, particularly three or more, are contemplated. In a combined embodiment, multiple wires 92 in a bundled form may be used to form an artery flow passage 814, while a single layer of multiple wires 92 may be used to form the active flow passages 815 branching off the main artery flow passage 814. Thus, the bundle will provide the artery flow passage 814 with a greater volume in both the height and width directions, while the multiple wires in the single layer will provide the active flow passages 815 with a greater volume in the width direction but not the height direction, as compared to a single wire embodiment.

The multiple wire technique may also be useful in forming the large volume preheat chambers 13, 19 that feed the more narrow gas passages 14, 20 in FIG. 32A. Wires 92 of two different lengths could be used, with the longer wires 92 forming the gas passages 14, 20 and the shorter wires 92 bundled or side-by-side to form the pre-heat chambers 13, 19.

In the U-turn concept for pre-heating the gas described in FIGS. 33A-33C, the gas flows down the entire length of the Fuel Cell Stick™ device 10 in the hot zone 32, heating up for the entire time, then turns around and comes back to the active areas 33b. The advantage of the U-turn passages is that there is lower chance that the gas (air or fuel) is not fully heated to the reaction temperature when it reaches the active area 33b. With the wire concept for forming the passages, the path down and back (on one side of the device, for one type of gas) can be made using wires 92, which are pulled out after lamination. The cross connection between the down and back directions, i.e., the bend or U-turn, can be made using organic material that bakes out, or using a wire which touches both the down and back wires, from a side direction. There may be an undesired leak point from the device 10 at the connection points, particularly when a side connection wire is used. The solution to prevent such leak points is to plug the leak holes, after the wires 92 are removed. This can be done before or after sintering, and can be done using ceramic, glass, or a combination of several materials with appropriate temperature properties (such as a glass-ceramic).

Figure 149:
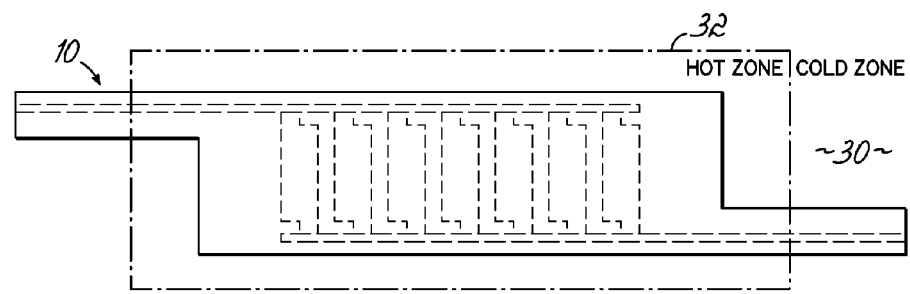
FIG. 149 depicts in schematic top view an embodiment with ends protruding into a cold zone.
Figure 150:
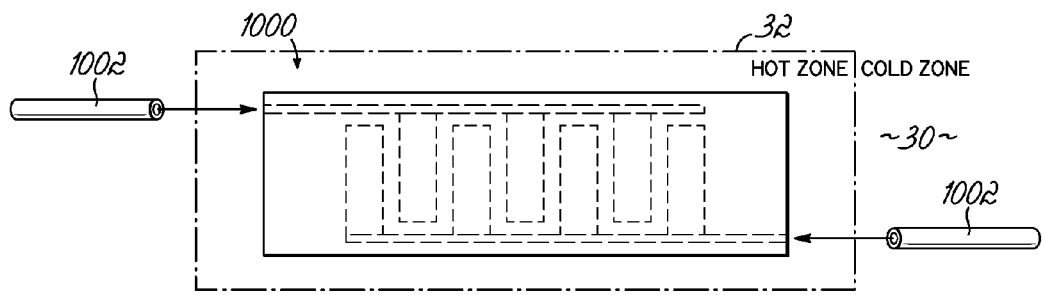
FIG. 150 depicts in schematic top view the modification of the device to eliminate the cold ends.

Many embodiments have been described above in which the Fuel Cell Stick™ device 10 (et al.) has a hot zone 32 and at least one cold zone 30, for example, as shown in FIG. 149. However, many of these embodiments may benefit from the multilayer design even without a portion of the fuel cell device serving as a cold zone. In FIG. 150, the device 10 from FIG. 149 is modified to remove the cold ends of the device thereby providing a multilayer Fuel Cell Stick™ device 1000 that resides solely in the hot zone 32. Fuel and electrical connection may be made by tubes 1002 that reach into the hot zone 32 to supply air and fuel. In accordance with the invention, the artery flow passages 814, 820 still deliver gas in high volume to the active layers; and the active layers that travel across the short dimension of the device 1000 are in parallel, side by side, so that the resistance to flow is minimal. The internal layouts of air and fuel passages on the same level can still be in accordance with previous embodiments. Additionally, the series and parallel electrical connections can still be made in accordance with previous embodiments. In one embodiment, the device 1000 is elongate, i.e., it has a longer length along the direction of the artery flow passages 814, 820, and a shorter width along the direction of the active flow passages 815, 821. This long length is helpful to device function, in terms of having a dominant expansion direction, because the device 1000 can be more willing to allow rapid heating of the device 1000 without cracking.

In accordance with additional embodiments, both connections of air and fuel can be made from the same side, instead of opposite sides as shown, or there can be any number of outside tubes 1002 connecting to the device 1000. For example, there can be four or more tubes 1002, and they can attach to the device 1000 from any of the four sides, or from the top and bottom. The tubes 1002 can be metallic in order to provide electrical connection at the same time that they provide air or fuel connection, or the tubes can be made from ceramic that is coated with conductor. As discussed in prior embodiments (e.g., FIGS. 100A-103B), the connection tubes 1002 can serve both physical and electrical functions. Also as previously described (e.g., FIGS. 101 and 102A-B), the multilayer device 1000 may be provided with mating areas for receiving the connection tubes 1002. For example, the tube 1002 can fit into a depression in the device 1000, or can fit over a protrusion.

In certain embodiments of Fuel Cell Stick™ devices 10 (et al.) of the invention, it may be desired to have the gas output exit the furnace completely in order to measure properties of the gas. To accomplish this, the Fuel Cell Stick™ device 10 (et al.) may be formed to have a small material removal or groove 1010 along the long center axis CA of the device 10 (et al.), forming split or forked ends 1012a,b and 1014a,b, as shown schematically in top view in FIG. 151A. With this split-end design, it is easy to have the remaining gases (after reaction) exit the furnace in a controlled way. With this technique, it also may be useful for some configurations to have the air and fuel enter on the same forked end 1012a, 1012b of the device, and then exit side by side on the opposite forked end 1014a, 1014b of the device 10 (et al.), as shown schematically in FIG. 151B. In yet another alternative, schematically depicted in FIG. 151C, the air and fuel can enter from the same forked end 1012a, 1012b, and then exit at a non-forked end 1015, such that no tabs or split ends exit the furnace at the other end, i.e., only one end is split. The exit flows could occur side by side at the non-forked end 1015 of the device 10 (et al.) that terminates in the hot zone 32. The exit flows could also exit at the exact corner, in order to have the excess fuel not overheat the Fuel Cell Stick™ device 10 (et al.) unevenly at one point.

Figure 152A:
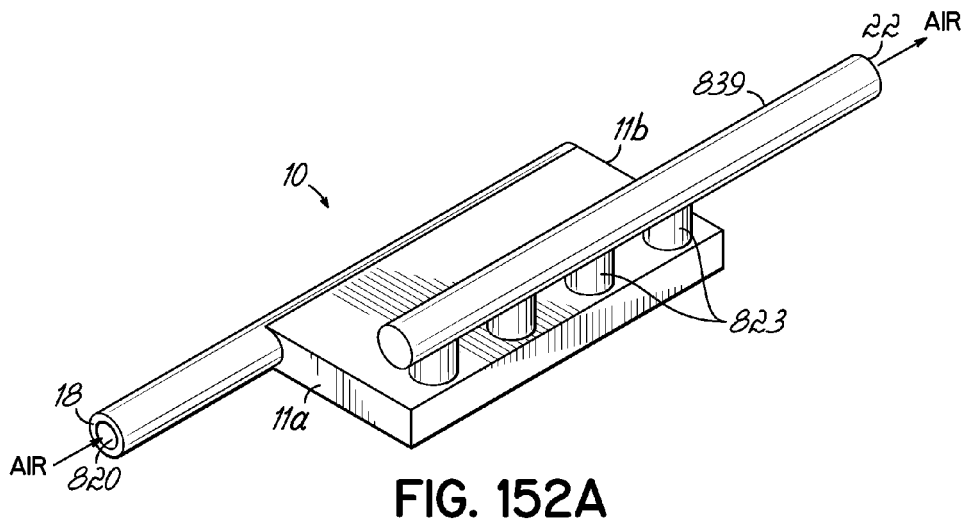
FIGS. 152A-152C depict in schematic perspective view one embodiment for the arrangement of the gas flow passages.
Figure 152B:
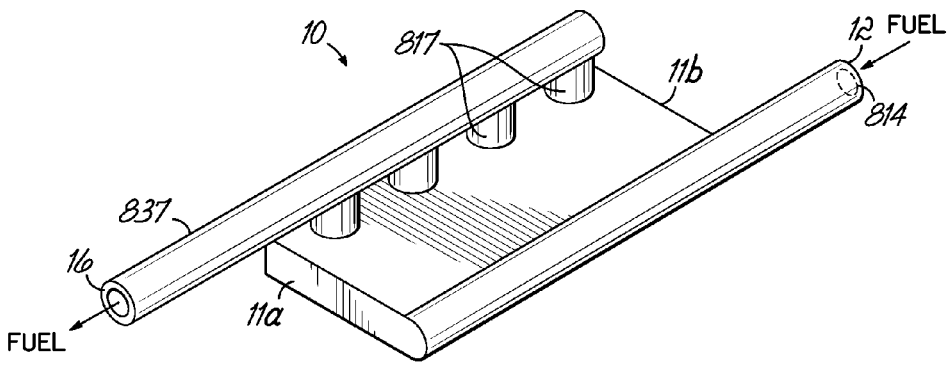
Figure 152C:
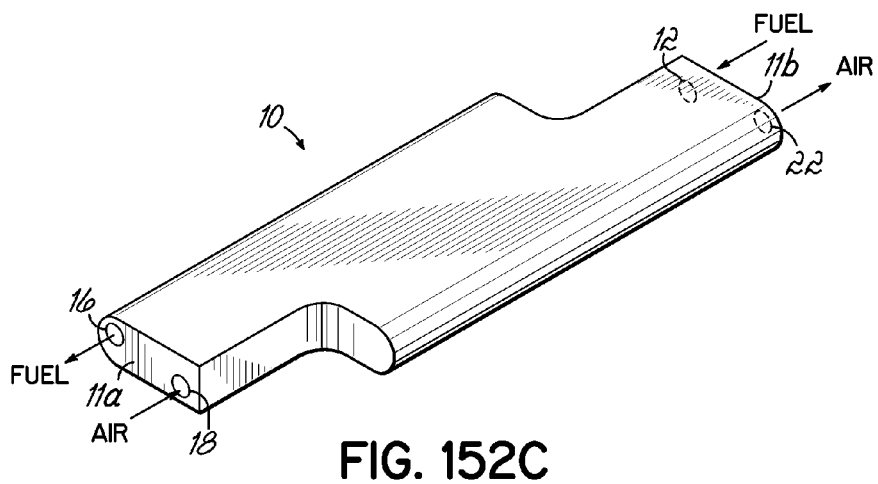

In another embodiment, which is a variation on the embodiment depicted in FIGS. 141A and 141B, the input pathway for one gas and the exit pathway for the other gas occur on the same side and end of the Fuel Cell Stick™ device 10 (et al.), as schematically depicted in FIGS. 152A-152C. FIG. 152A schematically depicts the pathway for air entering the left side of the device 10 at air inlet 18 in first end 11a, traveling along artery flow passage 820, and exiting up through vertical exit holes 823 on the right side of the device 10 to an exit pathway, e.g., surface artery 839, the outlet 22 of which is on the right side of the device 10 at the second end 11b. Not shown are the active flow paths 821 that travel from the left side to the right side of the device 10 across the active structure. FIG. 152B schematically depicts the pathway for fuel entering the right side of the device 10 at fuel inlet 12 in second end 11b, traveling along artery flow passage 814, and exiting up through vertical exit holes 817 on the left side of the device 10 to an exit pathway, e.g., surface artery 837, the outlet 16 of which is on the left side of the device at the first end 11a. Again, not shown are the active flow paths 815 that travel from the right side to the left side of the device 10 across the active structure. As shown in perspective view in FIG. 152C, the air inlet 18 and the fuel outlet 16 are each positioned on the left side of the device at the first end 11a, and the fuel inlet 12 and the air outlet 22 are each positioned on the right side of the device at the second end 11b. Thus, the air exit path (e.g., surface artery 839) can conveniently happen along the fuel inlet pathway (e.g., artery flow passage 814), and vice versa, due to the use of the vertical exit holes 817, 823, which allow for a path to be created near or on the surface of the device 10. That pathway can go in whatever direction is desired, including out of the furnace along the surface of the input path.

Figure 154C:
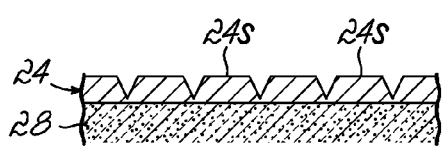

One challenge in creating multilayer structures with dissimilar materials, such as the anode/electrolyte/cathode structure, is limiting the effects of mismatch between the different materials. This mismatch can come in several forms, including mismatch due to shrinkage at sintering or due to coefficient of expansion. In accordance with one embodiment of the invention, a solution to this includes printing large areas of anode or cathode in a segmented format. For example, for anodes and cathodes with a printed area of 1 cm×3 cm, shown in top and side view in FIGS. 153A and 153B (depicting anode 24), a group of smaller electrode areas 24s is printed within that printed area, for example, each square area 24s having a dimension of 0.25 cm by 0.25 cm, as shown in top and side view in FIGS. 154A and 154B. By segmenting the electrodes, the overall stress that is possible in a given area is limited by limiting the total dimension of the affected area. Electrode areas 24s that are next to each other can undergo physical stress independently.

It is possible to make just the anode 24 in a segmented format, or just the cathode 26, or both. For example, in practice, it may be useful to use this segmented approach on the anode 24, while leaving the cathode 26 in a solid form, but the desired approach may differ depending on the particular materials used for each component. The actual gaps between the segmented electrode areas 24s can be quite small, because only a very small gap is required to help reduce the strain over the entire electrode region. In fact, the segmented electrode areas 24s could even touch at the very bottom of the electrode (e.g., anode) layer 24, as shown schematically in FIG. 154C, to achieve the effect.

A challenge presented by segmented electrodes (anode 24 or cathode 26) is the need to make electrical contact to the current collector 122. An anode 24 that is segmented has the ability to conduct ions to or from the electrolyte 28, has porosity to allow gas to pass through, and has electrical conductivity within its own region, but it does not have electrical connection to the device exterior. It is common in the industry to have a current collector composition that is different from the exact composition of the anode 24 or cathode 26 that is touching the electrolyte 28. For example, if the anode is made from a mixture of NiO and some amount of YSZ ceramic, then the anode current collector 122 can be a mixture of NiO and a lower percentage of YSZ, or can even be made of pure NiO. The reason for this difference is the different function of the current collector 122. It needs to be porous to allow gas passage, and conductive to allow electron flow, but it does not need to allow ionic conductivity at the same high rate (if at all) like the anode 24 near the electrolyte 28. This difference in function and composition allows freedom to modify the current collector 122 in a way that changes the physical properties described above, such as the shrinkage upon sinter or the coefficient of expansion, or some other property. One example for changing the physical properties of the current collector 122 would be to use a larger particle size for the NiO than that used in the anode 24 near the electrolyte 28, in order to reduce the sintered density and the forces due to sintering. Using this degree of freedom, a current collector 122 can be provided that has different physical properties than the anode or cathode region that is printed closest to the electrolyte tape. In another example, a different metal from that used in the electrode (e.g., different than Ni) can be used in the current collector 122. For example, platinum metal may be used as the majority compound for the current collector, plus some amount of YSZ ceramic. This mixture achieves the goal stated above of dramatically changing the physical properties of the current collector 122 because the sintering characteristics of Pt are different from the NiO. Many different materials and combinations thereof are possible, with the goal of providing different physical and material properties between the electrode and its current collector 122.

Figure 155A:
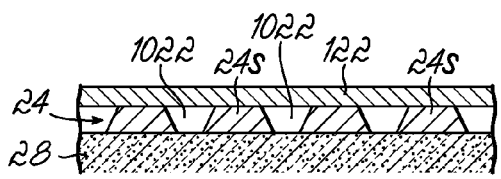
FIGS. 155A-155B depict in cross-sectional view embodiments for positioning a current collector on the segmented electrode of FIG. 154B.
Figure 155B:
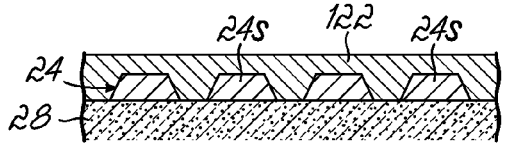

FIGS. 155A and 155B show two methods of applying the current collector 122 over the segmented anode 24 or cathode. The current collector 122 can create open voids 1022 in the spaces there beneath and between the electrode areas 24s, as shown in FIG. 155A, or it can be printed into the space between the segmented electrode areas 24s, as shown in FIG. 155B. If it is desired to leave the voids 1022 between the electrode areas 24s as shown in FIG. 155A, that can be accomplished by several means, including printing organic material into the spaces, so that the collector can't flow there, and where such organic material will disappear upon bake and sinter.

The segmented electrode embodiment is not limited to just two separate materials but rather could be applied to an anode 24 or cathode 26 that is based on three or more materials. The idea is generally to control or influence the physical properties by creating small segments within the larger electrode, and possibly by leaving the spaces between the segments as open voids.

The size of the printed electrode areas 24s can be made as large or small as desired, depending on the physical needs of the system to control the forces. For example, squares with a dimension of 0.005" square (0.13 mm×0.13 mm), or smaller may be printed, or the dimension could be larger than the 0.25 cm example recited above. Regardless of the size, these squares represent the breakup into smaller parts of one anode 24 or cathode 26, these smaller parts being side by side and at the same voltage potential. In addition, the segmented electrode areas 24s for the anode 24 or cathode 26 do not need to be square. The areas 24s may be rectangular or any other shape. Also, the printed segmented area can be defined by the wire dimension of a printing screen. This would be achieved by printing with a certain screen, and using a printing ink that has poor flow characteristics, such that after printing the paste does not flow together, and maintains the pattern created by the wire or mesh. In this way, the mesh of the screen provides the segmented form on a fine scale.

Figure 156:
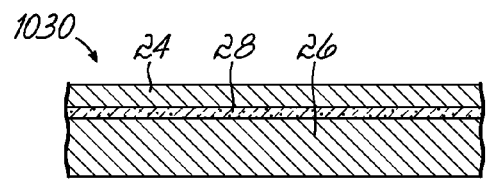
FIG. 156 depicts in cross-sectional view an embodiment with different electrode thicknesses.

In many depictions herein, the anodes 24 and cathodes 26 appear to be of similar dimension. This is not required. Non-symmetric anode and cathode thicknesses may be used for the triple layer structure 1030 (i.e., anode 24/electrode 28/cathode 26), as depicted in FIG. 156. The thickness of the electrolyte 28 is advantageously as thin as possible in order to give the lowest resistance to ionic conductivity. As the anode 24, cathode 26 and electrolyte 28 become thinner, the physical strength can be reduced, in terms of having large unsupported areas of the cells. So if the electrolyte 28 becomes thinner in a given design, it can be useful to have the anode 24 or cathode 26 remain thick, or even become thicker to make up for the thin electrolyte 28. In accordance with one embodiment shown in cross-section in FIG. 156, a thicker cathode 26 is used, while maintaining a thinner electrolyte 28 and thinner anode 24. These conditions can be reversed, and the anode 24 can be made extra thick. The advantage of the thicker cathode 26 is that the cathode 26 will support a very thin electrolyte 28 and a relatively thin anode 24, as shown. Overall power output per area can be increased as a result. In one example, samples were made having dimensions of 0.014" (0.356 mm) thickness for the cathode 26, 0.002" (0.051 mm) thickness for the electrolyte 28, and 0.003" (0.076 mm) thickness for the anode 24. These dimensions are not meant to be restrictive, but are merely provided by way of example.

Figure 157:
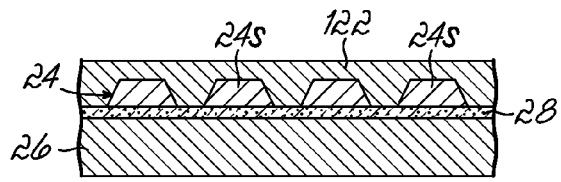
FIG. 157 depicts in cross-sectional view an embodiment that is the combination of the embodiments of FIGS. 155B and 156.

In another embodiment, depicted in FIG. 157, a thicker cathode 26 is used in combination with a thinner but segmented anode 24 (24s). By combining these two designs and reducing the thickness of the electrolyte 28, the stress on the material composite of the triple layer structure 1030 (anode 24/electrolyte 28/cathode 26) is greatly reduced. The physical properties of the system below are dominated by the cathode 26, with only a small influence by the electrolyte 28 or the anode 24.

Figure 158:
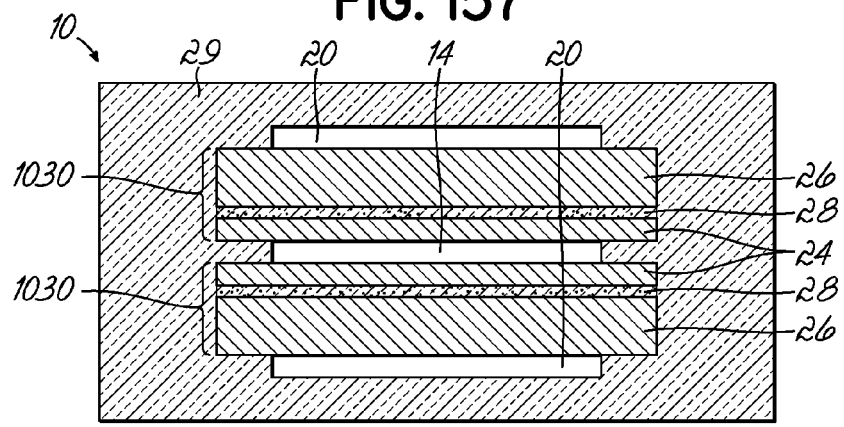
FIGS. 158 and 159 depict in cross-sectional view embodiments for anchoring the electrode structure of FIG. 156 in the ceramic support structure of the device.

The use of extra material 980 in the shape of a picture frame of electrolyte 28 around the anode 24 or cathode 26 to add to the stability of the mechanical structure at the edge 976 has been described (FIGS. 147A-F). A different technique for providing physical stability to the structure during bake, sinter, or operation of the Fuel Cell Stick™ device 10 (et al.) is provided by the thick electrode design. Using the triple layer structure 1030 outlined above, with thicker cathode 24 and thinner electrolyte 28 and anode 24, a different embodiment for construction extends that triple layer structure 1030 into the side margin of the Fuel Cell Stick™ device 10 (et al.), as depicted in FIG. 158. That is, after the triple layer structure 1030 is built up, the gaps or gas passages 14, 20 do not cover the full area of the triple layer structure 1030. The result is that the triple layer structure 1030 seems to extend into the side structure of the Fuel Cell Stick™ device 10 (et al.), such that the triple layer structure 1030 is well anchored to the overall device mechanical design. This design can be used where either the anode 24 or cathode 26 is thicker, or both. In an alternative embodiment, the triple layer structure 1030 may be extended into the side margins of the Fuel Cell Stick™ device 10 (et al.) even if the thickness of the anode 24 and cathode 26 are both as thin as possible, in order to give more strength to the overall device.

Figure 159:
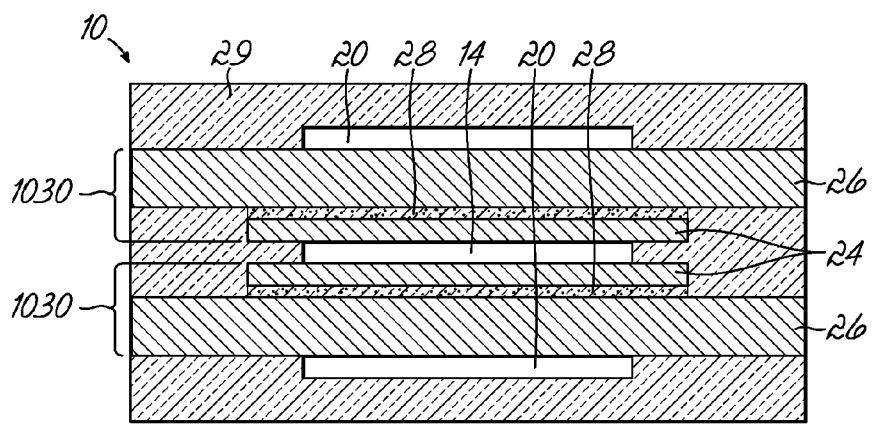
Figure 160A:
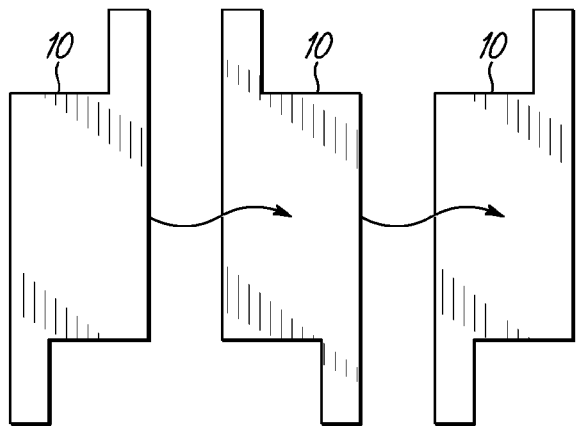
FIGS. 160A-160F are schematic top exploded views and end views for three examples of stacked devices.
Figure 160B:
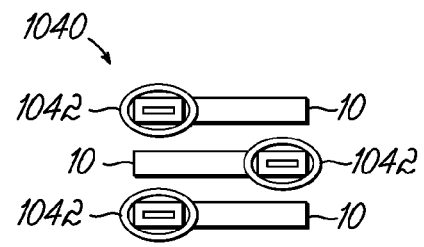
Figure 160C:
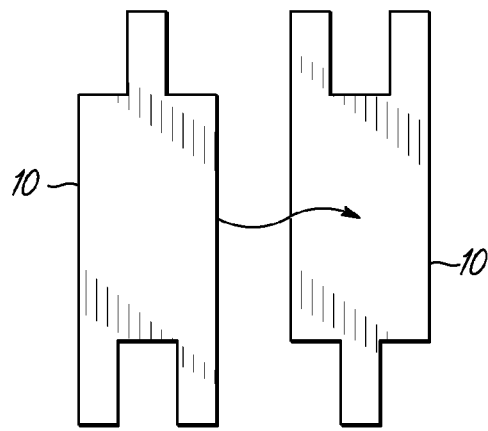
Figure 160D:
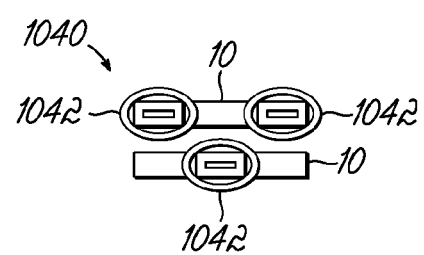
Figure 160E:
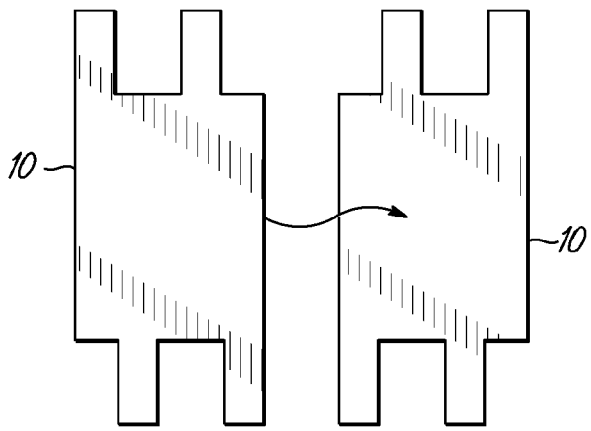
Figure 160F:
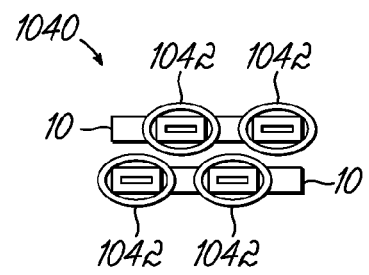

In yet another embodiment, the thicker electrode may extend all the way to the outside of the Fuel Cell Stick™ device 10 (et al.). This can be just the cathode 26, as depicted in FIG. 159, or it can be the entire triple layer structure 1030. In the embodiment depicted in FIG. 159, the thicker cathode 26 is extended all the way to the side for convenience, to enable quality check of the structure, and for maximum structural support.

In one embodiment of the invention, the Fuel Cell Stick™ device 10 (et al.) is built with YSZ as the electrolyte 28 and as the physical surrounding structure, ceramic 29 (e.g., covers, side margin), of the device. Commonly 8% Y is used as the ratio of Yttria in Zirconia (referred to as 8% YSZ), in order to give the highest possible ionic conductivity. In an alternative embodiment, two different types of YSZ are used to build the Fuel Cell Stick™ device 10 (et al.), for example in order to improve the physical strength of the device overall. For example, 8% YSZ is used for the electrolyte 28 to give high ionic conductivity in the electrolyte, and 3% YSZ is used for the surrounding structure ceramic 29 in order to give higher mechanical strength to the physical structure of the Fuel Cell Stick™ device 10 (et al.). This idea is not limited to the use of exactly 3% Y, but 3% is just given as an example.

In using two types of YSZ, there may be some amount of physical mismatch, which could manifest either in bake, sinter, or use of the Fuel Cell Stick™ device 10 (et al.). Technique in forming this composite can take these problems into account. The simplest method is to use layers of the two types of green tape, and alternate between the two types depending on the critical feature of the layer (maximum strength, or maximum conductivity). In an alternative, a single transition layer of tape is used that has a percentage of each 8Y and 3Y, for example in a ratio of 1:1 (e.g., equal parts of the two powders would be mixed together with the slurry before tape casting, for example, resulting in a uniform mixture of the two powders). When transitioning between an 8Y region and a 3Y region, the transition layer, e.g., mixed tape, can be provided. Further, multiple mixed tapes can be used, each with a different ratio of the two materials: 2:1; 1:1; 1:2. In this way, the transition can be made more gradual in order to avoid mismatch problems.

Fuel Cell Stick™ devices 10 (et al.) can be produced with asymmetric inputs/outputs so that they are able to pack densely in a stack of multiple devices 10 (et al.) within the hot zone 32, while also having plenty of room for the cold zone connections to be made to each device 10 (et al.) in the stack. FIGS. 160A-160F depict top exploded views and end views for three examples of asymmetric or staggered stacks 1040 of multiple Fuel Cell Stick™ devices 10 (et al.). Tubes 1042 or connectors on the end(s) of the device(s) 10 (et al.) can be bulky, so the staggered approach can be useful to allow the Fuel Cell Stick™ devices 10 (et al.) to be as physically close to each other in the stack 1040 as possible.

It is also possible to have the ends of the Fuel Cell Stick™ devices 10 (et al.) angle away from the main body at angles other than 0 or 90 degrees, for example, 30 and 60 degree angles can be used in the design of the devices 10 (et al.) to give this extra room for attachment of tubes 1042 in a device stack 1040.

Figure 161:
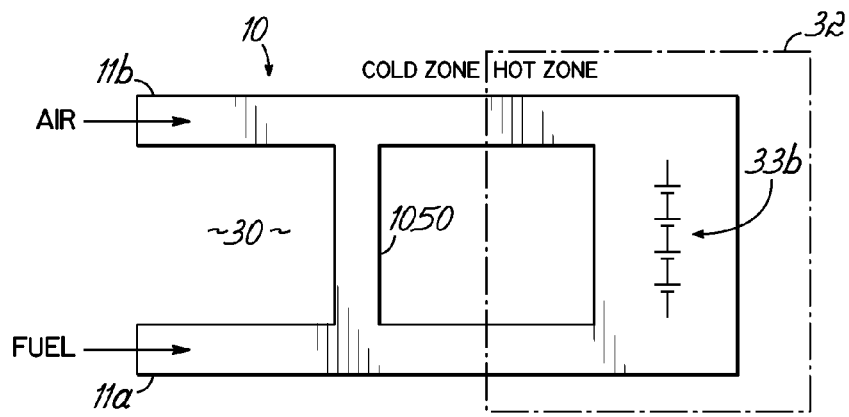
FIG. 161 is a schematic top down view of an embodiment having ends oriented at 90 degrees from the elongate active body.

For use in small products, where few Fuel Cell Stick™ devices 10 (et al.) are needed to give the necessary power, it may be useful to have support members integrated into the devices, as shown in a schematic top down view in FIG. 161. As shown, the end portions 11a, 11b of the elongate device 10 (et al.) are essentially bent at 90 degrees, such that the device 10 (et al.) is reconfigured to essentially have a C-shape (shown backwards, with squared edges). The air input end 11b and the fuel input end 11a are oriented parallel to each other in the cold zone 30 and are connected in the hot zone 32 by the active zone portion 33b of the device oriented perpendicular to the air and fuel input ends 11b, 11a. A support member 1050 is then added in the cold zone 30 to connect the input ends 11a, 11b to add strength for handling and mounting of the device 10 (et al.) in a system. The support member 1050 can be made narrow, thin or with a curve in order to avoid stress due to expansion of the hot portion of the device 10 (et al.). The support member may comprise the same material as ceramic 29, or may be different.

Figure 162:
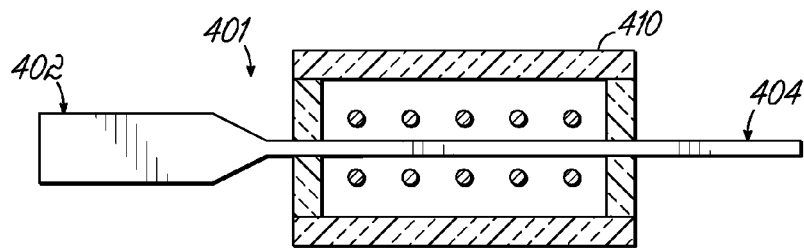
FIG. 162 is a schematic side view of a device having a thin active portion.

It may be useful to make a lightweight Fuel Cell Stick™ device for low power applications, such as a micro-sized unmanned aerial vehicle. Such a device 400 is shown in FIG. 48A. The thin portion 404 contains the active structure of the device 400, while the thick portion 402 contains the gas connection area. This design can facilitate rapid heating, save on overall system weight, and reduce heating requirements due to the low mass. Rather than end-rolling the thin portion 404, in this embodiment of a Fuel Cell Stick™ device 401, the thin portion 404 of the device 401 remains long and flat. Such a small device 401 can enter into a tiny sized heating element and furnace 410, as depicted in FIG. 162.

Figure 163:
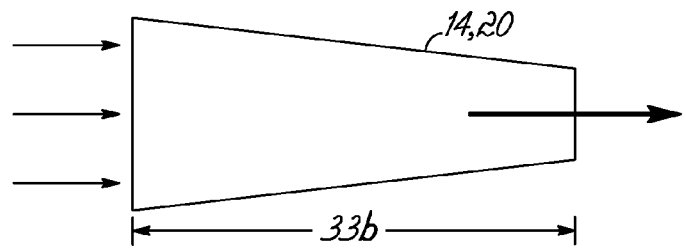

Within a fuel or air passage, one goal is to attain the highest efficiency possible. Just after the gas has entered the active zone 33b of the Fuel Cell Stick™ device 10 (et al.), it is most rich with fuel or oxygen, but near the end of the active zone 33b, most of the fuel or oxygen is removed. When the fuel or oxygen is depleted, the system will require a higher flow rate in order to generate the same power per unit area. To minimize this problem, and in accordance with an embodiment of the invention, the shape of the gas passage 14, 20 is changed in the active zone 33b, so that the gas flow rate is increasing as the percentage of oxygen or fuel is decreasing. FIG. 163 shows a schematic top view of such a gas passage 14, 20 in an active zone 33b. By making an area of the gas passage 14, 20 smaller, the flow rate of the gas will be increased in that area. This is represented by the arrows. In the embodiment depicted in FIG. 163, the area/volume of the gas passage 14, 20 is gradually and continuously decreased along the direction of gas flow, thereby gradually and continuously increasing the flow rate of the gas along the gas passage 14, 20. It may be appreciated that variations are possible, for example, one or more stepped or gradual decreases in area/volume between constant sections of area/volume.

Figure 164:
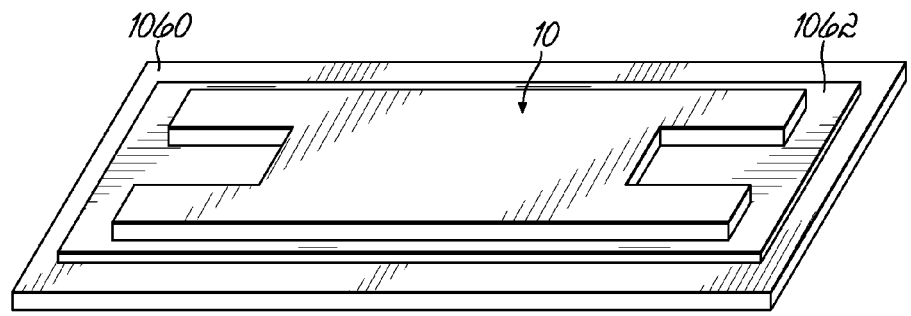

When baking and firing Fuel Cell Stick™ devices 10 (et al.) of the present invention, the devices may have a tendency to warp, possibly due to the large mass and some uneven bake out of the organic material in the device, including from top to bottom. In some instances, the device can develop a high point in the center due to these differences. This high point is not visible until the device has been processed through the highest temperatures of the sintering, even though the root cause may occur at low temperatures. According to an embodiment of the invention, warping that creates a high point can be largely overcome by placing a fibrous ceramic sheet between the Fuel Cell Stick™ device 10 (et al.) and the carrier substrate on which it is held during baking and firing. For example, a felt material made out of Zirconia may be used, although other types of felt or ceramic fabric are contemplated. FIG. 164 depicts a Fuel Cell Stick™ device 10 (et al.) prepared for bake-out and firing on a carrier substrate 1060 covered with a fibrous ceramic sheet 1062 that is a ceramic cloth, felt, or fibrous "wool". In addition, the use of zirconia felt or other fibrous ceramic sheet 1062 allows freedom to choose a carrier substrate 1060 that is otherwise incompatible (chemically) with the composition of the Fuel Cell Stick™ device 10 (et al.) because it acts as a buffer between the zirconia-based device and the foreign carrier substrate material. Finally, the Fuel Cell Stick™ device 10 (et al.) can be so heavy that it can stick to the carrier substrate material during sintering, whereas the softness and compliance of the fibrous material can allow the device 10 (et al.) to shrink without binding to the carrier substrate 1060.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A fuel cell device comprising:
   a ceramic support structure having a length in an x direction from a first end to a second end, a width in a y direction from a first side to a second side, and a thickness in a z direction from a top surface to a bottom surface, wherein the length is greater than the width or thickness whereby the x direction of the ceramic support structure is a dominant direction of thermal expansion;
   a reaction zone positioned along a first portion of the length spaced from the first end and having at least one active layer therein within the ceramic support structure comprising an electrolyte separating a first electrode from an opposing second electrode, an active first gas passage adjacent the first electrode, and an active second gas passage adjacent the second electrode, wherein each of the active first and second gas passages has a thickness in the z direction, and wherein the active first gas passage comprises a plurality of first sub-passages extending in the y direction and spaced apart in the x direction;
   a first artery flow passage extending from the first end in the x direction and into the reaction zone and having a thickness in the z direction, the first artery flow passage fluidicly coupled to each of the plurality of first sub-passages, wherein the plurality of first sub-passages extend from the first artery flow passage in the y direction toward at least one of the first or second sides and wherein the thickness of the first artery flow passage is greater than the thickness of each of the plurality of first sub-passages of the active first gas passage.

2. The fuel cell device of claim 1, wherein the first artery flow passage extends along the length adjacent the first side and the plurality of first sub-passages extend from the first artery flow passage in the y direction toward the second side.

3. The fuel cell device of claim 2, further comprising a second artery flow passage extending from the first end in the x direction along the length adjacent the second side and into the reaction zone and having a thickness in the z direction, the second artery flow passage fluidicly coupled to the active second gas passage comprising a plurality of second sub-passages spaced apart in the x direction and extending in the y direction toward the first side, and wherein the thickness of the second artery flow passage is greater than the thickness of each of the plurality of second sub-passages of the active second gas passage.

4. The fuel cell device of claim 3, wherein the at least one active layer comprises a plurality of active layers, and wherein the first artery flow passage is coupled to each of the active first gas passages and the second artery flow passage is coupled to each of the active second gas passages.

5. The fuel cell device of claim 3, wherein each of the plurality of first sub-passages decreases in area and/or volume between the first artery flow passage and the second side and each of the plurality of second sub-passages decreases in area and/or volume between the second artery flow passage and the first side.

6. The fuel cell device of claim 5, wherein the decrease in area and/or volume for each of the plurality of first and second sub-passages is a continuous decrease.

7. The fuel cell device of claim 5, wherein the decrease in area and/or volume for each of the plurality of first and second sub-passages is a stepped decrease.

8. The fuel cell device of claim 3, wherein the first end includes a groove extending in the x direction between the first side and the second side thereby splitting the first end into a first side end portion and a second side end portion, wherein the first artery flow passage extends from the first side end portion along the length adjacent the first side into the reaction zone, and wherein the second artery flow passage extends from the second side end portion along the length adjacent the second side into the reaction zone.

9. The fuel cell device of claim 8, wherein the second end includes a groove extending in the x direction between the first side and the second side thereby splitting the second end into a first side end portion and a second side end portion, wherein the plurality of first sub-passages are fluidicly coupled to a first artery exhaust passage extending along the length adjacent the second side from the reaction zone to the second side end portion of the second end and the plurality of second sub-passages are fluidicly coupled to a second artery exhaust passage extending along the length adjacent the first side from the reaction zone to the first side end portion of the second end.

10. The fuel cell device of claim 1, wherein the reaction zone positioned along the first portion of the length is spaced from the second end; wherein the active second gas passage comprises a plurality of second sub-passages extending in the y direction and spaced apart in the x direction; and further comprising a second artery flow passage extending from the second end in the x direction and into the reaction zone and having a thickness in the z direction, the second artery flow passage fluidicly coupled to each of the plurality of second sub-passages, wherein the plurality of second sub-passages extend from the second artery flow passage in the y direction toward at least one of the first or second sides, and wherein the thickness of the second artery flow passage is greater than the thickness of each of the plurality of second sub-passages of the active second gas passage.

11. The fuel cell device of claim 10, wherein the at least one active layer comprises a plurality of active layers, and wherein the first artery flow passage is coupled to each of the active first gas passages and the second artery flow passage is coupled to each of the active second gas passages.

12. The fuel cell device of claim 10, wherein the first artery flow passage extends along the length adjacent the first side and the plurality of first sub-passages extend from the first artery flow passage in the y direction toward the second side, and wherein the second artery flow passage extends along the length adjacent the second side and the plurality of second sub-passages extend from the second artery flow passage in the y direction toward the first side.

13. The fuel cell device of claim 12, further comprising a plurality of first vertical flow channels extending in the z direction from each of the plurality of first sub-passages toward one of the top or bottom surface adjacent to but not intersecting the second artery flow passage on the second side, and a plurality of second vertical flow channels extending in the z direction from each of the plurality of second sub-passages toward one of the top or bottom surface adjacent to but not intersecting the first artery flow passage on the first side.

14. The fuel cell device of claim 13, further comprising a first exit flow channel on or adjacent to the one of the top or bottom surface fluidicly coupled to each of the plurality of first vertical flow channels and extending in the x direction toward the second end to a desired first exit point, and a second exit flow channel on or adjacent to the one of the top or bottom surface fluidicly coupled to each of the plurality of second vertical flow channels and extending in the x direction toward the first end to a desired second exit point.

15. The fuel cell device of claim 12, wherein the first and second ends each include a groove extending in the x direction between the first side and the second side thereby splitting each of the first and second ends into first and second side end portions, wherein the first artery flow passage extends from the first side end portion of the first end along the length adjacent the first side into the reaction zone, and wherein the second artery flow passage extends from the second side end portion of the second end along the length adjacent the second side into the reaction zone.

16. The fuel cell device of claim 15, wherein the plurality of first sub-passages are fluidicly coupled to a first artery exhaust passage extending along the length adjacent the second side from the reaction zone to the second side end portion of the second end and the plurality of second sub-passages are fluidicly coupled to a second artery exhaust passage extending along the length adjacent the first side from the reaction zone to the first side end portion of the first end.

17. The fuel cell device of claim 10, wherein each of the plurality of first and second sub-passages decreases in area and/or volume between the respective first and second artery flow passages and the at least one of the first or second sides.

18. The fuel cell device of claim 17, wherein the decrease in area and/or volume for each of the plurality of first and second sub-passages is a continuous decrease.

19. The fuel cell device of claim 17, wherein the decrease in area and/or volume for each of the plurality of first and second sub-passages is a stepped decrease.

20. A fuel cell system comprising a plurality of the devices of claim 1, the system further comprising:
  a hot zone chamber having the plurality of devices positioned therein and a heat source coupled thereto and adapted to raise the temperature within the hot zone chamber to heat the plurality of devices to an operating temperature;
  a gas supply system positioned outside the hot zone chamber; and
  one or more fluid conduits coupled to the first ends of the plurality of devices in the hot zone chamber and to the gas supply system outside the hot zone chamber for supplying gas into the hot zone chamber to the first artery flow passages.

21. A fuel cell system comprising a plurality of the devices of claim 3, the system further comprising:
  a hot zone chamber having the plurality of devices positioned therein and a heat source coupled thereto and adapted to raise the temperature within the hot zone chamber to heat the plurality of devices to an operating temperature;
  a gas supply system positioned outside the hot zone chamber; and
  one or more conduits fluidicly coupled to the first ends of the devices in the hot zone chamber and to the gas supply system outside the hot zone chamber for supplying first and second gases into the hot zone chamber to the respective first and second artery flow passages.

22. A fuel cell system comprising a plurality of the devices of claim 8, the system further comprising:
  a hot zone chamber having the reaction zones of the plurality of devices positioned therein with at least a portion of the split first ends extending outside the hot zone chamber, and a heat source coupled thereto and adapted to raise the temperature within the hot zone chamber to heat the reaction zones to an operating temperature;
  a gas supply system positioned outside the hot zone chamber;
  one or more first fluid conduits coupled to the first side end portions of the first ends of the devices outside the hot zone chamber for supplying a first gas through the first artery flow passages into the reaction zones in the hot zone chamber; and
  one or more second fluid conduits coupled to the second side end portions of the first ends of the devices outside the hot zone chamber for supplying a second gas through the second artery flow passages into the reaction zones in the hot zone chamber.

23. A fuel cell system comprising a plurality of the devices of claim 9, the system further comprising:
  a hot zone chamber having the reaction zones of the plurality of devices positioned therein with at least a portion of the split first ends and second ends extending outside the hot zone chamber, and a heat source coupled thereto and adapted to raise the temperature within the hot zone chamber to heat the reaction zones to an operating temperature;
  a gas supply system positioned outside the hot zone chamber;
  one or more first fluid conduits coupled to the first side end portions of the first ends of the devices outside the hot zone chamber for supplying a first gas through the first artery flow passages into the reaction zones in the hot zone chamber; and
  one or more second fluid conduits coupled to the second side end portions of the first ends of the devices outside the hot zone chamber for supplying a second gas through the second artery flow passages into the reaction zones in the hot zone chamber; and
  an exhaust gas receiving system coupled to the first and second side end portions of the second ends outside the hot zone chamber for receiving exhaust gases from the first and second artery exhaust passages.

24. A fuel cell system comprising a plurality of the devices of claim 10, the system further comprising:
  a hot zone chamber having the plurality of devices positioned therein and a heat source coupled thereto and adapted to raise the temperature within the hot zone chamber to heat the plurality of devices to an operating temperature;

a gas supply system positioned outside the hot zone chamber;

one or more first fluid conduits coupled to the first ends of the devices in the hot zone chamber and to the gas supply system outside the hot zone chamber for supplying a first gas into the hot zone chamber to the first artery flow passages; and one or more second fluid conduits coupled to the second ends of the devices in the hot zone chamber and to the gas supply system outside the hot zone chamber for supplying a second gas into the hot zone chamber to the second artery flow passages.

25. A fuel cell system comprising a plurality of the devices of claim 16, the system further comprising:

a hot zone chamber having the reaction zones of the plurality of devices positioned therein with at least a portion of the split first ends and second ends extending outside the hot zone chamber, and a heat source coupled thereto and adapted to raise the temperature within the hot zone chamber to heat the reaction zones to an operating temperature;

a gas supply system positioned outside the hot zone chamber;

one or more first fluid conduits coupled to the first side end portions of the first ends of the devices outside the hot zone chamber for supplying a first gas through the first artery flow passages into the reaction zones in the hot zone chamber; and one or more second fluid conduits coupled to the second side end portions of the second ends of the devices outside the hot zone chamber for supplying a second gas through the second artery flow passages into the reaction zones in the hot zone chamber; and an exhaust gas receiving system coupled to the second side end portions of the first ends and to the first side end portions of the second ends outside the hot zone chamber for receiving exhaust gases from the first and second artery exhaust passages.

26. A fuel cell device comprising:

a ceramic support structure having a length in an x direction from a first end to a second end, a width in a y direction from a first side to a second side, and a thickness in a z direction from a top surface to a bottom surface, wherein the length is greater than the width or thickness whereby the x direction of the ceramic support structure is a dominant direction of thermal expansion;

a heated zone positioned along a first portion of the length spaced from the first end and having an active zone with at least one active layer therein within the ceramic support structure comprising an electrolyte separating a first electrode from an opposing second electrode;

a first artery flow passage extending from the first end in the x direction and into the heated zone and having a thickness in the z direction;

a plurality of active first gas passages positioned side-by-side and spaced apart in the x direction adjacent the first electrode and extending from the first artery flow passage in the y direction through the active zone toward at least one of the first or second sides; and one or more active second gas passages adjacent the second electrode and extending through the active zone, wherein each of the active first and second gas passages has a thickness in the z direction, and the thickness of the first artery flow passage is greater than the thickness of each of the plurality of active first gas passages to feed a large volume of an inputted gas into the heated zone for distribution to the plurality of active first gas passages for reacting with the first electrode along a plurality of separate reaction pathways in the active zone.

27. The fuel cell device of claim 26, wherein the first artery flow passage extends along the length adjacent the first side and the plurality of active first gas passages extend from the first artery flow passage in the y direction toward the second side.

28. The fuel cell device of claim 27, further comprising a second artery flow passage extending from the first end in the x direction along the length adjacent the second side and into the heated zone and having a thickness in the z direction, the one or more active second gas passages comprising a plurality of active second gas passages positioned side-by-side and spaced apart in the x direction adjacent the second electrode and extending from the second artery flow passage in the y direction through the active zone toward the first side, and wherein the thickness of the second artery flow passage is greater than the thickness of each of the plurality of active second gas passages.

29. The fuel cell device of claim 28, wherein the at least one active layer comprises a plurality of active layers, and wherein the first artery flow passage is coupled to each of the active first gas passages in each of the plurality of active layers and the second artery flow passage is coupled to each of the active second gas passages in each of the plurality of active layers.

30. The fuel cell device of claim 28, wherein each of the plurality of active first gas passages decreases in area and/or volume between the first artery flow passage and the second side and each of the plurality of active second gas passages decreases in area and/or volume between the second artery flow passage and the first side.

31. The fuel cell device of claim 30, wherein the decrease in area and/or volume for each of the plurality of active first and second gas passages is a continuous decrease.

32. The fuel cell device of claim 30, wherein the decrease in area and/or volume for each of the plurality of active first and second gas passages is a stepped decrease.

33. The fuel cell device of claim 26, wherein the heated zone positioned along the first portion of the length is spaced from the second end, and further comprising a second artery flow passage extending from the second end in the x direction and into the heated zone and having a thickness in the z direction; and wherein the one or more active second gas passages comprises a plurality of active second gas passages positioned side-by-side and spaced apart in the x direction adjacent the second electrode and extending from the second artery flow passage in the y direction through the active zone toward at least one of the first or second sides, the thickness of the second artery flow passage being greater than the thickness of each of the plurality of active second gas passages.

34. The fuel cell device of claim 33, wherein the at least one active layer comprises a plurality of active layers, and wherein the first artery flow passage is coupled to each of the active first gas passages in each of the plurality of active layers and the second artery flow passage is coupled to each of the active second gas passages in each of the plurality of active layers.

35. The fuel cell device of claim 33, wherein the first artery flow passage extends along the length adjacent the first side and the plurality of active first gas passages extend from the first artery flow passage in the y direction toward the second side, and wherein the second artery flow passage extends along the length adjacent the second side and the plurality of active second gas passages extend from the second artery flow passage in the y direction toward the first side.

36. The fuel cell device of claim 35, further comprising a plurality of first vertical flow channels extending in the z direction from each of the plurality of active first gas passages toward one of the top or bottom surface adjacent to but not intersecting the second artery flow passage on the second side, and a plurality of second vertical flow channels extending in the z direction from each of the plurality of active second gas passages toward one of the top or bottom surface adjacent to but not intersecting the first artery flow passage on the first side.

37. The fuel cell device of claim 36, further comprising a first exit flow channel on or adjacent to the one of the top or bottom surface fluidicly coupled to each of the plurality of first vertical flow channels and extending in the x direction toward the second end to a desired first exit point, and a second exit flow channel on or adjacent to the one of the top or bottom surface fluidicly coupled to each of the plurality of second vertical flow channels and extending in the x direction toward the first end to a desired second exit point.

38. The fuel cell device of claim 33, wherein each of the plurality of first and second sub-passages decreases in area and/or volume between the respective first and second artery flow passages and the at least one of the first or second sides.

39. The fuel cell device of claim 38, wherein the decrease in area and/or volume for each of the plurality of active first and second gas passages is a continuous decrease.

40. The fuel cell device of claim 38, wherein the decrease in area and/or volume for each of the plurality of active first and second gas passages is a stepped decrease.

41. A fuel cell system comprising a plurality of the devices of claim 26, the system further comprising:
   a hot zone chamber having the plurality of devices positioned therein and a heat source coupled thereto and adapted to raise the temperature within the hot zone chamber to heat the plurality of devices to an operating temperature;
   a gas supply system positioned outside the hot zone chamber; and
   one or more fluid conduits coupled to the first ends of the plurality of devices in the hot zone chamber and to the gas supply system outside the hot zone chamber for supplying gas into the hot zone chamber to the first artery flow passages.

42. A fuel cell system comprising a plurality of the devices of claim 28, the system further comprising:
   a hot zone chamber having the plurality of devices positioned therein and a heat source coupled thereto and adapted to raise the temperature within the hot zone chamber to heat the plurality of devices to an operating temperature;
   a gas supply system positioned outside the hot zone chamber; and
   one or more conduits fluidicly coupled to the first ends of the devices in the hot zone chamber and to the gas supply system outside the hot zone chamber for supplying first and second gases into the hot zone chamber to the respective first and second artery flow passages.

43. A fuel cell system comprising a plurality of the devices of claim 33, the system further comprising:
   a hot zone chamber having the plurality of devices positioned therein and a heat source coupled thereto and adapted to raise the temperature within the hot zone chamber to heat the plurality of devices to an operating temperature;
   a gas supply system positioned outside the hot zone chamber;
   one or more first fluid conduits coupled to the first ends of the devices in the hot zone chamber and to the gas supply system outside the hot zone chamber for supplying a first gas into the hot zone chamber to the first artery flow passages; and
   one or more second fluid conduits coupled to the second ends of the devices in the hot zone chamber and to the gas supply system outside the hot zone chamber for supplying a second gas into the hot zone chamber to the second artery flow passages.

\* \* \* \* \*